United States Patent
Beauchesne et al.

(10) Patent No.: US 12,553,024 B2
(45) Date of Patent: Feb. 17, 2026

(54) SERUM-FREE MEDIA FORMULATION FOR CULTURING CELLS AND METHODS OF USE THEREOF

(71) Applicant: Juno Therapeutics, Inc., Seattle, WA (US)

(72) Inventors: Pascal Beauchesne, Seattle, WA (US); Kien Khuu-Duong, Seattle, WA (US); Ivie Aifuwa, Seattle, WA (US); Calvin Chan, Seattle, WA (US)

(73) Assignee: Juno Therapeutics, Inc., Seattle, WA (US)

( * ) Notice: Subject to any disclaimer, the term of this patent is extended or adjusted under 35 U.S.C. 154(b) by 137 days.

(21) Appl. No.: 16/770,052

(22) PCT Filed: Dec. 7, 2018

(86) PCT No.: PCT/US2018/064627
§ 371 (c)(1),
(2) Date: Jun. 4, 2020

(87) PCT Pub. No.: WO2019/113556
PCT Pub. Date: Jun. 13, 2019

(65) Prior Publication Data
US 2021/0207080 A1    Jul. 8, 2021

Related U.S. Application Data

(60) Provisional application No. 62/596,766, filed on Dec. 8, 2017.

(51) Int. Cl.
| | | |
|---|---|---|
| C12N 5/00 | (2006.01) |
| A61K 40/11 | (2025.01) |
| A61K 40/31 | (2025.01) |
| A61K 40/42 | (2025.01) |
| C12N 5/0783 | (2010.01) |

(52) U.S. Cl.
CPC ............ *C12N 5/0031* (2013.01); *A61K 40/11* (2025.01); *A61K 40/31* (2025.01); *A61K 40/4215* (2025.01); *C12N 5/0636* (2013.01); *A61K 2239/31* (2023.05); *A61K 2239/38* (2023.05); *A61K 2239/48* (2023.05); *C12N 2500/32* (2013.01); *C12N 2500/90* (2013.01); *C12N 2501/2302* (2013.01); *C12N 2501/2307* (2013.01); *C12N 2501/2315* (2013.01); *C12N 2501/515* (2013.01); *C12N 2510/00* (2013.01)

(58) Field of Classification Search
CPC ............... C12N 5/0031; C12N 5/0636; C12N 2500/90; C12N 2501/2302; C12N 2501/2307; C12N 2501/2315; C12N 2500/99
See application file for complete search history.

(56) References Cited

U.S. PATENT DOCUMENTS

| | | |
|---|---|---|
| 4,452,773 A | 6/1984 | Molday |
| 4,690,915 A | 9/1987 | Rosenberg |
| 4,795,698 A | 1/1989 | Owen |
| 5,087,616 A | 2/1992 | Myers |
| 5,168,062 A | 12/1992 | Stinski |
| 5,200,084 A | 4/1993 | Liberti |
| 5,219,740 A | 6/1993 | Miller |
| 5,385,839 A | 1/1995 | Stinski |
| 5,994,136 A | 11/1999 | Naldini et al. |
| 6,013,516 A | 1/2000 | Verma et al. |
| 6,040,177 A | 3/2000 | Riddell et al. |
| 6,060,273 A | 5/2000 | Dirks et al. |
| 6,123,655 A | 9/2000 | Fell |
| 6,207,453 B1 | 3/2001 | Maass |
| 6,410,319 B1 | 6/2002 | Raubitschek |
| 6,451,995 B1 | 9/2002 | Cheung |
| 6,733,433 B1 | 5/2004 | Fell |
| 7,070,995 B2 | 7/2006 | Jensen |
| 7,265,209 B2 | 9/2007 | Jensen |
| 7,354,762 B2 | 4/2008 | Jensen |
| 7,446,179 B2 | 11/2008 | Jensen |
| 7,446,190 B2 | 11/2008 | Sadelain |
| 7,446,191 B2 | 11/2008 | Jensen |
| 8,008,450 B2 | 8/2011 | Williams et al. |
| 8,153,765 B2 | 4/2012 | Park et al. |
| 8,324,353 B2 | 12/2012 | Jensen |
| 8,339,645 B2 | 12/2012 | Nakawaki |
| 8,389,282 B2 | 3/2013 | Sadelain et al. |

(Continued)

FOREIGN PATENT DOCUMENTS

| | | |
|---|---|---|
| CN | 104 450 614 A | 3/2015 |
| CN | 106 635 955 A | 5/2017 |

(Continued)

OTHER PUBLICATIONS

US 8,252,592 B2, 08/2012, Sadelain (withdrawn)
EX-CELL 302. Material Safety Data Sheet. SAFC Bioscience. p. 1-2. (Year: 2006).*
Technical Bulletin. Animal-Component Free Recombinant Human Insulin is Suitable for Use in Serum-Free Media. SAFC Bioscience. p. 1-4 (Year: 2006).*
Karnieli et al. A consensus introduction to serum replacements and serum-free media for cellular therapies. Cytotherapy, 2017; 19: 155-169 (Year: 2017).*
Jeon et al. Development of a serum-free medium for in vitro expansion of human cytotoxic T lymphocytes using a statistical design. BMC Biotechnology Oct. 2010:70. p. 1-9 (Year: 2010).*

(Continued)

*Primary Examiner* — Taeyoon Kim
(74) *Attorney, Agent, or Firm* — Morrison & Foerster LLP

(57) ABSTRACT

Provided herein is a serum-free media for culturing, such as cultivating, preparing and/or producing cells, such as immune cells, such as genetically engineered cells. Also provided is a liquid basal media and frozen supplements that can be used to produce serum-free media. The provided embodiments include methods for producing serum-free media and methods for culturing cells, such as activating, transducing, cultivating or expanded cells, in the presence of serum-free media.

13 Claims, 2 Drawing Sheets

Specification includes a Sequence Listing.

(56) References Cited

U.S. PATENT DOCUMENTS

| | | |
|---|---|---|
| 8,479,118 B2 | 7/2013 | Lyndersay et al. |
| 8,603,477 B2 | 12/2013 | Afar et al. |
| 8,802,374 B2 | 8/2014 | Jensen |
| 8,822,647 B2 | 9/2014 | Jensen |
| 8,911,993 B2 | 12/2014 | June et al. |
| 10,131,882 B2 | 11/2018 | Angel et al. |
| 10,428,351 B2 | 10/2019 | Crisman et al. |
| 11,466,253 B2 | 10/2022 | Germeroth et al. |
| 11,851,678 B2 | 12/2023 | Mujacic et al. |
| 12,258,580 B2 | 3/2025 | Lee et al. |
| 2002/0131960 A1 | 9/2002 | Sadelain |
| 2002/0150914 A1 | 10/2002 | Anderse et al. |
| 2003/0170238 A1 | 9/2003 | Gruenberg et al. |
| 2003/0223994 A1 | 12/2003 | Hoogenboom et al. |
| 2004/0191260 A1 | 9/2004 | Reiter et al. |
| 2006/0034850 A1 | 2/2006 | Weidanz et al. |
| 2007/0092530 A1 | 4/2007 | Weidanz et al. |
| 2007/0116690 A1 | 5/2007 | Yang et al. |
| 2008/0171951 A1 | 7/2008 | Fell |
| 2009/0226474 A1 | 9/2009 | Weidanz et al. |
| 2009/0233360 A1 | 9/2009 | Baghbaderani et al. |
| 2009/0304679 A1 | 12/2009 | Weidanz |
| 2010/0260748 A1 | 10/2010 | Elkins et al. |
| 2011/0003380 A1 | 1/2011 | Miltenyi |
| 2011/0293667 A1 | 12/2011 | Baksh et al. |
| 2012/0189622 A1 | 7/2012 | Tesar et al. |
| 2013/0029418 A1 | 1/2013 | Angel et al. |
| 2013/0149337 A1 | 6/2013 | Cooper et al. |
| 2013/0287748 A1 | 10/2013 | June |
| 2014/0255993 A1 | 9/2014 | Follstad et al. |
| 2014/0271635 A1 | 9/2014 | Brogdon et al. |
| 2014/0294841 A1 | 10/2014 | Scheinberg et al. |
| 2015/0283178 A1 | 10/2015 | June et al. |
| 2016/0152723 A1 | 6/2016 | Chen et al. |
| 2016/0362472 A1 | 12/2016 | Bitter et al. |
| 2017/0037369 A1 | 2/2017 | Ramsborg et al. |
| 2017/0051252 A1 | 2/2017 | Morgan et al. |
| 2017/0209492 A1 | 7/2017 | June et al. |
| 2020/0239910 A1 | 7/2020 | Bonyhadi |
| 2020/0354677 A1 | 11/2020 | Lee et al. |
| 2020/0384025 A1 | 12/2020 | Mujacic et al. |
| 2021/0017249 A1 | 1/2021 | Sather et al. |
| 2021/0163893 A1 | 6/2021 | Westoby et al. |
| 2023/0090117 A1 | 3/2023 | Haig et al. |
| 2024/0076617 A1 | 3/2024 | Mujacic et al. |
| 2025/0171739 A1 | 5/2025 | Lee et al. |

FOREIGN PATENT DOCUMENTS

| | | |
|---|---|---|
| CN | 106 754 670 A | 5/2017 |
| CN | 106 801 032 | 6/2017 |
| CN | 106 834 218 | 6/2017 |
| EP | 0452342 | 10/1991 |
| EP | 2537416 | 12/2012 |
| EP | 3372670 | 9/2018 |
| WO | WO 1992/008796 | 5/1992 |
| WO | WO 1994/028143 | 12/1994 |
| WO | WO 1996/013593 | 5/1996 |
| WO | WO 1996/018105 | 6/1996 |
| WO | WO 1999/018129 | 4/1999 |
| WO | WO 1999/060120 | 11/1999 |
| WO | WO 2000/014257 | 3/2000 |
| WO | WO 2000/038762 | 7/2000 |
| WO | WO 2003/020763 | 3/2003 |
| WO | WO 2003/068201 | 8/2003 |
| WO | WO 2004/033685 | 4/2004 |
| WO | WO 2006/000830 | 1/2006 |
| WO | WO 2006/099875 | 9/2006 |
| WO | WO 2008/035631 | 3/2008 |
| WO | WO 2009/072003 | 6/2009 |
| WO | WO 2009/076524 | 6/2009 |
| WO | WO 2009/080829 | 7/2009 |
| WO | WO 2010/033140 | 3/2010 |
| WO | WO 2010/104949 | 9/2010 |
| WO | WO 2011/044186 | 4/2011 |
| WO | WO 2012/081650 | 6/2012 |
| WO | WO 2012/092612 | 7/2012 |
| WO | WO 2012/129514 | 9/2012 |
| WO | WO 2013/071154 | 5/2013 |
| WO | WO 2013/123061 | 8/2013 |
| WO | WO 2013/126726 | 8/2013 |
| WO | WO 2013/163171 | 10/2013 |
| WO | WO 2013/166321 | 11/2013 |
| WO | WO 2014/031687 | 2/2014 |
| WO | WO-2014/055668 | 4/2014 |
| WO | WO 2014/210064 | 12/2014 |
| WO | WO 2015/095895 | 6/2015 |
| WO | WO 2015/157252 | 10/2015 |
| WO | WO 2015/157384 | 10/2015 |
| WO | WO 2015/158868 | 10/2015 |
| WO | WO 2015/164675 | 10/2015 |
| WO | WO 2015/164745 | 10/2015 |
| WO | WO 2015/181253 | 12/2015 |
| WO | WO 2016/019300 | 2/2016 |
| WO | WO 2016/073602 | 5/2016 |
| WO | WO 2016/090190 | 6/2016 |
| WO | WO 2016/090312 | 6/2016 |
| WO | WO 2016/090320 | 6/2016 |
| WO | WO 2016/090327 | 6/2016 |
| WO | WO 2016/090329 | 6/2016 |
| WO | WO 2016/090369 | 6/2016 |
| WO | WO 2016/109410 | 7/2016 |
| WO | WO 2016/164580 | 10/2016 |
| WO | WO 2016/164731 | 10/2016 |
| WO | WO 2017/015427 | 1/2017 |
| WO | WO 2017/015490 | 1/2017 |
| WO | WO 2017/023803 | 2/2017 |
| WO | WO 2017/027291 | 2/2017 |
| WO | WO 2017/068421 | 4/2017 |
| WO | WO 2017/070337 | 4/2017 |
| WO | WO 2017/096329 | 6/2017 |
| WO | WO 2017/156479 | 9/2017 |
| WO | WO 2017/157505 | 9/2017 |
| WO | WO 2017/161353 | 9/2017 |
| WO | WO 2017/173256 | 10/2017 |
| WO | WO 2017/177137 | 10/2017 |
| WO | WO 2018/106732 | 6/2018 |
| WO | WO 2018/162352 | 9/2018 |
| WO | WO 2018/191723 | 10/2018 |
| WO | WO 2019/089855 | 5/2019 |
| WO | WO 2019/113556 | 6/2019 |
| WO | WO 2019/113557 | 6/2019 |
| WO | WO 2020/033927 | 2/2020 |

OTHER PUBLICATIONS

GlutaMAX-1. Gibco. p. 1 (Year: 2010).*
RPMI-1640 medium. Sigma-Aldrich. p. 1-2 (Year: 2007).*
WHO unit chart. PeproTech. downloaded from https://www.peprotech.com/en/who-unit-chart. p. 1-2 (Year: 2023).*
RPMI 1640. catalog #32404, downloaded from https://www.thermofisher.com/us/en/home/technical-resources/media-formulation.192.html. p.1-2 (Year: 2023).*
Litvinova et al. The Influence of Immunoregulatory Cytokines IL-2, IL-7, and IL-15 upon Activation, Proliferation, and Apoptosis of Immune Memory T-cells in vitro Cell and Tissue Biology, 2013, vol. 7, No. 6, pp. 539-544 (Year: 2013).*
Al-Lazikani et al., "Standard conformations for the canonical structures of immunoglobulins," J Mol Biol (1997) 273(4):927-948.
Alonso-Camino et al., "CARbodies: Human Antibodies Against Cell Surface Tumor Antigens Selected From Repertoires Displayed on T Cell Chimeric Antigen Receptors," Mol Ther Nucl Acids (2013) 2: e93.
Barrett et al., "Chimeric Antigen Receptor Therapy for Cancer," Annu Rev Med (2014) 65:333-347.
Baum et al., "Retrovirus Vectors: Toward the plentivirus," Mol Ther (2006) 13:1050-1063.
Benson et al., "CS1-Directed monoclonal antibody therapy for multiple myeloma," J Clin Oncol (2012) 30(16):2012-2015.
Boris-Lawrie et al., "Recent advances in retrovirus vector technology," Cur. Opin. Genet. Develop. (1993) 3:102-109.

(56) References Cited

OTHER PUBLICATIONS

Brash et al., "Strontium phosphate transfection of human cells in primary culture: stable expression of the simian virus 40 large-T-antigen gene in primary human bronchial epithelial cells," Mol. Cell Biol. (1987) 7: 2031-2034.
Brentjens et al., "CD19-targeted T cells rapidly induce molecular remissions in adults with chemotherapy-refractory acute lymphoblastic leukemia," Sci Transl Med. (2013) 5(177):177ra38.
Brown et al., "Structure-Based Mutagenesis of the Human Immunodeficiency Virus Type 1 DNA Attachment Site: Effects on Integration and cDNA Synthesis," J Viral (1999) 73(11):9011-9020.
Burns et al., "Vesicular stomatitis virus G glycoprotein pseudotyped retroviral vectors: concentration to very high titer and efficient gene transfer into mammalian and nonmammalian cells," Proc. Natl. Acad. Sci. USA (1993) 90:8033-8037.
Carlens et al., "Ex vivo T lymphocyte expansion for retroviral transduction: influence of serum-free media on variations in cell expansion rates and lymphocyte subset distribution," Exp Hematol (2000) 28(10): 1137-1146.
Carpenter et al., "B-cell maturation antigen is a promising target for adoptive T-cell therapy of multiple myeloma," Clin Cancer Res. (2013) 19:2048-2060.
Cavalieri et al., "Human T lymphocytes transduced by lentiviral vectors in the absence of TCR activation maintain an intact immune competence," Blood (2003) 102(2): 497-505.
Cheadle et al., "Chimeric antigen receptors for T-cell based therapy," Methods Mol Biol (2012) 907:645-666.
Cheever et al., "The prioritization of cancer antigens: a national cancer institute pilot project for the acceleration of translational research." Clin Cancer Res. Sep. 1, 2009;15(17):5323-37.
Chervin et al., "Engineering higher affinity T cell receptors using a T cell display system," J Immunol Methods. (2008) 339(2): 175-84.
Chicaybam et al., "An efficient low cost method for gene transfer to T lymphocytes," PLoS One (2013) 8(3): e60298.
Cho et al., "Human mammalian cell sorting using a highly integrated micro-fabricated fluorescence-activated cell sorter (μFACS)," Lab on a Chip (2010) 10:1567-1573.
Chothia et al., "The outline structure of the T-cell alpha beta receptor," EMBO J. (1988) 7(12): 3745-55.
Chu et al., "CS1-specific chimeric antigen receptor (CAR)-engineered natural killer cells enhance in vitro and in vivo antitumor activity against human multiple myeloma," Leukemia (2014) 28(4):917-927.
Clackson et al., "Making antibody fragments using phage display libraries," Nature (1991) 352(6336):624-628.
Cohen et al., "Recognition of Fresh Human Tumor by Human Peripheral Blood Lymphocytes Transduced with a Bicistronic Retroviral Vector Encoding a Murine Anti-p53 TCR," J Immunol (2005) 175(9):5799-5808.
Cohen et al., "Recombinant antibodies with MHC-restricted, peptide-specific, T-cell receptor-like specificity: new tools to study antigen presentation and TCR—peptide—MHC interactions," J Mol RecogN (2003) 16:324-332.
Cooper et al., "T-cell clones can be rendered specific for CD19: toward the selective augmentation of the graft-versus-B-lineage leukemia effect," Blood. (2003) 101:1637-1644.
Davila et al., "CD19 CAR-targeted T cells induce long-term remission and B Cell Aplasia in an immunocompetent mouse model of B cell acute lymphoblastic leukemia," PLoS One (2013) 8(4): e61338.
De Felipe et al., "Targeting of proteins derived from self-processing polyproteins containing multiple signal sequences," Trafic (2004) 5(8):616-626.
De Felipe, "Skipping the co-expression problem: the new 2A "Chysel" technology," Genetics Vaccines and Therapy (2004) 2:13.
Dull, T. et al. (Nov. 1998) "A Third-Generation Lentivirus Vector with a Conditional Packaging System," J. Viral. 72:8463-8471.
Engelman et al., "Multiple effects of mutations in human immunodeficiency virus type 1 integrase on viral replication," J Viral (1995) 69(5):2729-2736.

Fedorov et al., "PD-1- and CTLA-4-Based Inhibitory Chimeric Antigen Receptors (iCARs) Divert Off-Target Immunotherapy Responses," Sci Transl Medicine (2013) 5(215):215ra172.
Frecha et al., "Advances in the field of lentivector-based transduction of T and B lymphocytes for gene therapy," Mol Ther (2010) 18(10):1748-1757.
Garfall et al., "Immunotherapy with chimeric antigen receptors for multiple myeloma," Discov Med (2014) 17(91):37-46.
Garfall et al., "Posterior Reversible Encephalopathy Syndrome (PRES) after infusion of anti-Bcma CAR T cells (CART_BCMA) for multiple myeloma: Successful Treatment with Cyclophophamide," Blood (2016) 128(22):5702.
Gargett et al., "Different cytokine and stimulation conditions influence the expansion and immune phenotype of third-generation chimeric antigen receptor T cells specific for tumor antigen GD2," Cytotherapy (2015) 17(4):487-495.
Gibco, CTS™ Immune Cell SR (2015).
Gibco, OpTmizer™ T-cell Expansion SFM (2008).
Godin et al., "Microfluidics and photonics for Bio-System-on-a-Chip: A review of advancements in technology towards a microfluidic flow cytometry chip," J Biophotonics (2008) 1(5):355-376.
Hackett et al., "A transposon and transposase system for human application," Molecular Therapy: The Journal of the American Society of Gene Therapy (2010) 18:674-683.
Hermans et al., "The VITAL assay: a versatile fluorometric technique for assessing CTL- and NKT-mediated cytotoxicity against multiple targets in vitro and in vivo," J Immunol Methods (2004) 285(1):25-40.
Holler et al., "In vitro evolution of a T cell receptor with high affinity for peptide/MHC," Proc Natl Acad Sci U S A. (2000) 97(10): 5387-5392.
Holler et al., "TCRs with high affinity for foreign pMHC show self-reactivity," Nat Immunol. Jan. 2003;4(1):55-62.
Honegger et al., "Yet another numbering scheme for immunoglobulin variable domains: an automatic modeling and analysis tool," J Mol Biol (2001) 309(3):657-670.
Huang et al., "DNA transposons for modification of human primary T lymphocytes," Methods Mol Biol (2009) 506: 115-126.
Hudecek et al., "Receptor affinity and extracellular domain modifications affect tumor recognition by ROR1-specific chimeric antigen receptor T cells," Clin Cancer Res (2013) 19(12):3153-3164.
Hudecek et al., "The nonsignaling extracellular spacer domain of chimeric antigen receptors is decisive for in vivo antitumor activity," Cancer Immunol Res (2015) 3(2):125-135.
Imadome, "The clinical condition and diagnosis of EBV-T/NK-LPD (CAEBV, EBV-HLH etc.)," [Rinsho Ketsueki] Japanese J Clin Hematol (2013) 54(10):1992-98. (Reference in Japanese).
Imamoto et al., "Advantages of AlaGln as an additive to cell culture medium: use with anti-CD20 chimeric antibody-producing POTELLIGENT™ CHO cell lines," Cytotechnology (2013) 65:135-143.
Janeway et al., Immunobiology: The Immune System in Health and Disease, 3rd ED., Current Biology Publications (1997), p. 4:33.
Johnston, et al., "Biolistic transformation: microbes to mice," Nature (1990) 346: 776-777.
Jores et al., "Resolution of hypervariable regions in T-cell receptor beta chains by a modified Wu-Kabat index of amino acid diversity.," PNAS (1990) 87(23):9138-9142.
Kindt et al., "Antigens and Antibodies," in Chapter 4 of Kuby Immunology, 6th ed., W.H. Freeman and Co., N.Y, (2007) pp. 91, 14 pages.
Klebanoff et al., "Sorting through subsets: which T-cell populations mediate highly effective adoptive immunotherapy?," J Immunother. (2012) 35(9): 651-660.
Kochenderfer et al., "Construction and preclinical evaluation of an anti-CD19 chimeric antigen receptor," J. Immunotherapy (2009) 32(7): 689-702.
Kochenderfer et al., "Treating B-cell cancer with T cells expressing anti-CD19 chimeric antigen receptors," Nature Reviews Clinical Oncology (2013) 10:267-276.
Koste et al., "T-cell receptor transfer into human T cells with ecotropic retroviral vectors," Gene Therapy (2014) 21: 533-538.
Kotb, "Bacterial pyrogenic exotoxins as superantigens," Clin Microbiol Rev. (1995) 8(3):411-426.

(56) References Cited

OTHER PUBLICATIONS

Kurucz et al., "A bacterially expressed single-chain Fv construct from the 2B4 T-cell receptor," Proc Natl Acad Sci U S A. (1993) 90(9): 3830-3834.
Lefranc et al., "IMGT unique numbering for immunoglobulin and T cell receptor variable domains and Ig superfamily V-like domains," Dev Comp Immunol (2003) 27(1):55-77.
Li et al., "Directed evolution of human T-cell receptors with picomolar affinities by phage display," Nature Biotechnology (2005) 23:349-354.
Ling et al., "B-cell and plasma cell antigens: new and previously defined clusters," Leucocyte typing III. (1987) 302-355.
Liu et al., "Inclusion of Strep-tag II in design of antigen receptors for T-cell immunotherapy," Nature Biotechnology (2016) 34(4):430-434.
Lu et al., "A Rapid Cell Expansion Process for Production of Engineered Autologous CAR-T Cell Therapies," Human Gene Therapy Methods (2016) 27(6):209-218.
Lupton et al., "Dominant positive and negative selection using a hygromycin phosphotransferase-Thymidine kinase dusion gene," Molecular and cellular biology (1991) 11(6):3374-3378.
Maccallum et al., "Antibody-antigen interactions: contact analysis and binding site topography," J Mol Biol (1996) 262(5):732-745.
Manuri et al., "piggyBac transposon/transposase system to generate CD19-specific T cells for the treatment of B-lineage malignancies," Hum Gene Ther (2010) 21(4): 427-437.
Martin et al., "Modeling antibody hypervariable loops: a combined algorithm," PNAS (1989) 86(23):9268-9272.
Mcwilliams et al., "Mutations in the 5' end of the human immunodeficiency virus type 1 polypurine tract affect RNase H cleavage specificity and virus titer," J Virol (2003) 77(20):11150-11157.
Methods in Molecular Medicine, vol. 58: Metastasis Research Protocols, vol. 2: Cell Behavior In Vitro and In Vivo, p. 17-25 Edited by: S. A. Brooks and U. Schumacher © Humana Press Inc., Totowa, NJ.
Miller et al., "Improved retroviral vectors for gene transfer and expression," BioTechniques (1989) 7:980-990.
Miller et al., "Retrovirus packaging cells," Human Gene Therapy (1990) 1:5-14.
Miyoshi et al. "Development of a self-inactivating lentivirus vector," J Virol (1998) 72(10):8150-8157.
Naldini et al., "In vivo gene delivery and stable transduction of nondividing cells by a lentiviral vector," Science. (Apr. 12, 1996);272(5259):263-7.
Naldini et al., "Lentiviruses as gene transfer agents for delivery to non-dividing cells", Curr Opin Biotechnol., (Oct. 9, 1998); 5:457-63.
Park et al., "Treating cancer with genetically engineered T cells," Trends Biotechnol. (2011) 29(11): 550-557.
Parkhurst et al., "Characterization of genetically modified T-cell receptors that recognize the CEA:691-699 peptide in the context of HLA-A2.1 on human colorectal cancer cells," Clin Cancer Res (2009) 15:169-180.
Philpott et al., "Use of Nonintegrating Lentiviral Vectors for Gene Therapy," Human Gene Therapy (2007) 18:483.
Portolano et al., "Lack of promiscuity in autoantigen-specific H and L chain combinations as revealed by human H and L chain "roulette"," J Immunol (1993) 150(3):880-887.
Powell et al., "Sequence and structural determinants required for priming of plus-strand DNA synthesis by the human immunodeficiency virus type 1 polypurine tract," J Virol (1996) 70(8):5288-5296.
Riddell et al., "The Fred Hutchinson Cancer Research Center and the University of Washington School of Medicine, Department of Medicine, Division of Oncology Oct. 7, 1991," Human Gene Therapy (1992) 3:319-338.
Rosenberg, et al., "Cell transfer immunotherapy for metastatic solid cancer—what clinicians need to know," Nat Rev Clin Oncol. (2011) 8(10):577-85.

Sadelain et al., "The basic principles of chimeric antigen receptor design," Cancer Discov. (2013) 3(4): 388-398.
Scarpa et al., "Characterization of recombinant helper retroviruses from Moloney-based vectors in ecotropic and amphotropic packaging cell lines," Virology (1991) 180:849-852.
Schlueter et al., "Specificity and Binding Properties of a Single-chain T Cell Receptor," J Mol Biol (1996) 859-869.
Schuler et al., SYFPEITHI, Database for Searching and T-Cell Epitope Prediction. in Immunoinformatics Methods in Molecular Biology, (2007) 409(1): 75-93.
Sharma et al., "Efficient sleeping beauty DNA transposition from DNA minicircles," Molec Ther Nucl Acids (2013) 2, e74.
Singh et al., "ProPred: prediction of HLA-DR binding sites," Bioinformatics. (2001) 17(12): 1236-1237.
Smith et al., "Ex vivo expansion of human T cells for adoptive immunotherapy using the novel xeno-free CTS immune cell serum replacement," Clin Transl Immunol (2015) 4:e31.
Soo Hoo et al., "Characterization of a single-chain T-cell receptor expressed in *Escherichia coli*," Proc Natl Acad Sci U S A. (1992) 89(10): 4759-4763.
Tai et al., "Antibody-Based Therapies in Multiple Myeloma," Bone Marrow Research (2011) vol. 2011. Article ID 924058.
Terakura et al., "Generation of CD19-chimeric antigen receptor modified CD8+ T cells derived from virus-specific central memory T cells," Blood (2012) 1:72-82.
Themeli et al., "Generation of tumor-targeted human T lymphocytes from induced pluripotent stem cells for cancer therapy," Nat Biotechnol. (2013) 31(10): 928-933.
Tsukahara et al., "CD19 target-engineered T-cells accumulate at tumor lesions in human B-cell lymphoma xenograft mouse models," Biochem Biophys Res Commun (2013) 438(1): 84-89.
Turtle et al., "Anti-CD19 Chimeric Antigen Receptor-Modified T Cell Therapy for B Cell Non-Hodgkin Lyphoma and Chronic Lyphocytic Leukemia: Fludarabine and Cyclophosphamide Lyphodepletion Imprives In Vivo Expansion and Persistence of CAR-T Cells and Clinical Outcomes," Blood (2015) 126:184.
Turtle et al., "Engineered T cells for anti-cancer therapy," Curr. Opin. Immunol. (2012) 24(5): 633-39.
Van Tendeloo et al., "High-level transgene expression in primary human T lymphocytes and adult bone marrow CD34+ cells via electroporation-mediated gene delivery," Gene Therapy (2000) 7(16): 1431-1437.
Varela-Rohena et al., "Control of HIV-1 immune escape by CD8 T cells expressing enhanced T-cell receptor," Nature Medicine (2008) 14(12): 1390-1395.
Verhoeyen et al., "Lentiviral vector gene transfer into human T cells," Methods Mol Biol. (2009) 506: 97-114.
Wadhwa et al., "Receptor mediated glycotargeting," J. Drug Targeting (1995) 3: 111.
Wang et al., "Phenotypic and functional attributes of lentivirus-modified CD19-specific human CD8+ central memory T cells manufactured at clinical scale," J Immunother. (2012) 35(9):689-701.
Wu et al., "Adoptive T-cell therapy using autologous tumor-infiltrating lymphocytes for metastatic melanoma: current status and future outlook," Cancer (2012) 18(2): 160-175.
Wulfing et al., "Correctly folded T-cell receptor fragments in the periplasm of *Escherichia coli*. Influence of folding catalysts," J Mol Biol. (1994) 242(5): 655-669.
Zufferey et al. "Self-Inactivating Lentivirus Vector for Safe and Efficient In Vivo Gene Delivery," J. Virol (1998) 72(12):9873-9880.
Zufferey et al., "Multiply attenuated lentiviral vector achieves efficient gene delivery in vivo," Nat Biotechnol. (Sep. 1997);15(9):871-875.
Aksoy et al., "Human primary T cells: A practical guide," dated Jun. 19, 2018. Retrieved from https://peerj.com/preprints/26993.html (31 pages).
Anonymous, "Scientists helping scientists™ | WWW Optimization of Human T Cell Expansion Protocol: Effects of Early Cell Dilution," (2018) (8 pages).
Applikon Biotechnology/BioPharma-Reporter (2016) How automation has changed the way we count cells BioPharma-Reporter.com; 1-4 (Year: 2016).

(56) References Cited

OTHER PUBLICATIONS

Chang et al., "Identification and selective expansion of functionally superior T cells expressing chimeric antigen receptors," J Transl Med (2015) 13(1):161 (16 pages).
Eaker et al., "Concise review: guidance in developing commercializable autologous/patient-specific cell therapy manufacturing," Stem Cells Transl Med. (2013) 2(11): 871-83.
Fryar et al., "Mean Body Weight, Height, Waist Circumference, and Body Mass Index Among Adults: United States, 1999-2000 Through 2015-2016," Natl Health Stat Report. (2018) (122):1-16.
Janas et al., "Perfusion's role in maintenance of high-density T-cell cultures," BioProcesses International. (2015) pp. 1-12.
Kahn et al., "Optimization of retroviral vector-mediated gene transfer into endothelial cells in vitro," Circ Res. (1992) 71(6):1508-17.
Klaver et al., "T Cell Maturation Stage Prior to and During GMP Processing Informs on CAR T Cell Expansion in Patients," Front Immunol. (2016) 7:648 (7 pages).
Lada et al., "Quantitation of integrated HIV provirus by pulsed-field gel electrophoresis and droplet digital PCR," J Clin Microbiol (2018) 56(12):e01158 (10 pages).
Li et al., "Comparison of anti-CD3 and anti-CD28-coated beads with soluble anti-CD3 for expanding human T cells: Differing impact on CD8 T cell phenotype and responsiveness to restimulation," J Transl Med (2010) 8(1):104 (15 pages).
Maude et al., "Tisagenlecleucel in Children and Young Adults with B-Cell Lymphoblastic Leukemia," New Engl J Med (2018) 378(5):439-448.
Neeson et al., "Ex vivo culture of chimeric antigen receptor T cells generates functional CD8+ T cells with effector and central memory-like phenotype," Gene Therapy (2010) 17(9):1105-1116.
Okamoto et al., "A promising vector for TCR gene therapy: differential effect of siRNA, 2A peptide, and disulfide bond on the introduced TCR expression," Mol Ther Nucl Acids (2012) 1(12):1-11.
Sun et al., "Early transduction produces highly functional chimeric antigen receptor-modified virus-specific T-cells with central memory markers: a Production Assistant for Cell Therapy (PACT) translational application," J Immunother Cancer. (2015) 3:5 (17 pages).
Tai et al., "Targeting B-cell maturation antigen in multiple myeloma," Immunotherapy (2015) 7:1187-1199.
Turtle et al., "CD19 CAR-T cells of defined CD4+:CD8+ composition in adult B cell ALL patients," J. Clin. Invest. (2016) 126(6):2123-38.
Vormittag et al., "A guide to manufacturing CAR T cell therapies," Curr Opin in Biotechnology (2018) 53:164-181.
Wang et al., "Clinical manufacturing of CAR T cells: foundation of a promising therapy," Molecular Therapy—Oncolytics (2016) 3:16015 (7 pages).
Xu et al., "Closely related T-memory stem cells correlate with in vivo expansion of CAR.CD19-T cells and are preserved by IL-7 and IL-15," Blood (2014) 123(24):3750-3759.
Xu et al., "Multiparameter comparative analysis reveals differential impacts of various cytokines on CART cell phenotype and function ex vivo and in vivo," Oncotarget (2016) 7(50):82354-82368.
Zhao et al., "Development of the First World Health Organization Lentiviral Vector Standard: Toward the production control and standardization of lentivirus-based gene therapy products," Human Gene Therapy Methods (2017) 28(4):205-214.
Akron Biotech "cGMP rHuIL-15: Exceptional purity, consistency and performance. Expand T-Cells and NK-Cells with Akron's cGMP IL-15," (2023):1-9.
Berthois et al., "Phenol red in tissue culture media is a weak estrogen: implications concerning the study of estrogen-responsive cells in culture," Proc Natl Acad Sci USA. (1986) 83(8):2496-500.
Dupont et al., "Comparative dose-responses of recombinant human IL-2 and IL-7 on STAT5 phosphorylation in CD4+FOXP3-cells versus regulatory T cells: a whole blood perspective," Cytokine. (2014) 69(1):146-9.
Hinrichs et al., "Human effector CD8+ T cells derived from naive rather than memory subsets possess superior traits for adoptive immunotherapy," Blood. (2011) 117(3):808-14.
Life Technologies Corporation (2013) OpTmizer™ CTS™ T-cell Expansion SFM Technical information; pp. 1-2 (Year: 2013).
Marenghi et al., "The role of perfusion in maintaining high density T-cell cultures," GE (2014):1-2.
Navarro et al., "Estrogen Stimulation Differentially Impacts Human Male and Female Antigen-Specific T Cell Anti-Tumor Function and Polyfunctionality," Gender and the Genome. (2017) 1(4):167-179.
Okern et al., "CTS™ immune cell SR for serum free culture and expansion of human T cells," J Immunother Cancer. (2015); 3(Suppl 2): P1.
Poltorak et al., "Expamers: a new technology to control T cell activation," Sci Rep. (2020) 10(1):17832 (15 pages).
Qian et al., "Advances in the Development of Interleukin-2 and its Analogues," Chinese Journal of Pharmaceuticals. (2020) 947-955. (Article in Chinese; English abstract provided).
Dong, Modern Biology, Beijing Institute of Technology Press, 1st edition, p. 328, Jul. 31, 2016 (Article in Chinese; English translation provided).
Hirakawa et al., "IL-2, IL-7, IL-15 and IL-6 Induce Differential Activation of Naive and Memory T Cell Subsets," Blood (2015) 126(23):3425, 4 pages.
Hou et al., "Tutorial on Animal Cell Culture Techniques," Gansu Science and Technology Press (2009) 520, Chapter 9, p. 105. (Article in Chinese; English translation provided).
Kaartinen et al., "Low interleukin-2 concentration favors generation of early memory T cells over effector phenotypes during chimeric antigen receptor T-cell expansion," Cytotherapy (2017) 19(6):689-702.
Al-Shanti et al., "Human purified CD8+ T cells: Ex vivo expansion model to generate a maximum yield of functional cytotoxic cells," Immunol Invest. (2007);36(1):85-104.
Bondanza et al., "IL-7 receptor expression identifies suicide gene-modified allospecific CD8+ T cells capable of self-renewal and differentiation into antileukemia effectors," Blood. (2011) 117(24):6469-78.
Chang et al., "Investigation of interfacial properties of pure and mixed poloxamers for surfactant-mediated shear protection of mammalian cells," Colloids Surf B Biointerfaces. (2017) 156:358-365.
Finney et al., "Activation of resting human primary T cells with chimeric receptors: costimulation from CD28, inducible costimulator, CD134, and CD137 in series with signals from the TCR zeta chain," J Immunol. (2004) 172(1):104-13.
Kemper et al., "Label-free quantitative cell division monitoring of endothelial cells by digital holographic microscopy," J Biomed Opt. (2010) 15(3):036009 (6 pages).
Levine et al., "Global manufacturing of CAR T cell therapy" Mol. Ther. Methods & Clin. Dev. (2016) 4: 92-101.
Mak et al., "Glutathione Primes T Cell Metabolism for Inflammation," Immunity. (2017) 46(4):675-689.
Marthandan et al., "An investigation of the effects of the antioxidants, ebselen or N-acetyl cysteine on human peripheral blood mononuclear cells and T cells," Immun Ageing. (2013) 10(1):7 (16 pages).
Medvec et al., "Improved Expansion and In Vivo Function of Patient T Cells by a Serum-free Medium," Mol Ther Methods Clin Dev. (2017) 8:65-74.
Amos et al., "The role of caspase 3 and BclxL in the action of interleukin 7 (IL-7): a survival factor in activated human T cells," Cytokine. (1998) 10(9):662-8.
Jiang Bo, Fundamentals and Clinics of Apoptosis, People's Military Medical Press, p. 141, Jul. 1999 (Reference in Chinese; English translation provided).
Lada et al., "Quantitation of integrated HIV provirus by pulsed-field gel electrophoresis and droplet digital PCR," J Clin Microbiol (2018) 56(12):e01158.
Saligrama et al., "IL-15 maintains T-cell survival via S-nitrosylation-mediated inhibition of caspase-3," Cell Death Differ. (2014) 21(6):904-14.

(56) References Cited

OTHER PUBLICATIONS

Anastasov et al., "Optimized Lentiviral Transduction Protocols by Use of a Poloxamer Enhancer, Spinoculation, and scFv-Antibody Fusions to VSV-G," Methods Mol Biol (2016) 1448:49-61.

Boyman et al., "The role of interleukin-2 in memory CD8 cell differentiation," Adv Exp Med Biol (2010) 684:28-41.

Han et al., "Masked Chimeric Antigen Receptor for Tumor-Specific Activation," Mol Ther (Jan. 2017) 25(1):274-284.

Krug et al., "A GMP-compliant protocol to expand and transfect cancer patient T cells with mRNA encoding a tumor-specific chimeric antigen receptor," Cancer Immunol Immunother (2014) 63(10):999-1008.

Chatot et al., "An improved culture medium supports development of random-bred 1-cell mouse embryos in vitro," J Reprod Fertil (Jul. 1989) 86(2):679-688.

Kueberuwa et al., "CCR7+ selected gene-modified T cells maintain a central memory phenotype and display enhanced persistence in peripheral blood in vivo," J Immunother Cancer (Feb. 21, 2017) 5(14):1-14.

Zynda et al., "Optimization of a Phenol Red-Free T Cell Expansion Medium to Improve Performance and Workflow Flexibility," Thermo Fisher Scientific, Poster, presented at International Society for Cellular Therapy (ISCT) Melbourne Annual Meeting, May 29-Jun. 1, 2019, one page.

\* cited by examiner

SEQUENCE LISTING

<160> NUMBER OF SEQ ID NOS: 70

<210> SEQ ID NO 1
<211> LENGTH: 12
<212> TYPE: PRT
<213> ORGANISM: Homo sapiens
<220> FEATURE:
<223> OTHER INFORMATION: Spacer (IgG4hinge)

<400> SEQUENCE: 1

Glu Ser Lys Tyr Gly Pro Pro Cys Pro Pro Cys Pro
1               5                   10

<210> SEQ ID NO 2
<211> LENGTH: 36
<212> TYPE: DNA
<213> ORGANISM: Homo sapiens
<220> FEATURE:
<223> OTHER INFORMATION: Spacer (IgG4hinge)

<400> SEQUENCE: 2
gaatctaagt acggaccgcc ctgcccccct tgccct                              36

<210> SEQ ID NO 3
<211> LENGTH: 119
<212> TYPE: PRT
<213> ORGANISM: Homo sapiens
<220> FEATURE:
<223> OTHER INFORMATION: Hinge-CH3 spacer

<400> SEQUENCE: 3

Glu Ser Lys Tyr Gly Pro Pro Cys Pro Pro Cys Pro Gly Gln Pro Arg
1               5                   10                  15

```
Glu Pro Gln Val Tyr Thr Leu Pro Pro Ser Gln Glu Glu Met Thr Lys
                20                  25                  30

Asn Gln Val Ser Leu Thr Cys Leu Val Lys Gly Phe Tyr Pro Ser Asp
            35                  40                  45

Ile Ala Val Glu Trp Glu Ser Asn Gly Gln Pro Glu Asn Asn Tyr Lys
 50                  55                  60

Thr Thr Pro Pro Val Leu Asp Ser Asp Gly Ser Phe Phe Leu Tyr Ser
 65                  70                  75                  80

Arg Leu Thr Val Asp Lys Ser Arg Trp Gln Gln Gly Asn Val Phe Ser
                85                  90                  95

Cys Ser Val Met His Glu Ala Leu His Asn His Tyr Thr Gln Lys Ser
                100                 105                 110

Leu Ser Leu Ser Leu Gly Lys
                115

<210> SEQ ID NO 4
<211> LENGTH: 229
<212> TYPE: PRT
<213> ORGANISM: Homo sapiens
<220> FEATURE:
<223> OTHER INFORMATION: Hinge-CH2-CH3 spacer

<400> SEQUENCE: 4

Glu Ser Lys Tyr Gly Pro Pro Cys Pro Pro Cys Pro Ala Pro Glu Phe
 1               5                  10                  15

Leu Gly Gly Pro Ser Val Phe Leu Phe Pro Pro Lys Pro Lys Asp Thr
                20                  25                  30

Leu Met Ile Ser Arg Thr Pro Glu Val Thr Cys Val Val Val Asp Val
            35                  40                  45

Ser Gln Glu Asp Pro Glu Val Gln Phe Asn Trp Tyr Val Asp Gly Val
 50                  55                  60

Glu Val His Asn Ala Lys Thr Lys Pro Arg Glu Glu Gln Phe Asn Ser
 65                  70                  75                  80

Thr Tyr Arg Val Val Ser Val Leu Thr Val Leu His Gln Asp Trp Leu
                85                  90                  95

Asn Gly Lys Glu Tyr Lys Cys Lys Val Ser Asn Lys Gly Leu Pro Ser
                100                 105                 110

Ser Ile Glu Lys Thr Ile Ser Lys Ala Lys Gly Gln Pro Arg Glu Pro
            115                 120                 125

Gln Val Tyr Thr Leu Pro Pro Ser Gln Glu Glu Met Thr Lys Asn Gln
130                 135                 140

Val Ser Leu Thr Cys Leu Val Lys Gly Phe Tyr Pro Ser Asp Ile Ala
145                 150                 155                 160

Val Glu Trp Glu Ser Asn Gly Gln Pro Glu Asn Asn Tyr Lys Thr Thr
                165                 170                 175

Pro Pro Val Leu Asp Ser Asp Gly Ser Phe Phe Leu Tyr Ser Arg Leu
                180                 185                 190

Thr Val Asp Lys Ser Arg Trp Gln Glu Gly Asn Val Phe Ser Cys Ser
            195                 200                 205

Val Met His Glu Ala Leu His Asn His Tyr Thr Gln Lys Ser Leu Ser
210                 215                 220

Leu Ser Leu Gly Lys
225

<210> SEQ ID NO 5
<211> LENGTH: 282
```

-continued

```
<212> TYPE: PRT
<213> ORGANISM: Homo sapiens
<220> FEATURE:
<223> OTHER INFORMATION: IgD-hinge-Fc

<400> SEQUENCE: 5

Arg Trp Pro Glu Ser Pro Lys Ala Gln Ala Ser Ser Val Pro Thr Ala
1               5                   10                  15

Gln Pro Gln Ala Glu Gly Ser Leu Ala Lys Ala Thr Thr Ala Pro Ala
            20                  25                  30

Thr Thr Arg Asn Thr Gly Arg Gly Gly Glu Glu Lys Lys Lys Glu Lys
        35                  40                  45

Glu Lys Glu Glu Gln Glu Glu Arg Glu Thr Lys Thr Pro Glu Cys Pro
    50                  55                  60

Ser His Thr Gln Pro Leu Gly Val Tyr Leu Leu Thr Pro Ala Val Gln
65                  70                  75                  80

Asp Leu Trp Leu Arg Asp Lys Ala Thr Phe Thr Cys Phe Val Val Gly
                85                  90                  95

Ser Asp Leu Lys Asp Ala His Leu Thr Trp Glu Val Ala Gly Lys Val
            100                 105                 110

Pro Thr Gly Gly Val Glu Glu Gly Leu Leu Glu Arg His Ser Asn Gly
        115                 120                 125

Ser Gln Ser Gln His Ser Arg Leu Thr Leu Pro Arg Ser Leu Trp Asn
    130                 135                 140

Ala Gly Thr Ser Val Thr Cys Thr Leu Asn His Pro Ser Leu Pro Pro
145                 150                 155                 160

Gln Arg Leu Met Ala Leu Arg Glu Pro Ala Ala Gln Ala Pro Val Lys
                165                 170                 175

Leu Ser Leu Asn Leu Leu Ala Ser Ser Asp Pro Pro Glu Ala Ala Ser
            180                 185                 190

Trp Leu Leu Cys Glu Val Ser Gly Phe Ser Pro Pro Asn Ile Leu Leu
        195                 200                 205

Met Trp Leu Glu Asp Gln Arg Glu Val Asn Thr Ser Gly Phe Ala Pro
    210                 215                 220

Ala Arg Pro Pro Pro Gln Pro Gly Ser Thr Thr Phe Trp Ala Trp Ser
225                 230                 235                 240

Val Leu Arg Val Pro Ala Pro Pro Ser Pro Gln Pro Ala Thr Tyr Thr
                245                 250                 255

Cys Val Val Ser His Glu Asp Ser Arg Thr Leu Leu Asn Ala Ser Arg
            260                 265                 270

Ser Leu Glu Val Ser Tyr Val Thr Asp His
        275                 280

<210> SEQ ID NO 6
<211> LENGTH: 24
<212> TYPE: PRT
<213> ORGANISM: Artificial Sequence
<220> FEATURE:
<223> OTHER INFORMATION: T2A

<400> SEQUENCE: 6

Leu Glu Gly Gly Gly Glu Gly Arg Gly Ser Leu Leu Thr Cys Gly Asp
1               5                   10                  15

Val Glu Glu Asn Pro Gly Pro Arg
            20

<210> SEQ ID NO 7
```

<211> LENGTH: 357
<212> TYPE: PRT
<213> ORGANISM: Artificial Sequence
<220> FEATURE:
<223> OTHER INFORMATION: tEGFR

<400> SEQUENCE: 7

```
Met Leu Leu Leu Val Thr Ser Leu Leu Leu Cys Glu Leu Pro His Pro
1               5                   10                  15
Ala Phe Leu Leu Ile Pro Arg Lys Val Cys Asn Gly Ile Gly Ile Gly
            20                  25                  30
Glu Phe Lys Asp Ser Leu Ser Ile Asn Ala Thr Asn Ile Lys His Phe
        35                  40                  45
Lys Asn Cys Thr Ser Ile Ser Gly Asp Leu His Ile Leu Pro Val Ala
    50                  55                  60
Phe Arg Gly Asp Ser Phe Thr His Thr Pro Pro Leu Asp Pro Gln Glu
65                  70                  75                  80
Leu Asp Ile Leu Lys Thr Val Lys Glu Ile Thr Gly Phe Leu Leu Ile
                85                  90                  95
Gln Ala Trp Pro Glu Asn Arg Thr Asp Leu His Ala Phe Glu Asn Leu
            100                 105                 110
Glu Ile Ile Arg Gly Arg Thr Lys Gln His Gly Gln Phe Ser Leu Ala
        115                 120                 125
Val Val Ser Leu Asn Ile Thr Ser Leu Gly Leu Arg Ser Leu Lys Glu
    130                 135                 140
Ile Ser Asp Gly Asp Val Ile Ile Ser Gly Asn Lys Asn Leu Cys Tyr
145                 150                 155                 160
Ala Asn Thr Ile Asn Trp Lys Lys Leu Phe Gly Thr Ser Gly Gln Lys
                165                 170                 175
Thr Lys Ile Ile Ser Asn Arg Gly Glu Asn Ser Cys Lys Ala Thr Gly
            180                 185                 190
Gln Val Cys His Ala Leu Cys Ser Pro Glu Gly Cys Trp Gly Pro Glu
        195                 200                 205
Pro Arg Asp Cys Val Ser Cys Arg Asn Val Ser Arg Gly Arg Glu Cys
    210                 215                 220
Val Asp Lys Cys Asn Leu Leu Glu Gly Glu Pro Arg Glu Phe Val Glu
225                 230                 235                 240
Asn Ser Glu Cys Ile Gln Cys His Pro Glu Cys Leu Pro Gln Ala Met
                245                 250                 255
Asn Ile Thr Cys Thr Gly Arg Gly Pro Asp Asn Cys Ile Gln Cys Ala
            260                 265                 270
His Tyr Ile Asp Gly Pro His Cys Val Lys Thr Cys Pro Ala Gly Val
        275                 280                 285
Met Gly Glu Asn Asn Thr Leu Val Trp Lys Tyr Ala Asp Ala Gly His
    290                 295                 300
Val Cys His Leu Cys His Pro Asn Cys Thr Tyr Gly Cys Thr Gly Pro
305                 310                 315                 320
Gly Leu Glu Gly Cys Pro Thr Asn Gly Pro Lys Ile Pro Ser Ile Ala
                325                 330                 335
Thr Gly Met Val Gly Ala Leu Leu Leu Leu Val Ala Leu Gly
            340                 345                 350
Ile Gly Leu Phe Met
        355
```

<210> SEQ ID NO 8

```
<211> LENGTH: 27
<212> TYPE: PRT
<213> ORGANISM: Homo sapiens
<220> FEATURE:
<223> OTHER INFORMATION: CD28
<300> PUBLICATION INFORMATION:
<308> DATABASE ACCESSION NUMBER: UniProt P10747
<309> DATABASE ENTRY DATE: 1989-07-01

<400> SEQUENCE: 8

Phe Trp Val Leu Val Val Val Gly Gly Val Leu Ala Cys Tyr Ser Leu
1               5                   10                  15

Leu Val Thr Val Ala Phe Ile Ile Phe Trp Val
            20                  25

<210> SEQ ID NO 9
<211> LENGTH: 66
<212> TYPE: PRT
<213> ORGANISM: Homo sapiens
<220> FEATURE:
<223> OTHER INFORMATION: CD28
<300> PUBLICATION INFORMATION:
<308> DATABASE ACCESSION NUMBER: UniProt P10747
<309> DATABASE ENTRY DATE: 1989-07-01

<400> SEQUENCE: 9

Ile Glu Val Met Tyr Pro Pro Pro Tyr Leu Asp Asn Glu Lys Ser Asn
1               5                   10                  15

Gly Thr Ile Ile His Val Lys Gly Lys His Leu Cys Pro Ser Pro Leu
            20                  25                  30

Phe Pro Gly Pro Ser Lys Pro Phe Trp Val Leu Val Val Val Gly Gly
        35                  40                  45

Val Leu Ala Cys Tyr Ser Leu Leu Val Thr Val Ala Phe Ile Ile Phe
    50                  55                  60

Trp Val
65

<210> SEQ ID NO 10
<211> LENGTH: 41
<212> TYPE: PRT
<213> ORGANISM: Homo sapiens
<220> FEATURE:
<223> OTHER INFORMATION: CD28
<300> PUBLICATION INFORMATION:
<308> DATABASE ACCESSION NUMBER: UniProt P10747
<309> DATABASE ENTRY DATE: 1989-07-01

<400> SEQUENCE: 10

Arg Ser Lys Arg Ser Arg Leu Leu His Ser Asp Tyr Met Asn Met Thr
1               5                   10                  15

Pro Arg Arg Pro Gly Pro Thr Arg Lys His Tyr Gln Pro Tyr Ala Pro
            20                  25                  30

Pro Arg Asp Phe Ala Ala Tyr Arg Ser
        35                  40

<210> SEQ ID NO 11
<211> LENGTH: 41
<212> TYPE: PRT
<213> ORGANISM: Homo sapiens
<220> FEATURE:
<223> OTHER INFORMATION: CD28

<400> SEQUENCE: 11

Arg Ser Lys Arg Ser Arg Gly Gly His Ser Asp Tyr Met Asn Met Thr
1               5                   10                  15
```

```
Pro Arg Arg Pro Gly Pro Thr Arg Lys His Tyr Gln Pro Tyr Ala Pro
            20                  25                  30

Pro Arg Asp Phe Ala Ala Tyr Arg Ser
            35                  40
```

<210> SEQ ID NO 12
<211> LENGTH: 42
<212> TYPE: PRT
<213> ORGANISM: Homo sapiens
<220> FEATURE:
<223> OTHER INFORMATION: 4-1BB
<300> PUBLICATION INFORMATION:
<308> DATABASE ACCESSION NUMBER: UniProt Q07011.1
<309> DATABASE ENTRY DATE: 1995-02-01

<400> SEQUENCE: 12

```
Lys Arg Gly Arg Lys Lys Leu Leu Tyr Ile Phe Lys Gln Pro Phe Met
1               5                   10                  15

Arg Pro Val Gln Thr Thr Gln Glu Glu Asp Gly Cys Ser Cys Arg Phe
            20                  25                  30

Pro Glu Glu Glu Glu Gly Gly Cys Glu Leu
            35                  40
```

<210> SEQ ID NO 13
<211> LENGTH: 112
<212> TYPE: PRT
<213> ORGANISM: Homo sapiens
<220> FEATURE:
<223> OTHER INFORMATION: CD3 zeta

<400> SEQUENCE: 13

```
Arg Val Lys Phe Ser Arg Ser Ala Asp Ala Pro Ala Tyr Gln Gln Gly
1               5                   10                  15

Gln Asn Gln Leu Tyr Asn Glu Leu Asn Leu Gly Arg Arg Glu Glu Tyr
            20                  25                  30

Asp Val Leu Asp Lys Arg Arg Gly Arg Asp Pro Glu Met Gly Gly Lys
            35                  40                  45

Pro Arg Arg Lys Asn Pro Gln Glu Gly Leu Tyr Asn Glu Leu Gln Lys
        50                  55                  60

Asp Lys Met Ala Glu Ala Tyr Ser Glu Ile Gly Met Lys Gly Glu Arg
65                  70                  75                  80

Arg Arg Gly Lys Gly His Asp Gly Leu Tyr Gln Gly Leu Ser Thr Ala
                85                  90                  95

Thr Lys Asp Thr Tyr Asp Ala Leu His Met Gln Ala Leu Pro Pro Arg
            100                 105                 110
```

<210> SEQ ID NO 14
<211> LENGTH: 112
<212> TYPE: PRT
<213> ORGANISM: Homo sapiens
<220> FEATURE:
<223> OTHER INFORMATION: CD3 zeta

<400> SEQUENCE: 14

```
Arg Val Lys Phe Ser Arg Ser Ala Glu Pro Pro Ala Tyr Gln Gln Gly
1               5                   10                  15

Gln Asn Gln Leu Tyr Asn Glu Leu Asn Leu Gly Arg Arg Glu Glu Tyr
            20                  25                  30

Asp Val Leu Asp Lys Arg Arg Gly Arg Asp Pro Glu Met Gly Gly Lys
            35                  40                  45
```

```
Pro Arg Arg Lys Asn Pro Gln Glu Gly Leu Tyr Asn Glu Leu Gln Lys
    50                  55                  60

Asp Lys Met Ala Glu Ala Tyr Ser Glu Ile Gly Met Lys Gly Glu Arg
65                  70                  75                  80

Arg Arg Gly Lys Gly His Asp Gly Leu Tyr Gln Gly Leu Ser Thr Ala
                85                  90                  95

Thr Lys Asp Thr Tyr Asp Ala Leu His Met Gln Ala Leu Pro Pro Arg
            100                 105                 110

<210> SEQ ID NO 15
<211> LENGTH: 112
<212> TYPE: PRT
<213> ORGANISM: Homo sapiens
<220> FEATURE:
<223> OTHER INFORMATION: CD3 zeta

<400> SEQUENCE: 15

Arg Val Lys Phe Ser Arg Ser Ala Asp Ala Pro Ala Tyr Lys Gln Gly
1               5                   10                  15

Gln Asn Gln Leu Tyr Asn Glu Leu Asn Leu Gly Arg Arg Glu Glu Tyr
                20                  25                  30

Asp Val Leu Asp Lys Arg Arg Gly Arg Asp Pro Glu Met Gly Gly Lys
            35                  40                  45

Pro Arg Arg Lys Asn Pro Gln Glu Gly Leu Tyr Asn Glu Leu Gln Lys
    50                  55                  60

Asp Lys Met Ala Glu Ala Tyr Ser Glu Ile Gly Met Lys Gly Glu Arg
65                  70                  75                  80

Arg Arg Gly Lys Gly His Asp Gly Leu Tyr Gln Gly Leu Ser Thr Ala
                85                  90                  95

Thr Lys Asp Thr Tyr Asp Ala Leu His Met Gln Ala Leu Pro Pro Arg
            100                 105                 110

<210> SEQ ID NO 16
<211> LENGTH: 335
<212> TYPE: PRT
<213> ORGANISM: Artificial Sequence
<220> FEATURE:
<223> OTHER INFORMATION: tEGFR

<400> SEQUENCE: 16

Arg Lys Val Cys Asn Gly Ile Gly Ile Gly Glu Phe Lys Asp Ser Leu
1               5                   10                  15

Ser Ile Asn Ala Thr Asn Ile Lys His Phe Lys Asn Cys Thr Ser Ile
                20                  25                  30

Ser Gly Asp Leu His Ile Leu Pro Val Ala Phe Arg Gly Asp Ser Phe
            35                  40                  45

Thr His Thr Pro Pro Leu Asp Pro Gln Glu Leu Asp Ile Leu Lys Thr
    50                  55                  60

Val Lys Glu Ile Thr Gly Phe Leu Leu Ile Gln Ala Trp Pro Glu Asn
65                  70                  75                  80

Arg Thr Asp Leu His Ala Phe Glu Asn Leu Glu Ile Ile Arg Gly Arg
                85                  90                  95

Thr Lys Gln His Gly Gln Phe Ser Leu Ala Val Val Ser Leu Asn Ile
            100                 105                 110

Thr Ser Leu Gly Leu Arg Ser Leu Lys Glu Ile Ser Asp Gly Asp Val
        115                 120                 125

Ile Ile Ser Gly Asn Lys Asn Leu Cys Tyr Ala Asn Thr Ile Asn Trp
    130                 135                 140
```

```
Lys Lys Leu Phe Gly Thr Ser Gly Gln Lys Thr Lys Ile Ile Ser Asn
145                 150                 155                 160

Arg Gly Glu Asn Ser Cys Lys Ala Thr Gly Gln Val Cys His Ala Leu
                165                 170                 175

Cys Ser Pro Glu Gly Cys Trp Gly Pro Glu Pro Arg Asp Cys Val Ser
            180                 185                 190

Cys Arg Asn Val Ser Arg Gly Arg Glu Cys Val Asp Lys Cys Asn Leu
        195                 200                 205

Leu Glu Gly Glu Pro Arg Glu Phe Val Glu Asn Ser Glu Cys Ile Gln
    210                 215                 220

Cys His Pro Glu Cys Leu Pro Gln Ala Met Asn Ile Thr Cys Thr Gly
225                 230                 235                 240

Arg Gly Pro Asp Asn Cys Ile Gln Cys Ala His Tyr Ile Asp Gly Pro
                245                 250                 255

His Cys Val Lys Thr Cys Pro Ala Gly Val Met Gly Glu Asn Asn Thr
            260                 265                 270

Leu Val Trp Lys Tyr Ala Asp Ala Gly His Val Cys His Leu Cys His
        275                 280                 285

Pro Asn Cys Thr Tyr Gly Cys Thr Gly Pro Gly Leu Glu Gly Cys Pro
    290                 295                 300

Thr Asn Gly Pro Lys Ile Pro Ser Ile Ala Thr Gly Met Val Gly Ala
305                 310                 315                 320

Leu Leu Leu Leu Leu Val Val Ala Leu Gly Ile Gly Leu Phe Met
                325                 330                 335

<210> SEQ ID NO 17
<211> LENGTH: 18
<212> TYPE: PRT
<213> ORGANISM: Artificial Sequence
<220> FEATURE:
<223> OTHER INFORMATION: T2A

<400> SEQUENCE: 17

Glu Gly Arg Gly Ser Leu Leu Thr Cys Gly Asp Val Glu Glu Asn Pro
1               5                   10                  15

Gly Pro

<210> SEQ ID NO 18
<211> LENGTH: 22
<212> TYPE: PRT
<213> ORGANISM: Artificial Sequence
<220> FEATURE:
<223> OTHER INFORMATION: P2A

<400> SEQUENCE: 18

Gly Ser Gly Ala Thr Asn Phe Ser Leu Leu Lys Gln Ala Gly Asp Val
1               5                   10                  15

Glu Glu Asn Pro Gly Pro
            20

<210> SEQ ID NO 19
<211> LENGTH: 19
<212> TYPE: PRT
<213> ORGANISM: Artificial Sequence
<220> FEATURE:
<223> OTHER INFORMATION: P2A

<400> SEQUENCE: 19

Ala Thr Asn Phe Ser Leu Leu Lys Gln Ala Gly Asp Val Glu Glu Asn
```

```
1               5                   10                  15
Pro Gly Pro

<210> SEQ ID NO 20
<211> LENGTH: 20
<212> TYPE: PRT
<213> ORGANISM: Artificial Sequence
<220> FEATURE:
<223> OTHER INFORMATION: E2A

<400> SEQUENCE: 20

Gln Cys Thr Asn Tyr Ala Leu Leu Lys Leu Ala Gly Asp Val Glu Ser
1               5                   10                  15

Asn Pro Gly Pro
            20

<210> SEQ ID NO 21
<211> LENGTH: 22
<212> TYPE: PRT
<213> ORGANISM: Artificial Sequence
<220> FEATURE:
<223> OTHER INFORMATION: F2A

<400> SEQUENCE: 21

Val Lys Gln Thr Leu Asn Phe Asp Leu Leu Lys Leu Ala Gly Asp Val
1               5                   10                  15

Glu Ser Asn Pro Gly Pro
            20

<210> SEQ ID NO 22
<211> LENGTH: 9
<212> TYPE: PRT
<213> ORGANISM: Artificial Sequence
<220> FEATURE:
<223> OTHER INFORMATION: Linker
<220> FEATURE:
<221> NAME/KEY: REPEAT
<222> LOCATION: (5)...(9)
<223> OTHER INFORMATION: SGGGG is repeated 5 times

<400> SEQUENCE: 22

Pro Gly Gly Gly Ser Gly Gly Gly Gly
1               5

<210> SEQ ID NO 23
<211> LENGTH: 17
<212> TYPE: PRT
<213> ORGANISM: Artificial Sequence
<220> FEATURE:
<223> OTHER INFORMATION: Linker

<400> SEQUENCE: 23

Gly Ser Ala Asp Asp Ala Lys Lys Asp Ala Ala Lys Lys Asp Gly Lys
1               5                   10                  15

Ser

<210> SEQ ID NO 24
<211> LENGTH: 66
<212> TYPE: DNA
<213> ORGANISM: Artificial Sequence
<220> FEATURE:
<223> OTHER INFORMATION: GMCSFR alpha chain signal sequence

<400> SEQUENCE: 24
atgcttctcc tggtgacaag ccttctgctc tgtgagttac cacacccagc attcctcctg     60
``` atccca 66

```
<210> SEQ ID NO 25
<211> LENGTH: 22
<212> TYPE: PRT
<213> ORGANISM: Artificial Sequence
<220> FEATURE:
<223> OTHER INFORMATION: GMCSFR alpha chain signal sequence

<400> SEQUENCE: 25
```

Met Leu Leu Leu Val Thr Ser Leu Leu Leu Cys Glu Leu Pro His Pro
1               5                   10                  15

Ala Phe Leu Leu Ile Pro
            20

```
<210> SEQ ID NO 26
<211> LENGTH: 18
<212> TYPE: PRT
<213> ORGANISM: Artificial Sequence
<220> FEATURE:
<223> OTHER INFORMATION: CD8 alpha signal peptide

<400> SEQUENCE: 26
```

Met Ala Leu Pro Val Thr Ala Leu Leu Leu Pro Leu Ala Leu Leu Leu
1               5                   10                  15

His Ala

```
<210> SEQ ID NO 27
<211> LENGTH: 118
<212> TYPE: PRT
<213> ORGANISM: Artificial Sequence
<220> FEATURE:
<223> OTHER INFORMATION: Variable heavy (VH) Anti-BCMA

<400> SEQUENCE: 27
```

Glu Val Gln Leu Val Gln Ser Gly Ala Glu Met Lys Lys Pro Gly Ala
1               5                   10                  15

Ser Leu Lys Leu Ser Cys Lys Ala Ser Gly Tyr Thr Phe Ile Asp Tyr
            20                  25                  30

Tyr Val Tyr Trp Met Arg Gln Ala Pro Gly Gln Gly Leu Glu Ser Met
        35                  40                  45

Gly Trp Ile Asn Pro Asn Ser Gly Gly Thr Asn Tyr Ala Gln Lys Phe
    50                  55                  60

Gln Gly Arg Val Thr Met Thr Arg Asp Thr Ser Ile Ser Thr Ala Tyr
65                  70                  75                  80

Met Glu Leu Ser Arg Leu Arg Ser Asp Asp Thr Ala Met Tyr Tyr Cys
                85                  90                  95

Ala Arg Ser Gln Arg Asp Gly Tyr Met Asp Tyr Trp Gly Gln Gly Thr
            100                 105                 110

Leu Val Thr Val Ser Ser
        115

```
<210> SEQ ID NO 28
<211> LENGTH: 105
<212> TYPE: PRT
<213> ORGANISM: Artificial Sequence
<220> FEATURE:
<223> OTHER INFORMATION: Variable light (VL) Anti-BCMA

<400> SEQUENCE: 28
```

Gln Ser Ala Leu Thr Gln Pro Ala Ser Val Ser Ala Ser Pro Gly Gln

-continued

```
               1               5                  10                 15
            Ser Ile Ala Ile Ser Cys Thr Gly Thr Ser Ser Asp Val Gly Trp Tyr
                            20                 25                 30

Gln Gln His Pro Gly Lys Ala Pro Lys Leu Met Ile Tyr Glu Asp Ser
                            35                 40                 45

Lys Arg Pro Ser Gly Val Ser Asn Arg Phe Ser Gly Ser Lys Ser Gly
                         50                 55                 60

Asn Thr Ala Ser Leu Thr Ile Ser Gly Leu Gln Ala Glu Asp Glu Ala
             65                 70                 75                 80

Asp Tyr Tyr Cys Ser Ser Asn Thr Arg Ser Ser Thr Leu Val Phe Gly
                            85                 90                 95

Gly Gly Thr Lys Leu Thr Val Leu Gly
                            100                105

<210> SEQ ID NO 29
<211> LENGTH: 228
<212> TYPE: PRT
<213> ORGANISM: Homo sapiens
<220> FEATURE:
<221> NAME/KEY: PEPTIDE
<222> LOCATION: (0)...(0)
<223> OTHER INFORMATION: Hinge-CH2-CH3 spacer

<400> SEQUENCE: 29

Glu Ser Lys Tyr Gly Pro Pro Cys Pro Pro Cys Pro Ala Pro Pro Val
            1               5                  10                 15

Ala Gly Pro Ser Val Phe Leu Phe Pro Pro Lys Pro Lys Asp Thr Leu
                            20                 25                 30

Met Ile Ser Arg Thr Pro Glu Val Thr Cys Val Val Val Asp Val Ser
                            35                 40                 45

Gln Glu Asp Pro Glu Val Gln Phe Asn Trp Tyr Val Asp Gly Val Glu
                         50                 55                 60

Val His Asn Ala Lys Thr Lys Pro Arg Glu Glu Gln Phe Gln Ser Thr
             65                 70                 75                 80

Tyr Arg Val Val Ser Val Leu Thr Val Leu His Gln Asp Trp Leu Asn
                            85                 90                 95

Gly Lys Glu Tyr Lys Cys Lys Val Ser Asn Lys Gly Leu Pro Ser Ser
                            100                105                110

Ile Glu Lys Thr Ile Ser Lys Ala Lys Gly Gln Pro Arg Glu Pro Gln
                            115                120                125

Val Tyr Thr Leu Pro Pro Ser Gln Glu Glu Met Thr Lys Asn Gln Val
                         130                135                140

Ser Leu Thr Cys Leu Val Lys Gly Phe Tyr Pro Ser Asp Ile Ala Val
            145                150                155                160

Glu Trp Glu Ser Asn Gly Gln Pro Glu Asn Asn Tyr Lys Thr Thr Pro
                            165                170                175

Pro Val Leu Asp Ser Asp Gly Ser Phe Phe Leu Tyr Ser Arg Leu Thr
                            180                185                190

Val Asp Lys Ser Arg Trp Gln Glu Gly Asn Val Phe Ser Cys Ser Val
                            195                200                205

Met His Glu Ala Leu His Asn His Tyr Thr Gln Lys Ser Leu Ser Leu
                            210                215                220

Ser Leu Gly Lys
            225

<210> SEQ ID NO 30
```

<211> LENGTH: 117
<212> TYPE: PRT
<213> ORGANISM: Artificial Sequence
<220> FEATURE:
<223> OTHER INFORMATION: Variable heavy (VH) Anti-BCMA

<400> SEQUENCE: 30

Gln Ile Gln Leu Val Gln Ser Gly Pro Glu Leu Lys Lys Pro Gly Glu
1               5                   10                  15

Thr Val Lys Ile Ser Cys Lys Ala Ser Gly Tyr Thr Phe Thr Asp Tyr
            20                  25                  30

Ser Ile Asn Trp Val Lys Arg Ala Pro Gly Lys Gly Leu Lys Trp Met
        35                  40                  45

Gly Trp Ile Asn Thr Glu Thr Arg Glu Pro Ala Tyr Ala Tyr Asp Phe
    50                  55                  60

Arg Gly Arg Phe Ala Phe Ser Leu Glu Thr Ser Ala Ser Thr Ala Tyr
65                  70                  75                  80

Leu Gln Ile Asn Asn Leu Lys Tyr Glu Asp Thr Ala Thr Tyr Phe Cys
                85                  90                  95

Ala Leu Asp Tyr Ser Tyr Ala Met Asp Tyr Trp Gly Gln Gly Thr Ser
            100                 105                 110

Val Thr Val Ser Ser
        115

<210> SEQ ID NO 31
<211> LENGTH: 111
<212> TYPE: PRT
<213> ORGANISM: Artificial Sequence
<220> FEATURE:
<223> OTHER INFORMATION: Variable light (VL) Anti-BCMA

<400> SEQUENCE: 31

Asp Ile Val Leu Thr Gln Ser Pro Pro Ser Leu Ala Met Ser Leu Gly
1               5                   10                  15

Lys Arg Ala Thr Ile Ser Cys Arg Ala Ser Glu Ser Val Thr Ile Leu
            20                  25                  30

Gly Ser His Leu Ile His Trp Tyr Gln Gln Lys Pro Gly Gln Pro Pro
        35                  40                  45

Thr Leu Leu Ile Gln Leu Ala Ser Asn Val Gln Thr Gly Val Pro Ala
    50                  55                  60

Arg Phe Ser Gly Ser Gly Ser Arg Thr Asp Phe Thr Leu Thr Ile Asp
65                  70                  75                  80

Pro Val Glu Glu Asp Asp Val Ala Val Tyr Tyr Cys Leu Gln Ser Arg
                85                  90                  95

Thr Ile Pro Arg Thr Phe Gly Gly Gly Thr Lys Leu Glu Ile Lys
            100                 105                 110

<210> SEQ ID NO 32
<211> LENGTH: 122
<212> TYPE: PRT
<213> ORGANISM: Artificial Sequence
<220> FEATURE:
<223> OTHER INFORMATION: Variable heavy (VH) Anti-BCMA

<400> SEQUENCE: 32

Gln Ile Gln Leu Val Gln Ser Gly Pro Asp Leu Lys Lys Pro Gly Glu
1               5                   10                  15

Thr Val Lys Leu Ser Cys Lys Ala Ser Gly Tyr Thr Phe Thr Asn Phe
            20                  25                  30

```
Gly Met Asn Trp Val Lys Gln Ala Pro Gly Lys Gly Phe Lys Trp Met
        35                  40                  45

Ala Trp Ile Asn Thr Tyr Thr Gly Glu Ser Tyr Phe Ala Asp Asp Phe
 50                  55                  60

Lys Gly Arg Phe Ala Phe Ser Val Glu Thr Ser Ala Thr Thr Ala Tyr
 65                  70                  75                  80

Leu Gln Ile Asn Asn Leu Lys Thr Glu Asp Thr Ala Thr Tyr Phe Cys
                 85                  90                  95

Ala Arg Gly Glu Ile Tyr Tyr Gly Tyr Asp Gly Gly Phe Ala Tyr Trp
            100                 105                 110

Gly Gln Gly Thr Leu Val Thr Val Ser Ala
        115                 120
```

<210> SEQ ID NO 33
<211> LENGTH: 107
<212> TYPE: PRT
<213> ORGANISM: Artificial Sequence
<220> FEATURE:
<223> OTHER INFORMATION: Variable light (VL) Anti-BCMA

<400> SEQUENCE: 33

```
Asp Val Val Met Thr Gln Ser His Arg Phe Met Ser Thr Ser Val Gly
 1               5                  10                  15

Asp Arg Val Ser Ile Thr Cys Arg Ala Ser Gln Asp Val Asn Thr Ala
            20                  25                  30

Val Ser Trp Tyr Gln Gln Lys Pro Gly Gln Ser Pro Lys Leu Leu Ile
        35                  40                  45

Phe Ser Ala Ser Tyr Arg Tyr Thr Gly Val Pro Asp Arg Phe Thr Gly
 50                  55                  60

Ser Gly Ser Gly Ala Asp Phe Thr Leu Thr Ile Ser Ser Val Gln Ala
 65                  70                  75                  80

Glu Asp Leu Ala Val Tyr Tyr Cys Gln Gln His Tyr Ser Thr Pro Trp
                 85                  90                  95

Thr Phe Gly Gly Gly Thr Lys Leu Asp Ile Lys
            100                 105
```

<210> SEQ ID NO 34
<211> LENGTH: 116
<212> TYPE: PRT
<213> ORGANISM: Artificial Sequence
<220> FEATURE:
<223> OTHER INFORMATION: Variable heavy (VH) Anti-BCMA

<400> SEQUENCE: 34

```
Glu Val Gln Leu Val Gln Ser Gly Ala Glu Val Lys Lys Pro Gly Glu
 1               5                  10                  15

Ser Leu Lys Ile Ser Cys Lys Gly Ser Gly Tyr Ser Phe Thr Ser Tyr
            20                  25                  30

Trp Ile Gly Trp Val Arg Gln Met Pro Gly Lys Gly Leu Glu Trp Met
        35                  40                  45

Gly Ile Ile Tyr Pro Gly Asp Ser Asp Thr Arg Tyr Ser Pro Ser Phe
 50                  55                  60

Gln Gly His Val Thr Ile Ser Ala Asp Lys Ser Ile Ser Thr Ala Tyr
 65                  70                  75                  80

Leu Gln Trp Ser Ser Leu Lys Ala Ser Asp Thr Ala Met Tyr Tyr Cys
                 85                  90                  95

Ala Arg Tyr Ser Gly Ser Phe Asp Asn Trp Gly Gln Gly Thr Leu Val
            100                 105                 110
```

Thr Val Ser Ser
        115

<210> SEQ ID NO 35
<211> LENGTH: 111
<212> TYPE: PRT
<213> ORGANISM: Artificial Sequence
<220> FEATURE:
<223> OTHER INFORMATION: Variable light (VL) Anti-BCMA

<400> SEQUENCE: 35

Ser Tyr Glu Leu Thr Gln Pro Pro Ser Ala Ser Gly Thr Pro Gly Gln
1               5                   10                  15

Arg Val Thr Met Ser Cys Ser Gly Thr Ser Ser Asn Ile Gly Ser His
            20                  25                  30

Ser Val Asn Trp Tyr Gln Gln Leu Pro Gly Thr Ala Pro Lys Leu Leu
        35                  40                  45

Ile Tyr Thr Asn Asn Gln Arg Pro Ser Gly Val Pro Asp Arg Phe Ser
    50                  55                  60

Gly Ser Lys Ser Gly Thr Ser Ala Ser Leu Ala Ile Ser Gly Leu Gln
65                  70                  75                  80

Ser Glu Asp Glu Ala Asp Tyr Tyr Cys Ala Ala Trp Asp Gly Ser Leu
                85                  90                  95

Asn Gly Leu Val Phe Gly Gly Gly Thr Lys Leu Thr Val Leu Gly
            100                 105                 110

<210> SEQ ID NO 36
<211> LENGTH: 5
<212> TYPE: PRT
<213> ORGANISM: Artificial Sequence
<220> FEATURE:
<223> OTHER INFORMATION: Linker

<400> SEQUENCE: 36

Gly Gly Gly Gly Ser
1               5

<210> SEQ ID NO 37
<211> LENGTH: 4
<212> TYPE: PRT
<213> ORGANISM: Artificial Sequence
<220> FEATURE:
<223> OTHER INFORMATION: Linker

<400> SEQUENCE: 37

Gly Gly Gly Ser
1

<210> SEQ ID NO 38
<211> LENGTH: 15
<212> TYPE: PRT
<213> ORGANISM: Artificial Sequence
<220> FEATURE:
<223> OTHER INFORMATION: Linker

<400> SEQUENCE: 38

Gly Gly Gly Gly Ser Gly Gly Gly Gly Ser Gly Gly Gly Gly Ser
1               5                   10                  15

<210> SEQ ID NO 39
<211> LENGTH: 18
<212> TYPE: PRT
<213> ORGANISM: Artificial Sequence

```
<220> FEATURE:
<223> OTHER INFORMATION: Linker

<400> SEQUENCE: 39

Gly Ser Thr Ser Gly Ser Gly Lys Pro Gly Ser Gly Glu Gly Ser Thr
1               5                   10                  15

Lys Gly

<210> SEQ ID NO 40
<211> LENGTH: 21
<212> TYPE: PRT
<213> ORGANISM: Artificial Sequence
<220> FEATURE:
<223> OTHER INFORMATION: Linker

<400> SEQUENCE: 40

Ser Arg Gly Gly Gly Gly Ser Gly Gly Gly Ser Gly Gly Gly Gly
1               5                   10                  15

Ser Leu Glu Met Ala
            20

<210> SEQ ID NO 41
<211> LENGTH: 122
<212> TYPE: PRT
<213> ORGANISM: Artificial Sequence
<220> FEATURE:
<223> OTHER INFORMATION: Variable heavy (VH) Anti-BCMA

<400> SEQUENCE: 41

Glu Val Gln Leu Val Gln Ser Gly Ala Glu Val Lys Lys Pro Gly Ser
1               5                   10                  15

Ser Val Lys Val Ser Cys Lys Ala Ser Gly Gly Thr Phe Ser Ser Tyr
            20                  25                  30

Ala Ile Ser Trp Val Arg Gln Ala Pro Gly Gln Gly Leu Glu Trp Met
        35                  40                  45

Gly Arg Ile Ile Pro Ile Leu Gly Ile Ala Asn Tyr Ala Gln Lys Phe
    50                  55                  60

Gln Gly Arg Val Thr Met Thr Glu Asp Thr Ser Thr Asp Thr Ala Tyr
65                  70                  75                  80

Met Glu Leu Ser Ser Leu Arg Ser Glu Asp Thr Ala Val Tyr Tyr Cys
                85                  90                  95

Ala Arg Ser Gly Tyr Ser Lys Ser Ile Val Ser Tyr Met Asp Tyr Trp
            100                 105                 110

Gly Gln Gly Thr Leu Val Thr Val Ser Ser
        115                 120

<210> SEQ ID NO 42
<211> LENGTH: 111
<212> TYPE: PRT
<213> ORGANISM: Artificial Sequence
<220> FEATURE:
<223> OTHER INFORMATION: Variable light (VL) Anti-BCMA

<400> SEQUENCE: 42

Leu Pro Val Leu Thr Gln Pro Pro Ser Thr Ser Gly Thr Pro Gly Gln
1               5                   10                  15

Arg Val Thr Val Ser Cys Ser Gly Ser Ser Asn Ile Gly Ser Asn
            20                  25                  30

Val Val Phe Trp Tyr Gln Gln Leu Pro Gly Thr Ala Pro Lys Leu Val
        35                  40                  45
```

```
Ile Tyr Arg Asn Asn Gln Arg Pro Ser Gly Val Pro Asp Arg Phe Ser
        50                  55                  60
Val Ser Lys Ser Gly Thr Ser Ala Ser Leu Ala Ile Ser Gly Leu Arg
 65                  70                  75                  80
Ser Glu Asp Glu Ala Asp Tyr Tyr Cys Ala Ala Trp Asp Asp Ser Leu
                85                  90                  95
Ser Gly Tyr Val Phe Gly Thr Gly Thr Lys Val Thr Val Leu Gly
                100                 105                 110
```

<210> SEQ ID NO 43
<211> LENGTH: 120
<212> TYPE: PRT
<213> ORGANISM: Artificial Sequence
<220> FEATURE:
<223> OTHER INFORMATION: Variable heavy (VH) Anti-BCMA

<400> SEQUENCE: 43

```
Gln Val Gln Leu Val Gln Ser Gly Ala Glu Val Lys Lys Pro Gly Ser
 1               5                   10                  15
Ser Val Lys Val Ser Cys Lys Ala Ser Gly Gly Thr Phe Ser Ser Tyr
                20                  25                  30
Ala Ile Ser Trp Val Arg Gln Ala Pro Gly Gln Gly Leu Glu Trp Met
            35                  40                  45
Gly Arg Ile Ile Pro Ile Leu Gly Thr Ala Asn Tyr Ala Gln Lys Phe
 50                  55                  60
Gln Gly Arg Val Thr Ile Thr Ala Asp Glu Ser Thr Ser Thr Ala Tyr
 65                  70                  75                  80
Met Glu Leu Ser Ser Leu Arg Ser Glu Asp Thr Ala Val Tyr Tyr Cys
                85                  90                  95
Ala Arg Ser Gly Tyr Gly Ser Tyr Arg Trp Glu Asp Ser Trp Gly Gln
                100                 105                 110
Gly Thr Leu Val Thr Val Ser Ser
            115                 120
```

<210> SEQ ID NO 44
<211> LENGTH: 112
<212> TYPE: PRT
<213> ORGANISM: Artificial Sequence
<220> FEATURE:
<223> OTHER INFORMATION: Variable light (VL) Anti-BCMA

<400> SEQUENCE: 44

```
Gln Ala Val Leu Thr Gln Pro Pro Ser Ala Ser Gly Thr Pro Gly Gln
 1               5                   10                  15
Arg Val Thr Ile Ser Cys Ser Gly Ser Ser Asn Ile Gly Ser Asn
                20                  25                  30
Tyr Val Phe Trp Tyr Gln Gln Leu Pro Gly Thr Ala Pro Lys Leu Leu
            35                  40                  45
Ile Tyr Ser Asn Asn Gln Arg Pro Ser Gly Val Pro Asp Arg Phe Ser
 50                  55                  60
Gly Ser Lys Ser Gly Thr Ser Ala Ser Leu Ala Ile Ser Gly Leu Arg
 65                  70                  75                  80
Ser Glu Asp Glu Ala Asp Tyr Tyr Cys Ala Ala Trp Asp Asp Ser Leu
                85                  90                  95
Ser Ala Ser Tyr Val Phe Gly Thr Gly Thr Lys Val Thr Val Leu Gly
                100                 105                 110
```

<210> SEQ ID NO 45

```
<211> LENGTH: 118
<212> TYPE: PRT
<213> ORGANISM: Artificial Sequence
<220> FEATURE:
<223> OTHER INFORMATION: Variable heavy (VH) Anti-BCMA

<400> SEQUENCE: 45

Gln Val Gln Leu Val Gln Ser Gly Ala Glu Val Lys Lys Pro Gly Ala
1               5                   10                  15

Ser Val Lys Val Ser Cys Lys Ala Ser Gly Tyr Thr Phe Thr Asp Tyr
            20                  25                  30

Tyr Met His Trp Val Arg Gln Ala Pro Gly Gln Arg Leu Glu Trp Met
        35                  40                  45

Gly Trp Ile Asn Pro Asn Ser Gly Gly Thr Asn Tyr Ala Gln Lys Phe
    50                  55                  60

Gln Asp Arg Ile Thr Val Thr Arg Asp Thr Ser Asn Thr Gly Tyr
65                  70                  75                  80

Met Glu Leu Thr Arg Leu Arg Ser Asp Asp Thr Ala Val Tyr Tyr Cys
                85                  90                  95

Ala Arg Ser Pro Tyr Ser Gly Val Leu Asp Lys Trp Gly Gln Gly Thr
            100                 105                 110

Leu Val Thr Val Ser Ser
        115

<210> SEQ ID NO 46
<211> LENGTH: 112
<212> TYPE: PRT
<213> ORGANISM: Artificial Sequence
<220> FEATURE:
<223> OTHER INFORMATION: Variable light (VL) Anti-BCMA

<400> SEQUENCE: 46

Gln Ser Val Leu Thr Gln Pro Pro Ser Val Ser Gly Ala Pro Gly Gln
1               5                   10                  15

Arg Val Thr Ile Ser Cys Thr Gly Ser Ser Ser Asn Ile Gly Ala Gly
            20                  25                  30

Phe Asp Val His Trp Tyr Gln Gln Leu Pro Gly Thr Ala Pro Lys Leu
        35                  40                  45

Leu Ile Tyr Gly Asn Ser Asn Arg Pro Ser Gly Val Pro Asp Arg Phe
    50                  55                  60

Ser Gly Ser Lys Ser Gly Thr Ser Ala Ser Leu Ala Ile Thr Gly Leu
65                  70                  75                  80

Gln Ala Glu Asp Glu Ala Asp Tyr Tyr Cys Gln Ser Tyr Asp Ser Ser
                85                  90                  95

Leu Ser Gly Tyr Val Phe Gly Thr Gly Thr Lys Val Thr Val Leu Gly
            100                 105                 110

<210> SEQ ID NO 47
<211> LENGTH: 11
<212> TYPE: PRT
<213> ORGANISM: Artificial Sequence
<220> FEATURE:
<223> OTHER INFORMATION: CDR L1

<400> SEQUENCE: 47

Arg Ala Ser Gln Asp Ile Ser Lys Tyr Leu Asn
1               5                   10

<210> SEQ ID NO 48
<211> LENGTH: 7
```

```
<212> TYPE: PRT
<213> ORGANISM: Artificial Sequence
<220> FEATURE:
<223> OTHER INFORMATION: CDR L2

<400> SEQUENCE: 48

Ser Arg Leu His Ser Gly Val
1               5

<210> SEQ ID NO 49
<211> LENGTH: 9
<212> TYPE: PRT
<213> ORGANISM: Artificial Sequence
<220> FEATURE:
<223> OTHER INFORMATION: CDR L3

<400> SEQUENCE: 49

Gly Asn Thr Leu Pro Tyr Thr Phe Gly
1               5

<210> SEQ ID NO 50
<211> LENGTH: 5
<212> TYPE: PRT
<213> ORGANISM: Artificial Sequence
<220> FEATURE:
<223> OTHER INFORMATION: CDR H1

<400> SEQUENCE: 50

Asp Tyr Gly Val Ser
1               5

<210> SEQ ID NO 51
<211> LENGTH: 16
<212> TYPE: PRT
<213> ORGANISM: Artificial Sequence
<220> FEATURE:
<223> OTHER INFORMATION: CDR H2

<400> SEQUENCE: 51

Val Ile Trp Gly Ser Glu Thr Thr Tyr Tyr Asn Ser Ala Leu Lys Ser
1               5                   10                  15

<210> SEQ ID NO 52
<211> LENGTH: 7
<212> TYPE: PRT
<213> ORGANISM: Artificial Sequence
<220> FEATURE:
<223> OTHER INFORMATION: CDR H3

<400> SEQUENCE: 52

Tyr Ala Met Asp Tyr Trp Gly
1               5

<210> SEQ ID NO 53
<211> LENGTH: 120
<212> TYPE: PRT
<213> ORGANISM: Artificial Sequence
<220> FEATURE:
<223> OTHER INFORMATION: VH

<400> SEQUENCE: 53

Glu Val Lys Leu Gln Glu Ser Gly Pro Gly Leu Val Ala Pro Ser Gln
1               5                   10                  15

Ser Leu Ser Val Thr Cys Thr Val Ser Gly Val Ser Leu Pro Asp Tyr
                20                  25                  30

Gly Val Ser Trp Ile Arg Gln Pro Pro Arg Lys Gly Leu Glu Trp Leu
```

```
                35                  40                  45
Gly Val Ile Trp Gly Ser Glu Thr Thr Tyr Tyr Asn Ser Ala Leu Lys
        50                  55                  60

Ser Arg Leu Thr Ile Ile Lys Asp Asn Ser Lys Ser Gln Val Phe Leu
 65                 70                  75                  80

Lys Met Asn Ser Leu Gln Thr Asp Asp Thr Ala Ile Tyr Tyr Cys Ala
                85                  90                  95

Lys His Tyr Tyr Tyr Gly Gly Tyr Ala Met Asp Tyr Trp Gly Gln
                100                 105                 110

Gly Thr Ser Val Thr Val Ser Ser
        115                 120
```

<210> SEQ ID NO 54
<211> LENGTH: 107
<212> TYPE: PRT
<213> ORGANISM: Artificial Sequence
<220> FEATURE:
<223> OTHER INFORMATION: VL

<400> SEQUENCE: 54

```
Asp Ile Gln Met Thr Gln Thr Thr Ser Ser Leu Ser Ala Ser Leu Gly
 1               5                  10                  15

Asp Arg Val Thr Ile Ser Cys Arg Ala Ser Gln Asp Ile Ser Lys Tyr
                20                  25                  30

Leu Asn Trp Tyr Gln Gln Lys Pro Asp Gly Thr Val Lys Leu Leu Ile
            35                  40                  45

Tyr His Thr Ser Arg Leu His Ser Gly Val Pro Ser Arg Phe Ser Gly
        50                  55                  60

Ser Gly Ser Gly Thr Asp Tyr Ser Leu Thr Ile Ser Asn Leu Glu Gln
 65                 70                  75                  80

Glu Asp Ile Ala Thr Tyr Phe Cys Gln Gln Gly Asn Thr Leu Pro Tyr
                85                  90                  95

Thr Phe Gly Gly Gly Thr Lys Leu Glu Ile Thr
                100                 105
```

<210> SEQ ID NO 55
<211> LENGTH: 245
<212> TYPE: PRT
<213> ORGANISM: Artificial Sequence
<220> FEATURE:
<223> OTHER INFORMATION: scFv

<400> SEQUENCE: 55

```
Asp Ile Gln Met Thr Gln Thr Thr Ser Ser Leu Ser Ala Ser Leu Gly
 1               5                  10                  15

Asp Arg Val Thr Ile Ser Cys Arg Ala Ser Gln Asp Ile Ser Lys Tyr
                20                  25                  30

Leu Asn Trp Tyr Gln Gln Lys Pro Asp Gly Thr Val Lys Leu Leu Ile
            35                  40                  45

Tyr His Thr Ser Arg Leu His Ser Gly Val Pro Ser Arg Phe Ser Gly
        50                  55                  60

Ser Gly Ser Gly Thr Asp Tyr Ser Leu Thr Ile Ser Asn Leu Glu Gln
 65                 70                  75                  80

Glu Asp Ile Ala Thr Tyr Phe Cys Gln Gln Gly Asn Thr Leu Pro Tyr
                85                  90                  95

Thr Phe Gly Gly Gly Thr Lys Leu Glu Ile Thr Gly Ser Thr Ser Gly
                100                 105                 110
```

-continued

```
Ser Gly Lys Pro Gly Ser Gly Glu Gly Ser Thr Lys Gly Glu Val Lys
        115                 120                 125
Leu Gln Glu Ser Gly Pro Gly Leu Val Ala Pro Ser Gln Ser Leu Ser
    130                 135                 140
Val Thr Cys Thr Val Ser Gly Val Ser Leu Pro Asp Tyr Gly Val Ser
145                 150                 155                 160
Trp Ile Arg Gln Pro Pro Arg Lys Gly Leu Glu Trp Leu Gly Val Ile
                165                 170                 175
Trp Gly Ser Glu Thr Thr Tyr Tyr Asn Ser Ala Leu Lys Ser Arg Leu
            180                 185                 190
Thr Ile Ile Lys Asp Asn Ser Lys Ser Gln Val Phe Leu Lys Met Asn
        195                 200                 205
Ser Leu Gln Thr Asp Asp Thr Ala Ile Tyr Tyr Cys Ala Lys His Tyr
    210                 215                 220
Tyr Tyr Gly Gly Ser Tyr Ala Met Asp Tyr Trp Gly Gln Gly Thr Ser
225                 230                 235                 240
Val Thr Val Ser Ser
            245

<210> SEQ ID NO 56
<211> LENGTH: 11
<212> TYPE: PRT
<213> ORGANISM: Artificial Sequence
<220> FEATURE:
<223> OTHER INFORMATION: CDR L1

<400> SEQUENCE: 56

Lys Ala Ser Gln Asn Val Gly Thr Asn Val Ala
1               5                   10

<210> SEQ ID NO 57
<211> LENGTH: 7
<212> TYPE: PRT
<213> ORGANISM: Artificial Sequence
<220> FEATURE:
<223> OTHER INFORMATION: CDR L2

<400> SEQUENCE: 57

Ser Ala Thr Tyr Arg Asn Ser
1               5

<210> SEQ ID NO 58
<211> LENGTH: 9
<212> TYPE: PRT
<213> ORGANISM: Artificial Sequence
<220> FEATURE:
<223> OTHER INFORMATION: CDR L3

<400> SEQUENCE: 58

Gln Gln Tyr Asn Arg Tyr Pro Tyr Thr
1               5

<210> SEQ ID NO 59
<211> LENGTH: 5
<212> TYPE: PRT
<213> ORGANISM: Artificial Sequence
<220> FEATURE:
<223> OTHER INFORMATION: CDR H1

<400> SEQUENCE: 59

Ser Tyr Trp Met Asn
1               5
```

```
<210> SEQ ID NO 60
<211> LENGTH: 17
<212> TYPE: PRT
<213> ORGANISM: Artificial Sequence
<220> FEATURE:
<223> OTHER INFORMATION: CDR H2

<400> SEQUENCE: 60

Gln Ile Tyr Pro Gly Asp Gly Asp Thr Asn Tyr Asn Gly Lys Phe Lys
1               5                   10                  15

Gly

<210> SEQ ID NO 61
<211> LENGTH: 13
<212> TYPE: PRT
<213> ORGANISM: Artificial Sequence
<220> FEATURE:
<223> OTHER INFORMATION: CDR H3

<400> SEQUENCE: 61

Lys Thr Ile Ser Ser Val Val Asp Phe Tyr Phe Asp Tyr
1               5                   10

<210> SEQ ID NO 62
<211> LENGTH: 122
<212> TYPE: PRT
<213> ORGANISM: Artificial Sequence
<220> FEATURE:
<223> OTHER INFORMATION: VH

<400> SEQUENCE: 62

Glu Val Lys Leu Gln Gln Ser Gly Ala Glu Leu Val Arg Pro Gly Ser
1               5                   10                  15

Ser Val Lys Ile Ser Cys Lys Ala Ser Gly Tyr Ala Phe Ser Ser Tyr
            20                  25                  30

Trp Met Asn Trp Val Lys Gln Arg Pro Gly Gln Gly Leu Glu Trp Ile
        35                  40                  45

Gly Gln Ile Tyr Pro Gly Asp Gly Asp Thr Asn Tyr Asn Gly Lys Phe
    50                  55                  60

Lys Gly Gln Ala Thr Leu Thr Ala Asp Lys Ser Ser Ser Thr Ala Tyr
65                  70                  75                  80

Met Gln Leu Ser Gly Leu Thr Ser Glu Asp Ser Ala Val Tyr Phe Cys
                85                  90                  95

Ala Arg Lys Thr Ile Ser Ser Val Val Asp Phe Tyr Phe Asp Tyr Trp
            100                 105                 110

Gly Gln Gly Thr Thr Val Thr Val Ser Ser
        115                 120

<210> SEQ ID NO 63
<211> LENGTH: 108
<212> TYPE: PRT
<213> ORGANISM: Artificial Sequence
<220> FEATURE:
<223> OTHER INFORMATION: VL

<400> SEQUENCE: 63

Asp Ile Glu Leu Thr Gln Ser Pro Lys Phe Met Ser Thr Ser Val Gly
1               5                   10                  15

Asp Arg Val Ser Val Thr Cys Lys Ala Ser Gln Asn Val Gly Thr Asn
            20                  25                  30

Val Ala Trp Tyr Gln Gln Lys Pro Gly Gln Ser Pro Lys Pro Leu Ile
```

```
                    35                  40                  45
Tyr Ser Ala Thr Tyr Arg Asn Ser Gly Val Pro Asp Arg Phe Thr Gly
         50                  55                  60

Ser Gly Ser Gly Thr Asp Phe Thr Leu Thr Ile Thr Asn Val Gln Ser
 65                  70                  75                  80

Lys Asp Leu Ala Asp Tyr Phe Cys Gln Gln Tyr Asn Arg Tyr Pro Tyr
                 85                  90                  95

Thr Ser Gly Gly Gly Thr Lys Leu Glu Ile Lys Arg
            100                 105
```

<210> SEQ ID NO 64
<211> LENGTH: 15
<212> TYPE: PRT
<213> ORGANISM: Artificial Sequence
<220> FEATURE:
<223> OTHER INFORMATION: Linker

<400> SEQUENCE: 64

```
Gly Gly Gly Gly Ser Gly Gly Gly Gly Ser Gly Gly Gly Gly Ser
 1               5                  10                  15
```

<210> SEQ ID NO 65
<211> LENGTH: 245
<212> TYPE: PRT
<213> ORGANISM: Artificial Sequence
<220> FEATURE:
<223> OTHER INFORMATION: scFv

<400> SEQUENCE: 65

```
Glu Val Lys Leu Gln Gln Ser Gly Ala Glu Leu Val Arg Pro Gly Ser
 1               5                  10                  15

Ser Val Lys Ile Ser Cys Lys Ala Ser Gly Tyr Ala Phe Ser Ser Tyr
                 20                  25                  30

Trp Met Asn Trp Val Lys Gln Arg Pro Gly Gln Gly Leu Glu Trp Ile
             35                  40                  45

Gly Gln Ile Tyr Pro Gly Asp Gly Asp Thr Asn Tyr Asn Gly Lys Phe
         50                  55                  60

Lys Gly Gln Ala Thr Leu Thr Ala Asp Lys Ser Ser Ser Thr Ala Tyr
 65                  70                  75                  80

Met Gln Leu Ser Gly Leu Thr Ser Glu Asp Ser Ala Val Tyr Phe Cys
                 85                  90                  95

Ala Arg Lys Thr Ile Ser Ser Val Val Asp Phe Tyr Phe Asp Tyr Trp
            100                 105                 110

Gly Gln Gly Thr Thr Val Thr Val Ser Ser Gly Gly Gly Gly Ser Gly
            115                 120                 125

Gly Gly Gly Ser Gly Gly Gly Gly Ser Asp Ile Glu Leu Thr Gln Ser
        130                 135                 140

Pro Lys Phe Met Ser Thr Ser Val Gly Asp Arg Val Ser Val Thr Cys
145                 150                 155                 160

Lys Ala Ser Gln Asn Val Gly Thr Asn Val Ala Trp Tyr Gln Gln Lys
                165                 170                 175

Pro Gly Gln Ser Pro Lys Pro Leu Ile Tyr Ser Ala Thr Tyr Arg Asn
            180                 185                 190

Ser Gly Val Pro Asp Arg Phe Thr Gly Ser Gly Ser Gly Thr Asp Phe
        195                 200                 205

Thr Leu Thr Ile Thr Asn Val Gln Ser Lys Asp Leu Ala Asp Tyr Phe
    210                 215                 220
```

Cys Gln Gln Tyr Asn Arg Tyr Pro Tyr Thr Ser Gly Gly Gly Thr Lys
225                 230                 235                 240

Leu Glu Ile Lys Arg
            245

<210> SEQ ID NO 66
<211> LENGTH: 12
<212> TYPE: PRT
<213> ORGANISM: Artificial Sequence
<220> FEATURE:
<223> OTHER INFORMATION: HC-CDR3

<400> SEQUENCE: 66

His Tyr Tyr Tyr Gly Gly Ser Tyr Ala Met Asp Tyr
1               5                   10

<210> SEQ ID NO 67
<211> LENGTH: 7
<212> TYPE: PRT
<213> ORGANISM: Artificial Sequence
<220> FEATURE:
<223> OTHER INFORMATION: LC-CDR2

<400> SEQUENCE: 67

His Thr Ser Arg Leu His Ser
1               5

<210> SEQ ID NO 68
<211> LENGTH: 9
<212> TYPE: PRT
<213> ORGANISM: Artificial Sequence
<220> FEATURE:
<223> OTHER INFORMATION: LC-CDR3

<400> SEQUENCE: 68

Gln Gln Gly Asn Thr Leu Pro Tyr Thr
1               5

<210> SEQ ID NO 69
<211> LENGTH: 735
<212> TYPE: DNA
<213> ORGANISM: Artificial Sequence
<220> FEATURE:
<223> OTHER INFORMATION: Sequence encoding scFv

<400> SEQUENCE: 69

```
gacatccaga tgacccagac cacctccagc ctgagcgcca gcctgggcga ccgggtgacc      60
atcagctgcc gggccagcca ggacatcagc aagtacctga actggtatca gcagaagccc     120
gacggcaccg tcaagctgct gatctaccac accagccggc tgcacagcgg cgtgcccagc     180
cggtttagcg gcagcggctc cggcaccgac tacagcctga ccatctccaa cctggaacag     240
gaagatatcg ccacctactt ttgccagcag ggcaacacac tgccctacac ctttggcggc     300
ggaacaaagc tggaaatcac cggcagcacc tccggcagcg gcaagcctgg cagcggcgag     360
ggcagcacca agggcgaggt gaagctgcag gaaagcggcc ctggcctggt ggcccccagc     420
cagagcctga gcgtgacctg caccgtgagc ggcgtgagcc tgcccgacta cggcgtgagc     480
tggatccggc agccccccag gaagggcctg gaatggctgg gcgtgatctg gggcagcgag     540
accacctact acaacagcgc cctgaagagc cggctgacca tcatcaagga caacagcaag     600
agccaggtgt tcctgaagat gaacagcctg cagaccgacg acaccgccat ctactactgc     660
gccaagcact actactacgg cggcagctac gccatggact actggggcca gggcaccagc     720
```

```
gtgaccgtga gcagc                                                    735

<210> SEQ ID NO 70
<211> LENGTH: 18
<212> TYPE: PRT
<213> ORGANISM: Artificial Sequence
<220> FEATURE:
<223> OTHER INFORMATION: Linker

<400> SEQUENCE: 70

Gly Ser Thr Ser Gly Ser Gly Lys Pro Gly Ser Gly Glu Gly Ser Thr
1               5                   10                  15

Lys Gly
```

SERUM-FREE MEDIA FORMULATION FOR CULTURING CELLS AND METHODS OF USE THEREOF

CROSS-REFERENCE TO RELATED APPLICATIONS

This application is a National Stage application under 35 U.S.C. § 371 of International Application No. PCT/US2018/064627, filed on Dec. 7, 2018 which claims priority from U.S. provisional application 62/596,766, filed Dec. 8, 2017, entitled "Serum-Free Media formulation for culturing cells and methods of use thereof," the contents of which are incorporated by reference in their entirety.

INCORPORATION BY REFERENCE OF SEQUENCE LISTING

The present application is being filed along with a Sequence Listing in electronic format. The Sequence Listing is provided as a file entitled 735042012400SeqList.txt, created Jun. 3, 2020, which is 50,975 bytes in size. The information in the electronic format of the Sequence Listing is incorporated by reference in its entirety.

FIELD

The present disclosure provides serum-free media for culturing, such as cultivating, preparing and/or producing cells, such as immune cells, such as genetically engineered cells. The present disclosure also provides liquid basal media and frozen supplements that can be used to produce serum-free media. The present disclosure also provides methods for producing serum-free media and methods for culturing cells, such as activating, transducing, cultivating or expanded cells in the presence of serum-free media.

BACKGROUND

Various cell therapy methods are available for treating diseases and conditions. Among cell therapy methods are methods involving immune cells, such as T cells, genetically engineered with a recombinant receptor, such as a chimeric antigen receptors. Improved methods for cultivating and producing such cell therapies are needed, including to provide for a serum-free media. Provided are composition, methods, and articles of manufacture that meet such needs.

SUMMARY

Provided herein are serum-free media for culturing, preparing and/or producing cells. In some aspects are serum-free media, the media comprise (a) 0.5 mM to 5 mM of a dipeptide form of L-glutamine in a base media; (b) 0.5 mM to 5 mM L-glutamine; and (c) at least one protein, wherein the media is free of serum. In some embodiments, the dipeptide form of L-glutamine is L-alanyl-L-glutamine. In some embodiments, the concentration of the dipeptide form of L-glutamine is from or from about 0.5 mM to 5 mM, 0.5 mM to 4 mM, 0.5 mM to 3 mM, 0.5 mM to 2 mM, 0.5 mM to 1 mM, 1 mM to 5 mM, 1 mM to 4 mM, 1 mM to 3 mM, 1 mM to 2 mM, 2 mM to 5 mM, 2 mM to 4 mM, 2 mM to 3 mM, 3 mM to 5 mM, 3 mM to 4 mM or 4 mM to 5 mM, each inclusive.

In some embodiments, the concentration of the dipeptide form of L-glutamine in the serum-free media is at least or at least about or is or is about 0.5 mM, 1 mM, 2 mM, 3 mM, 4 mM or 5 mM.

In some embodiments, the concentration of the dipeptide form of L-glutamine in the serum-free media is or is about 2 mM.

In some embodiments of any of the serum-free media provided herein, the concentration of the L-glutamine in the serum-free media is from or from about 0.5 mM to 5 mM, 0.5 mM to 4 mM, 0.5 mM to 3 mM, 0.5 mM to 2 mM, 0.5 mM to 1 mM, 1 mM to 5 mM, 1 mM to 4 mM, 1 mM to 3 mM, 1 mM to 2 mM, 2 mM to 5 mM, 2 mM to 4 mM, 2 mM to 3 mM, 3 mM to 5 mM, 3 mM to 4 mM or 4 mM to 5 mM, each inclusive. In some embodiments, the concentration of the L-glutamine in the serum-free media is at least or at least about or is or is about 0.5 mM, 1 mM, 2 mM, 3 mM, 4 mM or 5 mM. In some embodiments, the concentration of L-glutamine in the serum-free media is or is about 2 mM.

In some embodiments of any of the serum-free media provided herein, the at least one protein is not of non-mammalian origin. In some embodiments, the at least one protein is a human protein. In some embodiments, the at least one protein is recombinant. In some embodiments, the at least one protein comprises one or more of albumin, insulin or transferrin, optionally one or more of a human or recombinant albumin, insulin or transferrin. In some embodiments, the at least one protein comprises at least one albumin, optionally wherein the albumin is a human serum albumin or is a recombinant human albumin, and optionally wherein the concentration of albumin in the media is about 2.5 mg/mL to 7.5 mg/mL. In some embodiments, the concentration of albumin in the serum-free media is about 5 mg/mL. In some embodiments, the at least one protein comprises at least one transferrin, optionally wherein the transferrin is human or is a recombinant human albumin, and optionally wherein the concentration of transferrin in the serum-free media is about 50 mg/L to 200 mg/L. In some embodiments, the concentration of transferrin in the serum-free media is about 100 mg/L. In some embodiments, the at least one protein comprises at least one insulin, optionally wherein the insulin is human or is a recombinant human insulin, and optionally wherein the concentration of insulin in the serum-free media is about 5 mg/L to 20 mg/L. In some embodiments, the concentration of insulin in the serum-free media is about 10 mg/L.

In some embodiments of any of the serum-free media provided herein, the serum-free media comprises one or more of inorganic salts, sugars, amino acids, optionally also containing vitamins, organic acids, antioxidants, and/or buffers.

In some embodiments of any of the serum-free media provided herein, the base media comprises Dulbecco's Modified Eagle's Medium (DMEM), Minimal Essential Medium (MEM), Basal Medium Eagle (BME), F-10, F-12, RPMI 1640, Glasgow's Minimal Essential Medium (GMEM), alpha Minimal Essential Medium (alpha MEM), Iscove's Modified Dulbecco's Medium, or M199.

In some embodiments of any of the serum-free media provided herein, the base media and/or the serum-free media does not comprise phenol red.

In some embodiments of any of the serum-free media provided herein, the serum-free media comprises a lipid, growth factor, N-acetylcysteine, ethanolamine, and/or albumin. In some embodiments, the serum-free media comprises one or more cytokines.

In some embodiments of any of the serum-free media provided herein, the one or more cytokine is selected from IL-2, IL-7 or IL-15.

In some embodiments of any of the serum-free media provided herein, the serum-free media supports the expansion of cells. In some embodiments, the cells are primary immune cells. In some embodiments, the cells are or comprise T cells. In some embodiments, the T cells comprise CD4+ or CD8+ T cells.

Provided herein are basal medium that comprise a dipeptide form of L-glutamine, wherein the basal medium is free of L-glutamine and a protein. In some embodiments, the dipeptide form of L-glutamine is L-alanyl-L-glutamine. In some embodiments, the concentration of the dipeptide form of L-glutamine is from or from about 0.5 mM to 5 mM, 0.5 mM to 4 mM, 0.5 mM to 3 mM, 0.5 mM to 2 mM, 0.5 mM to 1 mM, 1 mM to 5 mM, 1 mM to 4 mM, 1 mM to 3 mM, 1 mM to 2 mM, 2 mM to 5 mM, 2 mM to 4 mM, 2 mM to 3 mM, 3 mM to 5 mM, 3 mM to 4 mM or 4 mM to 5 mM, each inclusive. In some embodiments, the concentration of the dipeptide form of L-glutamine in the serum-free media is at least or at least about or is or is about 0.5 mM, 1 mM, 2 mM, 3 mM, 4 mM or 5 mM. In some embodiments, the concentration of the dipeptide form of L-glutamine in the serum-free media is or is about 2 mM.

In some embodiments of any of the basal medium provided herein, the basal medium comprises one or more of inorganic salts, sugars, amino acids, optionally also containing vitamins, organic acids, antioxidants, and/or buffers.

In some embodiments of any of the basal medium provided herein, the basal medium comprises Dulbecco's Modified Eagle's Medium (DMEM), Minimal Essential Medium (MEM), Basal Medium Eagle (BME), F-10, F-12, RPMI 1640, Glasgow's Minimal Essential Medium (GMEM), alpha Minimal Essential Medium (alpha MEM), Iscove's Modified Dulbecco's Medium, or M199.

In some embodiments of any of the basal medium provided herein, the basal media does not comprise phenol red.

In some embodiments of any of the basal medium provided herein, the protein is a human-derived protein, or a recombinant protein, or both.

In some embodiments of any of the basal medium provided herein, the basal medium is a liquid.

Provided herein are supplements that comprise at least one protein and L-glutamine, wherein a basal cell culture medium combined with the supplement is capable of supporting the expansion of a cell. In some embodiments, the supplement is frozen or stored frozen prior to use, optionally at a temperature of from or from about −10° C. to −30° C., optionally at or about 18° C. or 20° C. In some embodiments, the L-glutamine in the supplement does not precipitate when combined with a basal media and/or when the supplement is thawed or subjected to a temperature of from or from about 20° C. to 42° C., optionally from or from about 20° C. to 42° C., or at or greater than or about 37° C. In some embodiments, the concentration of L-glutamine in the supplement is less than 100 mM. In some embodiments, the L-glutamine in the supplement is from or from about 20 mM to 100 mM. In some embodiments, the concentration of the L-glutamine in the supplement is at least or at least about or is or is about 40 mM, 50 mM, 60 mM, 70 mM, 80 mM or 90 mM. In some embodiments, the concentration of L-glutamine in the supplement is or is about 80 mM. In some embodiments, the at least one protein is not of non-mammalian origin. In some embodiments, the at least one protein is a human protein. In some embodiments, the at least one protein is recombinant. In some embodiments, the at least one protein comprises one or more of albumin, insulin or transferrin, optionally one or more of a human or recombinant albumin, insulin or transferrin. In some embodiments, the at least one protein comprises at least one albumin, wherein optionally the albumin is a human serum albumin or is a recombinant human albumin.

In some embodiments, the at least one protein comprises at least one transferrin, wherein optionally the transferrin is derived from human or is a recombinant human transferrin. In some embodiments, the at least one protein comprises at least one insulin, optionally wherein the insulin is human insulin or a recombinant human insulin, and wherein the concentration of insulin in the serum-free media is about 5 mg/L to 20 mg/L.

In some embodiments of any of the serum-free media, basal medium or supplement provided herein, the serum-free media, the basal medium or the supplement is sterile.

Provided herein are methods for preparing a serum-free medium, the method comprising combining a basal medium and a supplement, such as in accord with the provided basal media and supplements.

Provided herein are methods for preparing a serum-free medium formulation that involves combining: (a) a basal medium comprising a dipeptide form of L-glutamine, wherein the serum-free basal medium is a liquid formulation and/or has not been frozen prior to the combining; (b) a first supplement comprising L-glutamine. In some embodiments, the first supplement had been frozen prior to the combining, optionally wherein the method comprises thawing the first supplement prior to the combining. In some embodiments, the concentration of the dipeptide form of L-glutamine in the basal medium is from or from about 0.5 mM to 5 mM, 0.5 mM to 4 mM, 0.5 mM to 3 mM, 0.5 mM to 2 mM, 0.5 mM to 1 mM, 1 mM to 5 mM, 1 mM to 4 mM, 1 mM to 3 mM, 1 mM to 2 mM, 2 mM to 5 mM, 2 mM to 4 mM, 2 mM to 3 mM, 3 mM to 5 mM, 3 mM to 4 mM or 4 mM to 5 mM, each inclusive. In some embodiments, the concentration of the dipeptide form of L-glutamine in the basal medium is at least or at least about or is or is about 0.5 mM, 1 mM, 2 mM, 3 mM, 4 mM or 5 mM. In some embodiments, the concentration of the dipeptide form of L-glutamine in the basal medium formulation is or is about 2 mM. In some embodiments, the dipeptide form of L-glutamine is L-alanyl-L-glutamine. In some embodiments, the concentration of the L-glutamine in the supplement is from or from about 20 mM to 100 mM. In some embodiments, the concentration of the L-glutamine in the supplement is at least or at least about or is or is about 40 mM, 50 mM, 60 mM, 70 mM, 80 mM or 90 mM. In some embodiments, the concentration of L-glutamine in the supplement is or is about 80 mM.

In some embodiments, the first supplement (or the supplement) comprises at least one protein, and wherein the at least one protein present is a not a non-mammalian protein. In some embodiments, the at least one protein present in the first supplement comprises a human protein. In some embodiments, the human protein comprises a human serum albumin, human transferrin, and/or human recombinant insulin.

In some embodiments, the serum-free medium formulation comprises 90% to 97.5% (v/v) of the basal medium and 1.25% to 5% (v/v) of the first supplement.

In some embodiments, the method further comprises combining (c) a second supplement comprising one or more ingredients selected from the group consisting of one or more antioxidants, one or more albumins or albumin substitutes, one or more lipid agents, one or more insulins or insulin substitutes, one or more transferrins or transferrin substitutes, one or more growth factors, one or more trace elements, and one or more glucocorticoids. In some embodiments, the second supplement comprises a lipid, growth factor, N-acetylcysteine, ethanolamine, and/or albumin. In some embodiments, the serum-free media formulation comprises and 1.25% to 5% (v/v) of the second supplement.

Provided herein are serum-free medium formulations produced by a method for producing a serum-free medium formulation, such as in accord with the provided methods.

Provided herein are methods of culturing cells, the method comprising incubating a composition comprising cells in a serum-free medium formulation such as in accord with the provided serum-free medium formulations. In some embodiments, the culturing is carried out in connection with one or more steps selected from activation of cells in the presence of a stimulating agent or condition; introduction of an agent encoding a heterologous protein, optionally a recombinant receptor, optionally wherein the recombinant receptor is a chimeric antigen receptor; or cultivation or expansion of the cells. In some embodiments, the agent comprising a nucleic acid molecule encoding the recombinant receptor is a viral vector, optionally a lentiviral vector or a gamma retroviral vector. In some embodiments, the cells are primary cells obtained from a subject. In some embodiments, the heterologous protein is a recombinant receptor. In some embodiments, the recombinant receptor is a chimeric antigen receptor.

Provided herein are methods for producing engineered cells involving: (a) contacting a population of cells comprising cells with an agent comprising a nucleic acid molecule encoding a heterologous protein, optionally a recombinant receptor, under conditions to introduce the nucleic acid encoding the recombinant receptor into cells in the population; and (b) incubating the cells in the presence of a stimulating condition, prior to, during and/or subsequent to said contacting, wherein the stimulating condition induces a primary signal, signaling, stimulation, activation and/or expansion of the cells, wherein one or both of (a) and (b) is carried out in a serum-free medium formulation such as in accord with the provided formulations. In some embodiments, the cells are primary cells. In some embodiments, the cells are immune cells. In some embodiments, the cells are T cells or enriched with T cells. In some embodiments, the T cells or the enriched T cells are CD4+ T cells and/or CD8 T cells. In some embodiments, the method further comprises, prior to (a), isolating the population of cells from a biological sample. In some embodiments, the isolating comprises, selecting cells based on surface expression of CD3 or based on surface expression of one or both of CD4 and CD8, optionally by positive or negative selection. In some embodiments, the isolating comprises carrying out immunoaffinity-based selection. In some embodiments, the biological sample is or comprises a whole blood sample, a buffy coat sample, a peripheral blood mononuclear cells (PBMC) sample, an unfractionated T cell sample, a lymphocyte sample, a white blood cell sample, an apheresis product, or a leukapheresis product. In some embodiments, CD4+ and CD8+ T cells are separately isolated and combined prior to the contacting or incubating, optionally combined at a ratio of 1:2 to 2:1 of CD4 to CD8 cells, optionally wherein the ratio is or is about 1:1. In some embodiments CD4+ T cells are isolated and/or the population of cells is enriched for CD4+ cells. In some embodiments, CD8+ cells are isolated and/or the population of cells is enriched for CD8+ cells. In some embodiments, total T cells, CD3+ cells or CD4+ cells and CD8+ cells are isolated and/or the population of cells is enriched for total T cells, CD3+ cells or CD4+ and CD8+ cells. In some embodiments, the enriched cells comprises greater than or greater than about 75% 80%, 85%, 90%, 95%, 96%, 97%, 98%, 99% of the cells. In some embodiments, the agent comprising a nucleic acid molecule encoding the recombinant receptor is a viral vector, optionally a lentiviral vector or a gamma retroviral vector. In some embodiments, the cells are primary cells obtained from a subject. In some embodiments, the heterologous protein is a recombinant receptor. In some embodiments, the recombinant receptor is a chimeric antigen receptor.

In some embodiments of any of the methods for producing engineered cells, the stimulating condition comprises incubation with a stimulatory reagent capable of activating one or more intracellular signaling domains of one or more components of a TCR complex and/or one or more intracellular signaling domains of one or more costimulatory molecules. In some embodiments, the stimulatory reagent comprises a primary agent that specifically binds to a member of a TCR complex and a secondary agent that specifically binds to a T cell costimulatory molecule. In some embodiments, the primary agent specifically binds to CD3 and/or the costimulatory molecule is selected from the group consisting of CD28, CD137 (4-1-BB), OX40, or ICOS. In some embodiments, the primary and secondary agents comprise antibodies and/or are present on the surface of a solid support, optionally a bead.

In some embodiments of any of the methods for producing engineered cells, the stimulating the cells is carried out or is initiated prior to the contacting, optionally for 18-24 hours at or about 37° C.

In some embodiments of any of the methods for producing engineered cells, the stimulating condition comprises a cytokine selected from among IL-2, IL-15 and IL-7.

In some embodiments of any of the methods for producing engineered cells, the stimulating cells is carried out subsequent to the contacting, optionally for a period of time to achieve a threshold concentration.

In some embodiments of any of the methods for culturing cells or for producing engineered cells, the agent comprising a nucleic acid molecule encoding the recombinant receptor is a viral vector, optionally a lentiviral vector or a gamma retroviral vector.

In some embodiments of any of the methods for culturing or for producing engineered cells, the method results in expansion of cells at least about 5-fold, 10-fold, 20-fold, 30-fold, 40-fold, or 50-fold or more compared to the number of cells at the initiation of the incubating. In some embodiments, the expansion of cells is achieved after carrying out the incubating for more than 5 days, optionally 5, 6, 7, 8, or 9 days.

In some embodiments of any of the methods for culturing or for producing engineered cells, the method results in cells that have a viability higher than about 80%, 85%, or 90% after the incubating. In some embodiments, the viability exists after carrying out the incubating for more than 5 days, optionally 5, 6, 7, 8 or 9 days.

Provided herein are cell compositions produced by a method such as in accord with the provided methods.

Provided herein are articles of manufacture, involving a serum-free media such as in accord with the provided serum-free media; a basal medium such as in accord with the provided herein; or a supplement such as in accord with the provided herein, and instructions for making or using the composition. In some embodiments, the article of manufacture is a container, optionally a bottle.

DETAILED DESCRIPTION

Figure 1A:
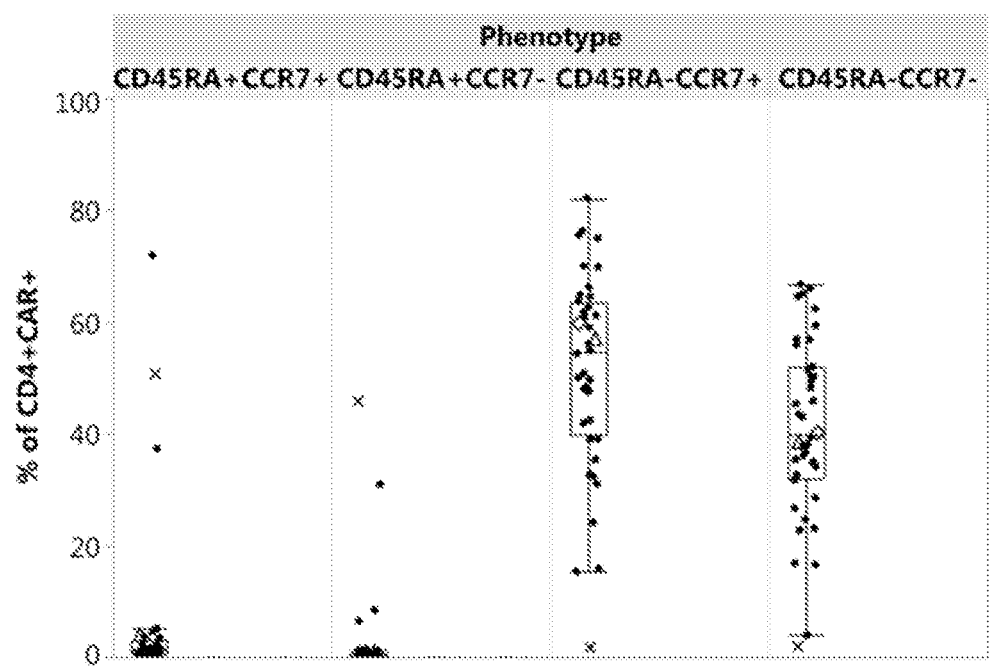
FIGS. 1A-1D depict exemplary phenotypical profiles of 40 engineered CAR+ T cell compositions, each from a multiple myeloma patient. CD45RA×CCR7 expression profiles among the CAR+ T cell compositions are shown for the CD4+ populations (FIG. 1A) and the CD8+ populations (FIG. 1B). CD27×CD28 expression profiles among the CAR+ T cell compositions are shown for the CD4+ populations (FIG. 1C) and the CD8+ populations (FIG. 1D). Each CAR+ T cell composition is shown by a dot (•), a cross (x), a diamond (◊), or a triangle (Δ).

Provided herein is a serum-free media for cultivating cells, promoting cell expansion and/or activation, and/or producing genetically engineered cells. In some embodiments, the serum-free media comprises a dipeptide form of L-glutamine, such as L-alanyl-L-glutamine, in a base media, a free form of glutamine (i.e., L-glutamine), and at least one protein, wherein the media is free of serum. In some embodiments, the serum-free media supports cell viability, expansion and/or activation. In some embodiments, the serum-free media inhibits cell apoptosis. In some embodiments, the serum-free media promotes the production of genetically engineered cells. Also provided herein are basal media and supplements that can be used to make serum-free media. In some embodiments, the basal medium is liquid, comprises a dipeptide form of L-glutamine and is free of L-glutamine, and, in some cases, a protein. In some embodiments, the supplement is frozen and comprises L-glutamine, and, in some cases, at least one protein. In some embodiments, one or more further supplements can be added to prepare the serum-free media, including supplements that contain at least one protein. In some of any such embodiments, the at least one protein is a serum-substituting or serum-replacement protein, such as generally a human protein or recombinant or synthetic protein, e.g. albumin. Also provided herein are methods for preparing a serum-free medium formulation. In some embodiments, the method includes combining a liquid serum-free basal medium comprising a dipeptide form of L-glutamine with a first supplement comprising L-glutamine, wherein the first supplement is kept frozen and thawed prior to the combining. Also provided here are methods of culturing cells in the serum-free media and articles of manufacture.

Different media are available for culturing cells, such as primary immune cells and genetically engineered cells used as cell therapy. In many cases, a base medium supplemented with about 5% serum (e.g., human serum) is used for cultivating these cells. However, in some cases, individual lots of serum (e.g., human serum) can be variable in their ability to support the cell viability, expansion, and/or activation. In some cases, media for culturing cells, including serum-free media, include L-glutamine, which is an essential nutrient in cell cultures for energy production as well as protein and nucleic acid synthesis. However, L-glutamine in cell culture media spontaneously degrades and generates ammonia as a by-product, which can be toxic to the cells and/or can affect protein glycosylation and cell viability, which, in some cases, lowers protein production and change glycosylation patterns. Furthermore, L-glutamine is often manufactured at a relatively high concentration, such as a 200 mM stock solution. With such concentrations, L-glutamine may often precipitate when it is thawed for use and incorporation into a basal medium.

Various other forms of L-glutamine are available, such as a dipeptide form of L-glutamine, including L-alanyl-L-glutamine. In some cases, such dipeptide forms, e.g. L-alanyl-L-glutamine, is more stable in media. However, it takes time and/or energy for a cell to convert the dipeptide form of L-glutamine into a free form of glutamine (i.e., L-glutamine) for use. Furthermore, in some cases, a specific cell population such as immune cells and genetically engineered cells may have higher demands for L-glutamine. In some cases, cells under expansion, activated cells, and/or cells being genetically engineered may have higher demands for L-glutamine as well.

The provided embodiments address one or more of these issues. In particular embodiments, the provided serum-free media contains two sources of glutamine, specifically, a) a dipeptide form of glutamine (such as L-alanyl-L-glutamine) and b) a free form of glutamine (i.e., L-glutamine). In particular embodiments, the free form of glutamine (i.e., L-glutamine) is a component of a frozen supplement to reduce and/or delay the degradation of L-glutamine. In some embodiments, the free form of glutamine (i.e., L-glutamine) is a component of a supplement, wherein the concentration of L-glutamine in the supplement is less than 200 mM (e.g., about 80 mM), which, in some aspects, improves solubility and avoids precipitation of L-glutamine, such as when added to a basal medium. In some aspects, the provided serum-free media, methods, and uses provides advantages for cells because two different sources of glutamine are simultaneously provided. In some embodiments, the first source of glutamine is not a free form of glutamine and is a stabilized form of glutamine. In some embodiments, the first source of glutamine is a dipeptide form of glutamine because it is stable and can be converted into a free form of glutamine. In some embodiments, the second source of glutamine is a free form of glutamine (L-glutamine), which can provide a fast and efficient supply of glutamine.

In some aspects, the provided serum-free media is produced from a basal medium that contains the dipeptide form of glutamine. In some aspects, the base media does not contain phenol red. In some aspects, the provided serum-free media is further produced using a supplement containing the free form of glutamine (i.e., L-glutamine) to improve manufacturability by reducing number of additives to produce the complete media. The inclusion of the dipeptide form of glutamine in the base media and/or the inclusion of the free form of glutamine in a supplement can, in some aspects, improve manufacturability by reducing number of additives to produce the complete media. In some aspects, the supplement is frozen shortly after L-glutamine becomes a component of the supplement to improve the stability of glutamine. The inclusion of the L-glutamine in the supplement at a concentration less than 200 mM, e.g. about or 80 mM, is also beneficial as it can improve solubility and can avoid problems with precipitation.

In particular embodiments, the provided methods include culturing a specific population or cell composition that contains cells, such as primary immune cells, e.g. T cells, with the serum-free media. In some embodiments, the cell composition contains immune cells or an enriched population of immune cells. In some embodiments, the cell composition contains primary immune cells or an enriched population of immune cells. In some embodiments, the cell composition contains T cells or an enriched population of T cells. In some embodiments, the cell composition contains CD4+ T cells or an enriched population of CD4+ T cells. In some embodiments, the cell composition contains CD8+ T cells or an enriched population of CD8+ T cells. In some embodiments, the cell composition comprises cells to be genetically engineered or that are being genetically engineered. In some embodiments, the cell composition contains, or is produced to contain during the culture, genetically engineered cells. In some embodiments, the cell composition that is cultured in the presence of the provided serum-free media contains cells, such as primary immune cells, e.g. T cells, genetically engineered with or expressing a recombinant receptor, such as chimeric antigen receptor (CAR) expressing T cells or an enriched CAR-expressing T cells.

In particular embodiments, the provided methods include culturing the cells in connection with methods for producing genetically engineered cells expressing a recombinant receptor, such as a chimeric antigen receptor (CAR). In some embodiments, the presence of the provided serum-free media during culturing, such as in connection with activation, transduction, cultivation and/or expansion, of immune cells, e.g. T cells, is comparable to, and in some cases improves, cell viability, transduction, or expansion compared to other media types, such as serum-containing media.

In some aspects, the provided serum-free media, methods and uses support desired effects on cells, which, in some cases, are improved compared to culture in the presence of serum-containing media. For example, in some aspects, the provided serum-free media, methods and uses support or promote the viability of a cell. In some embodiments, the cells have a viability that is greater than about 80%, 85%, or 90% after culture in the serum-free medium formulation, such as under conditions for cultivation or expansion, e.g. for about 5 to 6 days. In some cases, viability may be initially reduced, such as compared to culture in serum-containing media, but remaining live cells are able to robustly expand in the presence of the serum-free media. In some embodiments, following culture in the presence of serum-free media, such as for about 5 or 6 days, results in comparable or improved viability compared to a method in which the cells were cultured with serum-containing media. In some aspects, culture of cells in the presence of the provided serum-free media reduces the apoptosis of a cell. In some embodiments, less than about 20%, 15%, 10% or 5% of the cells are apoptotic (e.g., having a positive staining of Caspase3) after culture in the serum-free medium formulation, such as for about 5 to 6 days.

In some aspects, the provided serum-free media, methods and uses support or promote the expansion of a cell. In some embodiments, when cultured in the presence of the serum-free media under conditions for cultivation or expansion, e.g. in the presence of one or more cytokines, the cells expand at least about 5-fold, 10-fold, 20-fold, 30-fold, 40-fold, or 50-fold or more after culture in the serum-free medium formulation, such as following such culture for about 5 to 6 days. In some aspects, the provided serum-free media results in comparable or improved methods for producing genetically engineered cells. In some embodiments, methods for producing genetically engineered cells in the presence of serum-free media, such as in connection with activation, transduction or expansion, results in at least about 50%, 55%, 60%, 65%, or 70% of the cells expressing a heterologous gene, such as a recombinant receptor, e.g. a chimeric antigen receptor. In some aspects, methods and uses for culturing cells in the presence of serum-free media results in a cell composition with comparable, and in some cases improved, function compared to cells produced in serum-containing media. Such functions include improved or comparable effector functions of cells, including cytokine production and cytotoxic activity target cells, such as after antigen-specific stimulation or contact with target cells. In some embodiments, cells, such as genetically engineered cells, e.g. CAR-T cells, that are produced by a process that involves culture in the presence of serum-free media, such as in connection with activation, transduction or expansion of cells, results in a cell composition with comparable or improved anti-tumor activity compared to a cell composition produced by a comparable method but with serum-containing media.

Furthermore, in some embodiments, the provided serum-free media, methods and uses result in a more consistent, and less variable, process in terms of the amount of time required for producing engineered cells from samples collected from among different subjects. In particular embodiments, the provided methods are able to successfully generate engineered T cells suitable for cell therapy from a high proportion of subjects. In certain embodiments, the resulting cell compositions contain high or relatively high portions of healthy cells, e.g., cells that are viable and/or do not express an apoptotic marker, high or relatively high portions of cells that express a recombinant receptor, and/or cells with a high or relatively high activity, e.g., cytotoxic, anti-tumor, and/or cytokine production, in response to antigen stimulation. In some embodiments, the provided methods provide a process for producing engineered cell products and in some aspects have particular success rates such as high success rates or rates of success greater than a threshold rate, such as those that are able to generate therapeutic cell compositions, such as able to generate such compositions having certain required or desired features, for a large number or percentage of samples, such as for all or a high percentage of samples each derived from a different individual subject or patient, such as a subject or patient to be treated with the therapeutic composition (e.g., in the context of autologous cell therapy). In some aspects, the subjects or patients have a disease or condition such as a cancer such as a blood or hematological cancer such as a multiple myeloma. In some aspects, the samples—from which, for a high percentage thereof, it is possible to generate therapeutic cell compositions—are patient samples including those that are variable for example in terms of cell phenotypes or other parameters of the samples or cells thereof. In some embodiments, the provided methods generate engineered T cell compositions that have improved or high degrees of cell health such as compared to cell compositions generated via other processes.

All publications, including patent documents, scientific articles and databases, referred to in this application are incorporated by reference in their entirety for all purposes to the same extent as if each individual publication were individually incorporated by reference. If a definition set forth herein is contrary to or otherwise inconsistent with a definition set forth in the patents, applications, published applications and other publications that are herein incorporated by reference, the definition set forth herein prevails over the definition that is incorporated herein by reference.

The section headings used herein are for organizational purposes only and are not to be construed as limiting the subject matter described.

I. SERUM-FREE MEDIA FORMULATIONS AND RELATED COMPONENTS

The present application provides a serum-free media containing a synthetic amino acid (e.g., a dipeptide form of L-glutamine, e.g., L-alanyl-L-glutamine), a free form of glutamine (i.e., L-glutamine), and at least one protein. The present application also provides a liquid basal medium comprising at least one synthetic amino acid (e.g., a dipeptide form of L-glutamine, e.g., L-alanyl-L-glutamine), wherein the basal medium is free of a free form of glutamine (i.e., L-glutamine) and a protein. The present application also provides a frozen supplement comprising a free form of glutamine (i.e., L-glutamine), and, in some cases, at least one protein, such as a serum-substituting protein. One or more further supplements can be added, including one or more supplements containing at least one protein, such as a serum-substituting protein, or one or more other components supporting growth and expansion of cells. In some embodiments, the concentration of the synthetic amino acid (e.g., a dipeptide form of L-glutamine, e.g., L-alanyl-L-glutamine) is about 0.5 mM to 5 mM (such as 2 mM). In some embodiments, the concentration of L-glutamine is about 0.5 mM to 5 mM (such as 2 mM). In some embodiments, the at least one protein is a human protein or a recombinant protein, such as a serum-substituting protein, e.g. albumin. In some embodiments, the serum free media further comprises one or more cytokine (such as IL-2, IL-7, or IL-15). In some embodiments, the serum-free media does not comprise phenol red.

In some embodiments, the provided serum-free media is produced or prepared from a liquid basal medium and one or more supplements.

In some embodiments, there is provided a liquid basal medium containing a synthetic amino acid that is capable of being converted into L-glutamine in a cell culture, such as a synthetic amino acid that is a dipeptide form of L-glutamine, e.g., L-alanyl-L-glutamine. In some cases, the basal medium is free of L-glutamine and a protein. In some embodiments, the concentration of the synthetic amino acid (e.g., a dipeptide form of L-glutamine, e.g., L-alanyl-L-glutamine) is about 0.5 mM to 5 mM (such as 2 mM). In some embodiments, the at least one protein is a human-derived protein, a recombinant protein, or both. In some embodiments, the basal medium does not comprise phenol red.

In some embodiments, there is provided a supplement comprising at least one protein and a free form of glutamine, e.g. L-glutamine, wherein the supplement is frozen or has been frozen after L-glutamine becomes a component thereof. In some embodiments, the concentration of L-glutamine in the supplement is less than 200 mM, such as less than 150 mM, 100 mM or less, such as 20 mM to 120 mM, or 40 mM to 100 mM, such as or about 80 mM. In some embodiments, the concentration of L-glutamine after the supplement has been combined with basal medium is about 0.5 mM to about 5 mM (such as 2 mM). In some embodiments, the at least one protein is not of non-mammalian origin. In some embodiments, the at least one protein is a human protein or a human-derived protein or is recombinant. In some embodiments, the at least one protein includes albumin, e.g. human or recombinant human albumin.

A. Basal Medium

In some embodiments, the basal medium comprises an amino acid. In some embodiments, the amino acid comprises aspartic acid, glutamic acid, asparagine, serine, glutamine, histidine, glycine, threonine, arginine, alanine, tyrosine, cysteine, valine, methionine, norvaline, tryptophan, phenylalanine, isoleucine, leucine, lysine, hydroxyproline, sarcosine, and/or proline.

In some embodiments, the basal medium comprises at least one synthetic amino acid. In some embodiments, the synthetic amino acid is capable of being converted into a free form of glutamine (i.e., L-glutamine) in a cell culture comprising a cell. In some embodiments, the cell comprises a human cell. In some embodiments, the cell comprises an immune cell. In some embodiments, the cell is a genetically engineered cell. In some embodiments, the cell is a T cell. In some embodiments, the cell is a genetically engineered T cell. In some embodiments, the cell is genetically engineered to express a recombinant receptor (e.g., a chimeric antigen receptor). In some embodiments, the cell is a chimeric antigen receptor (CAR) expressing T cells.

In some embodiments, the synthetic amino acid is a stabilized form of glutamine (i.e., L-glutamine). In some embodiments, the synthetic amino acid is more stable than glutamine (i.e., L-glutamine) in an aqueous solution (e.g., a basal medium). In some embodiments, the synthetic amino acid does not produce a significant amount of glutamine in the basal medium. In some embodiments, the synthetic amino acid does not produce a significant amount of pyrrolidone carboxylic acid or ammonia. In some embodiments, the synthetic amino acid does not produce a significant amount of glutamine (i.e., L-glutamine) for at least about 1, 3, 5, 7, 9, 11, 13, or 14 days in the basal medium. In some embodiments, the synthetic amino acid does not produce a significant amount of glutamine (i.e., L-glutamine) for at least about 1, 2, 3, 4, 5, 6, 7, or 8 weeks in the basal medium. In some embodiments, the synthetic amino acid does not produce a significant amount of glutamine (i.e., L-glutamine) for at least about 1, 2, 3, 4, 5, 6, 7, 8, 9, 10, 11, or 12 months in the basal medium. In some embodiments, the synthetic amino acid does not produce a significant amount of glutamine (i.e., L-glutamine) for at least 1, 2, 3, 4, or 5 years in the basal medium. In some embodiments, the synthetic amino acid does not produce a significant amount of pyrrolidone carboxylic acid or ammonia for at least about 1, 3, 5, 7, 9, 11, 13, or 14 days in the basal medium. In some embodiments, the synthetic amino acid does not produce a significant amount of pyrrolidone carboxylic acid or ammonia for at least about 1, 2, 3, 4, 5, 6, 7, or 8 weeks in the basal medium. In some embodiments, the synthetic amino acid does not produce a significant amount of pyrrolidone carboxylic acid or ammonia for at least about 1, 2, 3, 4, 5, 6, 7, 8, 9, 10, 11, or 12 months in the basal medium. In some embodiments, the synthetic amino acid does not produce a significant amount of pyrrolidone carboxylic acid or ammonia for at least 1, 2, 3, 4, or 5 years in the basal medium.

In some embodiments, the synthetic amino acid is soluble in an aqueous solution (e.g., a basal medium). In some embodiments, the solubility of the synthetic amino acid in the aqueous solution is higher than a free form of glutamine (i.e., L-glutamine).

In some embodiments, the synthetic amino acid is capable of being transported into a cell, wherein it can be converted into a free form of glutamine (i.e., L-glutamine). In some embodiments, the cell comprises an immune cell. In some embodiments, the cell is a genetically engineered cell. In some embodiments, the cell is a T cell. In some embodiments, the cell is a genetically engineered T cell. In some embodiments, the cell is genetically engineered to express a recombinant receptor (e.g., a chimeric antigen receptor). In some embodiments, the cell is a chimeric antigen receptor (CAR) expressing T cells.

In some embodiments, the synthetic amino acid is a dipeptide. In some embodiments, the synthetic amino acid is a tripeptide. In some embodiments, the synthetic amino acid is a dipeptide form of L-glutamine (e.g., L-alanyl-L-glutamine).

In some embodiments, the concentration of the dipeptide form of L-glutamine (e.g., L-alanyl-L-glutamine) in the basal medium is about 0.5 mM-5 mM. In some embodiments, the concentration of the dipeptide form of L-glutamine (e.g., L-alanyl-L-glutamine) in the basal medium is at or about 2 mM. In some embodiments, the concentration of the dipeptide form of L-glutamine (e.g., L-alanyl-L-glutamine) is at or about 0.5 mM-1 mM, 0.5 mM-1.5 mM, 0.5 mM-2 mM, 0.5 mM-2.5 mM, 0.5 mM-3 mM, 0.5 mM-3.5 mM, 0.5 mM-4 mM, 0.5 mM-4.5 mM, 0.5 mM-5 mM, 1 mM-1.5 mM, 1 mM-2 mM, 1 mM-2.5 mM, 1 mM-3 mM, 1 mM-3.5 mM, 1 mM-4 mM, 1 mM-4.5 mM, 1 mM-5 mM, 1.5 mM-2 mM, 1.5 mM-2.5 mM, 1.5 mM-3 mM, 1.5 mM-3.5 mM, 1.5 mM-4 mM, 1.5 mM-4.5 mM, 1.5 mM-5 mM, 2 mM-2.5 mM, 2 mM-3 mM, 2 mM-3.5 mM, 2 mM-4 mM, 2 mM-4.5 mM, 2 mM-5 mM, 2.5 mM-3 mM, 2.5 mM-3.5 mM, 2.5 mM-4 mM, 2.5 mM-4.5 mM, 2.5 mM-5 mM, 3 mM-3.5 mM, 3 mM-4 mM, 3 mM-4.5 mM, 3 mM-5 mM, 3.5 mM-4 mM, 3.5 mM-4.5 mM, 3.5 mM-5 mM, 4 mM-4.5 mM, 4 mM-5 mM, or 4.5 mM-5 mM, each inclusive. In some embodiments, the concentration of the dipeptide form of L-glutamine (e.g., L-alanyl-L-glutamine) in the basal medium is at or about 5 mM-7.5 mM, 5 mM-10 mM, 5 mM-12.5 mM, 5 mM-15 mM, 5 mM-17.5 mM, 5 mM-20 mM, 7.5 mM-10 mM, 7.5 mM-12.5 mM, 7.5 mM-15 mM, 7.5 mM-17.5 mM, 7.5 mM-20 mM, 10 mM-12.5 mM, 10 mM-15 mM, 10 mM-17.5 mM, 10 mM-20 mM, 12.5 mM-15 mM, 12.5 mM-17.5 mM, 12.5 mM-20 mM, 15 mM-17.5 mM, 15 mM-20 mM, or 17.5 mM-20 mM, each inclusive. In some embodiments, the concentration of dipeptide form of L-glutamine (e.g., L-alanyl-L-glutamine) in the basal medium is at least at or about 0.5 mM, 1 mM, 1.5 mM, 2 mM, 2.5 mM, 3 mM, 3.5 mM, 4 mM, 4.5 mM, or 5 mM. In some embodiments, the concentration of the dipeptide form of L-glutamine (e.g., L-alanyl-L-glutamine) in the basal medium is or is about 2 mM. In some embodiments, the concentration of the dipeptide form of L-glutamine (e.g., L-alanyl-L-glutamine) in the basal medium is at most at or about 2 mM, 2.5 mM, 3 mM, 3.5 mM, 4 mM, 4.5 mM, 5 mM, 5.5 mM, 6 mM, 6.5 mM, 7 mM, 7.5 mM, 8 mM, 8.5 mM, 9 mM, 9.5 mM, 10 mM, 12.5 mM, 15 mM, 17.5 mM, or 20 mM.

In some embodiments, the basal medium does not comprise L-glutamine or does not comprise a significant amount of L-glutamine. In some embodiments, the basal medium comprises L-glutamine. In some embodiments, the concentration of the L-glutamine in the basal medium is at or about or less than at or about 0.1 mM, 0.2 mM, 0.3 mM, 0.4 mM, or 0.5 mM. In some embodiments, the concentration of the L-glutamine in the basal medium is at or about or less than at or about 1 mM, 2 mM, 3 mM, 4 mM, or 5 mM.

In some embodiments, the one or more amino acids, including at least one synthetic amino acid that is capable of being converted into a free form of glutamine (i.e., L-glutamine), e.g. dipeptide form of L-glutamine, such as L-alanyl-L-glutamine, is provided in a base media. In some embodiments, the base media is an artificial or synthetic medium. In some embodiments, the base media is a balanced salt solution (e.g., PBS, DPBS, HBSS, EBSS). In some embodiments, the basal media is selected from Dulbecco's Modified Eagle's Medium (DMEM), Minimal Essential Medium (MEM), Basal Medium Eagle (BME), F-10, F-12, RPMI 1640, Glasgow's Minimal Essential Medium (GMEM), alpha Minimal Essential Medium (alpha MEM), Iscove's Modified Dulbecco's Medium, and M199. In some embodiments, the base media is a complex medium (e.g., RPMI-1640, IMDM). In some embodiments, the base medium is OpTmizer™ CTS™ T-Cell Expansion Basal Medium (ThermoFisher).

In some embodiments, the basal media comprises a nutrient mixture of inorganic salts, sugars, amino acids, optionally also containing vitamins, organic acids, antioxidants, and/or buffers.

In some embodiments, the basal medium comprises $CO_3$ and $HCO_3$. In some embodiments, the content of $CO_3/HCO_3$ content of the basal medium is balanced with gaseous CO2 (e.g., 5-10%), thereby maintaining an optimal pH in the medium. In some embodiments, the basal medium comprises a zwitterion, HEPES. In some embodiments, the basal medium comprises phenol red. In some embodiments, the basal medium does not comprise phenol red.

In some embodiments, the basal medium comprises an inorganic salt. In some embodiments, the inorganic salt promotes the osmotic balance. In some embodiments, the inorganic salt regulates membrane potential by providing sodium, potassium, and calcium ions.

In some embodiments, the basal medium comprises one or more carbohydrates. In some embodiments, the carbohydrate comprises glucose. In some embodiments, the carbohydrate comprises galactose. In some embodiments, the carbohydrate comprises maltose. In some embodiments, the carbohydrate comprises fructose.

In some embodiments, the basal medium comprises fatty acid. In some embodiments, the basal medium comprises lipid. In some embodiments, the basal medium comprises vitamin (e.g., Vitamin A, Vitamin B7, Vitamin B9, Vitamin B12, Vitamin C, Vitamin E). In some embodiments, the basal medium comprises a trace element. In some embodiments, the trace element comprises copper. In some embodiments, the trace element comprises zinc. In some embodiments, the trace element comprises selenium. In some embodiments, the trace element comprises tricarboxylic acid intermediate.

In some embodiments, the basal medium contains a mixture of inorganic salts, sugars, amino acids, and, optionally, vitamins, organic acids and/or buffers or other well known cell culture nutrients. In addition to nutrients, the medium also helps maintain pH and osmolality. In some aspects, the reagents of the basal media support cell growth, proliferation and/or expansion. A wide variety of commercially available basal media are well known to those skilled in the art, and include Dulbeccos' Modified Eagles Medium (DMEM), Roswell Park Memorial Institute Medium (RPMI), Iscove modified Dulbeccos' medium and Hams medium. In some embodiments, the basal medium is Iscove's Modified Dulbecco's Medium, RPMI- 1640, or α-MEM.

In some embodiments, the basal medium is free of a protein. In some embodiments, the basal medium is free of a human protein (e.g., a human serum protein). In some embodiments, the basal medium is serum-free. In some embodiments, the basal medium is free of serum derived from human. In some embodiments, the basal medium is free of a recombinant protein. In some embodiments, the basal medium is free of a human protein and a recombinant protein.

In some embodiments, the basal medium comprises a protein or a peptide. In some embodiments, the protein is an albumin or albumin substitute. In some embodiments, the albumin is a human derived albumin. In some embodiments, the albumin is a recombinant albumin. In some embodiments, the albumin is a natural human serum albumin. In some embodiments, the albumin is a recombinant human serum albumin. In some embodiments, the albumin is a recombinant albumin from a non-human source. Albumin substitutes may be any protein or polypeptide source. Examples of such protein or polypeptide samples include but are not limited to bovine pituitary extract, plant hydrolysate (e.g., rice hydrolysate), fetal calf albumin (fetuin), egg albumin, human serum albumin (HSA), or another animal-derived albumins, chick extract, bovine embryo extract, AlbuMAX® I, and AlbuMAX® II. In some embodiments, the protein or peptide comprises a transferrin. In some embodiments, the protein or peptide comprises a fibronectin. In some embodiments, the protein or peptide comprises aprotinin. In some embodiments, the protein comprises fetuin.

In some embodiments, the basal medium (e.g. a basal medium) is a liquid formulation. In some embodiments, the basal medium (e.g. a basal medium) has not been frozen or is instructed not to be frozen (e.g., according to its protocol) prior to an intended use. In some embodiments, the basal medium is stored at at or about 2° C. to 8° C. In some embodiments, the basal medium is stored at room temperature. In some embodiments, the basal medium is stable for at least at or about 1, 2, 3, 4, 5, or 6 weeks when stored at 2° C. to 8° C. In some embodiments, the basal medium is stable for at least at or about 1, 2, 3, 4, 5, or 6 months when stored at 2° C. to 8° C.

B. Supplement

In some embodiments, provided herein is a supplement, such as a first supplement, comprising a free form of glutamine (i.e., L-glutamine). In some embodiments, such a supplement is frozen prior to use and/or incorporation into a base media. In some embodiments, the supplement such as these described herein is intended to be used as a media supplement (e.g., a media supplement for a basal medium). In some embodiments, the first supplement is intended to be used as a supplement for the maintenance, expansion, and/or activation of a cell. In some embodiments, the first supplement is intended to be used as a supplement for the expansion of a cell. In some embodiments, the first supplement comprises a frozen supplement comprising at least one protein and a free form of glutamine (i.e., L-glutamine), wherein a basal cell culture medium supplemented with the first supplement is capable of supporting the expansion of a cell. In some embodiments, the cell is a primary cell. In some embodiments, the cell is an immune cell. In some embodiments, the cell is a T cell. In some embodiments, the cell is a CD4 T cell or CD8 T cell. In some embodiments, the cell is a cell from human. In some embodiments, the cell is an immune cell from human. In some embodiments, the cell is a T cell from human. In some embodiments, the cell is a primary immune cell from human. In some embodiments, the cell is a genetically engineered cell. In some embodiments, the cell is a genetically engineered cell derived from human. In some embodiments, the cell is a genetically engineered T cell (e.g., a chimeric antigen receptor (CAR) expressing T cell) from human.

In some embodiments, the first supplement is stored or is recommended to be stored at or about −20° C. to at or about 0° C. before its intended use. In some embodiments, the supplement is stored or is recommended to be stored at less than about 0° C. In some embodiments, the supplement is frozen immediately or quickly after the free form of glutamine (i.e., L-glutamine) becomes a component thereof until the time when the supplement is used for its intended use. In some embodiments, the supplement is frozen for the majority of the time after the free form of glutamine (i.e., L-glutamine) becomes a component thereof until the time when the supplement is used for its intended use. In some embodiments, the supplement is not kept as a liquid for more than 1, 2, 3, 4, 5, 6, or 7 days after the free form of glutamine (i.e., L-glutamine) becomes a component thereof until the time when the supplement is used for its intended use. In some embodiments, the supplement is not kept as a liquid for more than or more than about 4, 8, 12, 16, 20, or 24 hours after the free form of glutamine (i.e., L-glutamine) becomes a component thereof until the time when the supplement is used for its intended use. In some embodiments, the supplement is frozen for the majority of the time both before and after the free form of glutamine (i.e., L-glutamine) becomes a component thereof until the time when the supplement is used for its intended use. In some embodiments, the supplement is at or below room temperature (e.g., the temperature of the supplement is under or under about 20° C., 15° C., 10° C., 5° C., or 0° C.) when the free form of glutamine (i.e., L-glutamine) becomes a component of the supplement.

In some embodiments, the L-glutamine in the supplement does not precipitate when the supplement is thawed. In some embodiments, the L-glutamine in the supplement does not precipitate when the supplement is a liquid. In some embodiments, the L-glutamine in the supplement does not precipitate when the supplement is thawed under room temperature. In some embodiments, the concentration of L-glutamine in the supplement is at or about or less than or less than about 200 mM, 180 mM, 160 mM, 140 mM, 120 mM, 100 mM or 80 mM. In some embodiments, the concentration of L-glutamine in the supplement is at or about 10 mM to at or about 30 mM, at or about 10 mM to at or about 50 mM, at or about 10 mM to at or about 70 mM, at or about 10 mM to at or about 90 mM, at or about 10 mM to at or about 110 mM, at or about 10 mM to at or about 130 mM, at or about 10 mM to at or about 150 mM, at or about 10 mM to at or about 170 mM, at or about 30 mM to at or about 50 mM, at or about 30 mM to at or about 70 mM, at or about 30 mM to at or about 90 mM, at or about 30 mM to at or about 110 mM, at or about 30 mM to at or about 130 mM, at or about 30 mM to at or about 150 mM, at or about 30 mM to at or about 170 mM, at or about 50 mM to at or about 70 mM, at or about 50 mM to at or about 90 mM, at or about 50 mM to at or about 110 mM, at or about 50 mM to at or about 130 mM, at or about 50 mM to at or about 150 mM, at or about 50 mM to at or about 170 mM, at or about 70 mM to at or about 90 mM, at or about 70 mM to at or about 110 mM, at or about 70 mM to at or about 130 mM, at or about 70 mM to at or about 150 mM, at or about 70 mM to at or about 170 mM, at or about 90 mM to at or about 110 mM, at or about 90 mM to at or about 130 mM, at or about 90 mM to at or about 150 mM, at or about 90 mM to at or about 170 mM, at or about 110 mM to at or about 130 mM, at or about 110 mM to at or about 150 mM, at or about 110 mM to at or about 170 mM, at or about 130 mM to at or about 150 mM, at or about 130 mM to at or about 170 mM, or at or about 150 mM to at or about 170 mM. In some embodiments, the concentration of L-glutamine in the supplement is about 80 mM.

In some embodiments, the concentration of the free form of glutamine (i.e., L-glutamine) in the supplement is such that after the supplement is combined with a basal medium (such as these described herein), the concentration of the free form of glutamine (i.e., L-glutamine) in the media is at or about 0.5 mM-5 mM. In some embodiments, the concentration of the free form of glutamine (i.e., L-glutamine) in the basal medium is at or about 2 mM. In some embodiments, the concentration of the free form of glutamine (i.e., L-glutamine) is at or about 0.5 mM-1 mM, 0.5 mM-1.5 mM, 0.5 mM-2 mM, 0.5 mM-2.5 mM, 0.5 mM-3 mM, 0.5 mM-3.5 mM, 0.5 mM-4 mM, 0.5 mM-4.5 mM, 0.5 mM-5 mM, 1 mM-1.5 mM, 1 mM-2 mM, 1 mM-2.5 mM, 1 mM-3 mM, 1 mM-3.5 mM, 1 mM-4 mM, 1 mM-4.5 mM, 1 mM-5 mM, 1.5 mM-2 mM, 1.5 mM-2.5 mM, 1.5 mM-3 mM, 1.5 mM-3.5 mM, 1.5 mM-4 mM, 1.5 mM-4.5 mM, 1.5 mM-5 mM, 2 mM-2.5 mM, 2 mM-3 mM, 2 mM-3.5 mM, 2 mM-4 mM, 2 mM-4.5 mM, 2 mM-5 mM, 2.5 mM-3 mM, 2.5 mM-3.5 mM, 2.5 mM-4 mM, 2.5 mM-4.5 mM, 2.5 mM-5 mM, 3 mM-3.5 mM, 3 mM-4 mM, 3 mM-4.5 mM, 3 mM-5 mM, 3.5 mM-4 mM, 3.5 mM-4.5 mM, 3.5 mM-5 mM, 4 mM-4.5 mM, 4 mM-5 mM, or 4.5 mM-5 mM, each inclusive. In some embodiments, the concentration of the free form of glutamine (i.e., L-glutamine) in the basal medium is at or about 5 mM-7.5 mM, 5 mM-10 mM, 5 mM-12.5 mM, 5 mM-15 mM, 5 mM-17.5 mM, 5 mM-20 mM, 7.5 mM-10 mM, 7.5 mM-12.5 mM, 7.5 mM-15 mM, 7.5 mM-17.5 mM, 7.5 mM-20 mM, 10 mM-12.5 mM, 10 mM-15 mM, 10 mM-17.5 mM, 10 mM-20 mM, 12.5 mM-15 mM, 12.5 mM-17.5 mM, 12.5 mM-20 mM, 15 mM-17.5 mM, 15 mM-20 mM, or 17.5 mM-20 mM, each inclusive. In some embodiments, the concentration of the free form of glutamine (i.e., L-glutamine) in the basal medium is at least at or about 0.5 mM, 1 mM, 1.5 mM, 2 mM, 2.5 mM, 3 mM, 3.5 mM, 4 mM, 4.5 mM, or 5 mM. In some embodiments, the concentration of the free form of glutamine (i.e., L-glutamine) in the basal medium is at most at or about 2 mM, 2.5 mM, 3 mM, 3.5 mM, 4 mM, 4.5 mM, 5 mM, 5.5 mM, 6 mM, 6.5 mM, 7 mM, 7.5 mM, 8 mM, 8.5 mM, 9 mM, 9.5 mM, 10 mM, 12.5 mM, 15 mM, 17.5 mM, or 20 mM.

In some embodiments, the first supplement contains one or more additional components. In some embodiments, a further supplement, such as a second supplement, is provided to provide one or more additional components. In some embodiments, the supplements, the first supplement and optionally one or more further supplements, e.g. second supplement, are combined with the basal media to provide the one or more additional components to the basal media.

In some embodiments, the one or more additional components include at least one protein. In some embodiments, the at least one protein is not of non-mammalian origin. In some embodiments, the at least one protein is human or derived from human. In some embodiments, the at least one protein is recombinant. In some embodiments, the at least one protein includes albumin, transferrin, insulin, fibronectin, aprotinin or fetuin. In some embodiments, the protein comprises one or more of albumin, insulin or transferrin, optionally one or more of a human or recombinant albumin, insulin or transferrin.

In some embodiments, the protein is an albumin or albumin substitute. In some embodiments, the albumin is a human derived albumin. In some embodiments, the albumin is a recombinant albumin. In some embodiments, the albumin is a natural human serum albumin. In some embodiments, the albumin is a recombinant human serum albumin. In some embodiments, the albumin is a recombinant albumin from a non-human source. Albumin substitutes may be any protein or polypeptide source. Examples of such protein or polypeptide samples include but are not limited to bovine pituitary extract, plant hydrolysate (e.g., rice hydrolysate), fetal calf albumin (fetuin), egg albumin, human serum albumin (HSA), or another animal-derived albumins, chick extract, bovine embryo extract, AlbuMAX® I, and AlbuMAX® II.

In some embodiments, the one or more additional components include an albumin. In some embodiments, the albumin is human albumin or derived from human albumin. In some embodiments, the albumin is derived from human serum or human plasma. In some embodiments, the albumin is a recombinant albumin. In some embodiments, the recombinant albumin is derived from human. In some embodiments, the recombinant albumin is not derived from human. In some embodiments, the supplement comprises a natural albumin. In some embodiments, the natural albumin is derived from human. In some embodiments, the natural albumin is not derived from human. In some embodiments, the concentration of the albumin in the supplement is such that after the supplement is combined with a basal medium (such as these described herein), at or about the concentration of the albumin in the media is at or about 0mg/mL to at or about 2 mg/mL, at or about 0mg/mL to at or about 4 mg/mL, at or about 0mg/mL to at or about 6 mg/mL, at or about 0mg/mL to at or about 8 mg/mL, at or about 0mg/mL to at or about 10 mg/mL, at or about 0 mg/mL to at or about 12 mg/mL, at or about 2 mg/mL to at or about 4 mg/mL, at or about 2 mg/mL to at or about 6 mg/mL, at or about 2 mg/mL to at or about 8 mg/mL, at or about 2 mg/mL to at or about 10 mg/mL, at or about 2 mg/mL to at or about 12 mg/mL, at or about 4 mg/mL to at or about 6 mg/mL, at or about 4 mg/mL to at or about 8 mg/mL, at or about 4 mg/mL to at or about 10 mg/mL, at or about 4 mg/mL to at or about 12 mg/mL, at or about 6 mg/mL to at or about 8 mg/mL, at or about 6 mg/mL to at or about 10 mg/mL, at or about 6 mg/mL to at or about 12 mg/mL, at or about 8 mg/mL to at or about 10 mg/mL, at or about 8 mg/mL to at or about 12 mg/mL, at or about 10 mg/mL to at or about 12 mg/mL, or at or about 10 mg/mL to at or about 15 mg/mL each inclusive. In some embodiments, at or about the albumin in the media is at or about 5 mg/mL.

In some embodiments, the one or more additional components include a transferrin or transferrin substitute. In some embodiments, a transferrin substitute is a compound which may replace transferrin in the supplement to give substantially similar results as transferrin. Examples of transferrin substitutes include but are not limited to any iron chelate compound. Iron chelate compounds which may be used include but are not limited to iron chelates of ethylenediaminetetraacetic acid (EDTA), ethylene glycol-bis(O-aminoethyl ether)-N,N,N',N'-tetraacetic acid (EGTA), deferoxamine mesylate, dimercaptopropanol, diethylenetriamine-pentaacetic acid (DTPA), and trans-1,2-diaminocyclohexane-N,N,N',N'-tetraacetic acid (CDTA), as well as a ferric citrate chelate and a ferrous sulfate chelate. In some embodiments, the transferrin is iron saturated transferrin. In some embodiments, the transferrin is iron saturated human transferrin.

In some embodiments, the transferrin or transferrin substitute is human transferrin or is derived from human transferrin. In some embodiments, the transferrin or transferrin substitute is derived from human serum or plasma. In some embodiments, the transferrin or transferrin substitute is recombinant transferrin. In some embodiments, the concentration of the transferrin is such that after the supplement is combined with a basal medium (such as these described herein), the concentration of the transferrin in the media is at or about 10 mg/L to at or about 50 mg/L, at or about 10 mg/L to at or about 100 mg/L, at or about 10 mg/L to at or about 150 mg/L, at or about 10 mg/L to at or about 200 mg/L, at or about 10 mg/L to at or about 250 mg/L, at or about 10 mg/L to at or about 300 mg/L, at or about 10 mg/L to at or about 350 mg/L, at or about 10 mg/L to at or about 400 mg/L, at or about 10 mg/L to at or about 450 mg/L, at or about 10 mg/L to at or about 500 mg/L, at or about 10 mg/L to at or about 550 mg/L, at or about 10 mg/L to at or about 600 mg/L, at or about 10 mg/L to at or about 650 mg/L, at or about 10 mg/L to at or about 750 mg/L, at or about 50 mg/L to at or about 100 mg/L, at or about 50 mg/L to at or about 150 mg/L, at or about 50 mg/L to at or about 200 mg/L, at or about 50 mg/L to at or about 250 mg/L, at or about 50 mg/L to at or about 300 mg/L, at or about 50 mg/L to at or about 350 mg/L, at or about 50 mg/L to at or about 400 mg/L, at or about 50 mg/L to at or about 450 mg/L, at or about 50 mg/L to at or about 500 mg/L, at or about 50 mg/L to at or about 550 mg/L, at or about 50 mg/L to at or about 600 mg/L, at or about 50 mg/L to at or about 650 mg/L, at or about 50 mg/L to at or about 750 mg/L, at or about 100 mg/L to at or about 150 mg/L, at or about 100 mg/L to at or about 200 mg/L, at or about 100 mg/L to at or about 250 mg/L, at or about 100 mg/L to at or about 300 mg/L, at or about 100 mg/L to at or about 350 mg/L, at or about 100 mg/L to at or about 400 mg/L, at or about 100 mg/L to at or about 450 mg/L, at or about 100 mg/L to at or about 500 mg/L, at or about 100 mg/L to at or about 550 mg/L, at or about 100 mg/L to at or about 600 mg/L, at or about 100 mg/L to at or about 650 mg/L, at or about 100 mg/L to at or about 750 mg/L, at or about 150 mg/L to at or about 200 mg/L, at or about 150 mg/L to at or about 250 mg/L, at or about 150 mg/L to at or about 300 mg/L, at or about 150 mg/L to at or about 350 mg/L, at or about 150 mg/L to at or about 400 mg/L, at or about 150 mg/L to at or about 450 mg/L, at or about 150 mg/L to at or about 500 mg/L, at or about 150 mg/L to at or about 550 mg/L, at or about 150 mg/L to at or about 600 mg/L, at or about 150 mg/L to at or about 650 mg/L, at or about 150 mg/L to at or about 750 mg/L, at or about 200 mg/L to at or about 250 mg/L, at or about 200 mg/L to at or about 300 mg/L, at or about 200 mg/L to at or about 350 mg/L, at or about 200 mg/L to at or about 400 mg/L, at or about 200 mg/L to at or about 450 mg/L, at or about 200 mg/L to at or about 500 mg/L, at or about 200 mg/L to at or about 550 mg/L, at or about 200 mg/L to at or about 600 mg/L, at or about 200 mg/L to at or about 650 mg/L, at or about 200 mg/L to at or about 750 mg/L, at or about 250 mg/L to at or about 300 mg/L, at or about 250 mg/L to at or about 350 mg/L, at or about 250 mg/L to at or about 400 mg/L, at or about 250 mg/L to at or about 450 mg/L, at or about 250 mg/L to at or about 500 mg/L, at or about 250 mg/L to at or about 550 mg/L, at or about 250 mg/L to at or about 600 mg/L, at or about 250 mg/L to at or about 650 mg/L, at or about 250 mg/L to at or about 750 mg/L, at or about 300 mg/L to at or about 350 mg/L, at or about 300 mg/L to at or about 400 mg/L, at or about 300 mg/L to at or about 450 mg/L, at or about 300 mg/L to at or about 500 mg/L, at or about 300 mg/L to at or about 550 mg/L, at or about 300 mg/L to at or about 600 mg/L, at or about 300 mg/L to at or about 650 mg/L, at or about 300 mg/L to at or about 750 mg/L, at or about 350 mg/L to at or about 400 mg/L, at or about 350 mg/L to at or about 450 mg/L, at or about 350 mg/L to at or about 500 mg/L, at or about 350 mg/L to at or about 550 mg/L, at or about 350 mg/L to at or about 600 mg/L, at or about 350 mg/L to at or about 650 mg/L, at or about 350 mg/L to at or about 750 mg/L, at or about 400 mg/L to at or about 450 mg/L, at or about 400 mg/L to at or about 500 mg/L, at or about 400 mg/L to at or about 550 mg/L, at or about 400 mg/L to at or about 600 mg/L, at or about 400 mg/L to at or about 650 mg/L, at or about 400 mg/L to at or about 750 mg/L, at or about 450 mg/L to at or about 500 mg/L, at or about 450 mg/L to at or about 550 mg/L, at or about 450 mg/L to at or about 600 mg/L, at or about 450 mg/L to at or about 650 mg/L, at or about 450 mg/L to at or about 750 mg/L, at or about 500 mg/L to at or about 550 mg/L, at or about 500 mg/L to at or about 600 mg/L, at or about 500 mg/L to at or about 650 mg/L, at or about 500 mg/L to at or about 750 mg/L, at or about 550 mg/L to at or about 600 mg/L, at or about 550 mg/L to at or about 650 mg/L, at or about 550 mg/L to at or about 750 mg/L, at or about 600 mg/L to at or about 650 mg/L, at or about 600 mg/L to at or about 750 mg/L, or at or about 650 mg/L to at or about 750 mg/L. In some embodiments, the concentration of the transferrin is such that after the supplement is combined with a basal medium (such as these described herein), the concentration of the transferrin in the media is at or about 100 mg/L. In some embodiments, the concentration of the transferrin is such that after the supplement is combined with a basal medium (such as these described herein), the concentration of the transferrin in the media is at or about 50 mg/L to at or about 150 mg/L.

In some embodiments, the one or more additional components include insulin or insulin substitute. In some embodiments, an insulin substitute is a zinc containing compound which may be used in place of insulin to give substantially similar results as insulin. Examples of insulin substitutes include but are not limited to zinc chloride, zinc nitrate, zinc bromide, and zinc sulfate. A number of insulins are known to those of ordinary skill in the art. See Gilman, A. G. et al, Eds., The Pharmacological Basis of Therapeutics, Pergamon Press, New York, 1990, pp. 1463-1495. In some embodiments, insulin, rather than an insulin substitute, is used in the supplement and the medium. In some embodiments, the insulin is zinc insulin. In some embodiments, the insulin is human zinc insulin.

In some embodiments, the insulin is a human insulin or derived from human insulin. In some embodiments, the insulin is a recombinant insulin. In some embodiment, the insulin is a recombinant human insulin. In some embodiment, the concentration of the insulin (or insulin substitute) is such that after the supplement is combined with a basal medium (such as these described herein), at or about the concentration of the insulin (or insulin substitute) in the media is about 1 mg/L to at or about 2.5 mg/L, at or about 1 mg/L to at or about 5 mg/L, at or about 1 mg/L to at or about 7.5 mg/L, at or about 1 mg/L to at or about 10 mg/L, at or about 1 mg/L to at or about 12.5 mg/L, at or about 1 mg/L to at or about 15 mg/L, at or about 1 mg/L to at or about 17.5 mg/L, at or about 1 mg/L to at or about 20 mg/L, at or about 1 mg/L to at or about 22.5 mg/L, at or about 1 mg/L to at or about 25 mg/L, at or about 1 mg/L to at or about 27.5 mg/L, at or about 1 mg/L to at or about 30 mg/L, at or about 2.5 mg/L to at or about 5 mg/L, at or about 2.5 mg/L to at or about 7.5 mg/L, at or about 2.5 mg/L to at or about 10 mg/L, at or about 2.5 mg/L to at or about 12.5 mg/L, at or about 2.5 mg/L to at or about 15 mg/L, at or about 2.5 mg/L to at or about 17.5 mg/L, at or about 2.5 mg/L to at or about 20 mg/L, at or about 2.5 mg/L to at or about 22.5 mg/L, at or about 2.5 mg/L to at or about 25 mg/L, at or about 2.5 mg/L to at or about 27.5 mg/L, at or about 2.5 mg/L to at or about 30 mg/L, at or about 5 mg/L to at or about 7.5 mg/L, at or about 5 mg/L to at or about 10 mg/L, at or about 5 mg/L to at or about 12.5 mg/L, at or about 5 mg/L to at or about 15 mg/L, at or about 5 mg/L to at or about 17.5 mg/L, at or about 5 mg/L to at or about 20 mg/L, at or about 5 mg/L to at or about 22.5 mg/L, at or about 5 mg/L to at or about 25 mg/L, at or about 5 mg/L to at or about 27.5 mg/L, at or about 5 mg/L to at or about 30 mg/L, at or about 7.5 mg/L to at or about 10 mg/L, at or about 7.5 mg/L to at or about 12.5 mg/L, at or about 7.5 mg/L to at or about 15 mg/L, at or about 7.5 mg/L to at or about 17.5 mg/L, at or about 7.5 mg/L to at or about 20 mg/L, at or about 7.5 mg/L to at or about 22.5 mg/L, at or about 7.5 mg/L to at or about 25 mg/L, at or about 7.5 mg/L to at or about 27.5 mg/L, at or about 7.5 mg/L to at or about 30 mg/L, at or about 10 mg/L to at or about 12.5 mg/L, at or about 10 mg/L to at or about 15 mg/L, at or about 10 mg/L to at or about 17.5 mg/L, at or about 10 mg/L to at or about 20 mg/L, at or about 10 mg/L to at or about 22.5 mg/L, at or about 10 mg/L to at or about 25 mg/L, at or about 10 mg/L to at or about 27.5 mg/L, at or about 10 mg/L to at or about 30 mg/L, at or about 12.5 mg/L to at or about 15 mg/L, at or about 12.5 mg/L to at or about 17.5 mg/L, at or about 12.5 mg/L to at or about 20 mg/L, at or about 12.5 mg/L to at or about 22.5 mg/L, at or about 12.5 mg/L to at or about 25 mg/L, at or about 12.5 mg/L to at or about 27.5 mg/L, at or about 12.5 mg/L to at or about 30 mg/L, at or about 15 mg/L to at or about 17.5 mg/L, at or about 15 mg/L to at or about 20 mg/L, at or about 15 mg/L to at or about 22.5 mg/L, at or about 15 mg/L to at or about 25 mg/L, at or about 15 mg/L to at or about 27.5 mg/L, at or about 15 mg/L to at or about 30 mg/L, at or about 17.5 mg/L to at or about 20 mg/L, at or about 17.5 mg/L to at or about 22.5 mg/L, at or about 17.5 mg/L to at or about 25 mg/L, at or about 17.5 mg/L to at or about 27.5 mg/L, at or about 17.5 mg/L to at or about 30 mg/L, at or about 20 mg/L to at or about 22.5 mg/L, at or about 20 mg/L to at or about 25 mg/L, at or about 20 mg/L to at or about 27.5 mg/L, at or about 20 mg/L to at or about 30 mg/L, at or about 22.5 mg/L to at or about 25 mg/L, at or about 22.5 mg/L to at or about 27.5 mg/L, at or about 22.5 mg/L to at or about 30 mg/L, at or about 25 mg/L to at or about 27.5 mg/L, or at or about 27.5 mg/L to at or about 30 mg/L. In some embodiments, the concentration of insulin or insulin substitute in the media is at or about 10 mg/L. In some embodiments, the concentration of insulin or insulin substitute in the media is at or about 7.5 mg/L to at or about 12.5 mg/L.

In some embodiments, the supplement, e.g. first supplement, is prepared by adding or mixing L-glutamine with existing supplements containing one or more desired components. In some embodiments, L-glutamine is added or mixed with a serum replacement supplement, for example, Immune Cell Serum Replacement (ThermoFisher, #A2598101). In some embodiments, the L-glutamine is added to or mixed with a supplement that includes an immune cell serum replacement described in Smith et al. *Clin Transl Immunology.* 2015 January; 4(1): e31. In some embodiments, the concentration of L-glutamine in the supplement is at or about 10 mM to at or about 30 mM, at or about 10 mM to at or about 50 mM, at or about 10 mM to at or about 70 mM, at or about 10 mM to at or about 90 mM, at or about 10 mM to at or about 110 mM, at or about 10 mM to at or about 130 mM, at or about 10 mM to at or about 150 mM, at or about 10 mM to at or about 170 mM, at or about 30 mM to at or about 50 mM, at or about 30 mM to at or about 70 mM, at or about 30 mM to at or about 90 mM, at or about 30 mM to at or about 110 mM, at or about 30 mM to at or about 130 mM, at or about 30 mM to at or about 150 mM, at or about 30 mM to at or about 170 mM, at or about 50 mM to at or about 70 mM, at or about 50 mM to at or about 90 mM, at or about 50 mM to at or about 110 mM, at or about 50 mM to at or about 130 mM, at or about 50 mM to at or about 150 mM, at or about 50 mM to at or about 170 mM, at or about 70 mM to at or about 90 mM, at or about 70 mM to at or about 110 mM, at or about 70 mM to at or about 130 mM, at or about 70 mM to at or about 150 mM, at or about 70 mM to at or about 170 mM, at or about 90 mM to at or about 110 mM, at or about 90 mM to at or about 130 mM, at or about 90 mM to at or about 150 mM, at or about 90 mM to at or about 170 mM, at or about 110 mM to at or about 130 mM, at or about 110 mM to at or about 150 mM, at or about 110 mM to at or about 170 mM, at or about 130 mM to at or about 150 mM, at or about 130 mM to at or about 170 mM, or at or about 150 mM to at or about 170 mM. In some embodiments, the concentration of L-glutamine in the supplement is at or about 80 mM.

In some embodiments, the one or more additional components include a growth factor. In some embodiments, the growth factor comprises epidermal growth factor (EGF). In some embodiments, the growth factor comprises fibroblast growth factor (FGF). In some embodiments, the growth factor comprises insulin-like growth factor (IGF). In some embodiments, the growth factor comprises nerve growth factor (NGF). In some embodiments, the growth factor comprises platelet-derived growth factor (PDGF). In some embodiments, the growth factor comprises transforming growth factor (TGF).

In some embodiments, the one or more additional components include a hormone (e.g., growth hormone, insulin, hydrocortisone, triiodothyronine, estrogen, androgen, progesterone, prolactin, follicle-stimulating hormone, gastrin-releasing peptide). In some embodiments, the one or more additional components include alpha-globulin or beta-globulin. In some embodiments, the one or more additional components include a peptide or peptide fraction (e.g., protein hydrolysate derived from animal, microorganism or plant).

In some embodiments, the one or more additional components include a lipid. In some embodiments, the lipid comprises cholesterol. In some embodiments, the lipid comprises steroid. In some embodiments, the lipid comprises fatty acid (e.g., palmitate, stearate, oleate, linoleate). In some embodiments, the lipid comprises ethanolamine. In some embodiments, the lipid comprises choline. In some embodiments, the lipid comprises inositol.

In some embodiments, the one or more additional components comprises a transition metal. In some embodiments, the transition metal comprises iron. In some embodiments, the transition metal comprises zinc. In some embodiments, the transition metal comprises copper. In some embodiments, the transition metal comprises chromium. In some embodiments, the transition metal comprises iodine. In some embodiments, the transition metal comprises cobalt. In some embodiments, the transition metal comprises selenium. In some embodiments, the transition metal comprises magnesium. In some embodiments, the transition metal comprises molybdenum.

In some embodiments, the one or more additional components include a vitamin. In some embodiments, the vitamin comprises a fat-soluble vitamin (e.g., Vitamin A, Vitamin D, Vitamin E, Vitamin K). In some embodiments, the vitamin comprises a water-soluble vitamin (e.g., B1, B2, B6, $B_{12}$, C, folate).

In some embodiments, the one or more additional components include a polyamine. In some embodiments, the polyamine comprises putrescine. In some embodiments the polyamine comprises spermidine. In some embodiments, the polyamine comprises spermine.

In some embodiments, the one or more additional components include a reductant. In some embodiments, the reductant comprises a 2-mercaptoethanol. In some embodiments, the reductant includes an alpha-thioglycerol. In some embodiments, the reductant comprises reduced glutathione.

In some embodiments, the one or more additional components include a protective additive. In some embodiments, the protective additive comprises carboxymethyl cellulose. In some embodiments, the protective additive comprises polyvinyl pyrrolidone. In some embodiments, the protective additive comprises pluronic F-68. In some embodiments, the protective additive comprises Tween 80.

In some embodiments, the one or more additional components include an adhesion factor. In some embodiments the adhesion factor comprises fibronectin. In some embodiments, the adhesion factor comprises laminin.

In some embodiments, the one or more additional components is one or more of one or more antioxidants, one or more albumins or albumin substitutes, one or more lipid agents, one or more insulins or insulin substitutes, one or more transferrins or transferrin substitutes, one or more trace elements, and one or more glucocorticoids. In some embodiments, the antioxidants include N-acetyl-L-cysteine, 2-mercaptoethanol, or D,L-tocopherol acetate, or derivatives or mixtures thereof. In some embodiments, the albumin is human serum albumin. In some embodiments, the lipid agents include Human Ex-Cite® or ethanolamine or derivatives and mixtures thereof. In some embodiments, the insulin is human zinc insulin. In some embodiments, transferrin is human iron-saturated transferrin. In some embodiments, the trace element is Se4+. In some embodiments, glucocorticoid is hydrocortisone. In some embodiments, the supplement is concentrated.

In some embodiments, the one or more additional components comprises one or more antioxidants, and one or more ingredients selected from the group consisting of one or more albumins or albumin substitutes, one or more lipid agents, one or more insulins or insulin substitutes, one or more transferrins or transferrin substitutes, one or more trace elements, and one or more glucocorticoids In some embodiments, the one or more additional components comprises one or more of N-acetyl-L cysteine, human serum albumin, Human Ex-Cyte®, ethanolamine, human zinc insulin, human iron saturated transferrin, Se4+, hydrocortisone, D,L-tocopherol acetate, and/or 2-mercaptoethanol.

In some embodiments, the one or more additional components include N-acetyl-L-cysteine (NAC). In some embodiments, the concentration of NAC is such that after the supplement is combined with a basal medium (such as these described herein), the concentration of NAC of in the basal medium is at or about 10 mg/L to at or about 50 mg/L, at or about 10 mg/L to at or about 100 mg/L, at or about 10 mg/L to at or about 150 mg/L, at or about 10 mg/L to at or about 200 mg/L, at or about 10 mg/L to at or about 250 mg/L, at or about 10 mg/L to at or about 300 mg/L, at or about 10 mg/L to at or about 350 mg/L, at or about 10 mg/L to at or about 400 mg/L, at or about 10 mg/L to at or about 450 mg/L, at or about 10 mg/L to at or about 500 mg/L, at or about 10 mg/L to at or about 550 mg/L, at or about 10 mg/L to at or about 600 mg/L, at or about 10 mg/L to at or about 650 mg/L, at or about 10 mg/L to at or about 700 mg/L, at or about 50 mg/L to at or about 100 mg/L, at or about 50 mg/L to at or about 150 mg/L, at or about 50 mg/L to at or about 200 mg/L, at or about 50 mg/L to at or about 250 mg/L, at or about 50 mg/L to at or about 300 mg/L, at or about 50 mg/L to at or about 350 mg/L, at or about 50 mg/L to at or about 400 mg/L, at or about 50 mg/L to at or about 450 mg/L, at or about 50 mg/L to at or about 500 mg/L, at or about 50 mg/L to at or about 550 mg/L, at or about 50 mg/L to at or about 600 mg/L, at or about 50 mg/L to at or about 650 mg/L, at or about 50 mg/L to at or about 700 mg/L, at or about 100 mg/L to at or about 150 mg/L, at or about 100 mg/L to at or about 200 mg/L, at or about 100 mg/L to at or about 250 mg/L, at or about 100 mg/L to at or about 300 mg/L, at or about 100 mg/L to at or about 350 mg/L, at or about 100 mg/L to at or about 400 mg/L, at or about 100 mg/L to at or about 450 mg/L, at or about 100 mg/L to at or about 500 mg/L, at or about 100 mg/L to at or about 550 mg/L, at or about 100 mg/L to at or about 600 mg/L, at or about 100 mg/L to at or about 650 mg/L, at or about 100 mg/L to at or about 700 mg/L, at or about 150 mg/L to at or about 200 mg/L, at or about 150 mg/L to at or about 250 mg/L, at or about 150 mg/L to at or about 300 mg/L, at or about 150 mg/L to at or about 350 mg/L, at or about 150 mg/L to at or about 400 mg/L, at or about 150 mg/L to at or about 450 mg/L, at or about 150 mg/L to at or about 500 mg/L, at or about 150 mg/L to at or about 550 mg/L, at or about 150 mg/L to at or about 600 mg/L, at or about 150 mg/L to at or about 650 mg/L, at or about 150 mg/L to at or about 700 mg/L, at or about 200 mg/L to at or about 250 mg/L, at or about 200 mg/L to at or about 300 mg/L, at or about 200 mg/L to at or about 350 mg/L, at or about 200 mg/L to at or about 400 mg/L, at or about 200 mg/L to at or about 450 mg/L, at or about 200 mg/L to at or about 500 mg/L, at or about 200 mg/L to at or about 550 mg/L, at or about 200 mg/L to at or about 600 mg/L, at or about 200 mg/L to at or about 650 mg/L, at or about 200 mg/L to at or about 700 mg/L, at or about 250 mg/L to at or about 300 mg/L, at or about 250 mg/L to at or about 350 mg/L, at or about 250 mg/L to at or about 400 mg/L, at or about 250 mg/L to at or about 450 mg/L, at or about 250 mg/L to at or about 500 mg/L, at or about 250 mg/L to at or about 550 mg/L, at or about 250 mg/L to at or about 600 mg/L, at or about 250 mg/L to at or about 650 mg/L, at or about 250 mg/L to at or about 700 mg/L, at or about 300 mg/L to at or about 350 mg/L, at or about 300 mg/L to at or about 400 mg/L, at or about 300 mg/L to at or about 450 mg/L, at or about 300 mg/L to at or about 500 mg/L, at or about 300 mg/L to at or about 550 mg/L, at or about 300 mg/L to at or about 600 mg/L, at or about 300 mg/L to at or about 650 mg/L, at or about 300 mg/L to at or about 700 mg/L, at or about 350 mg/L to at or about 400 mg/L, at or about 350 mg/L to at or about 450 mg/L, at or about 350 mg/L to at or about 500 mg/L, at or about 350 mg/L to at or about 550 mg/L, at or about 350 mg/L to at or about 600 mg/L, at or about 350 mg/L to at or about 650 mg/L, at or about 350 mg/L to at or about 700 mg/L, at or about 400 mg/L to at or about 450 mg/L, at or about 400 mg/L to at or about 500 mg/L, at or about 400 mg/L to at or about 550 mg/L, at or about 400 mg/L to at or about 600 mg/L, at or about 400 mg/L to at or about 650 mg/L, at or about 400 mg/L to at or about 700 mg/L, at or about 450 mg/L to at or about 500 mg/L, at or about 450 mg/L to at or about 550 mg/L, at or about 450 mg/L to at or about 600 mg/L, at or about 450 mg/L to at or about 650 mg/L, at or about 450 mg/L to at or about 700 mg/L, at or about 500 mg/L to at or about 550 mg/L, at or about 500 mg/L to at or about 600 mg/L, at or about 500 mg/L to at or about 650 mg/L, at or about 500 mg/L to at or about 700 mg/L, at or about 550 mg/L to at or about 600 mg/L, at or about 550 mg/L to at or about 650 mg/L, at or about 550 mg/L to at or about 700 mg/L, at or about 600 mg/L to at or about 650 mg/L, at or about 60 mg/L to at or about 700 mg/L, or at or about 650 mg/L to at or about 700 mg/L.

In some embodiments, the concentration of NAC in the basal medium is at or about 0 mM to at or about 1 mM, at or about 0 mM to at or about 2 mM, at or about 0 mM to at or about 3 mM, at or about 0 mM to at or about 4 mM, at or about 0 mM to at or about 5 mM, at or about 0 mM to at or about 6 mM, at or about 0 mM to at or about 7 mM, at or about 0 mM to at or about 8 mM, at or about 0 mM to at or about 9 mM, at or about 0 mM to at or about 10 mM, at or about 0 mM to at or about 12 mM, at or about 0 mM to at or about 14 mM, at or about 0 mM to at or about 16 mM, at or about 0 mM to at or about 18 mM, at or about 0 mM to at or about 20 mM, at or about 1 mM to at or about 2 mM, at or about 1 mM to at or about 3 mM, at or about 1 mM to at or about 4 mM, at or about 1 mM to at or about 5 mM, at or about 1 mM to at or about 6 mM, at or about 1 mM to at or about 7 mM, at or about 1 mM to at or about 8 mM, at or about 1 mM to at or about 9 mM, at or about 1 mM to at or about 10 mM, at or about 1 mM to at or about 12 mM, at or about 1 mM to at or about 14 mM, at or about 1 mM to at or about 16 mM, at or about 1 mM to at or about 18 mM, at or about 1 mM to at or about 20 mM, at or about 2 mM to at or about 3 mM, at or about 2 mM to at or about 4 mM, at or about 2 mM to at or about 5 mM, at or about 2 mM to at or about 6 mM, at or about 2 mM to at or about 7 mM, at or about 2 mM to at or about 8 mM, at or about 2 mM to at or about 9 mM, at or about 2 mM to at or about 10 mM, at or about 2 mM to at or about 12 mM, at or about 2 mM to at or about 14 mM, at or about 2 mM to at or about 16 mM, at or about 2 mM to at or about 18 mM, at or about 2 mM to at or about 20 mM, at or about 3 mM, at or about to at or about 4 mM, at or about 3 mM to at or about 5 mM, at or about 3 mM to at or about 6 mM, at or about 3 mM to at or about 7 mM, at or about 3 mM to at or about 8 mM, at or about 3 mM to at or about 9 mM, at or about 3 mM to at or about 10 mM, at or about 3 mM to at or about 12 mM, at or about 3 mM to at or about 14 mM, at or about 3 mM to at or about 16 mM, at or about 3 mM to at or about 18 mM, at or about 3 mM to at or about 20 mM, at or about 4 mM to at or about 5 mM, at or about 4 mM to at or about 6 mM, at or about 4 mM to at or about 7 mM, at or about 4 mM to at or about 8 mM, at or about 4 mM to at or about 9 mM, at or about 4 mM to at or about 10 mM, at or about 4 mM to at or about 12 mM, at or about 4 mM to at or about 14 mM, at or about 4 mM to at or about 16 mM, at or about 4 mM to at or about 18 mM, at or about 4 mM to at or about 20 mM, at or about 5 mM to at or about 6 mM, at or about 5 mM to at or about 7 mM, at or about 5 mM to at or about 8 mM, at or about 5 mM to at or about 9 mM, at or about 5 mM to at or about 10 mM, at or about 5 mM to at or about 12 mM, at or about 5 mM to at or about 14 mM, at or about 5 mM to at or about 16 mM, at or about 5 mM to at or about 18 mM, at or about 5 mM to at or about 20 mM, at or about 6 mM to at or about 7 mM, at or about 6 mM to at or about 8 mM, at or about 6 mM to at or about 9 mM, at or about 6 mM to at or about 10 mM, at or about 6 mM to at or about 12 mM, at or about 6 mM to at or about 14 mM, at or about 6 mM to at or about 16 mM, at or about 6 mM to at or about 18 mM, at or about 6 mM to at or about 20 mM, at or about 7 mM to at or about 8 mM, at or about 7 mM to at or about 9 mM, at or about 7 mM to at or about 10 mM, at or about 7 mM to at or about 12 mM, at or about 7 mM to at or about 14 mM, at or about 7 mM to at or about 16 mM, at or about 7 mM to at or about 18 mM, at or about 7 mM to at or about 20 mM, at or about 8 mM to at or about 9 mM, at or about 8 mM to at or about 10 mM, at or about 8 mM to at or about 12 mM, at or about 8 mM to at or about 14 mM, at or about 8 mM to at or about 16 mM, at or about 8 mM to at or about 18 mM, at or about 8 mM to at or about 20 mM, at or about 9 mM to at or about 10 mM, at or about 9 mM to at or about 12 mM, at or about 9 mM to at or about 14 mM, at or about 9 mM to at or about 16 mM, at or about 9 mM to at or about 18 mM, at or about 9 mM to at or about 20 mM, at or about 10 mM to at or about 12 mM, at or about 10 mM to at or about 14 mM, at or about 10 mM to at or about 16 mM, at or about 10 mM to at or about 18 mM, at or about 10 mM to at or about 20 mM, at or about 12 mM to at or about 14 mM, at or about 12 mM to at or about 16 mM, at or about 12 mM to at or about 18 mM, at or about 12 mM to at or about 20 mM, at or about 14 mM to at or about 16 mM, at or about 14 mM to at or about 18 mM, at or about 14 mM to at or about 20 mM, at or about 16 mM to at or about 18 mM, at or about 16 mM to at or about 20 mM, at or about 18 mM to at or about 20 mM.

In some embodiments, the one or more additional components include ethanolamine. In some embodiments, the concentration of ethanolamine is such that after the supplement is combined with a basal medium (such as these described herein), the concentration of ethanolamine in the basal medium is at or about 0 mg/L to at or about 2 mg/L, at or about 0 mg/L to at or about 4 mg/L, at or about 0 mg/L to at or about 6 mg/L, at or about 0 mg/L to at or about 8 mg/L, at or about 0 mg/L to at or about 10 mg/L, at or about 0 mg/L to at or about 12 mg/L, at or about 0 mg/L to at or about 14 mg/L, at or about 0 mg/L to at or about 16 mg/L, at or about 0 mg/L to at or about 18 mg/L, at or about 0 mg/L to at or about 20 mg/L, at or about 0 mg/L to at or about 22 mg/L, at or about 0 mg/L to at or about 24 mg/L, at or about 0 mg/L to at or about 26 mg/L, at or about 0 mg/L to at or about 28 mg/L, at or about 0 mg/L to at or about 30 mg/L, at or about 2 mg/L to at or about 4 mg/L, at or about 2 mg/L to at or about 6 mg/L, at or about 2 mg/L to at or about 8 mg/L, at or about 2 mg/L to at or about 10 mg/L, at or about 2 mg/L to at or about 12 mg/L, at or about 2 mg/L to at or about 14 mg/L, at or about 2 mg/L to at or about 16 mg/L, at or about 2 mg/L to at or about 18 mg/L, at or about 2 mg/L to at or about 20 mg/L, at or about 2 mg/L to at or about 22 mg/L, at or about 2 mg/L to at or about 24 mg/L, at or about 2 mg/L to at or about 26 mg/L, at or about 2 mg/L to at or about 28 mg/L, at or about 2 mg/L to at or about 30 mg/L, at or about 4 mg/L to at or about 6 mg/L, at or about 4 mg/L to at or about 8 mg/L, at or about 4 mg/L to at or about 10 mg/L, at or about 4 mg/L to at or about 12 mg/L, at or about 4 mg/L to at or about 14 mg/L, at or about 4 mg/L to at or about 16 mg/L, at or about 4 mg/L to at or about 18 mg/L, at or about 4 mg/L to at or about 20 mg/L, at or about 4 mg/L to at or about 22 mg/L, at or about 4 mg/L to at or about 24 mg/L, at or about 4 mg/L to at or about 26 mg/L, at or about 4 mg/L to at or about 28 mg/L, at or about 4 mg/L to at or about 30 mg/L, at or about 6 mg/L to at or about 8 mg/L, at or about 6 mg/L to at or about 10 mg/L, at or about 6 mg/L to at or about 12 mg/L, at or about 6 mg/L to at or about 14 mg/L, at or about 6 mg/L to at or about 16 mg/L, at or about 6 mg/L to at or about 18 mg/L, at or about 6 mg/L to at or about 20 mg/L, at or about 6 mg/L to at or about 22 mg/L, at or about 6 mg/L to at or about 24 mg/L, at or about 6 mg/L to at or about 26 mg/L, at or about 6 mg/L to at or about 28 mg/L, at or about 6 mg/L to at or about 30 mg/L, at or about 8 mg/L to at or about 10 mg/L, at or about 8 mg/L to at or about 12 mg/L, at or about 8 mg/L to at or about 14 mg/L, at or about 8 mg/L to at or about 16 mg/L, at or about 8 mg/L to at or about 18 mg/L, at or about 8 mg/L to at or about 20 mg/L, at or about 8 mg/L to at or about 22 mg/L, at or about 8 mg/L to at or about 24 mg/L, at or about 8 mg/L to at or about 26 mg/L, at or about 8 mg/L to at or about 28 mg/L, at or about 8 mg/L to at or about 30 mg/L, at or about 10 mg/L to at or about 12 mg/L, at or about 8 mg/L to at or about 14 mg/L, at or about 8 mg/L to at or about 16 mg/L, at or about 8 mg/L to at or about 18 mg/L, at or about 8 mg/L to at or about 20 mg/L, at or about 8 mg/L to at or about 22 mg/L, at or about 8 mg/L to at or about 24 mg/L, at or about 8 mg/L to at or about 26 mg/L, at or about 8 mg/L to at or about 28 mg/L, at or about 8 mg/L to at or about 30 mg/L, at or about 10 mg/L to at or about 12 mg/L, at or about 10 mg/L to at or about 14 mg/L, at or about 10 mg/L to at or about 16 mg/L, at or about 10 mg/L to at or about 18 mg/L, at or about 10 mg/L to at or about 20 mg/L, at or about 10 mg/L to at or about 22 mg/L, at or about 10 mg/L to at or about 24 mg/L, at or about 10 mg/L to at or about 26 mg/L, at or about 10 mg/L to at or about 28 mg/L, at or about 10 mg/L to at or about 30 mg/L, at or about 12 mg/L to at or about 14 mg/L, at or about 12 mg/L to at or about 16 mg/L, at or about 12 mg/L to at or about 18 mg/L, at or about 12 mg/L to at or about 20 mg/L, at or about 12 mg/L to at or about 22 mg/L, at or about 12 mg/L to at or about 24 mg/L, at or about 12 mg/L to at or about 26 mg/L, at or about 12 mg/L to at or about 28 mg/L, at or about 12 mg/L to at or about 30 mg/L, at or about 14 mg/L to at or about 16 mg/L, at or about 14 mg/L to at or about 18 mg/L, at or about 14 mg/L to at or about 20 mg/L, at or about 14 mg/L to at or about 22 mg/L, at or about 14 mg/L to at or about 24 mg/L, at or about 14 mg/L to at or about 26 mg/L, at or about 14 mg/L to at or about 28 mg/L, at or about 14 mg/L to at or about 30 mg/L, at or about 16 mg/L to at or about 18 mg/L, at or about 16 mg/L to at or about 20 mg/L, at or about 16 mg/L to at or about 22 mg/L, at or about 16 mg/L to at or about 24 mg/L, at or about 16 mg/L to at or about 26 mg/L, at or about 16 mg/L to at or about 28 mg/L, at or about 16 mg/L to at or about 30 mg/L, at or about 18 mg/L to at or about 20 mg/L, at or about 18 mg/L to at or about 22 mg/L, at or about 18 mg/L to at or about 24 mg/L, at or about 18 mg/L to at or about 26 mg/L, at or about 18 mg/L to at or about 28 mg/L, at or about 18 mg/L to at or about 30 mg/L, at or about 20 mg/L to at or about 22 mg/L, at or about 20 mg/L to at or about 24 mg/L, at or about 20 mg/L to at or about 26 mg/L, at or about 20 mg/L to at or about 28 mg/L, at or about 20 mg/L to at or about 30 mg/L, at or about 22 mg/L to at or about 24 mg/L, at or about 22 mg/L to at or about 26 mg/L, at or about 22 mg/L to at or about 28 mg/L, at or about 22 mg/L to at or about 30 mg/L, at or about 24 mg/L to at or about 26 mg/L, at or about 24 mg/L to at or about 28 mg/L, at or about 24 mg/L to at or about 30 mg/L, at or about 26 mg/L to at or about 28 mg/L, at or about 26 mg/L to at or about 30 mg/L, or at or about 28 mg/L to at or about 30 mg/L.

In some embodiments, the supplement is liquid. In some embodiments, the supplement is not frozen, or not recommended to be frozen for the storage. In some embodiments, the supplement comprises an albumin, N-acetyle-L-cysteine (NAC) and ethanolamine. In some embodiments, the supplement comprises an albumin, N-acetyle-L-cysteine (NAC) and ethanolamine, wherein the concentration of albumin, NAC and/or ethanolamine is such that after the supplement is combined with a basal medium (such as these described herein), the concentration of albumin, NAC and/or ethanolamine is substantially the same as described herein. In some embodiments, the albumin is a human derived albumin. In some embodiments, the albumin is a human derived albumin from human plasma or serum. In some embodiments, the supplement is a liquid and does not include, or does not include a significant amount of a free form of glutamine (i.e., L-glutamine).

In some embodiments, a further supplement, e.g. second supplement, is combined with the basal media to provide the one or more additional components. In some embodiments, the further supplement, e.g. second supplement, is a cell expansion supplement. In some embodiments, the further supplement, e.g. second supplement is or comprises OpTmizer® supplement (Thermofisher, part of A1048503).

In some embodiments, the supplement is concentrated at or about 2 to at or about 100 fold. In some embodiments, the supplement is at or about a 40× formulation. In some embodiments, a liter of the basal medium is supplemented with at or about 20 to 30 milliliters, such as 25±2 milliliter, of at least one supplement, including the first supplement and, in some cases, one or more further supplement.

C. Serum-Free Media

In some embodiments, the serum-free media comprises a synthetic amino acid (e.g., a dipeptide form of L-glutamine, e.g., L-alanyl-L-glutamine), a free form of glutamine (i.e., L-glutamine). In some embodiments, the synthetic amino acid (e.g., a dipeptide form of L-glutamine, e.g., L-alanyl-L-glutamine) is capable of being converted into a free form of glutamine (i.e., L-glutamine) in a cell culture comprising a cell, wherein the media is serum-free. In some embodiments, the cell comprises a human cell. In some embodiments, the cell comprises an immune cell. In some embodiments, the cell is a genetically engineered cell. In some embodiments, the cell is a T cell. In some embodiments, the cell is a genetically engineered T cell. In some embodiments, the cell is genetically engineered to express a recombinant receptor (e.g., a chimeric antigen receptor). In some embodiments, the cell is a chimeric antigen receptor (CAR) expressing T cells.

In some embodiments, the serum-free media further comprises at least one protein. In some embodiments, the serum-free media comprises a synthetic amino acid, wherein the synthetic amino acid (e.g., a dipeptide form of L-glutamine, e.g., L-alanyl-L-glutamine) is capable of being converted into a free form of glutamine (i.e., L-glutamine) in a cell culture comprising a cell, a free form of glutamine (i.e., L-glutamine), and at least one protein, wherein the media is serum free.

In some embodiments, the synthetic amino acid is a stabilized form of glutamine (i.e., L-glutamine). In some embodiments, the synthetic amino acid is more stable than glutamine (i.e., L-glutamine) in an aqueous solution (e.g., a serum-free media). In some embodiments, the synthetic amino acid does not produce a significant amount of glutamine in the serum-free media. In some embodiments, the synthetic amino acid does not produce a significant amount of pyrrolidone carboxylic acid or ammonia. In some embodiments, the synthetic amino acid does not produce a significant amount of glutamine (i.e., L-glutamine) for at least at or about 1, 3, 5, 7, 9, 11 13, or 14 days in the serum-free media. In some embodiments, the synthetic amino acid does not produce a significant amount of glutamine (i.e., L-glutamine) for at least at or about 1, 2, 3, 4, 5, 6, 7, or 8 weeks in the serum-free media. In some embodiments, the synthetic amino acid does not produce a significant amount of glutamine (i.e., L-glutamine) for at least at or about 1, 2, 3, 4, 5, 6, 7, 8, 9, 10, 11, or 12 months in the serum-free media. In some embodiments, the synthetic amino acid does not produce a significant amount of glutamine (i.e., L-glutamine) for at least at or about 1, 2, 3, 4, or 5 years in the serum-free media. In some embodiments, the synthetic amino acid does not produce a significant amount of pyrrolidone carboxylic acid or ammonia for at least at or about 1, 3, 5, 7, 9, 11 13, or 14 days in the serum-free media. In some embodiments, the synthetic amino acid does not produce a significant amount of pyrrolidone carboxylic acid or ammonia for at least at or about 1, 2, 3, 4, 5, 6, 7, or 8 weeks in the serum-free media. In some embodiments, the synthetic amino acid does not produce a significant amount of pyrrolidone carboxylic acid or ammonia for at least at or about 1, 2, 3, 4, 5, 6, 7, 8, 9, 10, 11, or 12 months in the serum-free media. In some embodiments, the synthetic amino acid does not produce a significant amount of pyrrolidone carboxylic acid or ammonia for at least at or about 1, 2, 3, 4, or 5 years in the serum-free media.

In some embodiments, the synthetic amino acid is soluble in an aqueous solution (e.g., a serum-free media). In some embodiments, the solubility of the synthetic amino acid in the aqueous solution is higher than a free form of glutamine (i.e., L-glutamine).

In some embodiments, the synthetic amino acid is capable of being transported into a cell, wherein it can be converted into a free form of glutamine (i.e., L-glutamine). In some embodiments, the cell comprises an immune cell. In some embodiments, the cell is a genetically engineered cell. In some embodiments, the cell is a T cell. In some embodiments, the cell is a genetically engineered T cell. In some embodiments, the cell is genetically engineered to express a recombinant receptor (e.g., a chimeric antigen receptor). In some embodiments, the cell is a chimeric antigen receptor (CAR) expressing T cells.

In some embodiments, the synthetic amino acid is a dipeptide. In some embodiments, the synthetic amino acid is a tripeptide. In some embodiments, the synthetic amino acid is a dipeptide form of L-glutamine (e.g., L-alanyl-L-glutamine).

In some embodiments, the concentration of the dipeptide form of L-glutamine (e.g., L-alanyl-L-glutamine) in the serum-free media is at or about 0.5 mM-5 mM. In some embodiments, the concentration of the dipeptide form of L-glutamine (e.g., L-alanyl-L-glutamine) in the serum-free media is at or about 2 mM. In some embodiments, the concentration of the dipeptide form of L-glutamine (e.g., L-alanyl-L-glutamine) is at or about 0.5 mM-1 mM, 0.5 mM-1.5 mM, 0.5 mM-2 mM, 0.5 mM-2.5 mM, 0.5 mM-3 mM, 0.5 mM-3.5 mM, 0.5 mM-4 mM, 0.5 mM-4.5 mM, 0.5 mM-5 mM, 1 mM-1.5 mM, 1 mM-2 mM, 1 mM-2.5 mM, 1 mM-3 mM, 1 mM-3.5 mM, 1 mM-4 mM, 1 mM-4.5 mM, 1 mM-5 mM, 1.5 mM-2 mM, 1.5 mM-2.5 mM, 1.5 mM-3 mM, 1.5 mM-3.5 mM, 1.5 mM-4 mM, 1.5 mM-4.5 mM, 1.5 mM-5 mM, 2 mM-2.5 mM, 2 mM-3 mM, 2 mM-3.5 mM, 2 mM-4 mM, 2 mM-4.5 mM, 2 mM-5 mM, 2.5 mM-3 mM, 2.5 mM-3.5 mM, 2.5 mM-4 mM, 2.5 mM-4.5 mM, 2.5 mM-5 mM, 3 mM-3.5 mM, 3 mM-4 mM, 3 mM-4.5 mM, 3 mM-5 mM, 3.5 mM-4 mM, 3.5 mM-4.5 mM, 3.5 mM-5 mM, 4 mM-4.5 mM, 4 mM-5 mM, or 4.5 mM-5 mM, each inclusive. In some embodiments, the concentration of the dipeptide form of L-glutamine (e.g., L-alanyl-L-glutamine) in the serum-free media is at or about 5 mM-7.5 mM, 5 mM-10 mM, 5 mM-12.5 mM, 5 mM-15 mM, 5 mM-17.5 mM, 5 mM-20 mM, 7.5 mM-10 mM, 7.5 mM-12.5 mM, 7.5 mM-15 mM, 7.5 mM-17.5 mM, 7.5 mM-20 mM, 10 mM-12.5 mM, 10 mM-15 mM, 10 mM-17.5 mM, 10 mM-20 mM, 12.5 mM-15 mM, 12.5 mM-17.5 mM, 12.5 mM-20 mM, 15 mM-17.5 mM, 15 mM-20 mM, or 17.5 mM-20 mM, each inclusive. In some embodiments, the concentration of dipeptide form of L-glutamine (e.g., L-alanyl-L-glutamine) in the serum-free media is at least at or about 0.5 mM, 1 mM, 1.5 mM, 2 mM, 2.5 mM, 3 mM, 3.5 mM, 4 mM, 4.5 mM, or 5 mM. In some embodiments, the concentration of the dipeptide form of L-glutamine (e.g., L-alanyl-L-glutamine) in the serum-free media is or is at or about 2 mM. In some embodiments, the concentration of the dipeptide form of L-glutamine (e.g., L-alanyl-L-glutamine) in the serum-free media is at most at or about 2 mM, 2.5 mM, 3 mM, 3.5 mM, 4 mM, 4.5 mM, 5 mM, 5.5 mM, 6 mM, 6.5 mM, 7 mM, 7.5 mM, 8 mM, 8.5 mM, 9 mM, 9.5 mM, 10 mM, 12.5 mM, 15 mM, 17.5 mM, or 20 mM.

In some embodiments, the concentration of the free form of glutamine (i.e., L-glutamine) in the serum-free media is about 0.5 mM-5 mM. In some embodiments, the concentration of the free form of glutamine (i.e., L-glutamine) in the serum-free media is at or about 2 mM. In some embodiments, the concentration of the free form of glutamine (i.e., L-glutamine) in the serum-free media is at or about 0.5 mM-1 mM, 0.5 mM-1.5 mM, 0.5 mM-2 mM, 0.5 mM-2.5 mM, 0.5 mM-3 mM, 0.5 mM-3.5 mM, 0.5 mM-4 mM, 0.5 mM-4.5 mM, 0.5 mM-5 mM, 1 mM-1.5 mM, 1 mM-2 mM, 1 mM-2.5 mM, 1 mM-3 mM, 1 mM-3.5 mM, 1 mM-4 mM, 1 mM-4.5 mM, 1 mM-5 mM, 1.5 mM-2 mM, 1.5 mM-2.5 mM, 1.5 mM-3 mM, 1.5 mM-3.5 mM, 1.5 mM-4 mM, 1.5 mM-4.5 mM, 1.5 mM-5 mM, 2 mM-2.5 mM, 2 mM-3 mM, 2 mM-3.5 mM, 2 mM-4 mM, 2 mM-4.5 mM, 2 mM-5 mM, 2.5 mM-3 mM, 2.5 mM-3.5 mM, 2.5 mM-4 mM, 2.5 mM-4.5 mM, 2.5 mM-5 mM, 3 mM-3.5 mM, 3 mM-4 mM, 3 mM-4.5 mM, 3 mM-5 mM, 3.5 mM-4 mM, 3.5 mM-4.5 mM, 3.5 mM-5 mM, 4 mM-4.5 mM, 4 mM-5 mM, or 4.5 mM-5 mM, each inclusive. In some embodiments, the concentration of the free form of glutamine (i.e., L-glutamine) in the serum-free media is at or about 5 mM-7.5 mM, 5 mM-10 mM, 5 mM-12.5 mM, 5 mM-15 mM, 5 mM-17.5 mM, 5 mM-20 mM, 7.5 mM-10 mM, 7.5 mM-12.5 mM, 7.5 mM-15 mM, 7.5 mM-17.5 mM, 7.5 mM-20 mM, 10 mM-12.5 mM, 10 mM-15 mM, 10 mM-17.5 mM, 10 mM-20 mM, 12.5 mM-15 mM, 12.5 mM-17.5 mM, 12.5 mM-20 mM, 15 mM-17.5 mM, 15 mM-20 mM, or 17.5 mM-20 mM, each inclusive. In some embodiments, the concentration of the free form of glutamine (i.e., L-glutamine) in the media is at least at or about 0.5 mM, 1 mM, 1.5 mM, 2 mM, 2.5 mM, 3 mM, 3.5 mM, 4 mM, 4.5 mM, or 5 mM. In some embodiments, the concentration of the free form of glutamine (i.e., L-glutamine) in the serum-free media is at most at or about 2 mM, 2.5 mM, 3 mM, 3.5 mM, 4 mM, 4.5 mM, 5 mM, 5.5 mM, 6 mM, 6.5 mM, 7 mM, 7.5 mM, 8 mM, 8.5 mM, 9 mM, 9.5 mM, 10 mM, 12.5 mM, 15 mM, 17.5 mM, or 20 mM.

In some embodiments, the concentration of the dipeptide form of L-glutamine, such as L-alanyl-L-glutamine in the serum-free media is at or about 0.5 mM to at or about 5 mM. In some embodiments, the concentration of the dipeptide form of L-glutamine, such as L-alanyl-L-glutamine in the serum-free media is at or about 2 mM. In some embodiments, the concentration of L-glutamine in the serum-free media is at or about 0.5 mM to at or about 5 mM. In some embodiments, the concentration of the L-glutamine in the serum-free media is at or about 2 mM.

In some embodiments, the serum-free media comprises at least one protein. In some embodiments, the at least one protein is not of non-mammalian origin. In some embodiments, the at least one protein is human or derived from human. In some embodiments, the at least one protein is recombinant. In some embodiments, the one or more additional components include at least one protein. In some embodiments, the at least one protein is not of non-mammalian origin. In some embodiments, the at least one protein is human or derived from human. In some embodiments, the at least one protein is recombinant. In some embodiments, the at least one protein includes albumin, transferrin, insulin, fibronectin, aprotinin or fetuin. In some embodiments, the protein comprises one or more of albumin, insulin or transferrin, optionally one or more of a human or recombinant albumin, insulin or transferrin.

In some embodiments, the serum-free media comprises an albumin. In some embodiments, the albumin is derived from human. In some embodiments, the albumin is derived from human serum or human plasma. In some embodiments, the albumin is a recombinant albumin. In some embodiments, the recombinant albumin is derived from human. In some embodiment, the recombinant albumin is not derived from human. In some embodiments, the supplement comprises a natural albumin. In some embodiments, the natural albumin is derived from human. In some embodiments, the natural albumin is not derived from human. In some embodiments, the concentration of the albumin in the serum-free media is at or about 0mg/mL to at or about 2 mg/mL, at or about 0mg/mL to at or about 4 mg/mL, at or about 0mg/mL to at or about 6 mg/mL, at or about 0mg/mL to at or about 8 mg/mL, at or about 0mg/mL to at or about 10 mg/mL, at or about 0 mg/mL to at or about 12 mg/mL, at or about 2 mg/mL to at or about 4 mg/mL, at or about 2 mg/mL to at or about 6 mg/mL, at or about 2 mg/mL to at or about 8 mg/mL, at or about 2 mg/mL to at or about 10 mg/mL, at or about 2 mg/mL to at or about 12 mg/mL, at or about 4 mg/mL to at or about 6 mg/mL, at or about 4 mg/mL to at or about 8 mg/mL, at or about 4 mg/mL to at or about 10 mg/mL, at or about 4 mg/mL to at or about 12 mg/mL, at or about 6 mg/mL to at or about 8 mg/mL, at or about 6 mg/mL to at or about 10 mg/mL, at or about 6 mg/mL to at or about 12 mg/mL, at or about 8 mg/mL to at or about 10 mg/mL, at or about 8 mg/mL to at or about 12 mg/mL, at or about 10 mg/mL to at or about 12 mg/mL, or at or about 10 mg/mL to at or about 15 mg/mL each inclusive. In some embodiments, the albumin in the media is at or about 5 mg/mL.

In some embodiments, the serum-free media comprises a transferrin or transferrin substitute (such as these described herein). In some embodiments, the transferrin or transferrin substitute is derived from human. In some embodiments, the transferrin or transferrin substitute is derived from human serum or plasma. In some embodiments, the concentration of the transferrin in the serum-free media is at or about 10 mg/L to at or about 50 mg/L, at or about 10 mg/L to at or about 100 mg/L, at or about 10 mg/L to at or about 150 mg/L, at or about 10 mg/L to at or about 200 mg/L, at or about 10 mg/L to at or about 250 mg/L, at or about 10 mg/L to at or about 300 mg/L, at or about 10 mg/L to at or about 350 mg/L, at or about 10 mg/L to at or about 400 mg/L, at or about 10 mg/L to at or about 450 mg/L, at or about 10 mg/L to at or about 500 mg/L, at or about 10 mg/L to at or about 550 mg/L, at or about 10 mg/L to at or about 600 mg/L, at or about 10 mg/L to at or about 650 mg/L, at or about 10 mg/L to at or about 750 mg/L, at or about 50 mg/L to at or about 100 mg/L, at or about 50 mg/L to at or about 150 mg/L, at or about 50 mg/L to at or about 200 mg/L, at or about 50 mg/L to at or about 250 mg/L, at or about 50 mg/L to at or about 300 mg/L, at or about 50 mg/L to at or about 350 mg/L, at or about 50 mg/L to at or about 400 mg/L, at or about 50 mg/L to at or about 450 mg/L, at or about 50 mg/L to at or about 500 mg/L, at or about 50 mg/L to at or about 550 mg/L, at or about 50 mg/L to at or about 600 mg/L, at or about 50 mg/L to at or about 650 mg/L, at or about 50 mg/L to at or about 750 mg/L, at or about 100 mg/L to at or about 150 mg/L, at or about 100 mg/L to at or about 200 mg/L, at or about 100 mg/L to at or about 250 mg/L, at or about 100 mg/L to at or about 300 mg/L, at or about 100 mg/L to at or about 350 mg/L, at or about 100 mg/L to at or about 400 mg/L, at or about 100 mg/L to at or about 450 mg/L, at or about 100 mg/L to at or about 500 mg/L, at or about 100 mg/L to at or about 550 mg/L, at or about 100 mg/L to at or about 600 mg/L, at or about 100 mg/L to at or about 650 mg/L, at or about 100 mg/L to at or about 750 mg/L, at or about 150 mg/L to at or about 200 mg/L, at or about 150 mg/L to at or about 250 mg/L, at or about 150 mg/L to at or about 300 mg/L, at or about 150 mg/L to at or about 350 mg/L, at or about 150 mg/L to at or about 400 mg/L, at or about 150 mg/L to at or about 450 mg/L, at or about 150 mg/L to at or about 500 mg/L, at or about 150 mg/L to at or about 550 mg/L, at or about 150 mg/L to at or about 600 mg/L, at or about 150 mg/L to at or about 650 mg/L, at or about 150 mg/L to at or about 750 mg/L, at or about 200 mg/L to at or about 250 mg/L, at or about 200 mg/L to at or about 300 mg/L, at or about 200 mg/L to at or about 350 mg/L, at or about 200 mg/L to at or about 400 mg/L, at or about 200 mg/L to at or about 450 mg/L, at or about 200 mg/L to at or about 500 mg/L, at or about 200 mg/L to at or about 550 mg/L, at or about 200 mg/L to at or about 600 mg/L, at or about 200 mg/L to at or about 650 mg/L, at or about 200 mg/L to at or about 750 mg/L, at or about 250 mg/L to at or about 300 mg/L, at or about 250 mg/L to at or about 350 mg/L, at or about 250 mg/L to at or about 400 mg/L, at or about 250 mg/L to at or about 450 mg/L, at or about 250 mg/L to at or about 500 mg/L, at or about 250 mg/L to at or about 550 mg/L, at or about 250 mg/L to at or about 600 mg/L, at or about 250 mg/L to at or about 650 mg/L, at or about 250 mg/L to at or about 750 mg/L, at or about 300 mg/L to at or about 350 mg/L, at or about 300 mg/L to at or about 400 mg/L, at or about 300 mg/L to at or about 450 mg/L, at or about 300 mg/L to at or about 500 mg/L, at or about 300 mg/L to at or about 550 mg/L, at or about 300 mg/L to at or about 600 mg/L, at or about 300 mg/L to at or about 650 mg/L, at or about 300 mg/L to at or about 750 mg/L, at or about 350 mg/L to at or about 400 mg/L, at or about 350 mg/L to at or about 450 mg/L, at or about 350 mg/L to at or about 500 mg/L, at or about 350 mg/L to at or about 550 mg/L, at or about 350 mg/L to at or about 600 mg/L, at or about 350 mg/L to at or about 650 mg/L, at or about 350 mg/L to at or about 750 mg/L, at or about 400 mg/L to at or about 450 mg/L, at or about 400 mg/L to at or about 500 mg/L, at or about 400 mg/L to at or about 550 mg/L, at or about 400 mg/L to at or about 600 mg/L, at or about 400 mg/L to at or about 650 mg/L, at or about 400 mg/L to at or about 750 mg/L, at or about 450 mg/L to at or about 500 mg/L, at or about 450 mg/L to at or about 550 mg/L, at or about 450 mg/L to at or about 600 mg/L, at or about 450 mg/L to at or about 650 mg/L, at or about 450 mg/L to at or about 750 mg/L, at or about 500 mg/L to at or about 550 mg/L, at or about 500 mg/L to at or about 600 mg/L, at or about 500 mg/L to at or about 650 mg/L, at or about 500 mg/L to at or about 750 mg/L, at or about 550 mg/L to at or about 600 mg/L, at or about 500 mg/L to at or about 650 mg/L, at or about 500 mg/L to at or about 750 mg/L, at or about 550 mg/L to at or about 600 mg/L, at or about 550 mg/L to at or about 650 mg/L, at or about 550 mg/L to at or about 750 mg/L, at or about 600 mg/L to at or about 650 mg/L, at or about 600 mg/L to at or about 750 mg/L, or at or about 650 mg/L to at or about 750 mg/L. In some embodiments, the concentration of the transferrin in the serum-free media is at or about 100 mg/L. In some embodiments, the concentration of the transferrin in the serum-free media is at or about 50 mg/L to 150 mg/L.

In some embodiments, the supplement comprises insulin or insulin substitute (such as these described herein). In some embodiments, the insulin is derived from human. In some embodiments, the insulin is a recombinant insulin. In some embodiment, the insulin is a recombinant human insulin. In some embodiment, the concentration of the insulin (or insulin substitute) in the serum-free media is at or about 1 mg/L to at or about 2.5 mg/L, at or about 1 mg/L to at or about 5 mg/L, at or about 1 mg/L to at or about 7.5 mg/L, at or about 1 mg/L to at or about 10 mg/L, at or about 1 mg/L to at or about 12.5 mg/L, at or about 1 mg/L to at or about 15 mg/L, at or about 1 mg/L to at or about 17.5 mg/L, at or about 1 mg/L to at or about 20 mg/L, at or about 1 mg/L to at or about 22.5 mg/L, at or about 1 mg/L to at or about 25 mg/L, at or about 1 mg/L to at or about 27.5 mg/L, at or about 1 mg/L to at or about 30 mg/L, at or about 2.5 mg/L to at or about 5 mg/L, at or about 2.5 mg/L to at or about 7.5 mg/L, at or about 2.5 mg/L to at or about 10 mg/L, at or about 2.5 mg/L to at or about 12.5 mg/L, at or about 2.5 mg/L to at or about 15 mg/L, at or about 2.5 mg/L to at or about 17.5 mg/L, at or about 2.5 mg/L to at or about 20 mg/L, at or about 2.5 mg/L to at or about 22.5 mg/L, at or about 2.5 mg/L to at or about 25 mg/L, at or about 2.5 mg/L to at or about 27.5 mg/L, at or about 2.5 mg/L to at or about 30 mg/L, at or about 5 mg/L to at or about 7.5 mg/L, at or about 5 mg/L to at or about 10 mg/L, at or about 5 mg/L to at or about 12.5 mg/L, at or about 5 mg/L to at or about 15 mg/L, at or about 5 mg/L to at or about 17.5 mg/L, at or about 5 mg/L to at or about 20 mg/L, at or about 5 mg/L to at or about 22.5 mg/L, at or about 5 mg/L to at or about 25 mg/L, at or about 5 mg/L to at or about 27.5 mg/L, at or about 5 mg/L to at or about 30 mg/L, at or about 7.5 mg/L to at or about 10 mg/L, at or about 7.5 mg/L to at or about 12.5 mg/L, at or about 7.5 mg/L to at or about 15 mg/L, at or about 7.5 mg/L to at or about 17.5 mg/L, at or about 7.5 mg/L to at or about 20 mg/L, at or about 7.5 mg/L to at or about 22.5 mg/L, at or about 7.5 mg/L to at or about 25 mg/L, at or about 7.5 mg/L to at or about 27.5 mg/L, at or about 7.5 mg/L to at or about 30 mg/L, at or about 10 mg/L to at or about 12.5 mg/L, at or about 10 mg/L to at or about 15 mg/L, at or about 10 mg/L to at or about 17.5 mg/L, at or about 10 mg/L to at or about 20 mg/L, at or about 10 mg/L to at or about 22.5 mg/L, at or about 10 mg/L to at or about 25 mg/L, at or about 10 mg/L to at or about 27.5 mg/L, at or about 10 mg/L to at or about 30 mg/L, at or about 12.5 mg/L to at or about 15 mg/L, at or about 12.5 mg/L to at or about 17.5 mg/L, at or about 12.5 mg/L to at or about 20 mg/L, at or about 12.5 mg/L to at or about 22.5 mg/L, at or about 12.5 mg/L to at or about 25 mg/L, at or about 12.5 mg/L to at or about 27.5 mg/L, at or about 12.5 mg/L to at or about 30 mg/L, at or about 15 mg/L to at or about 17.5 mg/L, at or about 15 mg/L to at or about 20 mg/L, at or about 15 mg/L to at or about 22.5 mg/L, at or about 15 mg/L to at or about 25 mg/L, at or about 15 mg/L to at or about 27.5 mg/L, at or about 15 mg/L to at or about 30 mg/L, at or about 17.5 mg/L to at or about 20 mg/L, at or about 17.5 mg/L to at or about 22.5 mg/L, at or about 17.5 mg/L to at or about 25 mg/L, at or about 17.5 mg/L to at or about 27.5 mg/L, at or about 17.5 mg/L to at or about 30 mg/L, at or about 20 mg/L to at or about 22.5 mg/L, at or about 20 mg/L to at or about 25 mg/L, at or about 20 mg/L to at or about 27.5 mg/L, at or about 20 mg/L to at or about 30 mg/L, at or about 22.5 mg/L to at or about 25 mg/L, at or about 22.5 mg/L to at or about 27.5 mg/L, at or about 22.5 mg/L to at or about 30 mg/L, at or about 25 mg/L to at or about 27.5 mg/L, or at or about 27.5 mg/L to at or about 30 mg/L. In some embodiments, the concentration of insulin or insulin substitute in the serum-free media is at or about 10 mg/L. In some embodiments, the concentration of insulin or insulin substitute in the serum-free media is at or about 7.5 mg/L to at or about 12.5 mg/L.

In some embodiments, the serum-free media does not comprise phenol red. In some embodiments, the serum-free media comprises phenol red.

In some embodiments, the serum-free media comprises a nutrient mixture of inorganic salts, sugars, amino acids, optionally also containing vitamins, organic acids, antioxidants, lipids, growth factors, N-acetylcysteine, ethanolamine and/or buffers. Examples include those described herein, such as in the section above, including inorganic salts, sugars, amino acids, vitamins, organic acids, antioxidants, lipids, growth factors, N-acetylcysteine, ethanolamine and/or buffers.

In some embodiments, the serum free media comprises one or more ingredients selected from one or more of one or more antioxidants, one or more albumins or albumin substitutes, one or more lipid agents, one or more insulins or insulin substitutes, one or more transferrins or transferrin substitutes, one or more trace elements, one or more glucocorticoids, one or more inorganic salts, one or more energy sources, one or more buffering agents, one or more pyruvate salts, one or more pH indicators, one or more amino acids, and one or more vitamins. In some embodiments, the antioxidants are selecting from the group consisting of N-acetyl-L-cysteine, 2-mercaptoethanol, and D,L-tocopherol acetate, or derivatives or mixtures thereof. In some embodiments, the albumin is human serum albumin. In some embodiments, the lipid agents are Human Ex-Cyte® and ethanolamine. In some embodiments, the insulin is human zinc insulin. In some embodiments, the transferrin is human iron-saturated transferrin. In some embodiments, the glucocorticoid is hydrocortisone. In some embodiments, inorganic salt ingredient comprises one or more inorganic salts selected from the group consisting of one or more calcium salts, one or more potassium salts, one or more magnesium salts, one or more sodium salts, one or more carbonate salts, and one or more phosphate salts. In some embodiments, the energy source is D-glucose. In some embodiments, the buffering agent is HEPES. In some embodiments, the pyruvate salt is sodium pyruvate. In some embodiments, the pH indicator is phenol red. In some embodiments, amino acid ingredient comprises one or more amino acids selected from the group consisting of glycine, L-alanine, L-asparagine, L-cysteine, L-aspartic acid, L-glutamic acid, L-phenylalanine, L-histidine, L-isoleucine, L-lysine, L-leucine, L-glutamine, L-arginine HCL, L-methionine, L-proline, L-hydroxyproline, L-serine, L-threonine, L-tryptophan, L-tyrosine, and L-valine, and salts and derivatives thereof. In some embodiments, the vitamin ingredient comprises one or more vitamins selected from the group consisting of biotin, D-calcium pantothenate, choline chloride, folic acid, i-inositol, niacinamide, pyridoxal HCl, riboflavin, thiamine HCl, and vitamin B12 and derivatives thereof. In some embodiments, ingredients comprise N-acetyl-L-cysteine, 2-mercaptoethanol, human serum albumin, D,L-tocopherol acetate, Human Ex-Cyte®, ethanolamine, human zinc insulin, iron-saturated transferrin, $Se^{4+}$, hydrocortisone, $Ca^{2+}$, $K^+$, $Mg^{2+}$, $Na^+$, $CO_3^{2-}$, $P_4^{3-}$, D-glucose, HEPES, sodium pyruvate, phenol red, glycine, L-alanine, L-asparagine, L-cysteine, L-aspartic acid, L-glutamic acid, L-phenylalanine, L-histidine, L-isoleucine, L-lysine, L-leucine, L-glutamine, L-arginine HCL, L-methionine, L-proline, L-hydroxyproline, L-serine, L-threonine, L-tryptophan, L-tyrosine, and L-valine, biotin, D-calcium pantothenate, choline chloride, folic acid, i-inositol, niacinamide, pyridoxal HCl, riboflavin, thiamine HCl, and vitamin B2.

In some embodiments, there is provided a serum-free media comprising a basal medium and at least one supplement. Various examples of basal medium and supplements are described herein, such as in the section above.

In some embodiments, the serum-free medium formulation comprises at or about 90% to at or about 97.5% (v/v) of the basal medium, at or about 2.5% to at or about 10% (v/v) of a supplement, e.g. a first supplement and/or a second supplement. In some embodiments, the serum-free medium formulation comprises at or about 90% to at or about 97.5%

(v/v) of the basal medium, at or about 1.25% to at or about 5% (v/v) of a first supplement, and at or about 1.25% to at or about 5% (v/v) of a second supplement.

In some embodiments, there is provided a serum-free media comprising a basal medium, a first supplement and a second supplement. In some embodiments, the basal medium comprises a liquid comprising a synthetic amino acid (e.g., a dipeptide form of L-glutamine, e.g., L-alanyl-L-glutamine), and wherein the basal medium is free, or substantially free of a free form of glutamine (i.e., L-glutamine) and/or a protein. In some embodiments, the first supplement comprises a free form of glutamine (i.e., L-glutamine), wherein the first supplements is frozen or stored at a temperature under room temperature (e.g., under at or about 20, 10, 15, 5, 0, –5, –10, –15, or –20° C.) for the majority of the time after glutamine becomes a component thereof and before the intended use (e.g., used as a supplement for a basal medium). In some embodiments, the first supplement comprises a free form of glutamine (i.e., L-glutamine), wherein the first supplements is frozen or stored at a temperature under room temperature (e.g., under at or about 20, 10, 15, 5, 0, –5, –10, –15, or –20° C.) prior immediately to the combining with a medium (e.g., a basal medium). In some embodiments, the second supplement comprises an albumin, N-acetyle-L-cysteine (NAC) and/or ethanolamine. In some embodiments, the second supplement comprises one or more ingredients selected from the group consisting of one or more antioxidants, one or more albumins or albumin substitutes, one or more lipid agents, one or more insulins or insulin substitutes, one or more transferrins or transferrin substitutes, one or more trace elements, and one or more glucocorticoids.

In some embodiments, the serum-free media comprises one or more cytokines. In certain embodiments, the one or more cytokines are recombinant cytokines. In particular embodiments, the one or more cytokines are human recombinant cytokines. In certain embodiments, the one or more cytokines bind to and/or are capable of binding to receptors that are expressed by and/or are endogenous to T cells. In particular embodiments, the one or more cytokines is or includes a member of the 4-alpha-helix bundle family of cytokines. In some embodiments, members of the 4-alpha-helix bundle family of cytokines include, but are not limited to, interleukin-2 (IL-2), interleukin-4 (IL-4), interleukin-7 (IL-7), interleukin-9 (IL-9), interleukin 12 (IL-12), interleukin 15 (IL-15), granulocyte colony-stimulating factor (G-CSF), and granulocyte-macrophage colony-stimulating factor (GM-CSF). In some embodiments, the one or more cytokines is or includes IL-15. In particular embodiments, the one or more cytokines is or includes IL-7. In particular embodiments, the one or more cytokines is or includes recombinant IL-2. In some embodiments, the cytokine comprises IL-2. In some embodiments, the one or more cytokine is selected from IL-2, IL-7 or IL-15.

In some embodiments, the concentration of a cytokine is about between at or about 1 IU/ml and at or about 2,000 IU/ml, between at or about 10 IU/ml and at or about 100 IU/ml, between at or about 50 IU/ml and at or about 500 IU/ml, between at or about 100 IU/ml and at or about 200 IU/ml, between at or about 500 IU/ml and at or about 1400 IU/ml, between at or about 250 IU/ml and at or about 500 IU/ml, or between at or about 500 IU/ml and at or about 2,500 IU/ml.

In some embodiments, the serum-free media comprises IL-2. In some embodiments, the concentration of IL-2 (e.g., human recombinant IL-2) is between at or about 2 IU/ml and at or about 500 IU/ml, between at or about 10 IU/ml and at or about 250 IU/ml, between at or about 100 IU/ml and at or about 500 IU/ml, or between at or about 100 IU/ml and at or about 400 IU/ml. In particular embodiments, the concentration of IL-2 is at or at about 50 IU/ml, 75 IU/ml, 100 IU/ml, 125 IU/ml, 150 IU/ml, 175 IU/ml, 200 IU/ml, 225 IU/ml, 250 IU/ml, 300 IU/ml, or 400 IU/ml. In some embodiments, the concentration of IL-2 is at or about 200 IU/ml.

In some embodiments, the serum-free media comprises IL-7. In some embodiments, the concentration of IL-7, e.g., human recombinant IL-7, is about between at or about 10 IU/ml and at or about 5,000 IU/ml, between at or about 500 IU/ml and at or about 2,000 IU/ml, between at or about 600 IU/ml and at or about 1,500 IU/ml, between at or about 500 IU/ml and at or about 2,500 IU/ml, between at or about 750 IU/ml and at or about 1,500 IU/ml, or between at or about 1,000 IU/ml and at or about 2,000 IU/ml. In particular embodiments, the concentration of IL-7 at or at about 100 IU/ml, 200 IU/ml, 300 IU/ml, 400 IU/ml, 500 IU/ml, 600 IU/ml, 700 IU/ml, 800 IU/ml, 900 IU/ml, 1,000 IU/ml, 1,200 IU/ml, 1,400 IU/ml, or 1,600 IU/ml. In some embodiments, the concertation of IL-7 is about at 1,200 IU/ml.

In some embodiments, the serum-free media comprises IL-15. In some embodiments, the concentration of IL-15, e.g., human recombinant IL-15, is between at or about 0.1 IU/ml and at or about 200 IU/ml, between at or about 1 IU/ml and at or about 50 IU/ml, between at or about 5 IU/ml and at or about 25 IU/ml, between at or about 25 IU/ml and at or about 50 IU/ml, between at or about 5 IU/ml and at or about 15 IU/ml, or between at or about 10 IU/ml and at or about 50 IU/ml. In particular embodiments, the concentration of IL-15 is at or at about 1 IU/ml, 2 IU/ml, 3 IU/ml, 4 IU/ml, 5 IU/ml, 6 IU/ml, 7 IU/ml, 8 IU/ml, 9 IU/ml, 10 IU/ml, 11 IU/ml, 12 IU/ml, 13 IU/ml, 14 IU/ml, 15 IU/ml, 20 IU/ml, 25 IU/ml, 30 IU/ml, 40 IU/ml, 50 IU/ml, 100 IU/ml, or 200 IU/ml. In particular embodiments, the concentration of IL-15 is about 20 IU/ml.

In some embodiments, the serum-free media is a concentrated media formulation. In some embodiments, the serum-free media is not a concentrated media formulation. In some embodiments, the serum-free media is from at or about 2× to at or about 100× concentrated. In some embodiments, the serum-free media is at or about 10× formulation. In some embodiments, the serum-free media can be stored at at or about 2° C. to 8° C.

In some embodiments, the media is capable of cultivating cells for at least 2 days, 3 days, 4 days, 5 days, 6 days, 7 days, 8 days, 9 days, 10 days, 11 days, 12 days or more without an additional supplement of a L-glutamine, a dipeptide form of glutamine or other form of glutamine.

In some embodiments, the serum-free media is capable of promoting cell expansion for at least 2 days, 3 days, 4 days, 5 days, 6 days, 7 days, 8 days, 9 days, 10 days, 11 days, 12 days or more without an additional supplement of a L-glutamine, a dipeptide form of glutamine or other form of glutamine.

In some embodiments, the serum-free media supports or promotes the expansion of a cell. In some embodiments, the media supports or promotes the viability of a cell. In some embodiments, the media supports or promotes the activation of a cell.

In some embodiments, the cell comprises an immune cell. In some embodiments, the cell comprises a primary immune cell. In some embodiments, the primary immune cell comprises a genetically engineered cell. In some embodiments, the primary immune cell comprises a T cell. In some embodiments, the primary immune cell comprises CD4 and/or CD8 T cell. In some embodiments, the CD4 and/or CD8 T cell is a genetically engineered T cell. In some embodiments, the T cell is genetically engineered to express a recombinant receptor (e.g., a chimeric antigen receptor). In some embodiments, the T cell comprises a chimeric antigen receptor (CAR) expressing T cells.

In some embodiments, the serum-free media supports or promotes the viability, expansion, and/or activation of cells, wherein the cells cultured with the serum-free media achieve comparable functional property (e.g., viability, expansion and production of cytokine or cytokines) as cells cultured with serum-containing media, such as media containing about 5-10% (v/v) human serum.

D. Methods of Preparation of Serum-Free Media

In some embodiments, there is provided a method for preparing a serum-free medium formulation, the method comprising combining: (a) a basal medium comprising a synthetic amino acid capable of being converted into a free form of glutamine (e.g., L-glutamine) in a cell culture; (b) a first supplement comprising a free form of glutamine (i.e., L-glutamine), wherein the first supplement was frozen for at least a portion of time after L-glutamine becomes a component thereof and prior to combining. In some embodiments, the synthetic amino acid is dipeptide form of L-glutamine (e.g., L-alanyl-L-glutamine). In some embodiments, the basal medium is serum-free. In some embodiments, the basal medium is a liquid formulation and/or has not been frozen prior to the combining and/or not recommended in a commercial protocol to be frozen when kept in storage. In some embodiments, the first supplement was frozen for the majority of time after L-glutamine became a component thereof and before combining with the basal medium. In some embodiments, the first supplement was frozen and thawed prior to the combining.

In some embodiments, the first supplement is thawed as a liquid formulation no more than at or about one week, such as no more than at or about 6, 5, 4, 3, 2, or 1 day, generally no more than at or about 12 hours, 6 hours, 2 hours, 1 hour or 30 minutes prior to being combined with the basal medium. In some embodiments, the first supplement containing L-glutamine is kept frozen shortly (such as within 6, 12, 16, 24, 36, 48 hours) or immediately before the combining. In some embodiments, the first supplement containing the L-glutamine was a liquid formulation for less than at or about 48, 24, 16, 12, 8, 4, or 2 hours before being combined with basal medium. In some embodiments, the synthetic amino acid is a dipeptide of L-glutamine. In some embodiments, the synthetic amino acid is L-alanyl-L-glutamine.

In some embodiments, the serum-free medium formulation comprises at or about 90% to 98.75% (v/v) of the basal medium and at or about 1.25% to 10% (v/v) of the first supplement. In some embodiments, the serum-free medium formulation comprises at or about 90% to 97.5% (v/v) of the basal medium and at or about 1.25% to 5% (v/v) of the first supplement. In some embodiments, the serum-free medium formulation comprises at or about 95% (v/v) of the basal medium and at or about 2.5%±0.2% (v/v) of the first supplement, such as at or about 2.5% (v/v). In some embodiments, a liter of the basal medium is supplemented with at or about 25 milliliter of the first supplement.

In some embodiments, the method further comprises combining a second supplement. In some embodiments, the second supplement comprises one or more additional components, such as any described above, including one or more antioxidants, one or more albumins or albumin substitutes, one or more lipid agents, one or more insulins or insulin substitutes, one or more transferrins or transferrin substitutes, one or more trace elements, and one or more glucocorticoids. Exemplary components of a second supplement are described above.

In some embodiments, the second supplement comprises an albumin, N-acetylcysteine (NAC) and ethanolamine. In some embodiments, the second supplement comprises an albumin, N-acetylcysteine (NAC) and ethanolamine, wherein the concentration of albumin, NAC and/or ethanolamine is such that after the second supplement is combined with a basal medium (such as these described herein), the concentration of albumin, NAC and/or ethanolamine is substantially the same as described herein. In some embodiments, the albumin is a human derived albumin. In some embodiments, the albumin is a human derived albumin from human plasma or serum. In some embodiments, the second supplement is a liquid and does not include, or does not include a significant amount of a free form of glutamine (i.e., L-glutamine).

In some embodiments, the second supplement comprises OpTmizer® supplement (Thermofisher, part of A1048503).

In some embodiments, the second supplement is liquid. In some embodiments, the second supplement is not frozen, or not recommended to be frozen for the storage. In some embodiments, the serum-free medium formulation comprises at or about 1.25% to at or about 5% (v/v) of the second supplement, such as at or about 2.5%±0.2%, such as at or about 2.5% or at or about 2.6%. In some embodiments, a liter of the basal medium is supplemented with about 26 milliliter of the second supplement.

In some embodiments, the serum-free medium formulation comprises at or about 90% to at or about 97.5% (v/v) of the basal medium, at or about 1.25% to at or about 5% (v/v) of the first supplement, and at or about 1.25% to at or about 5% (v/v) of the second supplement. In some embodiments, the serum-free medium formulation comprises at or about 95% (v/v) of the basal medium, at or about 2.5%±0.2% (v/v) of the first supplement, and at or about 2.5%±0.2% (v/v) of the second supplement.

II. METHODS FOR PRODUCING AND PREPARING A CELL COMPOSITION

In some embodiments, the provided serum-free media can be used in methods for culturing cells, such as in connection with one or more of activation, transduction, expansion, cultivation or proliferation of cells, including immune cells, such as T cells. In some embodiments, provided methods for culturing cells in the presence of serum-free media can be carried out as part of a process for generating or producing a genetically engineered cells, such as genetically-engineered T cells. In some embodiments, cells are cultured for at least at or about 1, 2, 3, 4, 5, 6, 7, 8, 9, 10, 11, 12, 13, 14, 15, 16, 17, 18, 19, or 20 days with the provided serum-free media. In some embodiments, cells are cultured for about 2-3 days, 3-4 days, 4-5 days, 5-6 days, 6-7 days, 7-8 days, 8-9 days, 9-10 days, 10-11 days, 11-12 days, 12-13 days, 13-14 days, 14-15 days, 15-16 days, 16-17 days, 17-18 days, 18-19 days, or 19-20 days, each inclusive. In some embodiments, the cells are cultured at about 37° C. In some embodiments, the cells are cultured in 5% $CO_2$/95% air atmosphere. In some embodiments, the culturing can be carried for more than or more than about 1, 2, 3, 4, 5, 6, 7, 8, 9, 10, 11, 12, 13, 14, 15, 16, 17, 18, 19, or 20 days without changing the media when culturing cells. In some embodiments, methods of perfusion, such as semi-continuous perfusion, can be employed in connection with culturing the cells.

In some embodiments, the cells are primary cells. In some embodiments, the cells are immune cells or enriched immune cells. In some embodiments, the cells are T cells or enriched with T cells. In some embodiments, the cells are CD4+ T cells or enriched CD4+ T cells. In some embodiments, the cells are CD8+ T cells or enriched CD8+ T cells. In some embodiments, the cells comprise genetically engineered cells or an enriched population of genetically-engineered cells. In some embodiments, the cells comprise cells to be genetically engineered or being genetically engineered. In some embodiments, the cells comprise an enriched population of cells to be genetically engineered or being genetically engineered. In some embodiments, the cells comprise genetically engineered T cells or an enriched population of genetically engineered T cells. In some embodiments, the cells comprise chimeric antigen receptor (CAR) expressing T cells or an enriched CAR-expressing T cells. In some embodiments, the cells have been previously cryopreserved. In some embodiments, the cell has been cultured in the serum-free media and cryopreserved following the culture. In some embodiments, the cells specifically target a tumor cell.

In some embodiments, provided herein are methods for culturing cells, such as for cultivation, expansion or proliferation of cells. In some embodiments, the methods are carried out to expand the cells at least at or about 1.5-fold, 2-fold, 3-fold, 4-fold, 5-fold, 6-fold, 7-fold, 8-fold, 9-fold, 10-fold, 15-fold, 20-fold, 25-fold, 30-fold, 35-fold, 40-fold, 45-fold, 50-fold, 55-fold, 60-fold, 65-fold, 70-fold, 75-fold, 80-fold, 85-fold, 90-fold, 95-fold, 100-fold or more, such as following culture in the presence of serum-free media, optionally with one or more other cytokines or reagents, for at or about 1, 2, 3, 4, 5, 6, 7, 8, 9, 10, 11, 12, 13, 14, 15, 16, 17, 18, 19, 20 or more days. In some embodiments, the cells expand at least about 5-fold, 10-fold, 20-fold, 30-fold, 40-fold, or 50-fold or more after culture in the serum-free medium formulation for about 5 to 6 days. In some embodiments, the expansion is comparable or improved compared to culture with serum-containing media under the same conditions, such as following culture for at or about 1, 2, 3, 4, 5, 6, 7, 8, 9, 10, 11, 12, 13, 14, 15, 16, 17, 18, 19, 20 or more days.

In some embodiments, in connection with the provided methods for culturing, such as in connection with activation, transduction, cultivation, expansion or proliferation of cells, the serum-free media further contains one or more cytokines and/or the culturing is carried out in the presence of one or more cytokine. In some embodiments, the one or more cytokine is selected from IL-2, IL-7 and IL-15. In some embodiments, the cells are T cells. In some embodiments, the cells are CD4+ T cells and/or CD8+ T cells. In some embodiments, the cells are genetically-engineered T cells.

In some embodiments, the provided methods are used in connection with one or more steps or processes involved in the manufacturing, generating or producing a cell therapy. In some embodiments, the cell therapy includes cells, such as T cells, engineered with a recombinant receptor, such as a chimeric antigen receptor, e.g. CAR T cells. In some embodiments, the one or more steps comprises the isolation, separation, selection, activation or stimulation, transduction, cultivation, expansion, washing, suspension, dilution, concentration, and/or formulation of the cells. In some embodiments, the methods of generating or producing a cell therapy include isolating cells from a subject, preparing, processing, culturing under one or stimulating conditions. In some embodiments, the method includes processing steps carried out in an order in which: cells, e.g. primary cells, are first isolated, such as selected or separated, from a biological sample; selected cells are incubated with viral vector particles for transduction, optionally subsequent to a step of stimulating the isolated cells in the presence of a stimulation reagent; culturing the transduced cells, such as to expand the cells; formulating the transduced cells in a composition and introducing the composition into a biomedical material vessel. In some embodiments, the generated engineered cells are re-introduced into the same subject, before or after cryopreservation. In some embodiments, any one or more of the above steps can be carried out in the presence of serum-free media.

In some embodiments, the one or more processing steps can include one or more of (a) washing a biological sample containing cells (e.g., a whole blood sample, a buffy coat sample, a peripheral blood mononuclear cells (PBMC) sample, an unfractionated T cell sample, a lymphocyte sample, a white blood cell sample, an apheresis product, or a leukapheresis product), (b) isolating, e.g. selecting, from the sample a desired subset or population of cells (e.g., CD4+ and/or CD8+ T cells), for example, by incubation of cells with a selection or immunoaffinity reagent for immunoaffinity-based separation; c) introducing an agent encoding a recombinant receptor, e.g. a CAR, into the isolated or selected cells, such as by incubating the isolated, such as selected cells, with viral vector particles encoding the recombinant receptor, (d) culturing, cultivating or expanding the cells such using methods as described and (e) formulating the transduced cells, such as in a pharmaceutically acceptable buffer, cryopreservative or other suitable medium. In some embodiments, the methods can further include (f) stimulating cells by exposing cells to stimulating conditions, which can be performed prior to, during and/or subsequent to the incubation of cells with viral vector particles. In some embodiments, one or more further step of washing or suspending step, such as for dilution, concentration and/or buffer exchange of cells, can also be carried out prior to or subsequent to any of the above steps. In some aspects, the resulting engineered cell composition is introduced into one or more biomedical culture vessels. In some embodiments, any one or more of the above steps can be carried out in the presence of serum-free media.

In some embodiments, the process for manufacturing, generating or producing a cell therapy includes a step in which total T cells, e.g. CD3+ or CD4+/CD8+ T cells, are isolated or selected prior to carrying out the subsequent steps of the process.

In some embodiments, the process for manufacturing, generating or producing a cell therapy includes a step in which the CD4+ and CD8+ cells are separately isolated and then mixed together prior to the step of introducing a recombinant receptor, e.g. CAR, into the cells. In some embodiments, the CD4+ and CD8+ cells are mixed at a ratio of at or about 1:5 to at or about 5:1 CD4+ to CD8+ T cells, such as at or about 1:3 to at or about 3:1, at or about 1:2 to at or about 2:1 or at or about at a ratio of 1:1 CD4+ to CD8+ cells prior to the introducing of the agent encoding the recombinant receptor and/or one or more of the subsequent processing steps for producing genetically engineered cells.

In some embodiments, the process for manufacturing, generating or producing a cell therapy includes a step of separately isolating the CD4+ and CD8+ T cells and separately carrying out the one or more subsequent steps on the selected or isolated CD4+ T cells and separately carrying out the one or more subsequent steps on the selected or isolated CD8+ T cells. In aspects of such an embodiment, the transduced cells, such as separate compositions of CD4+ T cells and CD8+ T cells genetically engineered with a recombinant receptor, e.g. CAR, can be combined together as a single composition prior to the step of formulating the cells. In other aspects of such an embodiment, the transduced cells, such as the transduced cells, such as separate compositions of CD4+ T cells and CD8+ T cells genetically engineered with a recombinant receptor, e.g. CAR, are separately formulated, such as for separate administration to a subject.

In some embodiments, the provided methods for preparing or producing genetically engineered cells are carried out such that one, more, or all steps in the preparation of cells for clinical use, e.g., in adoptive cell therapy, are carried out without exposing the cells to non-sterile conditions and without the need to use a sterile room or cabinet. In some embodiments of such a process, the cells are isolated, separated or selected, transduced, washed, optionally activated or stimulated and formulated, all within a closed system. In some aspects of such a process, the cells are expressed from a closed system and introduced into one or more of the biomaterial vessels. In some embodiments, the methods are carried out in an automated fashion. In some embodiments, one or more of the steps is carried out apart from the closed system or device.

In some embodiments, a closed system is used for carrying out one or more of the other processing steps of a method for manufacturing, generating or producing a cell therapy. In certain embodiments, the isolation or separation is carried out using a system, device, or apparatus that carries out one or more of the isolation, cell preparation, separation, processing, incubation, culture, and/or formulation steps of the methods. In some aspects, the system is used to carry out each of these steps in a closed or sterile environment, for example, to minimize error, user handling and/or contamination In some embodiments, one or more or all of the processing steps, e.g., isolation, selection and/or enrichment, processing, incubation in connection with transduction and engineering, and formulation steps is carried out using a system, device, or apparatus in an integrated or self-contained system, and/or in an automated or programmable fashion.. In some aspects, the system or apparatus includes a computer and/or computer program in communication with the system or apparatus, which allows a user to program, control, assess the outcome of, and/or adjust various aspects of the processing, isolation, engineering, and formulation steps. In one example, the system is a system as described in International Patent Application, Publication Number WO2009/072003, or US 20110003380 A1. In some embodiments, the system or device includes a centrifugal chamber, such as for carrying out one or more of the steps for processing cells. In one example, the system is a system as described in International Publication Number WO2016/073602.

A. Isolation or Selection of Cells from Samples

In some embodiments, the processing steps include isolation of cells or compositions thereof from biological samples, such as those obtained from or derived from a subject, such as one having a particular disease or condition or in need of a cell therapy or to which cell therapy will be administered. In some aspects, the subject is a human, such as a subject who is a patient in need of a particular therapeutic intervention, such as the adoptive cell therapy for which cells are being isolated, processed, and/or engineered. Accordingly, the cells in some embodiments are primary cells, e.g., primary human cells. In some embodiments, the cells comprise CD4+ and CD8+ T cells. In some embodiments, the cells comprise CD4+ or CD8+ T cells.

In some embodiments, the nucleic acids, such as nucleic acids encoding a recombinant protein, are heterologous, i.e., normally not present in a cell or sample obtained from the cell, such as one obtained from another organism or cell, which for example, is not ordinarily found in the cell being engineered and/or an organism from which such cell is derived. In some embodiments, the nucleic acids are not naturally occurring, such as a nucleic acid not found in nature, including one comprising chimeric combinations of nucleic acids encoding various domains from multiple different cell types.

The cells generally are eukaryotic cells, such as mammalian cells, and typically are human cells. In some embodiments, the cells are derived from the blood, bone marrow, lymph, or lymphoid organs, are cells of the immune system, such as cells of the innate or adaptive immunity, e.g., myeloid or lymphoid cells, including lymphocytes, typically T cells and/or NK cells. Other exemplary cells include stem cells, such as multipotent and pluripotent stem cells, including induced pluripotent stem cells (iPSCs). The cells typically are primary cells, such as those isolated directly from a subject and/or isolated from a subject and frozen. In some embodiments, the cells include one or more subsets of T cells or other cell types, such as whole T cell populations, CD4+ cells, CD8+ cells, and subpopulations thereof, such as those defined by function, activation state, maturity, potential for differentiation, expansion, recirculation, localization, and/or persistence capacities, antigen-specificity, type of antigen receptor, presence in a particular organ or compartment, marker or cytokine secretion profile, and/or degree of differentiation. With reference to the subject to be treated, the cells may be allogeneic and/or autologous. Among the methods include off-the-shelf methods. In some aspects, such as for off-the-shelf technologies, the cells are pluripotent and/or multipotent, such as stem cells, such as induced pluripotent stem cells (iPSCs). In some embodiments, the methods include isolating cells from the subject, preparing, processing, culturing, and/or engineering them, and re-introducing them into the same subject, before or after cryopreservation.

Among the sub-types and subpopulations of T cells and/or of CD4+ and/or of CD8+ T cells are naïve T ($T_N$) cells, effector T cells ($T_{EFF}$), memory T cells and sub-types thereof, such as stem cell memory T ($T_{SCM}$), central memory T ($T_{CM}$), effector memory T ($T_{EM}$), or terminally differentiated effector memory T cells, tumor-infiltrating lymphocytes (TIL), immature T cells, mature T cells, helper T cells, cytotoxic T cells, mucosa-associated invariant T (MAIT) cells, naturally occurring and adaptive regulatory T (Treg) cells, helper T cells, such as TH1 cells, TH2 cells, TH3 cells, TH17 cells, TH9 cells, TH22 cells, follicular helper T cells, alpha/beta T cells, and delta/gamma T cells.

In some embodiments, the cells are natural killer (NK) cells. In some embodiments, the cells are monocytes or granulocytes, e.g., myeloid cells, macrophages, neutrophils, dendritic cells, mast cells, eosinophils, and/or basophils.

In some embodiments, the cells include one or more nucleic acids introduced via genetic engineering, and thereby express recombinant or genetically engineered products of such nucleic acids. In some embodiments, the nucleic acids are heterologous, i.e., normally not present in a cell or sample obtained from the cell, such as one obtained from another organism or cell, which for example, is not ordinarily found in the cell being engineered and/or an organism from which such cell is derived. In some embodiments, the nucleic acids are not naturally occurring, such as a nucleic acid not found in nature, including one comprising chimeric combinations of nucleic acids encoding various domains from multiple different cell types.

In some embodiments, preparation of the engineered cells includes one or more culture and/or preparation steps, some or all of which steps is in the presence of serum-free media as provided herein. The cells for introduction of the nucleic acid encoding the transgenic receptor such as the CAR, may be isolated from a sample, such as a biological sample, e.g., one obtained from or derived from a subject. In some embodiments, the subject from which the cell is isolated is one having the disease or condition or in need of a cell therapy or to which cell therapy will be administered.

The samples include tissue, fluid, and other samples taken directly from the subject, as well as samples resulting from one or more processing steps, such as separation, centrifugation, genetic engineering (e.g. transduction with viral vector), washing, and/or incubation. The biological sample can be a sample obtained directly from a biological source or a sample that is processed. Biological samples include, but are not limited to, body fluids, such as blood, plasma, serum, cerebrospinal fluid, synovial fluid, urine and sweat, tissue and organ samples, including processed samples derived therefrom.

In some aspects, the sample is blood or a blood-derived sample, or is or is derived from an apheresis or leukapheresis product. Exemplary samples include whole blood, peripheral blood mononuclear cells (PBMCs), leukocytes, bone marrow, thymus, tissue biopsy, tumor, leukemia, lymphoma, lymph node, gut associated lymphoid tissue, mucosa associated lymphoid tissue, spleen, other lymphoid tissues, liver, lung, stomach, intestine, colon, kidney, pancreas, breast, bone, prostate, cervix, testes, ovaries, tonsil, or other organ, and/or cells derived therefrom. Samples include, in the context of cell therapy, e.g., adoptive cell therapy, samples from autologous and allogeneic sources.

In some examples, cells from the circulating blood of a subject are obtained, e.g., by apheresis or leukapheresis. The samples, in some aspects, contain lymphocytes, including T cells, monocytes, granulocytes, B cells, other nucleated white blood cells, red blood cells, and/or platelets, and in some aspects contains cells other than red blood cells and platelets.

In some embodiments, the blood cells collected from the subject are washed, e.g., to remove the plasma fraction and to place the cells in an appropriate buffer or media for subsequent processing steps. In some embodiments, the cells are washed with phosphate buffered saline (PBS). In some embodiments, the wash solution lacks calcium and/or magnesium and/or many or all divalent cations. In some aspects, a washing step is accomplished a semi-automated "flow-through" centrifuge (for example, the Cobe 2991 cell processor, Baxter) according to the manufacturer's instructions. In some aspects, a washing step is accomplished by tangential flow filtration (TFF) according to the manufacturer's instructions. In some embodiments, the cells are resuspended in a variety of biocompatible buffers after washing, such as, for example, Ca++/Mg++ free PBS. In certain embodiments, components of a blood cell sample are removed and the cells directly resuspended in culture media.

In some embodiments, the preparation methods include steps for freezing, e.g., cryopreserving, the cells, either before or after isolation, selection and/or enrichment and/or incubation for transduction and engineering. In some embodiments, the freeze and subsequent thaw step removes granulocytes and, to some extent, monocytes in the cell population. In some embodiments, the cells are suspended in a freezing solution, e.g., following a washing step to remove plasma and platelets. Any of a variety of known freezing solutions and parameters in some aspects may be used. This is then diluted 1:1 with media so that the final concentration of DMSO and HSA are 10% and 4%, respectively. The cells are generally then frozen to −80° C. at a rate of 1° per minute and stored in the vapor phase of a liquid nitrogen storage tank.

In some embodiments, isolation of the cells or populations includes one or more preparation and/or non-affinity based cell separation steps. In some examples, cells are washed, centrifuged, and/or incubated in the presence of one or more reagents, for example, to remove unwanted components, enrich for desired components, lyse or remove cells sensitive to particular reagents. In some examples, cells are separated based on one or more property, such as density, adherent properties, size, sensitivity and/or resistance to particular components. In some embodiments, the methods include density-based cell separation methods, such as the preparation of white blood cells from peripheral blood by lysing the red blood cells and centrifugation through a Percoll or Ficoll gradient.

In some embodiments, at least a portion of the selection step includes incubation of cells with a selection reagent. The incubation with a selection reagent or reagents, e.g., as part of selection methods which may be performed using one or more selection reagents for selection of one or more different cell types based on the expression or presence in or on the cell of one or more specific molecules, such as surface markers, e.g., surface proteins, intracellular markers, or nucleic acid. In some embodiments, any known method using a selection reagent or reagents for separation based on such markers may be used. In some embodiments, the selection reagent or reagents result in a separation that is affinity- or immunoaffinity-based separation. For example, the selection in some aspects includes incubation with a reagent or reagents for separation of cells and cell populations based on the cells' expression or expression level of one or more markers, typically cell surface markers, for example, by incubation with an antibody or binding partner that specifically binds to such markers, followed generally by washing steps and separation of cells having bound the antibody or binding partner, from those cells having not bound to the antibody or binding partner. In some embodiments, the selection and/or other aspects of the process is as described in International Patent Application Publication Number WO/2015/164675.

In some aspects of such processes, a volume of cells is mixed with an amount of a desired affinity-based selection reagent. The immunoaffinity-based selection can be carried out using any system or method that results in a favorable energetic interaction between the cells being separated and the molecule specifically binding to the marker on the cell, e.g., the antibody or other binding partner on the solid surface, e.g., particle. In some embodiments, methods are carried out using particles such as beads, e.g. magnetic beads, that are coated with a selection agent (e.g. antibody) specific to the marker of the cells. The particles (e.g. beads) can be incubated or mixed with cells in a container, such as a tube or bag, while shaking or mixing, with a constant cell density-to-particle (e.g., bead) ratio to aid in promoting energetically favored interactions. In other cases, the methods include selection of cells in which all or a portion of the selection is carried out in the internal cavity of a centrifugal chamber, for example, under centrifugal rotation. In some embodiments, incubation of cells with selection reagents, such as immunoaffinity-based selection reagents, is performed in a centrifugal chamber. In certain embodiments, the isolation or separation is carried out using a system, device, or apparatus described in International Patent Application, Publication Number WO2009/072003, or US 20110003380 A1. In one example, the system is a system as described in International Publication Number WO2016/073602.

In some embodiments, by conducting such selection steps or portions thereof (e.g., incubation with antibody-coated particles, e.g., magnetic beads) in the cavity of a centrifugal chamber, the user is able to control certain parameters, such as volume of various solutions, addition of solution during processing and timing thereof, which can provide advantages compared to other available methods. For example, the ability to decrease the liquid volume in the cavity during the incubation can increase the concentration of the particles (e.g. bead reagent) used in the selection, and thus the chemical potential of the solution, without affecting the total number of cells in the cavity. This in turn can enhance the pairwise interactions between the cells being processed and the particles used for selection. In some embodiments, carrying out the incubation step in the chamber, e.g., when associated with the systems, circuitry, and control as described herein, permits the user to effect agitation of the solution at desired time(s) during the incubation, which also can improve the interaction.

In some embodiments, at least a portion of the selection step is performed in a centrifugal chamber, which includes incubation of cells with a selection reagent. In some aspects of such processes, a volume of cells is mixed with an amount of a desired affinity-based selection reagent that is far less than is normally employed when performing similar selections in a tube or container for selection of the same number of cells and/or volume of cells according to manufacturer's instructions. In some embodiments, an amount of selection reagent or reagents that is/are no more than 5%, no more than 10%, no more than 15%, no more than 20%, no more than 25%, no more than 50%, no more than 60%, no more than 70% or no more than 80% of the amount of the same selection reagent(s) employed for selection of cells in a tube or container-based incubation for the same number of cells and/or the same volume of cells according to manufacturer's instructions is employed.

In some embodiments, for selection, e.g., immunoaffinity-based selection of the cells, the cells are incubated in the cavity of the chamber in a composition that also contains the selection buffer with a selection reagent, such as a molecule that specifically binds to a surface marker on a cell that it desired to enrich and/or deplete, but not on other cells in the composition, such as an antibody, which optionally is coupled to a scaffold such as a polymer or surface, e.g., bead, e.g., magnetic bead, such as magnetic beads coupled to monoclonal antibodies specific for CD4 and CD8. In some embodiments, as described, the selection reagent is added to cells in the cavity of the chamber in an amount that is substantially less than (e.g. is no more than 5%, 10%, 20%, 30%, 40%, 50%, 60%, 70% or 80% of the amount) as compared to the amount of the selection reagent that is typically used or would be necessary to achieve about the same or similar efficiency of selection of the same number of cells or the same volume of cells when selection is performed in a tube with shaking or rotation. In some embodiments, the incubation is performed with the addition of a selection buffer to the cells and selection reagent to achieve a target volume with incubation of the reagent of, for example, 10 mL to 200 mL, such as at least or at least about or about or 10 mL, 20 mL, 30 mL, 40 mL, 50 mL, 60 mL, 70 mL, 80 mL, 90 mL, 100 mL, 150 mL or 200 mL. In some embodiments, the selection buffer and selection reagent are pre-mixed before addition to the cells. In some embodiments, the selection buffer and selection reagent are separately added to the cells. In some embodiments, the selection incubation is carried out with periodic gentle mixing condition, which can aid in promoting energetically favored interactions and thereby permit the use of less overall selection reagent while achieving a high selection efficiency.

In some embodiments, the total duration of the incubation with the selection reagent is from or from about 5 minutes to or to about 6 hours, such as 30 minutes to 3 hours, for example, at least or at least about 30 minutes, 60 minutes, 120 minutes or 180 minutes.

In some embodiments, the incubation generally is carried out under mixing conditions, such as in the presence of spinning, generally at relatively low force or speed, such as speed lower than that used to pellet the cells, such as from or from about 600 rpm to or to about 1700 rpm (e.g. at or about or at least 600 rpm, 1000 rpm, or 1500 rpm or 1700 rpm), such as at an RCF at the sample or wall of the chamber or other container of from or from about 80 g to 100 g (e.g. at or about or at least 80 g, 85 g, 90 g, 95 g, or 100 g). In some embodiments, the spin is carried out using repeated intervals of a spin at such low speed followed by a rest period, such as a spin and/or rest for 1, 2, 3, 4, 5, 6, 7, 8, 9, or 10 seconds, such as a spin at approximately 1 or 2 seconds followed by a rest for approximately 5, 6, 7, or 8 seconds.

In some embodiments, such process is carried out within the entirely closed system to which the chamber is integral. In some embodiments, this process (and in some aspects also one or more additional step, such as a previous wash step washing a sample containing the cells, such as an apheresis sample) is carried out in an automated fashion, such that the cells, reagent, and other components are drawn into and pushed out of the chamber at appropriate times and centrifugation effected, so as to complete the wash and binding step in a single closed system using an automated program.

In some embodiments, after the incubation and/or mixing of the cells and selection reagent and/or reagents, the incubated cells are subjected to a separation to select for cells based on the presence or absence of the particular reagent or reagents. In some embodiments, the separation is performed in the same closed system in which the incubation of cells with the selection reagent was performed. In some embodiments, after incubation with the selection reagents, incubated cells, including cells in which the selection reagent has bound are transferred into a system for immunoaffinity-based separation of the cells. In some embodiments, the system for immunoaffinity-based separation is or contains a magnetic separation column.

In some embodiments, the isolation methods include the separation of different cell types based on the expression or presence in the cell of one or more specific molecules, such as surface markers, e.g., surface proteins, intracellular markers, or nucleic acid. In some embodiments, any known method for separation based on such markers may be used. In some embodiments, the separation is affinity- or immunoaffinity-based separation. For example, the isolation in some aspects includes separation of cells and cell populations based on the cells' expression or expression level of one or more markers, typically cell surface markers, for example, by incubation with an antibody or binding partner that specifically binds to such markers, followed generally by washing steps and separation of cells having bound the antibody or binding partner, from those cells having not bound to the antibody or binding partner.

Such separation steps can be based on positive selection, in which the cells having bound the reagents, e.g. antibody or binding partner, are retained for further use, and/or negative selection, in which the cells having not bound to the reagent, e.g., antibody or binding partner, are retained. In some examples, both fractions are retained for further use. In some aspects, negative selection can be particularly useful where no antibody is available that specifically identifies a cell type in a heterogeneous population, such that separation is best carried out based on markers expressed by cells other than the desired population.

In some embodiments, the process steps further include negative and/or positive selection of the incubated and cells, such as using a system or apparatus that can perform an affinity-based selection. In some embodiments, isolation is carried out by enrichment for a particular cell population by positive selection, or depletion of a particular cell population, by negative selection. In some embodiments, positive or negative selection is accomplished by incubating cells with one or more antibodies or other binding agent that specifically bind to one or more surface markers expressed or expressed (marker$^+$) at a relatively higher level (marker-$^{high}$) on the positively or negatively selected cells, respectively.

The separation need not result in 100% enrichment or removal of a particular cell population or cells expressing a particular marker. For example, positive selection of or enrichment for cells of a particular type, such as those expressing a marker, refers to increasing the number or percentage of such cells, but need not result in a complete absence of cells not expressing the marker. Likewise, negative selection, removal, or depletion of cells of a particular type, such as those expressing a marker, refers to decreasing the number or percentage of such cells, but need not result in a complete removal of all such cells.

In some examples, multiple rounds of separation steps are carried out, where the positively or negatively selected fraction from one step is subjected to another separation step, such as a subsequent positive or negative selection. In some examples, a single separation step can deplete cells expressing multiple markers simultaneously, such as by incubating cells with a plurality of antibodies or binding partners, each specific for a marker targeted for negative selection. Likewise, multiple cell types can simultaneously be positively selected by incubating cells with a plurality of antibodies or binding partners expressed on the various cell types.

For example, in some aspects, specific subpopulations of T cells, such as cells positive or expressing high levels of one or more surface markers, e.g., CD28$^+$, CD62L$^+$, CCR7$^+$, CD27$^+$, CD127$^+$, CD4$^+$, CD8$^+$, CD45RA$^+$, and/or CD45RO$^+$ T cells, are isolated by positive or negative selection techniques. In some embodiments, such cells are selected by incubation with one or more antibody or binding partner that specifically binds to such markers. In some embodiments, the antibody or binding partner can be conjugated, such as directly or indirectly, to a solid support or matrix to effect selection, such as a magnetic bead or paramagnetic bead. For example, CD3$^+$, CD28$^+$ T cells can be positively selected using anti-CD3/anti-CD28 conjugated magnetic beads (e.g., DYNABEADS® M-450 CD3/CD28 T Cell Expander, and/or ExpACT® beads).

In particular embodiments, a biological sample, e.g., a sample of PBMCs or other white blood cells, are subjected to selection of CD4$^+$ T cells, where both the negative and positive fractions are retained. In certain embodiments, CD8$^+$ T cells are selected from the negative fraction. In some embodiments, a biological sample is subjected to selection of CD8+ T cells, where both the negative and positive fractions are retained. In certain embodiments, CD4$^+$ T cells are selected from the negative fraction.

In some embodiments, T cells are separated from a PBMC sample by negative selection of markers expressed on non-T cells, such as B cells, monocytes, or other white blood cells, such as CD14. In some aspects, a CD4$^+$ or CD8$^+$ selection step is used to separate CD4+ helper and CD8$^+$ cytotoxic T cells. Such CD4$^+$ and CD8$^+$ populations can be further sorted into sub-populations by positive or negative selection for markers expressed or expressed to a relatively higher degree on one or more naive, memory, and/or effector T cell subpopulations.

In some embodiments, CD8$^+$ cells are further enriched for or depleted of naive, central memory, effector memory, and/or central memory stem cells, such as by positive or negative selection based on surface antigens associated with the respective subpopulation. In some embodiments, enrichment for central memory T (T$_{CM}$) cells is carried out to increase efficacy, such as to improve long-term survival, expansion, and/or engraftment following administration, which in some aspects is particularly robust in such subpopulations. See Terakura et al., (2012) Blood. 1:72-82; Wang et al. (2012) J Immunother. 35(9):689-701. In some embodiments, combining TCM-enriched CD8$^+$ T cells and CD4$^+$ T cells further enhances efficacy.

In embodiments, memory T cells are present in both CD62L$^+$ and CD62L− subsets of CD8$^+$ peripheral blood lymphocytes. PBMC can be enriched for or depleted of CD62L-CD8$^+$ and/or CD62L$^+$CD8$^+$ fractions, such as using anti-CD8 and anti-CD62L antibodies.

In some embodiments, the enrichment for central memory T (T$_{CM}$) cells is based on positive or high surface expression of CD45RO, CD62L, CCR7, CD28, CD3, and/or CD 127; in some aspects, it is based on negative selection for cells expressing or highly expressing CD45RA and/or granzyme B. In some aspects, isolation of a CD8$^+$ population enriched for TCM cells is carried out by depletion of cells expressing CD4, CD14, CD45RA, and positive selection or enrichment for cells expressing CD62L. In one aspect, enrichment for central memory T (TCM) cells is carried out starting with a negative fraction of cells selected based on CD4 expression, which is subjected to a negative selection based on expression of CD14 and CD45RA, and a positive selection based on CD62L. Such selections in some aspects are carried out simultaneously and in other aspects are carried out sequentially, in either order. In some aspects, the same CD4 expression-based selection step used in preparing the CD8$^+$ cell population or subpopulation, also is used to generate the CD4$^+$ cell population or sub-population, such that both the positive and negative fractions from the CD4-based separation are retained and used in subsequent steps of the methods, optionally following one or more further positive or negative selection steps. In some embodiments, the selection for the CD4$^+$ cell population and the selection for the CD8$^+$ cell population are carried out simultaneously. In some embodiments, the CD4$^+$ cell population and the selection for the CD8$^+$ cell population are carried out sequentially, in either order. In some embodiments, methods for selecting cells can include those as described in published U.S. App. No. US20170037369. In some embodiments, the selected CD4$^+$ cell population and the selected CD8$^+$ cell population may be combined subsequent to the selecting. In some aspects, the selected CD4+ cell population and the selected CD8+ cell population may be combined in a container, such as a bag.

In a particular example, a sample of PBMCs or other white blood cell sample is subjected to selection of CD4+ cells, where both the negative and positive fractions are retained. The negative fraction then is subjected to negative selection based on expression of CD14 and CD45RA or CD19, and positive selection based on a marker characteristic of central memory T cells, such as CD62L or CCR7, where the positive and negative selections are carried out in either order.

CD4+ T helper cells are sorted into naïve, central memory, and effector cells by identifying cell populations that have cell surface antigens. CD4+ lymphocytes can be obtained by standard methods. In some embodiments, naive CD4+ T lymphocytes are CD45RO−, CD45RA+, CD62L+, CD4+ T cells. In some embodiments, central memory CD4+ cells are CD62L+ and CD45RO+. In some embodiments, effector CD4+ cells are CD62L− and CD45RO−.

In one example, to enrich for CD4+ cells by negative selection, a monoclonal antibody cocktail typically includes antibodies to CD14, CD20, CD11b, CD16, HLA-DR, and CD8. In some embodiments, the antibody or binding partner is bound to a solid support or matrix, such as a magnetic bead or paramagnetic bead, to allow for separation of cells for positive and/or negative selection. For example, in some embodiments, the cells and cell populations are separated or isolated using immunomagnetic (or affinitymagnetic) separation techniques (reviewed in Methods in Molecular Medicine, vol. 58: Metastasis Research Protocols, Vol. 2: Cell Behavior In Vitro and In Vivo, p 17-25 Edited by: S. A. Brooks and U. Schumacher © Humana Press Inc., Totowa, NJ).

In some aspects, the incubated sample or composition of cells to be separated is incubated with a selection reagent containing small, magnetizable or magnetically responsive material, such as magnetically responsive particles or microparticles, such as paramagnetic beads (e.g., such as Dynalbeads or MACS® beads). The magnetically responsive material, e.g., particle, generally is directly or indirectly attached to a binding partner, e.g., an antibody, that specifically binds to a molecule, e.g., surface marker, present on the cell, cells, or population of cells that it is desired to separate, e.g., that it is desired to negatively or positively select.

In some embodiments, the magnetic particle or bead comprises a magnetically responsive material bound to a specific binding member, such as an antibody or other binding partner. There are many well-known magnetically responsive materials used in magnetic separation methods. Suitable magnetic particles include those described in Molday, U.S. Pat. No. 4,452,773, and in European Patent Specification EP 452342 B, which are hereby incorporated by reference. Colloidal sized particles, such as those described in Owen U.S. Pat. No. 4,795,698, and Liberti et al., U.S. Pat. No. 5,200,084 are other examples.

The incubation generally is carried out under conditions whereby the antibodies or binding partners, or molecules, such as secondary antibodies or other reagents, which specifically bind to such antibodies or binding partners, which are attached to the magnetic particle or bead, specifically bind to cell surface molecules if present on cells within the sample.

In certain embodiments, the magnetically responsive particles are coated in primary antibodies or other binding partners, secondary antibodies, lectins, enzymes, or streptavidin. In certain embodiments, the magnetic particles are attached to cells via a coating of primary antibodies specific for one or more markers. In certain embodiments, the cells, rather than the beads, are labeled with a primary antibody or binding partner, and then cell-type specific secondary antibody- or other binding partner (e.g., streptavidin)-coated magnetic particles, are added. In certain embodiments, streptavidin-coated magnetic particles are used in conjunction with biotinylated primary or secondary antibodies.

In some aspects, separation is achieved in a procedure in which the sample is placed in a magnetic field, and those cells having magnetically responsive or magnetizable particles attached thereto will be attracted to the magnet and separated from the unlabeled cells. For positive selection, cells that are attracted to the magnet are retained; for negative selection, cells that are not attracted (unlabeled cells) are retained. In some aspects, a combination of positive and negative selection is performed during the same selection step, where the positive and negative fractions are retained and further processed or subject to further separation steps.

In some embodiments, the affinity-based selection is via magnetic-activated cell sorting (MACS) (Miltenyi Biotec, Auburn, CA). Magnetic Activated Cell Sorting (MACS), e.g., CliniMACS systems are capable of high-purity selection of cells having magnetized particles attached thereto. In certain embodiments, MACS operates in a mode wherein the non-target and target species are sequentially eluted after the application of the external magnetic field. That is, the cells attached to magnetized particles are held in place while the unattached species are eluted. Then, after this first elution step is completed, the species that were trapped in the magnetic field and were prevented from being eluted are freed in some manner such that they can be eluted and recovered. In certain embodiments, the non-target cells are labelled and depleted from the heterogeneous population of cells.

In some embodiments, the magnetically responsive particles are left attached to the cells that are to be subsequently incubated, cultured and/or engineered; in some aspects, the particles are left attached to the cells for administration to a patient. In some embodiments, the magnetizable or magnetically responsive particles are removed from the cells. Methods for removing magnetizable particles from cells are known and include, e.g., the use of competing non-labeled antibodies, magnetizable particles or antibodies conjugated to cleavable linkers, etc. In some embodiments, the magnetizable particles are biodegradable.

In some aspects, the separation and/or other steps is carried out using CliniMACS system (Miltenyi Biotec), for example, for automated separation of cells on a clinical-scale level in a closed and sterile system. Components can include an integrated microcomputer, magnetic separation unit, peristaltic pump, and various pinch valves. The integrated computer in some aspects controls all components of the instrument and directs the system to perform repeated procedures in a standardized sequence. The magnetic separation unit in some aspects includes a movable permanent magnet and a holder for the selection column. The peristaltic pump controls the flow rate throughout the tubing set and, together with the pinch valves, ensures the controlled flow of buffer through the system and continual suspension of cells.

The CliniMACS system in some aspects uses antibody-coupled magnetizable particles that are supplied in a sterile, non-pyrogenic solution. In some embodiments, after labelling of cells with magnetic particles the cells are washed to remove excess particles. A cell preparation bag is then connected to the tubing set, which in turn is connected to a bag containing buffer and a cell collection bag. The tubing set consists of pre-assembled sterile tubing, including a pre-column and a separation column, and are for single use only. After initiation of the separation program, the system automatically applies the cell sample onto the separation column. Labelled cells are retained within the column, while unlabeled cells are removed by a series of washing steps. In some embodiments, the cell populations for use with the methods described herein are unlabeled and are not retained in the column. In some embodiments, the cell populations for use with the methods described herein are labeled and are retained in the column. In some embodiments, the cell populations for use with the methods described herein are eluted from the column after removal of the magnetic field, and are collected within the cell collection bag.

In certain embodiments, separation and/or other steps are carried out using the CliniMACS Prodigy system (Miltenyi Biotec). The CliniMACS Prodigy system in some aspects is equipped with a cell processing unity that permits automated washing and fractionation of cells by centrifugation. The CliniMACS Prodigy system can also include an onboard camera and image recognition software that determines the optimal cell fractionation endpoint by discerning the macroscopic layers of the source cell product. For example, peripheral blood is automatically separated into erythrocytes, white blood cells and plasma layers. The CliniMACS Prodigy system can also include an integrated cell cultivation chamber which accomplishes cell culture protocols such as, e.g., cell differentiation and expansion, antigen loading, and long-term cell culture. Input ports can allow for the sterile removal and replenishment of media and cells can be monitored using an integrated microscope. See, e.g., Klebanoff et al. (2012) *J Immunother.* 35(9): 651-660, Terakura et al. (2012) Blood. 1:72-82, and Wang et al. (2012) *J Immunother.* 35(9):689-701.

In some embodiments, a cell population described herein is collected and enriched (or depleted) via flow cytometry, in which cells stained for multiple cell surface markers are carried in a fluidic stream. In some embodiments, a cell population described herein is collected and enriched (or depleted) via preparative scale (FACS)-sorting. In certain embodiments, a cell population described herein is collected and enriched (or depleted) by use of microelectromechanical systems (MEMS) chips in combination with a FACS-based detection system (see, e.g., WO 2010/033140, Cho et al. (2010) *Lab Chip* 10, 1567-1573; and Godin et al. (2008) J Biophoton. 1(5):355-376. In both cases, cells can be labeled with multiple markers, allowing for the isolation of well-defined T cell subsets at high purity.

In some embodiments, the antibodies or binding partners are labeled with one or more detectable marker, to facilitate separation for positive and/or negative selection. For example, separation may be based on binding to fluorescently labeled antibodies. In some examples, separation of cells based on binding of antibodies or other binding partners specific for one or more cell surface markers are carried in a fluidic stream, such as by fluorescence-activated cell sorting (FACS), including preparative scale (FACS) and/or microelectromechanical systems (MEMS) chips, e.g., in combination with a flow-cytometric detection system. Such methods allow for positive and negative selection based on multiple markers simultaneously.

B. Activation and Stimulation of Cells

In some embodiments, the one or more processing steps include a step of stimulating the isolated cells, such as selected cell populations. The incubation may be prior to or in connection with genetic engineering, such as genetic engineering resulting from embodiments of the transduction method described above. In some embodiments, the stimulation results in activation and/or proliferation of the cells, for example, prior to transduction.

In some embodiments, the processing steps include incubations of cells, such as selected cells, in which the incubation steps can include culture, cultivation, stimulation, activation, and/or propagation of cells. The incubation and/or engineering may be carried out in a culture vessel, such as a unit, chamber, well, column, tube, tubing set, valve, vial, culture dish, bag, or other container for culture or cultivating cells. In some embodiments, the compositions or cells are incubated in the presence of stimulating conditions or a stimulatory agent. Such conditions include those designed to induce proliferation, activation, and/or survival of cells in the population, to mimic antigen exposure, and/or to prime the cells for genetic engineering, such as for the introduction of a recombinant antigen receptor.

In some embodiments, the conditions for stimulation and/or activation can include one or more of particular media, temperature, oxygen content, carbon dioxide content, time, agents, e.g., nutrients, amino acids, antibiotics, ions, and/or stimulatory factors, such as cytokines, chemokines, antigens, binding partners, fusion proteins, recombinant soluble receptors, and any other agents designed to activate the cells.

In some embodiments, the stimulating conditions or agents include one or more agent, e.g., ligand, which is capable of stimulating or activating an intracellular signaling domain of a TCR complex. In some aspects, the agent turns on or initiates TCR/CD3 intracellular signaling cascade in a T cell, such as agents suitable to deliver a primary signal, e.g., to initiate activation of an ITAM-induced signal, such as those specific for a TCR component, e.g., anti-CD3, and/or an agent that promotes a costimulatory signal, such as one specific for a T cell costimulatory receptor, e.g., anti-CD28, or anti-4-1BB, for example, bound to solid support such as a bead, and/or one or more cytokines. Among the stimulating agents are anti-CD3/anti-CD28 beads (e.g., DYNABEADS® M-450 CD3/CD28 T Cell Expander, and/or ExpACT® beads). Optionally, the expansion method may further comprise the step of adding anti-CD3 and/or anti-CD28 antibody to the culture medium. In some embodiments, the stimulating agents include IL-2, IL-7 and/or IL-15, for example, an IL-2 concentration of at least about 10 units/mL, at least about 50 units/mL, at least about 100 units/mL or at least about 200 units/mL.

The conditions can include one or more of particular media, temperature, oxygen content, carbon dioxide content, time, agents, e.g., nutrients, amino acids, antibiotics, ions, and/or stimulatory factors, such as cytokines, chemokines, antigens, binding partners, fusion proteins, recombinant soluble receptors, and any other agents designed to activate the cells.

In some aspects, incubation is carried out in accordance with techniques such as those described in U.S. Pat. No. 6,040,177 to Riddell et al., Klebanoff et al. (2012) J Immunother. 35(9): 651-660, Terakura et al. (2012) Blood. 1:72-82, and/or Wang et al. (2012) J Immunother. 35(9):689-701.

In some embodiments, the T cells are expanded by adding to a culture-initiating composition feeder cells, such as non-dividing peripheral blood mononuclear cells (PBMC), (e.g., such that the resulting population of cells contains at least about 5, 10, 20, or 40 or more PBMC feeder cells for each T lymphocyte in the initial population to be expanded); and incubating the culture (e.g. for a time sufficient to expand the numbers of T cells). In some aspects, the non-dividing feeder cells can comprise gamma-irradiated PBMC feeder cells. In some embodiments, the PBMC are irradiated with gamma rays in the range of about 3000 to 3600 rads to prevent cell division. In some aspects, the feeder cells are added to culture medium prior to the addition of the populations of T cells.

In some embodiments, the stimulating conditions include temperature suitable for the growth of human T lymphocytes, for example, at least about 25 degrees Celsius, generally at least about 30 degrees, and generally at or about 37 degrees Celsius. Optionally, the incubation may further comprise adding non-dividing EBV-transformed lymphoblastoid cells (LCL) as feeder cells. LCL can be irradiated with gamma rays in the range of about 6000 to 10,000 rads. The LCL feeder cells in some aspects is provided in any suitable amount, such as a ratio of LCL feeder cells to initial T lymphocytes of at least about 10:1.

In embodiments, antigen-specific T cells, such as antigen-specific $CD4^+$ and/or $CD8^+$ T cells, are obtained by stimulating naive or antigen specific T lymphocytes with antigen. For example, antigen-specific T cell lines or clones can be generated to cytomegalovirus antigens by isolating T cells from infected subjects and stimulating the cells in vitro with the same antigen.

In some embodiments, at least a portion of the incubation in the presence of one or more stimulating conditions or stimulatory agents is carried out in the internal cavity of a centrifugal chamber, for example, under centrifugal rotation, such as described in International Publication Number WO2016/073602. In some embodiments, at least a portion of the incubation performed in a centrifugal chamber includes mixing with a reagent or reagents to induce stimulation and/or activation. In some embodiments, cells, such as selected cells, are mixed with a stimulating condition or stimulatory agent in the centrifugal chamber. In some aspects of such processes, a volume of cells is mixed with an amount of one or more stimulating conditions or agents that is far less than is normally employed when performing similar stimulations in a cell culture plate or other system.

In some embodiments, the stimulating agent is added to cells in the cavity of the chamber in an amount that is substantially less than (e.g. is no more than 5%, 10%, 20%, 30%, 40%, 50%, 60%, 70% or 80% of the amount) as compared to the amount of the stimulating agent that is typically used or would be necessary to achieve about the same or similar efficiency of selection of the same number of cells or the same volume of cells when selection is performed without mixing in a centrifugal chamber, e.g. in a tube or bag with periodic shaking or rotation. In some embodiments, the incubation is performed with the addition of an incubation buffer to the cells and stimulating agent to achieve a target volume with incubation of the reagent of, for example, 10 mL to 200 mL, such as at least or at least about or about or 10 mL, 20 mL, 30 mL, 40 mL, 50 mL, 60 mL, 70 mL, 80 mL, 90 mL, 100 mL, 150 mL, or 200 mL. In some embodiments, the incubation buffer and stimulating agent are pre-mixed before addition to the cells. In some embodiments, the incubation buffer and stimulating agent are separately added to the cells. In some embodiments, the stimulating incubation is carried out with periodic gentle mixing condition, which can aid in promoting energetically favored interactions and thereby permit the use of less overall stimulating agent while achieving stimulating and activation of cells.

In some embodiments, the incubation generally is carried out under mixing conditions, such as in the presence of spinning, generally at relatively low force or speed, such as speed lower than that used to pellet the cells, such as from or from about 600 rpm to or to about 1700 rpm (e.g. at or about or at least 600 rpm, 1000 rpm, or 1500 rpm or 1700 rpm), such as at an RCF at the sample or wall of the chamber or other container of from or from about 80 g to 100 g (e.g. at or about or at least 80 g, 85 g, 90 g, 95 g, or 100 g). In some embodiments, the spin is carried out using repeated intervals of a spin at such low speed followed by a rest period, such as a spin and/or rest for 1, 2, 3, 4, 5, 6, 7, 8, 9, or 10 seconds, such as a spin at approximately 1 or 2 seconds followed by a rest for approximately 5, 6, 7, or 8 seconds.

In some embodiments, the total duration of the incubation, e.g. with the stimulating agent, is between or between about 1 hour and 96 hours, 1 hour and 72 hours, 1 hour and 48 hours, 4 hours and 36 hours, 8 hours and 30 hours or 12 hours and 24 hours, such as at least or at least about 6 hours, 12 hours, 18 hours, 24 hours, 36 hours or 72 hours. In some embodiments, the further incubation is for a time between or about between 1 hour and 48 hours, 4 hours and 36 hours, 8 hours and 30 hours or 12 hours and 24 hours, inclusive.

C. Genetic Engineering

In some embodiments, the processing steps include introduction of a nucleic acid molecule encoding a recombinant protein. Among such recombinant proteins are recombinant receptors, such as described herein. Introduction of the nucleic acid molecules encoding the recombinant protein, such as recombinant receptor, in the cell may be carried out using any of a number of known vectors. Such vectors include viral and non-viral systems, including lentiviral and gammaretroviral systems, as well as transposon-based systems such as PiggyBac or Sleeping Beauty-based gene transfer systems. Exemplary methods include those for transfer of nucleic acids encoding the receptors, including via viral, e.g., retroviral or lentiviral, transduction, transposons, and electroporation.

In some embodiments, gene transfer is accomplished by first stimulating the cell, such as by combining it with a stimulus that induces a response such as proliferation, survival, and/or activation, e.g., as measured by expression of a cytokine or activation marker, followed by transduction of the activated cells, and expansion in culture to numbers sufficient for clinical applications.

In some embodiments, recombinant nucleic acids are transferred into cells using recombinant infectious virus particles, such as, e.g., vectors derived from simian virus 40 (SV40), adenoviruses, adeno-associated virus (AAV), and human immunodeficiency virus (HIV). In some embodiments, recombinant nucleic acids are transferred into T cells using recombinant lentiviral vectors or retroviral vectors, such as gamma-retroviral vectors (see, e.g., Koste et al. (2014) Gene Therapy 2014 Apr. 3. doi: 10.1038/gt.2014.25; Carlens et al. (2000) Exp Hematol 28(10): 1137-46; Alonso-Camino et al. (2013) Mol Ther Nucl Acids 2, e93; Park et al., Trends Biotechnol. 2011 Nov. 29(11): 550-557.

In some embodiments, the retroviral vector has a long terminal repeat sequence (LTR), e.g., a retroviral vector derived from the Moloney murine leukemia virus (MoMLV), myeloproliferative sarcoma virus (MPSV), murine embryonic stem cell virus (MESV), murine stem cell virus (MSCV), spleen focus forming virus (SFFV), or human immunodeficiency virus (HIV). In some embodiments, the retroviruses include those derived from any avian or mammalian cell source. The retroviruses typically are amphotropic, meaning that they are capable of infecting host cells of several species, including humans. In one embodiment, the gene to be expressed replaces the retroviral gag, pol and/or env sequences. A number of illustrative retroviral systems have been described (e.g., U.S. Pat. Nos. 5,219,740; 6,207,453; 5,219,740; Miller and Rosman (1989) BioTechniques 7:980-990; Miller, A. D. (1990) Human Gene Therapy 1:5-14; Scarpa et al. (1991) Virology 180:849-852; Burns et al. (1993) Proc. Natl. Acad. Sci. USA 90:8033-8037; and Boris-Lawrie and Temin (1993) Cur. Opin. Genet. Develop. 3:102-109.

Methods of lentiviral transduction are known. Exemplary methods are described in, e.g., Wang et al. (2012) J. Immunother. 35(9): 689-701; Cooper et al. (2003) Blood. 101: 1637-1644; Verhoeyen et al. (2009) Methods Mol Biol. 506: 97-114; and Cavalieri et al. (2003) Blood. 102(2): 497-505.

In some embodiments, recombinant nucleic acids are transferred into T cells via electroporation (see, e.g., Chicaybam et al, (2013) PLoS ONE 8(3): e60298 and Van Tedeloo et al. (2000) Gene Therapy 7(16): 1431-1437). In some embodiments, recombinant nucleic acids are transferred into T cells via transposition (see, e.g., Manuri et al. (2010) Hum Gene Ther 21(4): 427-437; Sharma et al. (2013) Molec Ther Nucl Acids 2, e74; and Huang et al. (2009) Methods Mol Biol 506: 115-126). Other methods of introducing and expressing genetic material in immune cells include calcium phosphate transfection (e.g., as described in Current Protocols in Molecular Biology, John Wiley & Sons, New York. N.Y.), protoplast fusion, cationic liposome-mediated transfection; tungsten particle-facilitated microparticle bombardment (Johnston, Nature, 346: 776-777 (1990)); and strontium phosphate DNA co-precipitation (Brash et al., Mol. Cell Biol., 7: 2031-2034 (1987)).

Other approaches and vectors for transfer of the nucleic acids encoding the recombinant products are those described, e.g., in international patent application, Publication No.: WO2014055668, and U.S. Pat. No. 7,446,190.

In some embodiments, the cells, e.g., T cells, may be transfected either during or after expansion e.g. with a T cell receptor (TCR) or a chimeric antigen receptor (CAR). This transfection for the introduction of the gene of the desired receptor can be carried out with any suitable retroviral vector, for example. The genetically modified cell population can then be liberated from the initial stimulus (the CD3/CD28 stimulus, for example) and subsequently be stimulated with a second type of stimulus e.g. via a de novo introduced receptor). This second type of stimulus may include an antigenic stimulus in form of a peptide/MHC molecule, the cognate (cross-linking) ligand of the genetically introduced receptor (e.g. natural ligand of a CAR) or any ligand (such as an antibody) that directly binds within the framework of the new receptor (e.g. by recognizing constant regions within the receptor). See, for example, Cheadle et al, "Chimeric antigen receptors for T-cell based therapy" Methods Mol Biol. 2012; 907:645-66 or Barrett et al., Chimeric Antigen Receptor Therapy for Cancer Annual Review of Medicine Vol. 65: 333-347 (2014).

In some cases, a vector may be used that does not require that the cells, e.g., T cells, are activated. In some such instances, the cells may be selected and/or transduced prior to activation. Thus, the cells may be engineered prior to, or subsequent to culturing of the cells, and in some cases at the same time as or during at least a portion of the culturing.

In some aspects, the cells further are engineered to promote expression of cytokines or other factors. Among additional nucleic acids, e.g., genes for introduction are those to improve the efficacy of therapy, such as by promoting viability and/or function of transferred cells; genes to provide a genetic marker for selection and/or evaluation of the cells, such as to assess in vivo survival or localization; genes to improve safety, for example, by making the cell susceptible to negative selection in vivo as described by Lupton S. D. et al., Mol. and Cell Biol., 11:6 (1991); and Riddell et al., Human Gene Therapy 3:319-338 (1992); see also the publications of PCT/US91/08442 and PCT/US94/05601 by Lupton et al. describing the use of bifunctional selectable fusion genes derived from fusing a dominant positive selectable marker with a negative selectable marker. See, e.g., Riddell et al., U.S. Pat. No. 6,040,177, at columns 14-17.

In some embodiments, the introducing is carried out by contacting one or more cells of a composition with a nucleic acid molecule encoding the recombinant protein, e.g. recombinant receptor. In some embodiments, the contacting can be effected with centrifugation, such as spinoculation (e.g. centrifugal inoculation). Such methods include any of those as described in International Publication Number WO2016/073602. Exemplary centrifugal chambers include those produced and sold by Biosafe SA, including those for use with the Sepax® and Sepax® 2 system, including an A-200/F and A-200 centrifugal chambers and various kits for use with such systems. Exemplary chambers, systems, and processing instrumentation and cabinets are described, for example, in U.S. Pat. Nos. 6,123,655, 6,733,433 and Published U.S. Patent Application, Publication No.: US 2008/0171951, and published international patent application, publication no. WO 00/38762, the contents of each of which are incorporated herein by reference in their entirety. Exemplary kits for use with such systems include, but are not limited to, single-use kits sold by BioSafe SA under product names CS-430.1, CS-490.1, CS-600.1 or CS-900.2.

In some embodiments, the system is included with and/or placed into association with other instrumentation, including instrumentation to operate, automate, control and/or monitor aspects of the transduction step and one or more various other processing steps performed in the system, e.g. one or more processing steps that can be carried out with or in connection with the centrifugal chamber system as described herein or in International Publication Number WO2016/073602. This instrumentation in some embodiments is contained within a cabinet. In some embodiments, the instrumentation includes a cabinet, which includes a housing containing control circuitry, a centrifuge, a cover, motors, pumps, sensors, displays, and a user interface. An exemplary device is described in U.S. Pat. Nos. 6,123,655, 6,733,433 and US 2008/0171951.

In some embodiments, the system comprises a series of containers, e.g., bags, tubing, stopcocks, clamps, connectors, and a centrifuge chamber. In some embodiments, the containers, such as bags, include one or more containers, such as bags, containing the cells to be transduced and the viral vector particles, in the same container or separate containers, such as the same bag or separate bags. In some embodiments, the system further includes one or more containers, such as bags, containing medium, such as diluent and/or wash solution, which is pulled into the chamber and/or other components to dilute, resuspend, and/or wash components and/or compositions during the methods. The containers can be connected at one or more positions in the system, such as at a position corresponding to an input line, diluent line, wash line, waste line and/or output line.

In some embodiments, the chamber is associated with a centrifuge, which is capable of effecting rotation of the chamber, such as around its axis of rotation. Rotation may occur before, during, and/or after the incubation in connection with transduction of the cells and/or in one or more of the other processing steps. Thus, in some embodiments, one or more of the various processing steps is carried out under rotation, e.g., at a particular force. The chamber is typically capable of vertical or generally vertical rotation, such that the chamber sits vertically during centrifugation and the side wall and axis are vertical or generally vertical, with the end wall(s) horizontal or generally horizontal.

In some embodiments, the composition containing cells, vector, e.g., viral particles, and reagent can be rotated, generally at relatively low force or speed, such as speed lower than that used to pellet the cells, such as from or from about 600 rpm to 1700 rpm (e.g. at or about or at least 600 rpm, 1000 rpm, or 1500 rpm or 1700 rpm). In some embodiments, the rotation is carried at a force, e.g., a relative centrifugal force, of from or from about 100 g to 3200 g (e.g. at or about or at least at or about 100 g, 200 g, 300 g, 400 g, 500 g, 1000 g, 1500 g, 2000 g, 2500 g, 3000 g or 3200 g), as measured for example at an internal or external wall of the chamber or cavity. The term "relative centrifugal force" or RCF is generally understood to be the effective force imparted on an object or substance (such as a cell, sample, or pellet and/or a point in the chamber or other container being rotated), relative to the earth's gravitational force, at a particular point in space as compared to the axis of rotation. The value may be determined using well-known formulas, taking into account the gravitational force, rotation speed and the radius of rotation (distance from the axis of rotation and the object, substance, or particle at which RCF is being measured).

In some embodiments, during at least a part of the genetic engineering, e.g. transduction, and/or subsequent to the genetic engineering the cells are transferred to a container such as a bag, e.g., bioreactor bag assembly, for culture of the genetically engineered cells, such as for cultivation or expansion of the cells, as described above. In some embodiments, the container for cultivation or expansion of the cells is a bioreactor bag, such as a perfusion bag.

a. Preparation of Viral Vector Particles for Transduction

The viral vector genome is typically constructed in a plasmid form that can be transfected into a packaging or producer cell line. In any of such examples, the nucleic acid encoding a recombinant protein, such as a recombinant receptor, is inserted or located in a region of the viral vector, such as generally in a non-essential region of the viral genome. In some embodiments, the nucleic acid is inserted into the viral genome in the place of certain viral sequences to produce a virus that is replication defective.

In some embodiments, the viral vector particles contain a genome derived from a retroviral genome based vector, such as derived from a lentiviral genome based vector. In some aspects of the viral vectors, the heterologous nucleic acid encoding a recombinant receptor, such as an antigen receptor, such as a CAR, is contained and/or located between the 5' LTR and 3' LTR sequences of the vector genome.

In some embodiments, the viral vector genome is a lentivirus genome, such as an HIV-1 genome or an SIV genome. For example, lentiviral vectors have been generated by multiply attenuating virulence genes, for example, the genes env, vif, vpu and nef can be deleted, making the vector safer for therapeutic purposes. Lentiviral vectors are known. See Naldini et al., (1996 and 1998); Zufferey et al., (1997); Dull et al., 1998, U.S. Pat. Nos. 6,013,516; and 5,994,136). In some embodiments, these viral vectors are plasmid-based or virus-based, and are configured to carry the essential sequences for incorporating foreign nucleic acid, for selection, and for transfer of the nucleic acid into a host cell. Known lentiviruses can be readily obtained from depositories or collections such as the American Type Culture Collection ("ATCC"; 10801 University Blvd., Manassas, Va. 20110-2209), or isolated from known sources using commonly available techniques.

Non-limiting examples of lentiviral vectors include those derived from a lentivirus, such as Human Immunodeficiency Virus 1 (HIV-1), HIV-2, an Simian Immunodeficiency Virus (SIV), Human T-lymphotropic virus 1 (HTLV-1), HTLV-2 or equine infection anemia virus (E1AV). For example, lentiviral vectors have been generated by multiply attenuating the HIV virulence genes, for example, the genes env, vif, vpr, vpu and nef are deleted, making the vector safer for therapeutic purposes. Lentiviral vectors are known in the art, see Naldini et al., (1996 and 1998); Zufferey et al., (1997); Dull et al., 1998, U.S. Pat. Nos. 6,013,516; and 5,994,136). In some embodiments, these viral vectors are plasmid-based or virus-based, and are configured to carry the essential sequences for incorporating foreign nucleic acid, for selection, and for transfer of the nucleic acid into a host cell. Known lentiviruses can be readily obtained from depositories or collections such as the American Type Culture Collection ("ATCC"; 10801 University Blvd., Manassas, Va. 20110-2209), or isolated from known sources using commonly available techniques.

In some embodiments, the viral genome vector can contain sequences of the 5' and 3' LTRs of a retrovirus, such as a lentivirus. In some aspects, the viral genome construct may contain sequences from the 5' and 3' LTRs of a lentivirus, and in particular can contain the R and U5 sequences from the 5' LTR of a lentivirus and an inactivated or self-inactivating 3' LTR from a lentivirus. The LTR sequences can be LTR sequences from any lentivirus from any species. For example, they may be LTR sequences from HIV, SIV, FIV or BIV. Typically, the LTR sequences are HIV LTR sequences.

In some embodiments, the nucleic acid of a viral vector, such as an HIV viral vector, lacks additional transcriptional units. The vector genome can contain an inactivated or self-inactivating 3' LTR (Zufferey et al. *J Virol* 72: 9873, 1998; Miyoshi et al., *J Virol* 72:8150, 1998). For example, deletion in the U3 region of the 3' LTR of the nucleic acid used to produce the viral vector RNA can be used to generate self-inactivating (SIN) vectors. This deletion can then be transferred to the 5' LTR of the proviral DNA during reverse transcription. A self-inactivating vector generally has a deletion of the enhancer and promoter sequences from the 3' long terminal repeat (LTR), which is copied over into the 5' LTR during vector integration. In some embodiments enough sequence can be eliminated, including the removal of a TATA box, to abolish the transcriptional activity of the LTR. This can prevent production of full-length vector RNA in transduced cells. In some aspects, the U3 element of the 3' LTR contains a deletion of its enhancer sequence, the TATA box, Sp1, and NF-kappa B sites. As a result of the self-inactivating 3' LTR, the provirus that is generated following entry and reverse transcription contains an inactivated 5' LTR. This can improve safety by reducing the risk of mobilization of the vector genome and the influence of the LTR on nearby cellular promoters. The self-inactivating 3' LTR can be constructed by any method known in the art. In some embodiments, this does not affect vector titers or the in vitro or in vivo properties of the vector.

Optionally, the U3 sequence from the lentiviral 5' LTR can be replaced with a promoter sequence in the viral construct, such as a heterologous promoter sequence. This can increase the titer of virus recovered from the packaging cell line. An enhancer sequence can also be included. Any enhancer/promoter combination that increases expression of the viral RNA genome in the packaging cell line may be used. In one example, the CMV enhancer/promoter sequence is used (U.S. Pat. Nos. 5,385,839 and 5,168,062).

In certain embodiments, the risk of insertional mutagenesis can be minimized by constructing the retroviral vector genome, such as lentiviral vector genome, to be integration defective. A variety of approaches can be pursued to produce a non-integrating vector genome. In some embodiments, a mutation(s) can be engineered into the integrase enzyme component of the pol gene, such that it encodes a protein with an inactive integrase. In some embodiments, the vector genome itself can be modified to prevent integration by, for example, mutating or deleting one or both attachment sites, or making the 3' LTR-proximal polypurine tract (PPT) non-functional through deletion or modification. In some embodiments, non-genetic approaches are available; these include pharmacological agents that inhibit one or more functions of integrase. The approaches are not mutually exclusive; that is, more than one of them can be used at a time. For example, both the integrase and attachment sites can be non-functional, or the integrase and PPT site can be non-functional, or the attachment sites and PPT site can be non-functional, or all of them can be non-functional. Such methods and viral vector genomes are known and available (see Philpott and Thrasher, *Human Gene Therapy* 18:483, 2007; Engelman et al. J Virol 69:2729, 1995; Brown et al *J Virol* 73:9011 (1999); WO 2009/076524; McWilliams et al., *J Virol* 77:11150, 2003; Powell and Levin *J Virol* 70:5288, 1996).

In some embodiments, the vector contains sequences for propagation in a host cell, such as a prokaryotic host cell. In some embodiments, the nucleic acid of the viral vector contains one or more origins of replication for propagation in a prokaryotic cell, such as a bacterial cell. In some embodiments, vectors that include a prokaryotic origin of replication also may contain a gene whose expression confers a detectable or selectable marker such as drug resistance.

Any of a variety of known methods can be used to produce retroviral particles whose genome contains an RNA copy of the viral vector genome. In some embodiments, at least two components are involved in making a virus-based gene delivery system: first, packaging plasmids, encompassing the structural proteins as well as the enzymes necessary to generate a viral vector particle, and second, the viral vector itself, i.e., the genetic material to be transferred. Biosafety safeguards can be introduced in the design of one or both of these components.

In some embodiments, the packaging plasmid can contain all retroviral, such as HIV-1, proteins other than envelope proteins (Naldini et al., 1998). In other embodiments, viral vectors can lack additional viral genes, such as those that are associated with virulence, e.g. vpr, vif, vpu and nef, and/or Tat, a primary transactivator of HIV. In some embodiments, lentiviral vectors, such as HIV-based lentiviral vectors, comprise only three genes of the parental virus: gag, pol and rev, which reduces or eliminates the possibility of reconstitution of a wild-type virus through recombination.

In some embodiments, the viral vector genome is introduced into a packaging cell line that contains all the components necessary to package viral genomic RNA, transcribed from the viral vector genome, into viral particles. Alternatively, the viral vector genome may comprise one or more genes encoding viral components in addition to the one or more sequences, e.g., recombinant nucleic acids, of interest. In some aspects, in order to prevent replication of the genome in the target cell, however, endogenous viral genes required for replication are removed and provided separately in the packaging cell line.

In some embodiments, a packaging cell line is transfected with one or more plasmid vectors containing the components necessary to generate the particles. In some embodiments, a packaging cell line is transfected with a plasmid containing the viral vector genome, including the LTRs, the cis-acting packaging sequence and the sequence of interest, i.e. a nucleic acid encoding an antigen receptor, such as a CAR; and one or more helper plasmids encoding the virus enzymatic and/or structural components, such as Gag, pol and/or rev. In some embodiments, multiple vectors are utilized to separate the various genetic components that generate the retroviral vector particles. In some such embodiments, providing separate vectors to the packaging cell reduces the chance of recombination events that might otherwise generate replication competent viruses. In some embodiments, a single plasmid vector having all of the retroviral components can be used.

In some embodiments, the retroviral vector particle, such as lentiviral vector particle, is pseudotyped to increase the transduction efficiency of host cells. For example, a retroviral vector particle, such as a lentiviral vector particle, in some embodiments is pseudotyped with a VSV-G glycoprotein, which provides a broad cell host range extending the cell types that can be transduced. In some embodiments, a packaging cell line is transfected with a plasmid or polynucleotide encoding a non-native envelope glycoprotein, such as to include xenotropic, polytropic or amphotropic envelopes, such as Sindbis virus envelope, GALV or VSV-G.

In some embodiments, the packaging cell line provides the components, including viral regulatory and structural proteins, that are required in trans for the packaging of the viral genomic RNA into lentiviral vector particles. In some embodiments, the packaging cell line may be any cell line that is capable of expressing lentiviral proteins and producing functional lentiviral vector particles. In some aspects, suitable packaging cell lines include 293 (ATCC CCL X), 293T, HeLa (ATCC CCL 2), D17 (ATCC CCL 183), MDCK (ATCC CCL 34), BHK (ATCC CCL-10) and Cf2Th (ATCC CRL 1430) cells.

In some embodiments, the packaging cell line stably expresses the viral protein(s). For example, in some aspects, a packaging cell line containing the gag, pol, rev and/or other structural genes but without the LTR and packaging components can be constructed. In some embodiments, a packaging cell line can be transiently transfected with nucleic acid molecules encoding one or more viral proteins along with the viral vector genome containing a nucleic acid molecule encoding a heterologous protein, and/or a nucleic acid encoding an envelope glycoprotein.

In some embodiments, the viral vectors and the packaging and/or helper plasmids are introduced via transfection or infection into the packaging cell line. The packaging cell line produces viral vector particles that contain the viral vector genome. Methods for transfection or infection are well known. Non-limiting examples include calcium phosphate, DEAE-dextran and lipofection methods, electroporation and microinjection.

When a recombinant plasmid and the retroviral LTR and packaging sequences are introduced into a special cell line (e.g., by calcium phosphate precipitation for example), the packaging sequences may permit the RNA transcript of the recombinant plasmid to be packaged into viral particles, which then may be secreted into the culture media. The media containing the recombinant retroviruses in some embodiments is then collected, optionally concentrated, and used for gene transfer. For example, in some aspects, after cotransfection of the packaging plasmids and the transfer vector to the packaging cell line, the viral vector particles are recovered from the culture media and titered by standard methods used by those of skill in the art.

In some embodiments, a retroviral vector, such as a lentiviral vector, can be produced in a packaging cell line, such as an exemplary HEK 293T cell line, by introduction of plasmids to allow generation of lentiviral particles. In some embodiments, a packaging cell is transfected and/or contains a polynucleotide encoding gag and pol, and a polynucleotide encoding a recombinant receptor, such as an antigen receptor, for example, a CAR. In some embodiments, the packaging cell line is optionally and/or additionally transfected with and/or contains a polynucleotide encoding a rev protein. In some embodiments, the packaging cell line is optionally and/or additionally transfected with and/or contains a polynucleotide encoding a non-native envelope glycoprotein, such as VSV-G. In some such embodiments, approximately two days after transfection of cells, e.g. HEK 293T cells, the cell supernatant contains recombinant lentiviral vectors, which can be recovered and titered.

Recovered and/or produced retroviral vector particles can be used to transduce target cells using the methods as described. Once in the target cells, the viral RNA is reverse-transcribed, imported into the nucleus and stably integrated into the host genome. One or two days after the integration of the viral RNA, the expression of the recombinant protein, e.g. antigen receptor, such as CAR, can be detected.

In some embodiments, the methods involve transducing cells by contacting, e.g., incubating, a cell composition comprising a plurality of cells with a viral particle. In some embodiments, the cells to be transfected or transduced are or comprise primary cells obtained from a subject, such as cells enriched and/or selected from a subject.

In some embodiments, the concentration of cells to be transduced of the composition is from or from about $1.0 \times 10^5$ cells/mL to $1.0 \times 10^8$ cells/mL, such as at least or at least about or about $1.0 \times 10^5$ cells/mL, $5 \times 10^5$ cells/mL, $1 \times 10^6$ cells/mL, $5 \times 10^6$ cells/mL, $1 \times 10^7$ cells/mL, $5 \times 10^7$ cells/mL or $1 \times 10^8$ cells/mL.

In some embodiments, the viral particles are provided at a certain ratio of copies of the viral vector particles or infectious units (IU) thereof, per total number of cells to be transduced (IU/cell). For example, in some embodiments, the viral particles are present during the contacting at or about or at least at or about 0.5, 1, 2, 3, 4, 5, 10, 15, 20, 30, 40, 50, or 60 IU of the viral vector particles per one of the cells.

In some embodiments, the titer of viral vector particles is between or between about $1 \times 10^6$ IU/mL and $1 \times 10^8$ IU/mL, such as between or between about $5 \times 10^6$ IU/mL and $5 \times 10^7$ IU/mL, such as at least $6 \times 10^6$ IU/mL, $7 \times 10^6$ IU/mL, $8 \times 10^6$ IU/mL, $9 \times 10^6$ IU/mL, $1 \times 10^7$ IU/mL, $2 \times 10^7$ IU/mL, $3 \times 10^7$ IU/mL, $4 \times 10^7$ IU/mL, or $5 \times 10^7$ IU/mL.

In some embodiments, transduction can be achieved at a multiplicity of infection (MOI) of less than 100, such as generally less than 60, 50, 40, 30, 20, 10, 5 or less.

In some embodiments, the method involves contacting or incubating, the cells with the viral particles. In some embodiments, the contacting is for 30 minutes to 72 hours, such as 30 minute to 48 hours, 30 minutes to 24 hours or 1 hour to 24 hours, such as at least or at least about 30 minutes, 1 hour, 2 hours, 6 hours, 12 hours, 24 hours, 36 hours or more.

In some embodiments, contacting is performed in solution. In some embodiments, the cells and viral particles are contacted in a volume of from or from about 0.5 mL to 500 mL, such as from or from about 0.5 mL to 200 mL, 0.5 mL to 100 mL, 0.5 mL to 50 mL, 0.5 mL to 10 mL, 0.5 mL to 5 mL, 5 mL to 500 mL, 5 mL to 200 mL, 5 mL to 100 mL, 5 mL to 50 mL, 5 mL to 10 mL, 10 mL to 500 mL, 10 mL to 200 mL, 10 mL to 100 mL, 10 mL to 50 mL, 50 mL to 500 mL, 50 mL to 200 mL, 50 mL to 100 mL, 100 mL to 500 mL, 100 mL to 200 mL or 200 mL to 500 mL.

In certain embodiments, the input cells are treated, incubated, or contacted with particles that comprise binding molecules that bind to or recognize the recombinant receptor that is encoded by the viral DNA.

In some embodiments, the incubation of the cells with the viral vector particles results in or produces an output composition comprising cells transduced with the viral vector particles.

D. Cultivating and/or Expansion of Cells

In some embodiments, the provided methods include one or more steps for cultivating engineered cells, e.g., cultivating cells under conditions that promote proliferation and/or expansion. In some embodiments, engineered cells are cultivated under conditions that promote proliferation and/or expansion subsequent to a step of genetically engineering, e.g., introducing a recombinant polypeptide to the cells by transduction or transfection. In particular embodiments, the cells are cultivated after the cells have been incubated under stimulating conditions and transduced or transfected with a recombinant polynucleotide, e.g., a polynucleotide encoding a recombinant receptor. In some embodiments, the cultivation produces one or more cultivated compositions of enriched T cells.

In some embodiments, the engineered cells are cultured in a container that can be filled, e.g. via the feed port, with cell media and/or cells for culturing of the added cells. The cells can be from any cell source for which culture of the cells is desired, for example, for expansion and/or proliferation of the cells.

In some aspects, the culture media is an adapted culture medium that supports that growth, cultivation, expansion or proliferation of the cells, such as T cells. In some aspects, the medium can be a liquid containing a mixture of salts, amino acids, vitamins, sugars or any combination thereof. In some embodiments, the culture media further contains one or more stimulating conditions or agents, such as to stimulate the cultivation, expansion or proliferation of cells during the incubation. In some embodiments, the stimulating condition is or includes one or more cytokine selected from IL-2, IL-7 or IL-15. In some embodiments, the cytokine is a recombinant cytokine. In some embodiments, the concentration of the one or more cytokine in the culture media during the culturing or incubation, independently, is from or from about 1 IU/mL to 1500 IU/mL, such as from or from about 1 IU/mL to 100 IU/mL, 2 IU/mL to 50 IU/mL, 5 IU/mL to 10 IU/mL, 10 IU/mL to 500 IU/mL, 50 IU/mL to 250 IU/mL or 100 IU/mL to 200 IU/mL, 50 IU/mL to 1500 IU/mL, 100 IU/mL to 1000 IU/mL or 200 IU/mL to 600 IU/mL. In some embodiments, the concentration of the one or more cytokine, independently, is at least or at least about 1 IU/mL, 5 IU/mL, 10 IU/mL, 50 IU/mL, 100 IU/mL, 200 IU/mL, 500 IU/mL, 1000 IU/mL or 1500 IU/mL.

In some aspects, the cells are incubated for at least a portion of time after transfer of the engineered cells and culture media. In some embodiments, the stimulating conditions generally include a temperature suitable for the growth of primary immune cells, such as human T lymphocytes, for example, at least about 25 degrees Celsius, generally at least about 30 degrees, and generally at or about 37 degrees Celsius. In some embodiments, the cells are incubated at a temperature of 25 to 38 degrees Celsius, such as 30 to 37 degrees Celsius, for example at or about 37 degrees Celsius±2 degrees Celsius. In some embodiments, the incubation is carried out for a time period until the culture, e.g. cultivation or expansion, results in a desired or threshold density, number or dose of cells. In some embodiments, the incubation is greater than or greater than about or is for about or 24 hours, 48 hours, 72 hours, 96 hours, 5 days, 6 days, 7 days, 8 days, 9 days or more.

In some embodiments, the cells are incubated under conditions to maintain a target amount of carbon dioxide in the cell culture. In some aspects, this ensures optimal cultivation, expansion and proliferation of the cells during the growth. In some aspects, the amount of carbon dioxide ($CO_2$) is between 10% and 0% (v/v) of said gas, such as between 8% and 2% (v/v) of said gas, for example an amount of or about 5% (v/v) $CO_2$.

In particular embodiments, the cultivation is performed in a closed system. In certain embodiments, the cultivation is performed in a closed system under sterile conditions. In particular embodiments, the cultivation is performed in the same closed system as one or more steps of the systems. In some embodiments the composition of enriched T cells is removed from a closed system and placed in and/or connected to a bioreactor for the cultivation. Examples of suitable bioreactors for the cultivation include, but are not limited to, GE Xuri W25, GE Xuri W5, Sartorius BioSTAT RM 20|50, Finesse SmartRocker Bioreactor Systems, and Pall XRS Bioreactor Systems. In some embodiments, the bioreactor is used to perfuse and/or mix the cells during at least a portion of the cultivation step. In some embodiments, the mixing is or includes rocking and/or motioning.

In some embodiments, cells are incubated using containers, e.g., bags, which are used in connection with a bioreactor. In some cases, the bioreactor can be subject to motioning or rocking, which, in some aspects, can increase oxygen transfer. Motioning the bioreactor may include, but is not limited to rotating along a horizontal axis, rotating along a vertical axis, a rocking motion along a tilted or inclined horizontal axis of the bioreactor or any combination thereof. In some embodiments, at least a portion of the incubation is carried out with rocking. The rocking speed and rocking angle may be adjusted to achieve a desired agitation. In some embodiments the rock angle is or is about 20°, 19°, 18°, 17°, 16°, 15°, 14°, 13°, 12°, 11°, 10°, 9°, 8°, 7° 6°, 5°, 4°, 3°, 2° or 1°. In certain embodiments, the rock angle is between 6-16°. In other embodiments, the rock angle is between 7-16°. In other embodiments, the rock angle is between 8-12°. In some embodiments, the rock rate is 1, 2, 3, 4, 5, 6, 7, 8, 9, 10, 11, 1 12, 13, 14 15, 16, 17, 18, 19, 20, 21, 22, 23, 24, 25, 26, 27, 28, 29, 30, 31, 32, 33, 34, 35, 36, 37, 38, 39, 40 rpm. In some embodiments, the rock rate is between 4 and 12 rpm, such as between 4 and 6 rpm, inclusive. At least a portion of the cell culture expansion is performed with a rocking motion, such as at an angle of between 5° and 10°, such as 6°, at a constant rocking speed, such as a speed of between 5 and 15 RPM, such as 6 RMP or 10 RPM. In some embodiments, the bioreactor maintains the temperature at or near 37° C. and $CO_2$ levels at or near 5% with a steady air flow at, at about, or at least 0.01 L/min, 0.05 L/min, 0.1 L/min, 0.2 L/min, 0.3 L/min, 0.4 L/min, 0.5 L/min, 1.0 L/min, 1.5 L/min, or 2.0 L/min or greater than 2.0 L/min. In certain embodiments, at least a portion of the cultivation is performed with perfusion, such as with a rate of 290 ml/day, 580 ml/day, and/or 1160 ml/day, e.g., depending on the timing in relation to the start of the cultivation and/or density of the cultivated cells. In some embodiments, the CD4+ and CD8+ cells are each separately expanded until they each reach a threshold amount or cell density.

In some embodiments, at least a portion of the incubation is carried out under static conditions. In some embodiments, at least a portion of the incubation is carried out with perfusion, such as to perfuse out spent media and perfuse in fresh media during the culture. In some embodiments, the method includes a step of perfusing fresh culture medium into the cell culture, such as through a feed port. In some embodiments, the culture media added during perfusion contains the one or more stimulating agents, e.g. one or more recombinant cytokine, such as IL-2, IL-7 and/or IL-15. In some embodiments, the culture media added during perfusion is the same culture media used during a static incubation.

In some embodiments, subsequent to the incubation, the container, e.g., bag, is re-connected to a system for carrying out the one or more other processing steps of for manufacturing, generating or producing the cell therapy, such as is re-connected to the system containing the centrifugal chamber. In some aspects, cultured cells are transferred from the bag to the internal cavity of the chamber for formulation of the cultured cells.

In some embodiments, the methods for manufacturing, generating or producing a cell therapy and/or engineered cells may include formulation of cells, such as formulation of genetically engineered cells resulting from the processing steps prior to or after the incubating, engineering, and cultivating, and/or one or more other processing steps as described. In some embodiments, one or more of the processing steps, including formulation of cells, can be carried out in a closed system. In some cases, the cells are processed in one or more steps (e.g. carried out in the centrifugal chamber and/or closed system) for manufacturing, generating or producing a cell therapy and/or engineered cells may include formulation of cells, such as formulation of genetically engineered cells resulting from the transduction processing steps prior to or after the culturing, e.g. cultivation and expansion, and/or one or more other processing steps as described.

E. Compositions and Formulations

In some embodiments, the dose of cells comprising cells engineered with a recombinant antigen receptor, e.g. CAR or TCR, is provided as a composition or formulation, such as a pharmaceutical composition or formulation. Such compositions can be used in accord with adoptive cell therapy methods, including methods for the prevention or treatment of diseases, conditions, and disorders, or in detection, diagnostic, and prognostic methods.

In some cases, one or more steps (e.g. carried out in the centrifugal chamber and/or closed system) for manufacturing, generating or producing a cell therapy and/or engineered cells may include formulation of cells, such as formulation of genetically engineered cells resulting from the provided transduction processing steps prior to or after the culturing, e.g. cultivation and expansion, and/or one or more other processing steps as described. In some cases, the cells can be formulated in an amount for dosage administration, such as for a single unit dosage administration or multiple dosage administration. In some embodiments, the provided methods associated with formulation of cells include processing transduced cells, such as cells transduced and/or expanded using the processing steps described above, in a closed system. In some embodiments, the formulated cells can be transferred or introduced into the biomedical material vessels, e.g., vials.

In some embodiments, T cells, such as CD4$^+$ and/or CD8$^+$ T cells, generated by one or more of the processing steps are formulated. In some aspects, a plurality of compositions are separately manufactured, produced or generated, each containing a different population and/or sub-types of cells from the subject, such as for administration separately or independently, optionally within a certain period of time. For example, separate formulations of engineered cells containing different populations or sub-types of cells can include CD8$^+$ and CD4$^+$ T cells, respectively, and/or CD8$^+$- and CD4$^+$-enriched populations, respectively, e.g., CD4$^+$ and/or CD8$^+$ T cells each individually including cells genetically engineered to express the recombinant receptor. In some embodiments, at least one composition is formulated with CD4$^+$ T cells genetically engineered to express the recombinant receptor. In some embodiments, at least one composition is formulated with CD8$^+$ T cells genetically engineered to express the recombinant receptor. In some embodiments, the administration of the dose comprises administration of a first composition comprising a dose of CD8$^+$ T cells or a dose of CD4$^+$ T cells and administration of a second composition comprising the other of the dose of CD4$^+$ T cells and the CD8$^+$ T cells. In some embodiments, a first composition comprising a dose of CD8$^+$ T cells or a dose of CD4$^+$ T cells is administered prior to the second composition comprising the other of the dose of CD4$^+$ T cells and the CD8$^+$ T cells. In some embodiments, the administration of the dose comprises administration of a composition comprising both of a dose of CD8$^+$ T cells and a dose of CD4$^+$ T cells.

In some embodiments, the cells are formulated in a pharmaceutically acceptable buffer, which may, in some aspects, include a pharmaceutically acceptable carrier or excipient. In some embodiments, the processing includes exchange of a medium into a medium or formulation buffer that is pharmaceutically acceptable or desired for administration to a subject. In some embodiments, the processing steps can involve washing the transduced and/or expanded cells to replace the cells in a pharmaceutically acceptable buffer that can include one or more optional pharmaceutically acceptable carriers or excipients. Exemplary of such pharmaceutical forms, including pharmaceutically acceptable carriers or excipients, can be any described below in conjunction with forms acceptable for administering the cells and compositions to a subject. The pharmaceutical composition in some embodiments contains the cells in amounts effective to treat or prevent the disease or condition, such as a therapeutically effective or prophylactically effective amount.

A "pharmaceutically acceptable carrier" refers to an ingredient in a pharmaceutical formulation, other than an active ingredient, which is nontoxic to a subject. A pharmaceutically acceptable carrier includes, but is not limited to, a buffer, excipient, stabilizer, or preservative.

In some aspects, the choice of carrier is determined in part by the particular cell and/or by the method of administration. Accordingly, there are a variety of suitable formulations. For example, the pharmaceutical composition can contain preservatives. Suitable preservatives may include, for example, methylparaben, propylparaben, sodium benzoate, and benzalkonium chloride. In some aspects, a mixture of two or more preservatives is used. The preservative or mixtures thereof are typically present in an amount of about 0.0001% to about 2% by weight of the total composition. Carriers are described, e.g., by Remington's Pharmaceutical Sciences 16th edition, Osol, A. Ed. (1980). Pharmaceutically acceptable carriers are generally nontoxic to recipients at the dosages and concentrations employed, and include, but are not limited to: buffers such as phosphate, citrate, and other organic acids; antioxidants including ascorbic acid and methionine; preservatives (such as octadecyldimethylbenzyl ammonium chloride; hexamethonium chloride; benzalkonium chloride; benzethonium chloride; phenol, butyl or benzyl alcohol; alkyl parabens such as methyl or propyl paraben; catechol; resorcinol; cyclohexanol; 3-pentanol; and m-cresol); low molecular weight (less than about 10 residues) polypeptides; proteins, such as serum albumin, gelatin, or immunoglobulins; hydrophilic polymers such as polyvinylpyrrolidone; amino acids such as glycine, glutamine, asparagine, histidine, arginine, or lysine; monosaccharides, disaccharides, and other carbohydrates including glucose, mannose, or dextrins; chelating agents such as EDTA; sugars such as sucrose, mannitol, trehalose or sorbitol; salt-forming counter-ions such as sodium; metal complexes (e.g. Zn-protein complexes); and/or non-ionic surfactants such as polyethylene glycol (PEG).

Buffering agents in some aspects are included in the compositions. Suitable buffering agents include, for example, citric acid, sodium citrate, phosphoric acid, potassium phosphate, and various other acids and salts. In some aspects, a mixture of two or more buffering agents is used. The buffering agent or mixtures thereof are typically present in an amount of about 0.001% to about 4% by weight of the total composition. Methods for preparing administrable pharmaceutical compositions are known. Exemplary methods are described in more detail in, for example, Remington: The Science and Practice of Pharmacy, Lippincott Williams & Wilkins; 21st ed. (May 1, 2005).

The formulations can include aqueous solutions. The formulation or composition may also contain more than one active ingredient useful for the particular indication, disease, or condition being treated with the cells, preferably those with activities complementary to the cells, where the respective activities do not adversely affect one another. Such active ingredients are suitably present in combination in amounts that are effective for the purpose intended. Thus, in some embodiments, the pharmaceutical composition further includes other pharmaceutically active agents or drugs, such as chemotherapeutic agents, e.g., asparaginase, busulfan, carboplatin, cisplatin, daunorubicin, doxorubicin, fluorouracil, gemcitabine, hydroxyurea, methotrexate, paclitaxel, rituximab, vinblastine, and/or vincristine.

Compositions in some embodiments are provided as sterile liquid preparations, e.g., isotonic aqueous solutions, suspensions, emulsions, dispersions, or viscous compositions, which may in some aspects be buffered to a selected pH. Liquid compositions can comprise carriers, which can be a solvent or dispersing medium containing, for example, water, saline, phosphate buffered saline, polyol (for example, glycerol, propylene glycol, liquid polyethylene glycol) and suitable mixtures thereof. Sterile injectable solutions can be prepared by incorporating the cells in a solvent, such as in admixture with a suitable carrier, diluent, or excipient such as sterile water, physiological saline, glucose, dextrose, or the like. The compositions can contain auxiliary substances such as wetting, dispersing, or emulsifying agents (e.g., methylcellulose), pH buffering agents, gelling or viscosity enhancing additives, preservatives, flavoring agents, and/or colors, depending upon the route of administration and the preparation desired. Standard texts may in some aspects be consulted to prepare suitable preparations.

Various additives which enhance the stability and sterility of the compositions, including antimicrobial preservatives, antioxidants, chelating agents, and buffers, can be added. Prevention of the action of microorganisms can be ensured by various antibacterial and antifungal agents, for example, parabens, chlorobutanol, phenol, and sorbic acid. Prolonged absorption of the injectable pharmaceutical form can be brought about by the use of agents delaying absorption, for example, aluminum monostearate and gelatin.

In some embodiments, the formulation buffer contains a cryopreservative. In some embodiments, the cell are formulated with a cryopreservative solution that contains 1.0% to 30% DMSO solution, such as a 5% to 20% DMSO solution or a 5% to 10% DMSO solution. In some embodiments, the cryopreservation solution is or contains, for example, PBS containing 20% DMSO and 8% human serum albumin (HSA), or other suitable cell freezing media. In some embodiments, the cryopreservative solution is or contains, for example, at least or about 7.5% DMSO. In some embodiments, the processing steps can involve washing the transduced and/or expanded cells to replace the cells in a cryopreservative solution.

In some embodiments, the formulation is carried out using one or more processing step including washing, diluting or concentrating the cells, such as the cultured or expanded cells. In some embodiments, the processing can include dilution or concentration of the cells to a desired concentration or number, such as unit dose form compositions including the number of cells for administration in a given dose or fraction thereof. In some embodiments, the processing steps can include a volume-reduction to thereby increase the concentration of cells as desired. In some embodiments, the processing steps can include a volume-addition to thereby decrease the concentration of cells as desired. In some embodiments, the processing includes adding a volume of a formulation buffer to transduced and/or expanded cells. In some embodiments, the volume of formulation buffer is from or from about 10 mL to 1000 mL, such as at least or at least about or about or 50 mL, 100 mL, 200 mL, 300 mL, 400 mL, 500 mL, 600 mL, 700 mL, 800 mL, 900 mL or 1000 mL.

In some embodiments, the cells are cultured, such as stimulated engineered and/or cultivated in a container, e.g., bag or a centrifugal chamber. In some aspects, the container is a first container and the cultured cells are expressed or transferred from the first container, e.g. bag or centrifugal chamber, to a second container, such as biomedical material vessels, that is operably linked to the first container. In some embodiments, the biomedical material vessels are configured for integration and or operable connection and/or is integrated or operably connected, to the first container, e.g. bag or centrifugal chamber, used for one or more of the previous processing steps. In some embodiments, the biomedical material vessel is connected to the first container, e.g. bag or centrifugal chamber, at an output line or output position. In some cases, the first container, e.g. bag or centrifugal chamber, is connected to the vial of the biomedical material vessel at the inlet tube.

In some embodiments, such processing steps for formulating a cell composition is carried out in a closed system. Exemplary of such processing steps can be performed using a centrifugal chamber in conjunction with one or more systems or kits associated with a cell processing system, such as a centrifugal chamber produced and sold by Biosafe SA, including those for use with the Sepax® or Sepax 2® cell processing systems. An exemplary system and process is described in International Publication Number WO2016/073602. In some embodiments, the method includes effecting expression or transfer from the internal cavity of the centrifugal chamber a formulated composition, which is the resulting composition of cells formulated in a formulation buffer, such as pharmaceutically acceptable buffer, in any of the above embodiments as described. In some embodiments, the expression or transfer of the formulated composition is to a container, such as the biomedical material vessels described herein, that is operably linked as part of a closed system with the centrifugal chamber. In some embodiments, the biomedical material vessels are configured for integration and or operable connection and/or is integrated or operably connected, to a closed system or device that carries out one or more processing steps. In some embodiments, the biomedical material vessel is connected to a system at an output line or output position. In some cases, the closed system is connected to the vial of the biomedical material vessel at the inlet tube. Exemplary closed systems for use with the biomedical material vessels described herein include the Sepax® and Sepax® 2 system.

In some embodiments, the composition can be transferred from the first container, such as a centrifugal chamber or cell processing system, to the biomedical material vessels via a multi-port output kit containing a multi-way tubing manifold associated at each end of a tubing line with a port to which one or a plurality of containers, e.g. biomedical material vessels, can be connected for expression of the formulated composition. In some aspects, a desired number or plurality of such vials, can be sterilely connected to one or more, generally two or more, such as at least 3, 4, 5, 6, 7, 8 or more of the ports of the multi-port output. For example, in some embodiments, one or more containers, e.g., biomedical material vessels, can be attached to the ports, or to fewer than all of the ports. Thus, in some embodiments, the system can effect expression of the output composition into a plurality of vials of the biomedical material vessels.

In some aspects, cells can be expressed or transferred to the one or more of the plurality of output containers, e.g., vials of the biomedical material vessels, in an amount for dosage administration, such as for a single unit dosage administration or multiple dosage administration. For example, in some embodiments, the vials of the biomedical material vessels, may each contain the number of cells for administration in a given dose or fraction thereof. Thus, each vial, in some aspects, may contain a single unit dose for administration or may contain a fraction of a desired dose such that more than one of the plurality of vials, such as two of the vials, or 3 of the vials, together constitute a dose for administration.

Thus, the vials described herein, generally contain the cells to be administered, e.g., one or more unit doses thereof. The unit dose may be an amount or number of the cells to be administered to the subject or twice the number (or more) of the cells to be administered. It may be the lowest dose or lowest possible dose of the cells that would be administered to the subject.

In some embodiments, each of the vials individually comprises a unit dose of the cells. Thus in some embodiments, each of the containers comprises the same or approximately or substantially the same number of cells. In some embodiments, each unit dose contains at least or at least at or about $1\times10^6$, $2\times10^6$, $5\times10^6$, $1\times10^7$, $5\times10^7$, $1\times10^8$, $1.5\times10^8$, $2.5\times10^8$, $3\times10^8$, $4.5\times10^8$, $5\times10^8$, $9\times10^8$, or $1.2\times10^9$ engineered cells, total cells, T cells, or PBMCs. In some embodiments, the volume of the formulated cell composition in each container, e.g. bag or vial, is at or about 10 mL to at or about 100 mL, such as at or about or at least or at least about 20 mL, 30 mL, 40 mL, 50 mL, 60 mL, 70 mL, 80 mL, 90 mL or 100 mL. In some embodiments, the cells in the container, e.g. bag or vials can be cryopreserved. In some embodiments, the vials can be stored in liquid nitrogen until further use.

In some embodiments, such cells produced by the method, or a composition comprising such cells, are administered to a subject for treating a disease or condition.

III. RECOMBINANT PROTEIN

In some embodiments, the cells that are treated, processed, engineered, and/or produced by the methods provided herein, e.g., the methods described in Section I, contain or express, or are engineered to contain or express, a recombinant protein, such as a recombinant receptor, e.g., a chimeric antigen receptor (CAR), or a T cell receptor (TCR). In certain embodiments, the methods provided herein produce and/or are capable of producing cells, or populations or compositions containing and/or enriched for cells, that are engineered to express or contain a recombinant protein. In some embodiments, T cells, or populations or compositions of T cells, are treated, processed, engineered, and/or produced.

In some embodiments, the cells include one or more nucleic acids introduced via genetic engineering, and thereby express recombinant or genetically engineered products of such nucleic acids. In some embodiments, gene transfer is accomplished by first stimulating the cells, such as by combining it with a stimulus that induces a response such as proliferation, survival, and/or activation, e.g., as measured by expression of a cytokine or activation marker, followed by transduction of the activated cells, and expansion in culture to numbers sufficient for clinical applications.

Among the receptors are antigen receptors and receptors containing one or more component thereof. The recombinant receptors may include chimeric receptors, such as those containing ligand-binding domains or binding fragments thereof and intracellular signaling domains or regions, functional non-TCR antigen receptors, chimeric antigen receptors (CARs), and T cell receptors (TCRs), such as recombinant or transgenic TCRs, chimeric autoantibody receptor (CAAR) and components of any of the foregoing. The recombinant receptor, such as a CAR, generally includes the extracellular antigen (or ligand) binding domain linked to one or more intracellular signaling components, in some aspects via linkers and/or transmembrane domain(s).

1. Chimeric Antigen Receptors (CARs)

In some embodiments, engineered cells, such as T cells, are described that express a CAR with specificity for a particular antigen (or marker or ligand), such as an antigen expressed on the surface of a particular cell type. In some embodiments, the antigen is a polypeptide. In some embodiments, it is a carbohydrate or other molecule. In some embodiments, the antigen is selectively expressed or overexpressed on cells of the disease or condition, e.g., the tumor or pathogenic cells, as compared to normal or non-targeted cells or tissues. In other embodiments, the antigen is expressed on normal cells and/or is expressed on the engineered cells.

In particular embodiments, the recombinant receptor, such as chimeric receptor, contains an intracellular signaling region, which includes a cytoplasmic signaling domain or region (also interchangeably called an intracellular signaling domain or region), such as a cytoplasmic (intracellular) region capable of inducing a primary activation signal in a T cell, for example, a cytoplasmic signaling domain or region of a T cell receptor (TCR) component (e.g. a cytoplasmic signaling domain or region of a zeta chain of a CD3-zeta (CD3ζ) chain or a functional variant or signaling portion thereof) and/or that comprises an immunoreceptor tyrosine-based activation motif (ITAM).

In some embodiments, the chimeric receptor further contains an extracellular ligand-binding domain that specifically binds to a ligand (e.g. antigen) antigen. In some embodiments, the chimeric receptor is a CAR that contains an extracellular antigen-recognition domain that specifically binds to an antigen. In some embodiments, the ligand, such as an antigen, is a protein expressed on the surface of cells. In some embodiments, the CAR is a TCR-like CAR and the antigen is a processed peptide antigen, such as a peptide antigen of an intracellular protein, which, like a TCR, is recognized on the cell surface in the context of a major histocompatibility complex (MHC) molecule.

Exemplary antigen receptors, including CARs, and methods for engineering and introducing such receptors into cells, include those described, for example, in international patent application publication numbers WO200014257, WO2013126726, WO2012/129514, WO2014031687, WO2013/166321, WO2013/071154, WO2013/123061, U.S. patent application publication numbers US2002131960, US2013287748, US20130149337, U.S. Pat. Nos. 6,451,995, 7,446,190, 8,252,592, 8,339,645, 8,398,282, 7,446,179, 6,410,319, 7,070,995, 7,265,209, 7,354,762, 7,446,191, 8,324,353, and 8,479,118, and European patent application number EP2537416, and/or those described by Sadelain et al., Cancer Discov. 2013 April; 3(4): 388-398; Davila et al. (2013) PLoS ONE 8(4): e61338; Turtle et al., Curr. Opin. Immunol., 2012 October; 24(5): 633-39; Wu et al., Cancer, 2012 Mar. 18(2): 160-75. In some aspects, the antigen receptors include a CAR as described in U.S. Pat. No. 7,446,190, and those described in International Patent Application Publication No.: WO/2014055668 A1. Examples of the CARs include CARs as disclosed in any of the aforementioned publications, such as WO2014031687, U.S. Pat. Nos. 8,339,645, 7,446,179, US 2013/0149337, U.S. Pat. Nos. 7,446,190, 8,389,282, Kochenderfer et al., 2013, Nature Reviews Clinical Oncology, 10, 267-276 (2013); Wang et al. (2012) J. Immunother. 35(9): 689-701; and Brentjens et al., Sci Transl Med. 2013 5(177). See also WO2014031687, U.S. Pat. Nos. 8,339,645, 7,446,179, US 2013/0149337, U.S. Pat. Nos. 7,446,190, and 8,389,282.

In some embodiments, the CAR is constructed with a specificity for a particular antigen (or marker or ligand), such as an antigen expressed in a particular cell type to be targeted by adoptive therapy, e.g., a cancer marker, and/or an antigen intended to induce a dampening response, such as an antigen expressed on a normal or non-diseased cell type. Thus, the CAR typically includes in its extracellular portion one or more antigen binding molecules, such as one or more antigen-binding fragment, domain, or portion, or one or more antibody variable domains, and/or antibody molecules. In some embodiments, the CAR includes an antigen-binding portion or portions of an antibody molecule, such as a single-chain antibody fragment (scFv) derived from the variable heavy ($V_H$) and variable light ($V_L$) chains of a monoclonal antibody (mAb).

The term "antibody" herein is used in the broadest sense and includes polyclonal and monoclonal antibodies, including intact antibodies and functional (antigen-binding) antibody fragments, including fragment antigen binding (Fab) fragments, F(ab')$_2$ fragments, Fab' fragments, Fv fragments, recombinant IgG (rIgG) fragments, heavy chain variable (V$_H$) regions capable of specifically binding the antigen, single chain antibody fragments, including single chain variable fragments (scFv), and single domain antibodies (e.g., sdAb, sdFv, nanobody) fragments. The term encompasses genetically engineered and/or otherwise modified forms of immunoglobulins, such as intrabodies, peptibodies, chimeric antibodies, fully human antibodies, humanized antibodies, and heteroconjugate antibodies, multispecific, e.g., bispecific or trispecific, antibodies, diabodies, triabodies, and tetrabodies, tandem di-scFv, tandem tri-scFv. Unless otherwise stated, the term "antibody" should be understood to encompass functional antibody fragments thereof also referred to herein as "antigen-binding fragments." The term also encompasses intact or full-length antibodies, including antibodies of any class or sub-class, including IgG and sub-classes thereof, IgM, IgE, IgA, and IgD.

In some embodiments, the antigen-binding proteins, antibodies and antigen binding fragments thereof specifically recognize an antigen of a full-length antibody. In some embodiments, the heavy and light chains of an antibody can be full-length or can be an antigen-binding portion (a Fab, F(ab')2, Fv or a single chain Fv fragment (scFv)). In other embodiments, the antibody heavy chain constant region is chosen from, e.g., IgG1, IgG2, IgG3, IgG4, IgM, IgA1, IgA2, IgD, and IgE, particularly chosen from, e.g., IgG1, IgG2, IgG3, and IgG4, more particularly, IgG1 (e.g., human IgG1). In another embodiment, the antibody light chain constant region is chosen from, e.g., kappa or lambda, particularly kappa.

Among the antibodies are antibody fragments. An "antibody fragment" refers to a molecule other than an intact antibody that comprises a portion of an intact antibody that binds the antigen to which the intact antibody binds. Examples of antibody fragments include but are not limited to Fv, Fab, Fab', Fab'-SH, F(ab')$_2$; diabodies; linear antibodies; variable heavy chain (V$_H$) regions, single-chain antibody molecules such as scFvs and single-domain V$_H$ single antibodies; and multispecific antibodies formed from antibody fragments. In particular embodiments, the antibodies are single-chain antibody fragments comprising a variable heavy chain region and/or a variable light chain region, such as scFvs.

The terms "complementarity determining region," and "CDR," synonymous with "hypervariable region" or "HVR," are known, in some cases, to refer to non-contiguous sequences of amino acids within antibody variable regions, which confer antigen specificity and/or binding affinity. In general, there are three CDRs in each heavy chain variable region (CDR-H1, CDR-H2, CDR-H3) and three CDRs in each light chain variable region (CDR-L1, CDR-L2, CDR-L3). "Framework regions" and "FR" are known, in some cases, to refer to the non-CDR portions of the variable regions of the heavy and light chains. In general, there are four FRs in each full-length heavy chain variable region (FR-H1, FR-H2, FR-H3, and FR-H4), and four FRs in each full-length light chain variable region (FR-L1, FR-L2, FR-L3, and FR-L4).

The precise amino acid sequence boundaries of a given CDR or FR can be readily determined using any of a number of well-known schemes, including those described by Kabat et al. (1991), "Sequences of Proteins of Immunological Interest," 5th Ed. Public Health Service, National Institutes of Health, Bethesda, MD ("Kabat" numbering scheme); Al-Lazikani et al., (1997) JMB 273,927-948 ("Chothia" numbering scheme); MacCallum et al., J. Mol. Biol. 262: 732-745 (1996), "Antibody-antigen interactions: Contact analysis and binding site topography," J. Mol. Biol. 262, 732-745." ("Contact" numbering scheme); Lefranc M P et al., "IMGT unique numbering for immunoglobulin and T cell receptor variable domains and Ig superfamily V-like domains," Dev Comp Immunol, 2003 January; 27(1):55-77 ("IMGT" numbering scheme); Honegger A and Plückthun A, "Yet another numbering scheme for immunoglobulin variable domains: an automatic modeling and analysis tool," J Mol Biol, 2001 Jun. 8; 309(3):657-70, ("Aho" numbering scheme); and Martin et al., "Modeling antibody hypervariable loops: a combined algorithm," PNAS, 1989, 86(23): 9268-9272, ("AbM" numbering scheme).

The boundaries of a given CDR or FR may vary depending on the scheme used for identification. For example, the Kabat scheme is based on structural alignments, while the Chothia scheme is based on structural information. Numbering for both the Kabat and Chothia schemes is based upon the most common antibody region sequence lengths, with insertions accommodated by insertion letters, for example, "30a," and deletions appearing in some antibodies. The two schemes place certain insertions and deletions ("indels") at different positions, resulting in differential numbering. The Contact scheme is based on analysis of complex crystal structures and is similar in many respects to the Chothia numbering scheme. The AbM scheme is a compromise between Kabat and Chothia definitions based on that used by Oxford Molecular's AbM antibody modeling software.

Table 1, below, lists exemplary position boundaries of CDR-L1, CDR-L2, CDR-L3 and CDR-H1, CDR-H2, CDR-H3 as identified by Kabat, Chothia, AbM, and Contact schemes, respectively. For CDR-H1, residue numbering is listed using both the Kabat and Chothia numbering schemes. FRs are located between CDRs, for example, with FR-L1 located before CDR-L1, FR-L2 located between CDR-L1 and CDR-L2, FR-L3 located between CDR-L2 and CDR-L3 and so forth. It is noted that because the shown Kabat numbering scheme places insertions at H35A and H35B, the end of the Chothia CDR-H1 loop when numbered using the shown Kabat numbering convention varies between H32 and H34, depending on the length of the loop.

TABLE 1

Boundaries of CDRs according to various numbering schemes.

| CDR | Kabat | Chothia | AbM | Contact |
|---|---|---|---|---|
| CDR-L1 | L24--L34 | L24--L34 | L24--L34 | L30--L36 |
| CDR-L2 | L50--L56 | L50--L56 | L50--L56 | L46--L55 |
| CDR-L3 | L89--L97 | L89--L97 | L89--L97 | L89--L96 |
| CDR-H1 (Kabat Numbering[1]) | H31--H35B | H26--H32 . . . 34 | H26--H35B | H30--H35B |

TABLE 1-continued

Boundaries of CDRs according to various numbering schemes.

| CDR | Kabat | Chothia | AbM | Contact |
|---|---|---|---|---|
| CDR-H1 (Chothia Numbering[2]) | H31--H35 | H26--H32 | H26--H35 | H30--H35 |
| CDR-H2 | H50--H65 | H52--H56 | H50--H58 | H47--H58 |
| CDR-H3 | H95--H102 | H95--H102 | H95--H102 | H93--H101 |

[1]Kabat et al. (1991), "Sequences of Proteins of Immunological Interest," 5th Ed. Public Health Service, National Institutes of Health, Bethesda, MD
[2]Al-Lazikani et al., (1997) JMB 273,927-948

Thus, unless otherwise specified, a "CDR" or "complementary determining region," or individual specified CDRs (e.g., CDR-H1, CDR-H2, CDR-H3), of a given antibody or region thereof, such as a variable region thereof, should be understood to encompass a (or the specific) complementary determining region as defined by any of the aforementioned schemes, or other known schemes. For example, where it is stated that a particular CDR (e.g., a CDR-H3) contains the amino acid sequence of a corresponding CDR in a given $V_H$ or $V_L$ region amino acid sequence, it is understood that such a CDR has a sequence of the corresponding CDR (e.g., CDR-H3) within the variable region, as defined by any of the aforementioned schemes, or other known schemes. In some embodiments, specific CDR sequences are specified. Exemplary CDR sequences of antibodies are described using various numbering schemes, although it is understood that an antibody can include CDRs as described according to any of the other aforementioned numbering schemes or other numbering schemes known to a skilled artisan.

Likewise, unless otherwise specified, a FR or individual specified FR(s) (e.g., FR-H1, FR-H2, FR-H3, FR-H4), of a given antibody or region thereof, such as a variable region thereof, should be understood to encompass a (or the specific) framework region as defined by any of the known schemes. In some instances, the scheme for identification of a particular CDR, FR, or FRs or CDRs is specified, such as the CDR as defined by the Kabat, Chothia, AbM or Contact method, or other known schemes. In other cases, the particular amino acid sequence of a CDR or FR is given.

The term "variable region" or "variable domain" refers to the domain of an antibody heavy or light chain that is involved in binding the antibody to antigen. The variable regions of the heavy chain and light chain ($V_H$ and $V_L$, respectively) of a native antibody generally have similar structures, with each domain comprising four conserved framework regions (FRs) and three CDRs. (See, e.g., Kindt et al. Kuby Immunology, 6th ed., W.H. Freeman and Co., page 91 (2007). A single $V_H$ or $V_L$ domain may be sufficient to confer antigen-binding specificity. Furthermore, antibodies that bind a particular antigen may be isolated using a $V_H$ or $V_L$ domain from an antibody that binds the antigen to screen a library of complementary $V_L$ or $V_H$ domains, respectively. See, e.g., Portolano et al., J. Immunol. 150: 880-887 (1993); Clarkson et al., Nature 352:624-628 (1991).

Among the antibodies included in the CARs are antibody fragments. An "antibody fragment" or "antigen-binding fragment" refers to a molecule other than an intact antibody that comprises a portion of an intact antibody that binds the antigen to which the intact antibody binds. Examples of antibody fragments include but are not limited to Fv, Fab, Fab', Fab'-SH, F(ab')$_2$; diabodies; linear antibodies; heavy chain variable ($V_H$) regions, single-chain antibody molecules such as scFvs and single-domain antibodies comprising only the $V_H$ region; and multispecific antibodies formed from antibody fragments. In some embodiments, the antigen-binding domain in the CARs is or comprises an antibody fragment comprising a variable heavy chain ($V_H$) and a variable light chain ($V_L$) region. In particular embodiments, the antibodies are single-chain antibody fragments comprising a heavy chain variable ($V_H$) region and/or a light chain variable ($V_L$) region, such as scFvs.

Single-domain antibodies are antibody fragments comprising all or a portion of the heavy chain variable domain or all or a portion of the light chain variable domain of an antibody. In certain embodiments, a single-domain antibody is a human single-domain antibody. In some embodiments, the CAR comprises an antibody heavy chain domain that specifically binds the antigen, such as a cancer marker or cell surface antigen of a cell or disease to be targeted, such as a tumor cell or a cancer cell, such as any of the target antigens described herein or known.

Antibody fragments can be made by various techniques, including but not limited to proteolytic digestion of an intact antibody as well as production by recombinant host cells. In some embodiments, the antibodies are recombinantly-produced fragments, such as fragments comprising arrangements that do not occur naturally, such as those with two or more antibody regions or chains joined by synthetic linkers, e.g., peptide linkers, and/or that are may not be produced by enzyme digestion of a naturally-occurring intact antibody. In some embodiments, the antibody fragments are scFvs.

A "humanized" antibody is an antibody in which all or substantially all CDR amino acid residues are derived from non-human CDRs and all or substantially all FR amino acid residues are derived from human FRs. A humanized antibody optionally may include at least a portion of an antibody constant region derived from a human antibody. A "humanized form" of a non-human antibody, refers to a variant of the non-human antibody that has undergone humanization, typically to reduce immunogenicity to humans, while retaining the specificity and affinity of the parental non-human antibody. In some embodiments, some FR residues in a humanized antibody are substituted with corresponding residues from a non-human antibody (e.g., the antibody from which the CDR residues are derived), e.g., to restore or improve antibody specificity or affinity.

In some embodiments, the antibody or antigen-binding portion thereof is expressed on cells as part of a recombinant receptor, such as an antigen receptor. Among the antigen receptors are functional non-TCR antigen receptors, such as chimeric antigen receptors (CARs). Generally, a CAR containing an antibody or antigen-binding fragment that exhibits TCR-like specificity directed against peptide-MHC complexes also may be referred to as a TCR-like CAR. In some embodiments, the extracellular antigen binding domain specific for an MHC-peptide complex of a TCR-like CAR is linked to one or more intracellular signaling components, in some aspects via linkers and/or transmembrane domain(s).

In some embodiments, such molecules can typically mimic or approximate a signal through a natural antigen receptor, such as a TCR, and, optionally, a signal through such a receptor in combination with a costimulatory receptor.

In some embodiments, the recombinant receptor, such as a chimeric receptor (e.g. CAR), includes a ligand-binding domain that binds, such as specifically binds, to an antigen (or a ligand). Among the antigens targeted by the chimeric receptors are those expressed in the context of a disease, condition, or cell type to be targeted via the adoptive cell therapy. Among the diseases and conditions are proliferative, neoplastic, and malignant diseases and disorders, including cancers and tumors, including hematologic cancers, cancers of the immune system, such as lymphomas, leukemias, and/or myelomas, such as B, T, and myeloid leukemias, lymphomas, and multiple myelomas.

In some embodiments, the antigen (or a ligand) is a polypeptide. In some embodiments, it is a carbohydrate or other molecule. In some embodiments, the antigen (or a ligand) is selectively expressed or overexpressed on cells of the disease or condition, e.g., the tumor or pathogenic cells, as compared to normal or non-targeted cells or tissues. In other embodiments, the antigen is expressed on normal cells and/or is expressed on the engineered cells.

In some embodiments, the CAR contains an antibody or an antigen-binding fragment (e.g. scFv) that specifically recognizes an antigen, such as an intact antigen, expressed on the surface of a cell.

In some embodiments, the antigen (or a ligand) is a tumor antigen or cancer marker. In some embodiments, the antigen (or a ligand) the antigen is or includes αvβ6 integrin (avb6 integrin), B cell maturation antigen (BCMA), B7-H3, B7-H6, carbonic anhydrase 9 (CA9, also known as CAIX or G250), a cancer-testis antigen, cancer/testis antigen 1B (CTAG, also known as NY-ESO-1 and LAGE-2), carcinoembryonic antigen (CEA), a cyclin, cyclin A2, C—C Motif Chemokine Ligand 1 (CCL-1), CD19, CD20, CD22, CD23, CD24, CD30, CD33, CD38, CD44, CD44v6, CD44v7/8, CD123, CD133, CD138, CD171, chondroitin sulfate proteoglycan 4 (CSPG4), epidermal growth factor protein (EGFR), type III epidermal growth factor receptor mutation (EGFR vIII), epithelial glycoprotein 2 (EPG-2), epithelial glycoprotein 40 (EPG-40), ephrinB2, ephrin receptor A2 (EPHa2), estrogen receptor, Fc receptor like 5 (FCRL5; also known as Fc receptor homolog 5 or FCRH5), fetal acetylcholine receptor (fetal AchR), a folate binding protein (FBP), folate receptor alpha, ganglioside GD2, O-acetylated GD2 (OGD2), ganglioside GD3, glycoprotein 100 (gp100), glypican-3 (GPC3), G protein-coupled receptor class C group 5 member D (GPRC5D), Her2/neu (receptor tyrosine kinase erb-B2), Her3 (erb-B3), Her4 (erb-B4), erbB dimers, Human high molecular weight-melanoma-associated antigen (HMW-MAA), hepatitis B surface antigen, Human leukocyte antigen A1 (HLA-A1), Human leukocyte antigen A2 (HLA-A2), IL-22 receptor alpha (IL-22Rα), IL-13 receptor alpha 2 (IL-13Rα2), kinase insert domain receptor (kdr), kappa light chain, L1 cell adhesion molecule (L1-CAM), CE7 epitope of L1-CAM, Leucine Rich Repeat Containing 8 Family Member A (LRRC8A), Lewis Y, Melanoma-associated antigen (MAGE)-A1, MAGE-A3, MAGE-A6, MAGE-A10, mesothelin (MSLN), c-Met, murine cytomegalovirus (CMV), mucin 1 (MUC1), MUC16, natural killer group 2 member D (NKG2D) ligands, melan A (MART-1), neural cell adhesion molecule (NCAM), oncofetal antigen, Preferentially expressed antigen of melanoma (PRAME), progesterone receptor, a prostate specific antigen, prostate stem cell antigen (PSCA), prostate specific membrane antigen (PSMA), Receptor Tyrosine Kinase Like Orphan Receptor 1 (ROR1), survivin, Trophoblast glycoprotein (TPBG also known as 5T4), tumor-associated glycoprotein 72 (TAG72), Tyrosinase related protein 1 (TRP1, also known as TYRP1 or gp75), Tyrosinase related protein 2 (TRP2, also known as dopachrome tautomerase, dopachrome delta-isomerase or DCT), vascular endothelial growth factor receptor (VEGFR), vascular endothelial growth factor receptor 2 (VEGFR2), Wilms Tumor 1 (WT-1), a pathogen-specific or pathogen-expressed antigen, or an antigen associated with a universal tag, and/or biotinylated molecules, and/or molecules expressed by HIV, HCV, HBV or other pathogens. Antigens targeted by the receptors in some embodiments include antigens associated with a B cell malignancy, such as any of a number of known B cell marker. In some embodiments, the antigen is or includes CD20, CD19, CD22, ROR1, CD45, CD21, CD5, CD33, Igkappa, Iglambda, CD79a, CD79b or CD30.

In some embodiments, the CAR is an anti-BCMA CAR that is specific for BCMA, e.g. human BCMA. Chimeric antigen receptors containing anti-BCMA antibodies, including mouse anti-human BCMA antibodies and human anti-human antibodies, and cells expressing such chimeric receptors have been previously described. See Carpenter et al., Clin Cancer Res., 2013, 19(8):2048-2060, WO 2016/090320, WO2016/090327, WO2010104949A2 and WO2017173256. In some embodiments, the anti-BCMA CAR contains an antigen-binding domain, such as an scFv, containing a variable heavy ($V_H$) and/or a variable light ($V_L$) region derived from an antibody described in WO 2016/090320 or WO2016090327. In some embodiments, the antigen-binding domain, such as an scFv, contains a $V_H$ set forth in SEQ ID NO: 30 and a $V_L$ set forth in SEQ ID NO:31. In some embodiments, the antigen-binding domain, such as an scFv, contains a $V_H$ set forth in SEQ ID NO: 32 and a $V_L$ set forth in SEQ ID NO:33. In some embodiments, the antigen-binding domain, such as an scFv, contains a $V_H$ set forth in SEQ ID NO: 34 and a $V_L$ set forth in SEQ ID NO: 35. In some embodiments, the antigen-binding domain, such as an scFv, contains a $V_H$ set forth in SEQ ID NO: 27 and a $V_L$ set forth in SEQ ID NO:28. In some embodiment the antigen-binding domain, such as an scFv, contains a $V_H$ set forth in SEQ ID NO: 41 and a $V_L$ set forth in SEQ ID NO: 42. In some embodiments, the antigen-binding domain, such as an scFv, contains a $V_H$ set forth in SEQ ID NO: 43 and a $V_L$ set forth in SEQ ID NO: 44.

In some embodiments, the antigen-binding domain, such as an scFv, contains a $V_H$ set forth in SEQ ID NO: 45 and a $V_L$ set forth in SEQ ID NO: 46. In some embodiments, the $V_H$ or $V_L$ has a sequence of amino acids that exhibits at least 85%, 86%, 87%, 88%, 89%, 90%, 91%, 92%, 93%, 94%, 95%, 96%, 97%, 98%, 99% or more sequence identity to any of the foregoing $V_H$ or $V_L$ sequences, and retains binding to BCMA. In some embodiments, the $V_H$ region is amino-terminal to the $V_L$ region. In some embodiments, the $V_H$ region is carboxy-terminal to the $V_L$ region.

In some embodiments, the CAR is an anti-CD19 CAR that is specific for CD19, e.g. human CD19. In some embodiments, the antigen is CD19. In some embodiments, the scFv contains a $V_H$ and a $V_L$ derived from an antibody or an antibody fragment specific to CD19. In some embodiments, the antibody or antibody fragment that binds CD19 is a mouse derived antibody such as FMC63 and SJ25C1. In some embodiments, the antibody or antibody fragment is a human antibody, e.g., as described in U.S. Patent Publication No. US 2016/0152723.

In some embodiments the scFv and/or $V_H$ domains is derived from FMC63. FMC63 generally refers to a mouse monoclonal IgG1 antibody raised against Nalm-1 and -16 cells expressing CD19 of human origin (Ling, N. R., et al. (1987). *Leucocyte typing III*. 302). In some embodiments, the FMC63 antibody comprises CDR-H1 and CDR-H2 set forth in SEQ ID NOS: 50, 51 respectively, and CDR-H3 set forth in SEQ ID NO: 52 or 66 and CDR-L1 set forth in SEQ ID NOS: 47 and CDR-L2 set forth in SEQ ID NO: 48 or 67 and CDR-L3 s set forth in SEQ ID NO: 49 or 68. In some embodiments, the FMC63 antibody comprises the heavy chain variable region ($V_H$) comprising the amino acid sequence of SEQ ID NO: 53 and the light chain variable region ($V_L$) comprising the amino acid sequence of SEQ ID NO: 54.

In some embodiments, the scFv comprises a variable light chain containing the CDR-L1 sequence of SEQ ID NO:47, a CDR-L2 sequence of SEQ ID NO:48, and a CDR-L3 sequence of SEQ ID NO:49 and/or a variable heavy chain containing a CDR-H1 sequence of SEQ ID NO:50, a CDR-H2 sequence of SEQ ID NO:51, and a CDR-H3 sequence of SEQ ID NO:52. In some embodiments, the scFv comprises a variable heavy chain region set forth in SEQ ID NO:53 and a variable light chain region set forth in SEQ ID NO:54. In some embodiments, the variable heavy and variable light chains are connected by a linker. In some embodiments, the linker is set forth in SEQ ID NO:70. In some embodiments, the scFv comprises, in order, a $V_H$, a linker, and a $V_L$. In some embodiments, the scFv comprises, in order, a $V_L$, a linker, and a $V_H$. In some embodiments, the scFv is encoded by a sequence of nucleotides set forth in SEQ ID NO:69 or a sequence that exhibits at least 85%, 86%, 87%, 88%, 89%, 90%, 91%, 92%, 93%, 94%, 95%, 96%, 97%, 98%, or 99% sequence identity to SEQ ID NO:69. In some embodiments, the scFv comprises the sequence of amino acids set forth in SEQ ID NO:55 or a sequence that exhibits at least 85%, 86%, 87%, 88%, 89%, 90%, 91%, 92%, 93%, 94%, 95%, 96%, 97%, 98%, or 99% sequence identity to SEQ ID NO:55.

In some embodiments the scFv is derived from SJ25C1. SJ25C1 is a mouse monoclonal IgG1 antibody raised against Nalm-1 and -16 cells expressing CD19 of human origin (Ling, N. R., et al. (1987). *Leucocyte typing III*. 302). In some embodiments, the SJ25C1 antibody comprises CDR-H1, CDR-H2 and CDR-H3 set forth in SEQ ID NOS: 59-61, respectively, and CDR-L1, CDR-L2 and CDR-L3 sequences set forth in SEQ ID NOS: 56-58, respectively. In some embodiments, the SJ25C1 antibody comprises the heavy chain variable region ($V_H$) comprising the amino acid sequence of SEQ ID NO: 62 and the light chain variable region ($V_L$) comprising the amino acid sequence of SEQ ID NO: 63.

In some embodiments, the scFv comprises a variable light chain containing the CDR-L1 sequence of SEQ ID NO:56, a CDR-L2 sequence of SEQ ID NO: 57, and a CDR-L3 sequence of SEQ ID NO:58 and/or a variable heavy chain containing a CDR-H1 sequence of SEQ ID NO:59, a CDR-H2 sequence of SEQ ID NO:60, and a CDR-H3 sequence of SEQ ID NO:61. In some embodiments, the scFv comprises a variable heavy chain region set forth in SEQ ID NO:62 and a variable light chain region set forth in SEQ ID NO:63. In some embodiments, the variable heavy and variable light chain are connected by a linker. In some embodiments, the linker is set forth in SEQ ID NO:64. In some embodiments, the scFv comprises, in order, a $V_H$, a linker, and a $V_L$. In some embodiments, the scFv comprises, in order, a $V_L$, a linker, and a $V_H$. In some embodiments, the scFv comprises the sequence of amino acids set forth in SEQ ID NO:65 or a sequence that exhibits at least 85%, 86%, 87%, 88%, 89%, 90%, 91%, 92%, 93%, 94%, 95%, 96%, 97%, 98%, or 99% sequence identity to SEQ ID NO:65.

In some embodiments, the antigen is CD20. In some embodiments, the scFv contains a $V_H$ and a $V_L$ derived from an antibody or an antibody fragment specific to CD20. In some embodiments, the antibody or antibody fragment that binds CD20 is an antibody that is or is derived from Rituximab, such as is Rituximab scFv.

In some embodiments, the antigen is CD22. In some embodiments, the scFv contains a $V_H$ and a $V_L$ derived from an antibody or an antibody fragment specific to CD22. In some embodiments, the antibody or antibody fragment that binds CD22 is an antibody that is or is derived from m971, such as is m971 scFv.

In some embodiments, the antigen or antigen binding domain is GPRC5D. In some embodiments, the scFv contains a $V_H$ and a $V_L$ derived from an antibody or an antibody fragment specific to GPRC5D. In some embodiments, the antibody or antibody fragment that binds GPRC5D is or contains a $V_H$ and a $V_L$ from an antibody or antibody fragment set forth in International Patent Applications, Publication Number WO 2016/090329 and WO 2016/090312.

In some embodiments, the antibody is an antigen-binding fragment, such as a scFv, that includes one or more linkers joining two antibody domains or regions, such as a heavy chain variable ($V_H$) region and a light chain variable ($V_L$) region. The linker typically is a peptide linker, e.g., a flexible and/or soluble peptide linker. Among the linkers are those rich in glycine and serine and/or in some cases threonine. In some embodiments, the linkers further include charged residues such as lysine and/or glutamate, which can improve solubility. In some embodiments, the linkers further include one or more proline. In some aspects, the linkers rich in glycine and serine (and/or threonine) include at least 80%, 85%, 90%, 91%, 92%, 93%, 94%, 95%, 96%, 97%, 98%, or 99% such amino acid(s). In some embodiments, they include at least at or about 50%, 55%, 60%, 70%, or 75%, glycine, serine, and/or threonine. In some embodiments, the linker is comprised substantially entirely of glycine, serine, and/or threonine. The linkers generally are between about 5 and about 50 amino acids in length, typically between at or about 10 and at or about 30, e.g., 10, 11, 12, 13, 14, 15, 16, 17, 18, 19, 20, 21, 22, 23, 24, 25, 26, 27, 28, 29, or 30, and in some examples between 10 and 25 amino acids in length. Exemplary linkers include linkers having various numbers of repeats of the sequence GGGGS (4GS; SEQ ID NO:36) or GGGS (3GS; SEQ ID NO:37), such as between 2, 3, 4, and 5 repeats of such a sequence. Exemplary linkers include those having or consisting of an sequence set forth in SEQ ID NO:38 (GGGGSGGGGSGGGGS), SEQ ID NO:39 (GSTSGSGKPGSGEGSTKG) or SEQ ID NO: 40 (SRGGGGSGGGGSGGGGSLEMA).

In some embodiments, the antigen is or includes a pathogen-specific or pathogen-expressed antigen. In some embodiments, the antigen is a viral antigen (such as a viral antigen from HIV, HCV, HBV, etc.), bacterial antigens, and/or parasitic antigens. In some embodiments, the CAR contains a TCR-like antibody, such as an antibody or an antigen-binding fragment (e.g. scFv) that specifically recognizes an intracellular antigen, such as a tumor-associated antigen, presented on the cell surface as a MHC-peptide complex. In some embodiments, an antibody or antigen-binding portion thereof that recognizes an MHC-peptide complex can be expressed on cells as part of a recombinant receptor, such as an antigen receptor. Among the antigen receptors are functional non-TCR antigen receptors, such as chimeric antigen receptors (CARs). Generally, a CAR containing an antibody or antigen-binding fragment that exhibits TCR-like specificity directed against peptide-MHC complexes also may be referred to as a TCR-like CAR.

Reference to "Major histocompatibility complex" (MHC) refers to a protein, generally a glycoprotein, that contains a polymorphic peptide binding site or binding groove that can, in some cases, complex with peptide antigens of polypeptides, including peptide antigens processed by the cell machinery. In some cases, MHC molecules can be displayed or expressed on the cell surface, including as a complex with peptide, i.e. MHC-peptide complex, for presentation of an antigen in a conformation recognizable by an antigen receptor on T cells, such as a TCRs or TCR-like antibody. Generally, MHC class I molecules are heterodimers having a membrane spanning α chain, in some cases with three a domains, and a non-covalently associated β2 microglobulin. Generally, MHC class II molecules are composed of two transmembrane glycoproteins, α and β, both of which typically span the membrane. An MHC molecule can include an effective portion of an MHC that contains an antigen binding site or sites for binding a peptide and the sequences necessary for recognition by the appropriate antigen receptor. In some embodiments, MHC class I molecules deliver peptides originating in the cytosol to the cell surface, where a MHC-peptide complex is recognized by T cells, such as generally CD8+ T cells, but in some cases CD4+ T cells. In some embodiments, MHC class II molecules deliver peptides originating in the vesicular system to the cell surface, where they are typically recognized by CD4+ T cells. Generally, MHC molecules are encoded by a group of linked loci, which are collectively termed H-2 in the mouse and human leukocyte antigen (HLA) in humans. Hence, typically human MHC can also be referred to as human leukocyte antigen (HLA).

The term "MHC-peptide complex" or "peptide-MHC complex" or variations thereof, refers to a complex or association of a peptide antigen and an MHC molecule, such as, generally, by non-covalent interactions of the peptide in the binding groove or cleft of the MHC molecule. In some embodiments, the MHC-peptide complex is present or displayed on the surface of cells. In some embodiments, the MHC-peptide complex can be specifically recognized by an antigen receptor, such as a TCR, TCR-like CAR or antigen-binding portions thereof.

In some embodiments, a peptide, such as a peptide antigen or epitope, of a polypeptide can associate with an MHC molecule, such as for recognition by an antigen receptor. Generally, the peptide is derived from or based on a fragment of a longer biological molecule, such as a polypeptide or protein. In some embodiments, the peptide typically is about 8 to about 24 amino acids in length. In some embodiments, a peptide has a length of from or from about 9 to 22 amino acids for recognition in the MHC Class II complex. In some embodiments, a peptide has a length of from or from about 8 to 13 amino acids for recognition in the MHC Class I complex. In some embodiments, upon recognition of the peptide in the context of an MHC molecule, such as MHC-peptide complex, the antigen receptor, such as TCR or TCR-like CAR, produces or triggers an activation signal to the T cell that induces a T cell response, such as T cell proliferation, cytokine production, a cytotoxic T cell response or other response.

In some embodiments, a TCR-like antibody or antigen-binding portion, are known or can be produced by known methods (see e.g. US Published Application Nos. US 2002/0150914; US 2003/0223994; US 2004/0191260; US 2006/0034850; US 2007/00992530; US20090226474; US20090304679; and International PCT Publication No. WO 03/068201).

In some embodiments, an antibody or antigen-binding portion thereof that specifically binds to a MHC-peptide complex, can be produced by immunizing a host with an effective amount of an immunogen containing a specific MHC-peptide complex. In some cases, the peptide of the MHC-peptide complex is an epitope of antigen capable of binding to the MHC, such as a tumor antigen, for example a universal tumor antigen, myeloma antigen or other antigen as described below. In some embodiments, an effective amount of the immunogen is then administered to a host for eliciting an immune response, wherein the immunogen retains a three-dimensional form thereof for a period of time sufficient to elicit an immune response against the three-dimensional presentation of the peptide in the binding groove of the MHC molecule. Serum collected from the host is then assayed to determine if desired antibodies that recognize a three-dimensional presentation of the peptide in the binding groove of the MHC molecule is being produced. In some embodiments, the produced antibodies can be assessed to confirm that the antibody can differentiate the MHC-peptide complex from the MHC molecule alone, the peptide of interest alone, and a complex of MHC and irrelevant peptide. The desired antibodies can then be isolated.

In some embodiments, an antibody or antigen-binding portion thereof that specifically binds to an MHC-peptide complex can be produced by employing antibody library display methods, such as phage antibody libraries. In some embodiments, phage display libraries of mutant Fab, scFv or other antibody forms can be generated, for example, in which members of the library are mutated at one or more residues of a CDR or CDRs. See e.g. US published application No. US20020150914, US2014/0294841; and Cohen C J. et al. (2003) *J Mol. Recogn.* 16:324-332.

Thus, in some embodiments, the chimeric antigen receptor, including TCR-like CARs, includes an extracellular portion containing an antibody or antibody fragment. In some embodiments, the antibody or fragment includes an scFv. In some aspects, the chimeric antigen receptor includes an extracellular portion containing the antibody or fragment and an intracellular signaling region. In some embodiments, the intracellular signaling region comprises an intracellular signaling domain. In some embodiments, the intracellular signaling domain is or comprises a primary signaling domain, a signaling domain that is capable of inducing a primary activation signal in a T cell, a signaling domain of a T cell receptor (TCR) component, and/or a signaling domain comprising an immunoreceptor tyrosine-based activation motif (ITAM).

In some embodiments, the recombinant receptor such as the CAR, such as the antibody portion thereof, further includes a spacer, which may be or include at least a portion of an immunoglobulin constant region or variant or modified version thereof, such as a hinge region, e.g., an IgG4 hinge region, and/or a $C_H1/C_L$ and/or Fc region. In some embodiments, the recombinant receptor further comprises a spacer and/or a hinge region. In some embodiments, the constant region or portion is of a human IgG, such as IgG4 or IgG1. In some aspects, the portion of the constant region serves as a spacer region between the antigen-recognition component, e.g., scFv, and transmembrane domain. The spacer can be of a length that provides for increased responsiveness of the cell following antigen binding, as compared to in the absence of the spacer.

In some examples, the spacer is at or about 12 amino acids in length or is no more than 12 amino acids in length. Exemplary spacers include those having at least about 10 to 229 amino acids, about 10 to 200 amino acids, about 10 to 175 amino acids, about 10 to 150 amino acids, about 10 to 125 amino acids, about 10 to 100 amino acids, about 10 to 75 amino acids, about 10 to 50 amino acids, about 10 to 40 amino acids, about 10 to 30 amino acids, about 10 to 20 amino acids, or about 10 to 15 amino acids, and including any integer between the endpoints of any of the listed ranges. In some embodiments, a spacer region has about 12 amino acids or less, about 119 amino acids or less, or about 229 amino acids or less. Exemplary spacers include IgG4 hinge alone, IgG4 hinge linked to CH2 and CH3 domains, or IgG4 hinge linked to the CH3 domain. Exemplary spacers include, but are not limited to, those described in Hudecek et al. (2013) *Clin. Cancer Res.,* 19:3153, Hudecek et al. (2015) Cancer Immunol Res. 3(2): 125-135 or international patent application publication number WO2014031687, U.S. Pat. No. 8,822,647 or published app. No. US2014/0271635. In some embodiments, the spacer includes a sequence of an immunoglobulin hinge region, a $C_H2$ and $C_H3$ region. In some embodiments, one of more of the hinge, $C_H2$ and $C_H3$ is derived all or in part from IgG4 or IgG2. In some cases, the hinge, $C_{H2}$ and $C_H3$ is derived from IgG4. In some aspects, one or more of the hinge, $C_{H2}$ and $C_H3$ is chimeric and contains sequence derived from IgG4 and IgG2. In some examples, the spacer contains an IgG4/2 chimeric hinge, an IgG2/4 $C_H2$, and an IgG4 $C_H3$ region.

In some embodiments, the spacer can be derived all or in part from IgG4 and/or IgG2 and can contain mutations, such as one or more single amino acid mutations in one or more domains. In some examples, the amino acid modification is a substitution of a proline (P) for a serine (S) in the hinge region of an IgG4. In some embodiments, the amino acid modification is a substitution of a glutamine (Q) for an asparagine (N) to reduce glycosylation heterogeneity, such as an N177Q mutation at position 177, in the $C_H2$ region, of the full-length IgG4 Fc sequence or an N176Q. at position 176, in the $C_H2$ region, of the full-length IgG4 Fc sequence.

In some embodiments, the spacer has the sequence set forth in SEQ ID NO: 1, and is encoded by the sequence set forth in SEQ ID NO: 2. In some embodiments, the spacer has the sequence set forth in SEQ ID NO: 3. In some embodiments, the spacer has the sequence set forth in SEQ ID NO: 4. In some embodiments, the encoded spacer is or contains the sequence set forth in SEQ ID NO: 29. In some embodiments, the constant region or portion is of IgD. In some embodiments, the spacer has the sequence set forth in SEQ ID NO: 5. In some embodiments, the spacer has a sequence of amino acids that exhibits at least 85%, 86%, 87%, 88%, 89%, 90%, 91%, 92%, 93%, 94%, 95%, 96%, 97%, 98%, 99% or more sequence identity to any of SEQ ID NOS: 1, 3, 4, 5 or 29.

The antigen recognition domain generally is linked to one or more intracellular signaling components, such as signaling components that mimic activation through an antigen receptor complex, such as a TCR complex, in the case of a CAR, and/or signal via another cell surface receptor. Thus, in some embodiments, the antigen binding component (e.g., antibody) is linked to one or more transmembrane and intracellular signaling regions. In some embodiments, the transmembrane domain is fused to the extracellular domain. In one embodiment, a transmembrane domain that naturally is associated with one of the domains in the receptor, e.g., CAR, is used. In some instances, the transmembrane domain is selected or modified by amino acid substitution to avoid binding of such domains to the transmembrane domains of the same or different surface membrane proteins to minimize interactions with other members of the receptor complex.

The transmembrane domain in some embodiments is derived either from a natural or from a synthetic source. Where the source is natural, the domain in some aspects is derived from any membrane-bound or transmembrane protein. Transmembrane regions include those derived from (i.e. comprise at least the transmembrane region(s) of) the alpha, beta or zeta chain of the T-cell receptor, CD28, CD3 epsilon, CD45, CD4, CD5, CD8, CD9, CD16, CD22, CD33, CD37, CD64, CD80, CD86, CD134, CD137, CD154. Alternatively the transmembrane domain in some embodiments is synthetic. In some aspects, the synthetic transmembrane domain comprises predominantly hydrophobic residues such as leucine and valine. In some aspects, a triplet of phenylalanine, tryptophan and valine will be found at each end of a synthetic transmembrane domain. In some embodiments, the linkage is by linkers, spacers, and/or transmembrane domain(s).

Among the intracellular signaling region are those that mimic or approximate a signal through a natural antigen receptor, a signal through such a receptor in combination with a costimulatory receptor, and/or a signal through a costimulatory receptor alone. In some embodiments, a short oligo- or polypeptide linker, for example, a linker of between 2 and 10 amino acids in length, such as one containing glycines and serines, e.g., glycine-serine doublet, is present and forms a linkage between the transmembrane domain and the cytoplasmic signaling domain of the CAR.

The receptor, e.g., the CAR, generally includes at least one intracellular signaling component or components. In some embodiments, the receptor includes an intracellular component of a TCR complex, such as a TCR CD3 chain that mediates T-cell activation and cytotoxicity, e.g., CD3 zeta chain. Thus, in some aspects, the ROR1-binding antibody is linked to one or more cell signaling modules. In some embodiments, cell signaling modules include CD3 transmembrane domain, CD3 intracellular signaling domains, and/or other CD transmembrane domains. In some embodiments, the receptor, e.g., CAR, further includes a portion of one or more additional molecules such as Fc receptor γ, CD8, CD4, CD25, or CD16. For example, in some aspects, the CAR includes a chimeric molecule between CD3-zeta (CD3-ζ) or Fc receptor γ and CD8, CD4, CD25 or CD16.

In some embodiments, upon ligation of the CAR, the cytoplasmic domain or intracellular signaling region of the CAR activates at least one of the normal effector functions or responses of the immune cell, e.g., T cell engineered to express the CAR. For example, in some contexts, the CAR induces a function of a T cell such as cytolytic activity or T-helper activity, such as secretion of cytokines or other factors. In some embodiments, a truncated portion of an intracellular signaling region of an antigen receptor component or costimulatory molecule is used in place of an intact immunostimulatory chain, for example, if it transduces the effector function signal. In some embodiments, the intracellular signaling regions, e.g., comprising intracellular domain or domains, include the cytoplasmic sequences of the T cell receptor (TCR), and in some aspects also those of co-receptors that in the natural context act in concert with such receptor to initiate signal transduction following antigen receptor engagement, and/or any derivative or variant of such molecules, and/or any synthetic sequence that has the same functional capability.

In the context of a natural TCR, full activation generally requires not only signaling through the TCR, but also a costimulatory signal. Thus, in some embodiments, to promote full activation, a component for generating secondary or co-stimulatory signal is also included in the CAR. In other embodiments, the CAR does not include a component for generating a costimulatory signal. In some aspects, an additional CAR is expressed in the same cell and provides the component for generating the secondary or costimulatory signal.

T cell activation is in some aspects described as being mediated by two classes of cytoplasmic signaling sequences: those that initiate antigen-dependent primary activation through the TCR (primary cytoplasmic signaling sequences), and those that act in an antigen-independent manner to provide a secondary or co-stimulatory signal (secondary cytoplasmic signaling sequences). In some aspects, the CAR includes one or both of such signaling components.

In some aspects, the CAR includes a primary cytoplasmic signaling sequence that regulates primary activation of the TCR complex. Primary cytoplasmic signaling sequences that act in a stimulatory manner may contain signaling motifs which are known as immunoreceptor tyrosine-based activation motifs or ITAMs. Examples of ITAM containing primary cytoplasmic signaling sequences include those derived from TCR or CD3 zeta, FcR gamma or FcR beta. In some embodiments, cytoplasmic signaling molecule(s) in the CAR contain(s) a cytoplasmic signaling domain, portion thereof, or sequence derived from CD3 zeta.

In some embodiments, the CAR includes a signaling region and/or transmembrane portion of a costimulatory receptor, such as CD28, 4-1BB, OX40, DAP10, and ICOS. In some aspects, the same CAR includes both the signaling region and costimulatory components.

In some embodiments, the signaling region is included within one CAR, whereas the costimulatory component is provided by another CAR recognizing another antigen. In some embodiments, the CARs include activating or stimulatory CARs, and costimulatory CARs, both expressed on the same cell (see WO2014/055668).

In certain embodiments, the intracellular signaling region comprises a CD28 transmembrane and signaling domain linked to a CD3 (e.g., CD3-zeta) intracellular domain. In some embodiments, the intracellular signaling region comprises a chimeric CD28 and CD137 (4-1BB, TNFRSF9) co-stimulatory domains, linked to a CD3 zeta intracellular domain.

In some embodiments, the CAR encompasses one or more, e.g., two or more, costimulatory domains and an activation domain, e.g., primary activation domain, in the cytoplasmic portion. Exemplary CARs include intracellular components of CD3-zeta, CD28, and 4-1BB.

In some cases, CARs are referred to as first, second, and/or third generation CARs. In some aspects, a first generation CAR is one that solely provides a CD3-chain induced signal upon antigen binding; in some aspects, a second-generation CARs is one that provides such a signal and costimulatory signal, such as one including an intracellular signaling domain from a costimulatory receptor such as CD28 or CD137; in some aspects, a third generation CAR in some aspects is one that includes multiple costimulatory domains of different costimulatory receptors.

In some embodiments, the chimeric antigen receptor includes an extracellular portion containing the antibody or fragment described herein. In some aspects, the chimeric antigen receptor includes an extracellular portion containing the antibody or fragment described herein and an intracellular signaling domain. In some embodiments, the antibody or fragment includes an scFv or a single-domain $V_H$ antibody and the intracellular domain contains an ITAM. In some aspects, the intracellular signaling domain includes a signaling domain of a zeta chain of a CD3-zeta (CD3ζ) chain. In some embodiments, the chimeric antigen receptor includes a transmembrane domain disposed between the extracellular domain and the intracellular signaling region.

In some aspects, the transmembrane domain contains a transmembrane portion of CD28. The extracellular domain and transmembrane can be linked directly or indirectly. In some embodiments, the extracellular domain and transmembrane are linked by a spacer, such as any described herein. In some embodiments, the chimeric antigen receptor contains an intracellular domain of a T cell costimulatory molecule, such as between the transmembrane domain and intracellular signaling domain. In some aspects, the T cell costimulatory molecule is CD28 or 4-1BB.

In some embodiments, the CAR contains an antibody, e.g., an antibody fragment, a transmembrane domain that is or contains a transmembrane portion of CD28 or a functional variant thereof, and an intracellular signaling domain containing a signaling portion of CD28 or functional variant thereof and a signaling portion of CD3 zeta or functional variant thereof. In some embodiments, the CAR contains an antibody, e.g., antibody fragment, a transmembrane domain that is or contains a transmembrane portion of CD28 or a functional variant thereof, and an intracellular signaling domain containing a signaling portion of a 4-1BB or functional variant thereof and a signaling portion of CD3 zeta or functional variant thereof. In some such embodiments, the receptor further includes a spacer containing a portion of an Ig molecule, such as a human Ig molecule, such as an Ig hinge, e.g. an IgG4 hinge, such as a hinge-only spacer.

In some embodiments, the transmembrane domain of the receptor, e.g., the CAR is a transmembrane domain of human CD28 or variant thereof, e.g., a 27-amino acid transmembrane domain of a human CD28 (Accession No.: P10747.1), or is a transmembrane domain that comprises the sequence of amino acids set forth in SEQ ID NO: 8 or a sequence of amino acids that exhibits at least or at least about 85%, 86%, 87%, 88%, 89%, 90%, 91%, 92%, 93%, 94%, 95%, 96%, 97%, 98%, 99% or more sequence identity to SEQ ID NO:8; in some embodiments, the transmembrane-domain containing portion of the recombinant receptor comprises the sequence of amino acids set forth in SEQ ID NO: 9 or a sequence of amino acids having at least or at least about 85%, 86%, 87%, 88%, 89%, 90%, 91%, 92%, 93%, 94%, 95%, 96%, 97%, 98%, 99% or more sequence identity thereto.

In some embodiments, the chimeric antigen receptor contains an intracellular domain of a T cell costimulatory molecule. In some aspects, the T cell costimulatory molecule is CD28 or 4-1BB.

In some embodiments, the intracellular signaling region comprises an intracellular costimulatory signaling domain of human CD28 or functional variant or portion thereof, such as a 41 amino acid domain thereof and/or such a domain with an LL to GG substitution at positions 186-187 of a native CD28 protein. In some embodiments, the intracellular signaling domain can comprise the sequence of amino acids set forth in SEQ ID NO: 10 or 11 or a sequence of amino acids that exhibits at least or at least about 85%, 86%, 87%, 88%, 89%, 90%, 91%, 92%, 93%, 94%, 95%, 96%, 97%, 98%, 99% or more sequence identity to SEQ ID NO: 10 or 11. In some embodiments, the intracellular region comprises an intracellular costimulatory signaling domain of 4-1BB or functional variant or portion thereof, such as a 42-amino acid cytoplasmic domain of a human 4-1BB (Accession No. Q07011.1) or functional variant or portion thereof, such as the sequence of amino acids set forth in SEQ ID NO: 12 or a sequence of amino acids that exhibits at least or at least about 85%, 86%, 87%, 88%, 89%, 90%, 91%, 92%, 93%, 94%, 95%, 96%, 97%, 98%, 99% or more sequence identity to SEQ ID NO: 12.

In some embodiments, the intracellular signaling region comprises a human CD3 chain, optionally a CD3 zeta stimulatory signaling domain or functional variant thereof, such as an 112 AA cytoplasmic domain of isoform 3 of human CD3ζ (Accession No.: P20963.2) or a CD3 zeta signaling domain as described in U.S. Pat. No. 7,446,190 or U.S. Pat. No. 8,911,993. In some embodiments, the intracellular signaling region comprises the sequence of amino acids set forth in SEQ ID NO: 13, 14 or 15 or a sequence of amino acids that exhibits at least or at least about 85%, 86%, 87%, 88%, 89%, 90%, 91%, 92%, 93%, 94%, 95%, 96%, 97%, 98%, 99% or more sequence identity to SEQ ID NO: 13, 14 or 15.

In some aspects, the spacer contains only a hinge region of an IgG, such as only a hinge of IgG4 or IgG1, such as the hinge only spacer set forth in SEQ ID NO:1. In other embodiments, the spacer is an Ig hinge, e.g., and IgG4 hinge, linked to a $C_H2$ and/or $C_H3$ domains. In some embodiments, the spacer is an Ig hinge, e.g., an IgG4 hinge, linked to $C_H2$ and $C_H3$ domains, such as set forth in SEQ ID NO:3. In some embodiments, the spacer is an Ig hinge, e.g., an IgG4 hinge, linked to a $C_H3$ domain only, such as set forth in SEQ ID NO:4. In some embodiments, the spacer is or comprises a glycine-serine rich sequence or other flexible linker such as known flexible linkers.

2. T Cell Receptors (TCRs)

In some embodiments, engineered cells, such as T cells, are those that express a T cell receptor (TCR) or antigen-binding portion thereof that recognizes an peptide epitope or T cell epitope of a target polypeptide, such as an antigen of a tumor, viral or autoimmune protein.

In some embodiments, a "T cell receptor" or "TCR" is a molecule that contains a variable α and β chains (also known as TCRα and TCRβ, respectively) or a variable γ and δ chains (also known as TCRα and TCRβ, respectively), or antigen-binding portions thereof, and which is capable of specifically binding to a peptide bound to an MHC molecule. In some embodiments, the TCR is in the αβ form. Typically, TCRs that exist in αβ and γδ forms are generally structurally similar, but T cells expressing them may have distinct anatomical locations or functions. A TCR can be found on the surface of a cell or in soluble form. Generally, a TCR is found on the surface of T cells (or T lymphocytes) where it is generally responsible for recognizing antigens bound to major histocompatibility complex (MHC) molecules.

Unless otherwise stated, the term "TCR" should be understood to encompass full TCRs as well as antigen-binding portions or antigen-binding fragments thereof. In some embodiments, the TCR is an intact or full-length TCR, including TCRs in the αβ form or γδ form. In some embodiments, the TCR is an antigen-binding portion that is less than a full-length TCR but that binds to a specific peptide bound in an MHC molecule, such as binds to an MHC-peptide complex. In some cases, an antigen-binding portion or fragment of a TCR can contain only a portion of the structural domains of a full-length or intact TCR, but yet is able to bind the peptide epitope, such as MHC-peptide complex, to which the full TCR binds. In some cases, an antigen-binding portion contains the variable domains of a TCR, such as variable α chain and variable β chain of a TCR, sufficient to form a binding site for binding to a specific MHC-peptide complex. Generally, the variable chains of a TCR contain complementarity determining regions involved in recognition of the peptide, MHC and/or MHC-peptide complex.

In some embodiments, the variable domains of the TCR contain hypervariable loops, or complementarity determining regions (CDRs), which generally are the primary contributors to antigen recognition and binding capabilities and specificity. In some embodiments, a CDR of a TCR or combination thereof forms all or substantially all of the antigen-binding site of a given TCR molecule. The various CDRs within a variable region of a TCR chain generally are separated by framework regions (FRs), which generally display less variability among TCR molecules as compared to the CDRs (see, e.g., Jores et al., Proc. Nat'l Acad. Sci. U.S.A. 87:9138, 1990; Chothia et al., EMBO J. 7:3745, 1988; see also Lefranc et al., Dev. Comp. Immunol. 27:55, 2003). In some embodiments, CDR3 is the main CDR responsible for antigen binding or specificity, or is the most important among the three CDRs on a given TCR variable region for antigen recognition, and/or for interaction with the processed peptide portion of the peptide-MHC complex. In some contexts, the CDR1 of the alpha chain can interact with the N-terminal part of certain antigenic peptides. In some contexts, CDR1 of the beta chain can interact with the C-terminal part of the peptide. In some contexts, CDR2 contributes most strongly to or is the primary CDR responsible for the interaction with or recognition of the MHC portion of the MHC-peptide complex. In some embodiments, the variable region of the β-chain can contain a further hypervariable region (CDR4 or HVR4), which generally is involved in superantigen binding and not antigen recognition (Kotb (1995) Clinical Microbiology Reviews, 8:411-426).

In some embodiments, a TCR also can contain a constant domain, a transmembrane domain and/or a short cytoplasmic tail (see, e.g., Janeway et al., Immunobiology: The Immune System in Health and Disease, 3rd Ed., Current Biology Publications, p. 4:33, 1997). In some aspects, each chain of the TCR can possess one N-terminal immunoglobulin variable domain, one immunoglobulin constant domain, a transmembrane region, and a short cytoplasmic tail at the C-terminal end. In some embodiments, a TCR is associated with invariant proteins of the CD3 complex involved in mediating signal transduction.

In some embodiments, a TCR chain contains one or more constant domain. For example, the extracellular portion of a given TCR chain (e.g., α-chain or β-chain) can contain two immunoglobulin-like domains, such as a variable domain (e.g., Vα or Vβ; typically amino acids 1 to 116 based on Kabat numbering Kabat et al., "Sequences of Proteins of Immunological Interest, US Dept. Health and Human Services, Public Health Service National Institutes of Health, 1991, 5th ed.) and a constant domain (e.g., α-chain constant domain or Cα, typically positions 117 to 259 of the chain based on Kabat numbering or β chain constant domain or $C_β$, typically positions 117 to 295 of the chain based on Kabat) adjacent to the cell membrane. For example, in some cases, the extracellular portion of the TCR formed by the two chains contains two membrane-proximal constant domains, and two membrane-distal variable domains, which variable domains each contain CDRs. The constant domain of the TCR may contain short connecting sequences in which a cysteine residue forms a disulfide bond, thereby linking the two chains of the TCR. In some embodiments, a TCR may have an additional cysteine residue in each of the α and β chains, such that the TCR contains two disulfide bonds in the constant domains.

In some embodiments, the TCR chains contain a transmembrane domain. In some embodiments, the transmembrane domain is positively charged. In some cases, the TCR chain contains a cytoplasmic tail. In some cases, the structure allows the TCR to associate with other molecules like CD3 and subunits thereof. For example, a TCR containing constant domains with a transmembrane region may anchor the protein in the cell membrane and associate with invariant subunits of the CD3 signaling apparatus or complex. The intracellular tails of CD3 signaling subunits (e.g. CD3γ, CD3δ, CD3ε and CD3ζ chains) contain one or more immunoreceptor tyrosine-based activation motif or ITAM that are involved in the signaling capacity of the TCR complex.

In some embodiments, the TCR may be a heterodimer of two chains α and β (or optionally γ and δ) or it may be a single chain TCR construct. In some embodiments, the TCR is a heterodimer containing two separate chains (α and β chains or γ and δ chains) that are linked, such as by a disulfide bond or disulfide bonds.

In some embodiments, the TCR can be generated from a known TCR sequence(s), such as sequences of Vα,β chains, for which a substantially full-length coding sequence is readily available. Methods for obtaining full-length TCR sequences, including V chain sequences, from cell sources are well known. In some embodiments, nucleic acids encoding the TCR can be obtained from a variety of sources, such as by polymerase chain reaction (PCR) amplification of TCR-encoding nucleic acids within or isolated from a given cell or cells, or synthesis of publicly available TCR DNA sequences.

In some embodiments, the TCR is obtained from a biological source, such as from cells such as from a T cell (e.g. cytotoxic T cell), T-cell hybridomas or other publicly available source. In some embodiments, the T-cells can be obtained from in vivo isolated cells. In some embodiments, the TCR is a thymically selected TCR. In some embodiments, the TCR is a neoepitope-restricted TCR. In some embodiments, the T-cells can be a cultured T-cell hybridoma or clone. In some embodiments, the TCR or antigen-binding portion thereof or antigen-binding fragment thereof can be synthetically generated from knowledge of the sequence of the TCR.

In some embodiments, the TCR is generated from a TCR identified or selected from screening a library of candidate TCRs against a target polypeptide antigen, or target T cell epitope thereof. TCR libraries can be generated by amplification of the repertoire of Vα and Vβ from T cells isolated from a subject, including cells present in PBMCs, spleen or other lymphoid organ. In some cases, T cells can be amplified from tumor-infiltrating lymphocytes (TILs). In some embodiments, TCR libraries can be generated from CD4+ or CD8+ cells. In some embodiments, the TCRs can be amplified from a T cell source of a normal of healthy subject, i.e. normal TCR libraries. In some embodiments, the TCRs can be amplified from a T cell source of a diseased subject, i.e. diseased TCR libraries. In some embodiments, degenerate primers are used to amplify the gene repertoire of Vα and Vβ, such as by RT-PCR in samples, such as T cells, obtained from humans. In some embodiments, scTv libraries can be assembled from naïve Vα and Vβ libraries in which the amplified products are cloned or assembled to be separated by a linker. Depending on the source of the subject and cells, the libraries can be HLA allele-specific. Alternatively, in some embodiments, TCR libraries can be generated by mutagenesis or diversification of a parent or scaffold TCR molecule. In some aspects, the TCRs are subjected to directed evolution, such as by mutagenesis, e.g., of the α or β chain. In some aspects, particular residues within CDRs of the TCR are altered. In some embodiments, selected TCRs can be modified by affinity maturation. In some embodiments, antigen-specific T cells may be selected, such as by screening to assess CTL activity against the peptide. In some aspects, TCRs, e.g. present on the antigen-specific T cells, may be selected, such as by binding activity, e.g., particular affinity or avidity for the antigen.

In some embodiments, the genetically engineered antigen receptors include recombinant T cell receptors (TCRs) and/or TCRs cloned from naturally occurring T cells. In some embodiments, a high-affinity T cell clone for a target antigen (e.g., a cancer antigen) is identified, isolated from a patient, and introduced into the cells. In some embodiments, the TCR clone for a target antigen has been generated in transgenic mice engineered with human immune system genes (e.g., the human leukocyte antigen system, or HLA). See, e.g., tumor antigens (see, e.g., Parkhurst et al. (2009) Clin Cancer Res. 15:169-180 and Cohen et al. (2005) J Immunol. 175:5799-5808. In some embodiments, phage display is used to isolate TCRs against a target antigen (see, e.g., Varela-Rohena et al. (2008) Nat Med. 14:1390-1395 and Li (2005) Nat Biotechnol. 23:349-354.

In some embodiments, the TCR or antigen-binding portion thereof is one that has been modified or engineered. In some embodiments, directed evolution methods are used to generate TCRs with altered properties, such as with higher affinity for a specific MHC-peptide complex. In some embodiments, directed evolution is achieved by display methods including, but not limited to, yeast display (Holler et al. (2003) Nat Immunol, 4, 55-62; Holler et al. (2000) Proc Natl Acad Sci USA, 97, 5387-92), phage display (Li et al. (2005) Nat Biotechnol, 23, 349-54), or T cell display (Chervin et al. (2008) J Immunol Methods, 339, 175-84). In some embodiments, display approaches involve engineering, or modifying, a known, parent or reference TCR. For example, in some cases, a wild-type TCR can be used as a template for producing mutagenized TCRs in which in one or more residues of the CDRs are mutated, and mutants with an desired altered property, such as higher affinity for a desired target antigen, are selected.

In some embodiments, peptides of a target polypeptide for use in producing or generating a TCR of interest are known or can be readily identified by a skilled artisan. In some embodiments, peptides suitable for use in generating TCRs or antigen-binding portions can be determined based on the presence of an HLA-restricted motif in a target polypeptide of interest, such as a target polypeptide described below. In some embodiments, peptides are identified using available computer prediction models. In some embodiments, for predicting MHC class I binding sites, such models include, but are not limited to, ProPred1 (Singh and Raghava (2001) Bioinformatics 17(12):1236-1237, and SYFPEITHI (see Schuler et al. (2007) Immunoinformatics Methods in Molecular Biology, 409(1): 75-93 2007). In some embodiments, the MHC-restricted epitope is HLA-A0201, which is expressed in approximately 39-46% of all Caucasians and therefore, represents a suitable choice of MHC antigen for use preparing a TCR or other MHC-peptide binding molecule.

HLA-A0201-binding motifs and the cleavage sites for proteasomes and immune-proteasomes using computer prediction models are known. For predicting MHC class I binding sites, such models include, but are not limited to, ProPred1 (described in more detail in Singh and Raghava, ProPred: prediction of HLA-DR binding sites. BIOINFORMATICS 17(12):1236-1237 2001), and SYFPEITHI (see Schuler et al. SYFPEITHI, Database for Searching and T-Cell Epitope Prediction. in Immunoinformatics Methods in Molecular Biology, vol 409(1): 75-93 2007).

In some embodiments, the TCR or antigen binding portion thereof may be a recombinantly produced natural protein or mutated form thereof in which one or more property, such as binding characteristic, has been altered. In some embodiments, a TCR may be derived from one of various animal species, such as human, mouse, rat, or other mammal. A TCR may be cell-bound or in soluble form. In some embodiments, for purposes of the provided methods, the TCR is in cell-bound form expressed on the surface of a cell.

In some embodiments, the TCR is a full-length TCR. In some embodiments, the TCR is an antigen-binding portion. In some embodiments, the TCR is a dimeric TCR (dTCR). In some embodiments, the TCR is a single-chain TCR (sc-TCR). In some embodiments, a dTCR or scTCR have the structures as described in WO 03/020763, WO 04/033685, WO2011/044186.

In some embodiments, the TCR contains a sequence corresponding to the transmembrane sequence. In some embodiments, the TCR does contain a sequence corresponding to cytoplasmic sequences. In some embodiments, the TCR is capable of forming a TCR complex with CD3. In some embodiments, any of the TCRs, including a dTCR or scTCR, can be linked to signaling domains that yield an active TCR on the surface of a T cell. In some embodiments, the TCR is expressed on the surface of cells.

In some embodiments a dTCR contains a first polypeptide wherein a sequence corresponding to a TCR α chain variable region sequence is fused to the N terminus of a sequence corresponding to a TCR α chain constant region extracellular sequence, and a second polypeptide wherein a sequence corresponding to a TCR β chain variable region sequence is fused to the N terminus a sequence corresponding to a TCR β chain constant region extracellular sequence, the first and second polypeptides being linked by a disulfide bond. In some embodiments, the bond can correspond to the native inter-chain disulfide bond present in native dimeric αβ TCRs. In some embodiments, the interchain disulfide bonds are not present in a native TCR. For example, in some embodiments, one or more cysteines can be incorporated into the constant region extracellular sequences of dTCR polypeptide pair. In some cases, both a native and a non-native disulfide bond may be desirable. In some embodiments, the TCR contains a transmembrane sequence to anchor to the membrane.

In some embodiments, a dTCR contains a TCR α chain containing a variable α domain, a constant α domain and a first dimerization motif attached to the C-terminus of the constant α domain, and a TCR β chain comprising a variable β domain, a constant β domain and a first dimerization motif attached to the C-terminus of the constant β domain, wherein the first and second dimerization motifs easily interact to form a covalent bond between an amino acid in the first dimerization motif and an amino acid in the second dimerization motif linking the TCR α chain and TCR β chain together.

In some embodiments, the TCR is a scTCR. Typically, a scTCR can be generated using methods known, See e.g., Soo Hoo, W. F. et al. PNAS (USA) 89, 4759 (1992); Wülfing, C. and Plückthun, A., J. Mol. Biol. 242, 655 (1994); Kurucz, I. et al. PNAS (USA) 90 3830 (1993); International published PCT Nos. WO 96/13593, WO 96/18105, WO99/60120, WO99/18129, WO 03/020763, WO2011/044186; and Schlueter, C. J. et al. J. Mol. Biol. 256, 859 (1996). In some embodiments, a scTCR contains an introduced non-native disulfide interchain bond to facilitate the association of the TCR chains (see e.g. International published PCT No. WO 03/020763). In some embodiments, a scTCR is a non-disulfide linked truncated TCR in which heterologous leucine zippers fused to the C-termini thereof facilitate chain association (see e.g. International published PCT No. WO99/60120). In some embodiments, a scTCR contain a TCRα variable domain covalently linked to a TCRβ variable domain via a peptide linker (see e.g., International published PCT No. WO99/18129).

In some embodiments, a scTCR contains a first segment constituted by an amino acid sequence corresponding to a TCR α chain variable region, a second segment constituted by an amino acid sequence corresponding to a TCR β chain variable region sequence fused to the N terminus of an amino acid sequence corresponding to a TCR β chain constant domain extracellular sequence, and a linker sequence linking the C terminus of the first segment to the N terminus of the second segment.

In some embodiments, a scTCR contains a first segment constituted by an α chain variable region sequence fused to the N terminus of an α chain extracellular constant domain sequence, and a second segment constituted by a β chain variable region sequence fused to the N terminus of a sequence β chain extracellular constant and transmembrane sequence, and, optionally, a linker sequence linking the C terminus of the first segment to the N terminus of the second segment.

In some embodiments, a scTCR contains a first segment constituted by a TCR β chain variable region sequence fused to the N terminus of a β chain extracellular constant domain sequence, and a second segment constituted by an α chain variable region sequence fused to the N terminus of a sequence α chain extracellular constant and transmembrane sequence, and, optionally, a linker sequence linking the C terminus of the first segment to the N terminus of the second segment.

In some embodiments, the linker of a scTCRs that links the first and second TCR segments can be any linker capable of forming a single polypeptide strand, while retaining TCR binding specificity. In some embodiments, the linker sequence may, for example, have the formula -P-AA-P- wherein P is proline and AA represents an amino acid sequence wherein the amino acids are glycine and serine. In some embodiments, the first and second segments are paired so that the variable region sequences thereof are orientated for such binding. Hence, in some cases, the linker has a sufficient length to span the distance between the C terminus of the first segment and the N terminus of the second segment, or vice versa, but is not too long to block or reduces bonding of the scTCR to the target ligand. In some embodiments, the linker can contain from or from about 10 to 45 amino acids, such as 10 to 30 amino acids or 26 to 41 amino acids residues, for example 29, 30, 31 or 32 amino acids. In some embodiments, the linker has the formula -PGGG- (SGGGG)$_5$-P- wherein P is proline, G is glycine and S is serine (SEQ ID NO:22). In some embodiments, the linker has the sequence GSADDAKKDAAKKDGKS (SEQ ID NO:23)

In some embodiments, the scTCR contains a covalent disulfide bond linking a residue of the immunoglobulin region of the constant domain of the α chain to a residue of the immunoglobulin region of the constant domain of the β chain. In some embodiments, the interchain disulfide bond in a native TCR is not present. For example, in some embodiments, one or more cysteines can be incorporated into the constant region extracellular sequences of the first and second segments of the scTCR polypeptide. In some cases, both a native and a non-native disulfide bond may be desirable.

In some embodiments of a dTCR or scTCR containing introduced interchain disulfide bonds, the native disulfide bonds are not present. In some embodiments, the one or more of the native cysteines forming a native interchain disulfide bonds are substituted to another residue, such as to a serine or alanine. In some embodiments, an introduced disulfide bond can be formed by mutating non-cysteine residues on the first and second segments to cysteine. Exemplary non-native disulfide bonds of a TCR are described in published International PCT No. WO2006/000830.

In some embodiments, the TCR or antigen-binding fragment thereof exhibits an affinity with an equilibrium binding constant for a target antigen of between or between about 10-5 and 10-12 M and all individual values and ranges therein. In some embodiments, the target antigen is an MHC-peptide complex or ligand.

In some embodiments, nucleic acid or nucleic acids encoding a TCR, such as α and β chains, can be amplified by PCR, cloning or other suitable means and cloned into a suitable expression vector or vectors. The expression vector can be any suitable recombinant expression vector, and can be used to transform or transfect any suitable host. Suitable vectors include those designed for propagation and expansion or for expression or both, such as plasmids and viruses.

In some embodiments, the vector can be a vector of the pUC series (Fermentas Life Sciences), the pBluescript series (Stratagene, LaJolla, Calif.), the pET series (Novagen, Madison, Wis.), the pGEX series (Pharmacia Biotech, Uppsala, Sweden), or the pEX series (Clontech, Palo Alto, Calif.). In some cases, bacteriophage vectors, such as λG10, λGT11, λZapII (Stratagene), λEMBL4, and XNM1149, also can be used. In some embodiments, plant expression vectors can be used and include pBI01, pBI101.2, pBI101.3, pBI121 and pBIN19 (Clontech). In some embodiments, animal expression vectors include pEUK-Cl, pMAM and pMAM-neo (Clontech). In some embodiments, a viral vector is used, such as a retroviral vector.

In some embodiments, the recombinant expression vectors can be prepared using standard recombinant DNA techniques. In some embodiments, vectors can contain regulatory sequences, such as transcription and translation initiation and termination codons, which are specific to the type of host (e.g., bacterium, fungus, plant, or animal) into which the vector is to be introduced, as appropriate and taking into consideration whether the vector is DNA- or RNA-based. In some embodiments, the vector can contain a nonnative promoter operably linked to the nucleotide sequence encoding the TCR or antigen-binding portion (or other MHC-peptide binding molecule). In some embodiments, the promoter can be a non-viral promoter or a viral promoter, such as a cytomegalovirus (CMV) promoter, an SV40 promoter, an RSV promoter, and a promoter found in the long-terminal repeat of the murine stem cell virus. Other known promoters also are contemplated.

In some embodiments, after the T-cell clone is obtained, the TCR alpha and beta chains are isolated and cloned into a gene expression vector. In some embodiments, the TCR alpha and beta genes are linked via a picornavirus 2A ribosomal skip peptide so that both chains are coexpression. In some embodiments, genetic transfer of the TCR is accomplished via retroviral or lentiviral vectors, or via transposons (see, e.g., Baum et al. (2006) Molecular Therapy: The Journal of the American Society of Gene Therapy. 13:1050-1063; Frecha et al. (2010) Molecular Therapy: The Journal of the American Society of Gene Therapy. 18:1748-1757; and Hackett et al. (2010) Molecular Therapy: The Journal of the American Society of Gene Therapy. 18:674-683.

In some embodiments, to generate a vector encoding a TCR, the α and β chains are PCR amplified from total cDNA isolated from a T cell clone expressing the TCR of interest and cloned into an expression vector. In some embodiments, the α and β chains are cloned into the same vector. In some embodiments, the α and β chains are cloned into different vectors. In some embodiments, the generated α and β chains are incorporated into a retroviral, e.g. lentiviral, vector.

3. Chimeric Auto-Antibody Receptor (CAAR)

In some embodiments, the recombinant receptor is a chimeric autoantibody receptor (CAAR). In some embodiments, the CAAR is specific for an autoantibody. In some embodiments, a cell expressing the CAAR, such as a T cell engineered to express a CAAR, can be used to specifically bind to and kill autoantibody-expressing cells, but not normal antibody expressing cells. In some embodiments, CAAR-expressing cells can be used to treat an autoimmune disease associated with expression of self-antigens, such as autoimmune diseases. In some embodiments, CAAR-expressing cells can target B cells that ultimately produce the autoantibodies and display the autoantibodies on their cell surfaces, mark these B cells as disease-specific targets for therapeutic intervention. In some embodiments, CAAR-expressing cells can be used to efficiently targeting and killing the pathogenic B cells in autoimmune diseases by targeting the disease-causing B cells using an antigen-specific chimeric autoantibody receptor. In some embodiments, the recombinant receptor is a CAAR, such as any described in U.S. Patent Application Pub. No. US 2017/0051035.

In some embodiments, the CAAR comprises an autoantibody binding domain, a transmembrane domain, and an intracellular signaling region. In some embodiments, the intracellular signaling region comprises an intracellular signaling domain. In some embodiments, the intracellular signaling domain is or comprises a primary signaling domain, a signaling domain that is capable of inducing a primary activation signal in a T cell, a signaling domain of a T cell receptor (TCR) component, and/or a signaling domain comprising an immunoreceptor tyrosine-based activation motif (ITAM). In some embodiments, the intracellular signaling region comprises a secondary or costimulatory signaling region (secondary intracellular signaling regions).

In some embodiments, the autoantibody binding domain comprises an autoantigen or a fragment thereof. The choice of autoantigen can depend upon the type of autoantibody being targeted. For example, the autoantigen may be chosen because it recognizes an autoantibody on a target cell, such as a B cell, associated with a particular disease state, e.g. an autoimmune disease, such as an autoantibody-mediated autoimmune disease. In some embodiments, the autoimmune disease includes pemphigus vulgaris (PV). Exemplary autoantigens include desmoglein 1 (Dsg1) and Dsg3.

4. Multi-Targeting

In some embodiments, the cells and methods include multi-targeting strategies, such as expression of two or more genetically engineered receptors on the cell, each recognizing the same of a different antigen and typically each including a different intracellular signaling component. Such multi-targeting strategies are described, for example, in International Patent Application Publication No: WO 2014055668 A1 (describing combinations of activating and costimulatory CARs, e.g., targeting two different antigens present individually on off-target, e.g., normal cells, but present together only on cells of the disease or condition to be treated) and Fedorov et al., Sci. Transl. Medicine, 5(215) (December, 2013) (describing cells expressing an activating and an inhibitory CAR, such as those in which the activating CAR binds to one antigen expressed on both normal or non-diseased cells and cells of the disease or condition to be treated, and the inhibitory CAR binds to another antigen expressed only on the normal cells or cells which it is not desired to treat).

For example, in some embodiments, the cells include a receptor expressing a first genetically engineered antigen receptor (e.g., CAR or TCR) which is capable of inducing an activating or stimulating signal to the cell, generally upon specific binding to the antigen recognized by the first receptor, e.g., the first antigen. In some embodiments, the cell further includes a second genetically engineered antigen receptor (e.g., CAR or TCR), e.g., a chimeric costimulatory receptor, which is capable of inducing a costimulatory signal to the immune cell, generally upon specific binding to a second antigen recognized by the second receptor. In some embodiments, the first antigen and second antigen are the same. In some embodiments, the first antigen and second antigen are different.

In some embodiments, the first and/or second genetically engineered antigen receptor (e.g. CAR or TCR) is capable of inducing an activating or stimulating signal to the cell. In some embodiments, the receptor includes an intracellular signaling component containing ITAM or ITAM-like motifs. In some embodiments, the activation induced by the first receptor involves a signal transduction or change in protein expression in the cell resulting in initiation of an immune response, such as ITAM phosphorylation and/or initiation of ITAM-mediated signal transduction cascade, formation of an immunological synapse and/or clustering of molecules near the bound receptor (e.g. CD4 or CD8, etc.), activation of one or more transcription factors, such as NF-κB and/or AP-1, and/or induction of gene expression of factors such as cytokines, proliferation, and/or survival.

In some embodiments, the first and/or second receptor includes intracellular signaling domains of costimulatory receptors such as CD28, CD137 (4-1BB), OX40, and/or ICOS. In some embodiments, the first and second receptor include an intracellular signaling domain of a costimulatory receptor that are different. In one embodiment, the first receptor contains a CD28 costimulatory signaling region and the second receptor contain a 4-1BB co-stimulatory signaling region or vice versa.

In some embodiments, the first and/or second receptor includes both an intracellular signaling domain containing ITAM or ITAM-like motifs and an intracellular signaling domain of a costimulatory receptor.

In some embodiments, the first receptor contains an intracellular signaling domain containing ITAM or ITAM-like motifs and the second receptor contains an intracellular signaling domain of a costimulatory receptor. The costimulatory signal in combination with the activating or stimulating signal induced in the same cell is one that results in an immune response, such as a robust and sustained immune response, such as increased gene expression, secretion of cytokines and other factors, and T cell mediated effector functions such as cell killing.

In some embodiments, neither ligation of the first receptor alone nor ligation of the second receptor alone induces a robust immune response. In some aspects, if only one receptor is ligated, the cell becomes tolerized or unresponsive to antigen, or inhibited, and/or is not induced to proliferate or secrete factors or carry out effector functions. In some such embodiments, however, when the plurality of receptors are ligated, such as upon encounter of a cell expressing the first and second antigens, a desired response is achieved, such as full immune activation or stimulation, e.g., as indicated by secretion of one or more cytokine, proliferation, persistence, and/or carrying out an immune effector function such as cytotoxic killing of a target cell.

In some embodiments, the two receptors induce, respectively, an activating and an inhibitory signal to the cell, such that binding by one of the receptor to its antigen activates the cell or induces a response, but binding by the second inhibitory receptor to its antigen induces a signal that suppresses or dampens that response. Examples are combinations of activating CARs and inhibitory CARs or iCARs. Such a strategy may be used, for example, in which the activating CAR binds an antigen expressed in a disease or condition but which is also expressed on normal cells, and the inhibitory receptor binds to a separate antigen which is expressed on the normal cells but not cells of the disease or condition.

In some embodiments, the cells expressing the recombinant receptor further include inhibitory CARs (iCARs, see Fedorov et al., Sci. Transl. Medicine, 5(215) (2013), such as a CAR recognizing an antigen other than the one associated with and/or specific for the disease or condition whereby an activating signal delivered through the disease-targeting CAR is diminished or inhibited by binding of the inhibitory CAR to its ligand, e.g., to reduce off-target effects.

In some embodiments, the two receptors induce, respectively, an activating and an inhibitory signal to the cell, such that ligation of one of the receptor to its antigen activates the cell or induces a response, but ligation of the second inhibitory receptor to its antigen induces a signal that suppresses or dampens that response. Examples are combinations of activating CARs and inhibitory CARs (iCARs). Such a strategy may be used, for example, to reduce the likelihood of off-target effects in the context in which the activating CAR binds an antigen expressed in a disease or condition but which is also expressed on normal cells, and the inhibitory receptor binds to a separate antigen which is expressed on the normal cells but not cells of the disease or condition.

In some aspects, the chimeric receptor is or includes an inhibitory CAR (e.g. iCAR) and includes intracellular components that dampen or suppress an immune response, such as an ITAM- and/or co stimulatory-promoted response in the cell. Exemplary of such intracellular signaling components are those found on immune checkpoint molecules, including PD-1, CTLA4, LAG3, BTLA, OX2R, TIM-3, TIGIT, LAIR-1, PGE2 receptors, EP2/4 Adenosine receptors including A2AR. In some aspects, the engineered cell includes an inhibitory CAR including a signaling domain of or derived from such an inhibitory molecule, such that it serves to dampen the response of the cell, for example, that induced by an activating and/or costimulatory CAR.

In some embodiments, the multi-targeting strategy is employed in a case where an antigen associated with a particular disease or condition is expressed on a non-diseased cell and/or is expressed on the engineered cell itself, either transiently (e.g., upon stimulation in association with genetic engineering) or permanently. In such cases, by requiring ligation of two separate and individually specific antigen receptors, specificity, selectivity, and/or efficacy may be improved.

In some embodiments, the plurality of antigens, e.g., the first and second antigens, are expressed on the cell, tissue, or disease or condition being targeted, such as on the cancer cell. In some aspects, the cell, tissue, disease or condition is multiple myeloma or a multiple myeloma cell. In some embodiments, one or more of the plurality of antigens generally also is expressed on a cell which it is not desired to target with the cell therapy, such as a normal or non-diseased cell or tissue, and/or the engineered cells themselves. In such embodiments, by requiring ligation of multiple receptors to achieve a response of the cell, specificity and/or efficacy is achieved.

B. Nucleic Acids, Vectors and Methods for Genetic Engineering

The recombinant proteins, such as recombinant receptors, are encoded by nucleic acid(s) polynucleotides, including nucleic acids (s) or polynucleotides contained in a vectors or constructs. In some embodiments, the cells, e.g., T cells, are genetically engineered to express a recombinant receptor, for example, using a method in which one or more steps are carried out in the presence of the provided serum-free media. In some embodiments, the engineering is carried out by introducing polynucleotides that encode the recombinant receptor.

In some cases, the nucleic acid sequence encoding the recombinant receptor contains a signal sequence that encodes a signal peptide. In some aspects, the signal sequence may encode a signal peptide derived from a native polypeptide. In other aspects, the signal sequence may encode a heterologous or non-native signal peptide, such as the exemplary signal peptide of the GMCSFR alpha chain set forth in SEQ ID NO:25 and encoded by the nucleotide sequence set forth in SEQ ID NO:24. In some cases, the nucleic acid sequence encoding the recombinant receptor, e.g., chimeric antigen receptor (CAR) contains a signal sequence that encodes a signal peptide. Non-limiting exemplary examples of signal peptides include, for example, the GMCSFR alpha chain signal peptide set forth in SEQ ID NO: 25 and encoded by the nucleotide sequence set forth in SEQ ID NO:24, or the CD8 alpha signal peptide set forth in SEQ ID NO:26.

In some embodiments, the polynucleotide encoding the recombinant receptor contains at least one promoter that is operatively linked to control expression of the recombinant receptor. In some examples, the polynucleotide contains two, three, or more promoters operatively linked to control expression of the recombinant receptor.

In certain cases where nucleic acid molecules encode two or more different polypeptide chains, e.g., a recombinant receptor and a marker, each of the polypeptide chains can be encoded by a separate nucleic acid molecule. For example, two separate nucleic acids are provided, and each can be individually transferred or introduced into the cell for expression in the cell. In some embodiments, the nucleic acid encoding the recombinant receptor and the nucleic acid encoding the marker are operably linked to the same promoter and are optionally separated by an internal ribosome entry site (IRES), or a nucleic acid encoding a self-cleaving peptide or a peptide that causes ribosome skipping, which optionally is a T2A, a P2A, a E2A or a F2A. In some embodiments, the nucleic acids encoding the marker and the nucleic acid encoding the recombinant receptor are operably linked to two different promoters. In some embodiments, the nucleic acid encoding the marker and the nucleic acid encoding the recombinant receptor are present or inserted at different locations within the genome of the cell. In some embodiments, the polynucleotide encoding the recombinant receptor is introduced into a composition containing cultured cells, such as by retroviral transduction, transfection, or transformation.

In some embodiments, such as those where the polynucleotide contains a first and second nucleic acid sequence, the coding sequences encoding each of the different polypeptide chains can be operatively linked to a promoter, which can be the same or different. In some embodiments, the nucleic acid molecule can contain a promoter that drives the expression of two or more different polypeptide chains. In some embodiments, such nucleic acid molecules can be multicistronic (bicistronic or tricistronic, see e.g., U.S. Pat. No. 6,060,273). In some embodiments, transcription units can be engineered as a bicistronic unit containing an IRES (internal ribosome entry site), which allows coexpression of gene products ((e.g. encoding the marker and encoding the recombinant receptor) by a message from a single promoter. Alternatively, in some cases, a single promoter may direct expression of an RNA that contains, in a single open reading frame (ORF), two or three genes (e.g. encoding the marker and encoding the recombinant receptor) separated from one another by sequences encoding a self-cleavage peptide (e.g., 2A sequences) or a protease recognition site (e.g., furin). The ORF thus encodes a single polypeptide, which, either during (in the case of 2A) or after translation, is processed into the individual proteins. In some cases, the peptide, such as a T2A, can cause the ribosome to skip (ribosome skipping) synthesis of a peptide bond at the C-terminus of a 2A element, leading to separation between the end of the 2A sequence and the next peptide downstream (see, for example, de Felipe, Genetic Vaccines and Ther. 2:13 (2004) and de Felipe et al. Traffic 5:616-626 (2004)). Various 2A elements are known. Examples of 2A sequences that can be used in the methods and system disclosed herein, without limitation, 2A sequences from the foot-and-mouth disease virus (F2A, e.g., SEQ ID NO: 21), equine rhinitis A virus (E2A, e.g., SEQ ID NO: 20), *Thosea asigna* virus (T2A, e.g., SEQ ID NO: 6 or 17), and porcine teschovirus-1 (P2A, e.g., SEQ ID NO: 18 or 19) as described in U.S. Patent Publication No. 20070116690.

Any of the recombinant receptors described herein can be encoded by polynucleotides containing one or more nucleic acid sequences encoding recombinant receptors, in any combinations or arrangements. For example, one, two, three or more polynucleotides can encode one, two, three or more different polypeptides, e.g., recombinant receptors. In some embodiments, one vector or construct contains a nucleic acid sequence encoding marker, and a separate vector or construct contains a nucleic acid sequence encoding a recombinant receptor, e.g., CAR. In some embodiments, the nucleic acid encoding the marker and the nucleic acid encoding the recombinant receptor are operably linked to two different promoters. In some embodiments, the nucleic acid encoding the recombinant receptor is present downstream of the nucleic acid encoding the marker.

In some embodiments, the vector backbone contains a nucleic acid sequence encoding one or more marker(s). In some embodiments, the one or more marker(s) is a transduction marker, surrogate marker and/or a selection marker.

In some embodiments, the marker is a transduction marker or a surrogate marker. A transduction marker or a surrogate marker can be used to detect cells that have been introduced with the polynucleotide, e.g., a polynucleotide encoding a recombinant receptor. In some embodiments, the transduction marker can indicate or confirm modification of a cell. In some embodiments, the surrogate marker is a protein that is made to be co-expressed on the cell surface with the recombinant receptor, e.g. CAR. In particular embodiments, such a surrogate marker is a surface protein that has been modified to have little or no activity. In certain embodiments, the surrogate marker is encoded on the same polynucleotide that encodes the recombinant receptor. In some embodiments, the nucleic acid sequence encoding the recombinant receptor is operably linked to a nucleic acid sequence encoding a marker, optionally separated by an internal ribosome entry site (IRES), or a nucleic acid encoding a self-cleaving peptide or a peptide that causes ribosome skipping, such as a 2A sequence, such as a T2A, a P2A, a E2A or a F2A. Extrinsic marker genes may in some cases be utilized in connection with engineered cell to permit detection or selection of cells and, in some cases, also to promote cell suicide.

Exemplary surrogate markers can include truncated forms of cell surface polypeptides such as truncated forms that are non-functional and to not transduce or are not capable of transducing a signal or a signal ordinarily transduced by the full-length form of the cell surface polypeptide, and/or do not or are not capable of internalizing. Exemplary truncated cell surface polypeptides including truncated forms of growth factors or other receptors, such as a truncated human epidermal growth factor receptor 2 (tHER2), a truncated epidermal growth factor receptor (EGFRt, exemplary EGFRt sequence set forth in SEQ ID NO:7 or 16) or a prostate-specific membrane antigen (PSMA) or modified form thereof. EGFRt may contain an epitope recognized by the antibody cetuximab (Erbitux®) or other therapeutic anti-EGFR antibody or binding molecule, which can be used to identify or select cells that have been engineered with the EGFRt construct and a recombinant receptor, such as a chimeric antigen receptor (CAR), and/or to eliminate or separate cells expressing the receptor. See U.S. Pat. No. 8,802,374 and Liu et al., Nature Biotech. 2016 April; 34(4): 430-434). In some aspects, the marker, e.g. surrogate marker, includes all or part (e.g., truncated form) of CD34, a NGFR, a CD19 or a truncated CD19, e.g., a truncated non-human CD19, or epidermal growth factor receptor (e.g., tEGFR). In some embodiments, the nucleic acid encoding the marker is operably linked to a polynucleotide encoding for a linker sequence, such as a cleavable linker sequence, e.g., T2A. For example, a marker, and optionally a linker sequence, can be any as disclosed in PCT Pub. No. WO2014031687. For example, the marker can be a truncated EGFR (tEGFR) that is, optionally, linked to a linker sequence, such as a T2A cleavable linker sequence. An exemplary polypeptide for a truncated EGFR (e.g. tEGFR) comprises the sequence of amino acids set forth in SEQ ID NO: 7 or 16 or a sequence of amino acids that exhibits at least 85%, 86%, 87%, 88%, 89%, 90%, 91%, 92%, 93%, 94%, 95%, 96%, 97%, 98%, 99% or more sequence identity to SEQ ID NO: 7 or 16.

In some embodiments, the marker is or comprises a fluorescent protein, such as green fluorescent protein (GFP), enhanced green fluorescent protein (EGFP), such as superfold GFP, red fluorescent protein (RFP), such as tdTomato, mCherry, mStrawberry, AsRed2, DsRed or DsRed2, cyan fluorescent protein (CFP), blue green fluorescent protein (BFP), enhanced blue fluorescent protein (EBFP), and yellow fluorescent protein (YFP), and variants thereof, including species variants, monomeric variants, and codon-optimized and/or enhanced variants of the fluorescent proteins. In some embodiments, the marker is or comprises an enzyme, such as a luciferase, the lacZ gene from E. coli, alkaline phosphatase, secreted embryonic alkaline phosphatase (SEAP), chloramphenicol acetyl transferase (CAT). Exemplary light-emitting reporter genes include luciferase (luc), β-galactosidase, chloramphenicol acetyltransferase (CAT), β-glucuronidase (GUS) or variants thereof.

In some embodiments, the marker is a selection marker. In some embodiments, the selection marker is or comprises a polypeptide that confers resistance to exogenous agents or drugs. In some embodiments, the selection marker is an antibiotic resistance gene. In some embodiments, the selection marker is an antibiotic resistance gene confers antibiotic resistance to a mammalian cell. In some embodiments, the selection marker is or comprises a Puromycin resistance gene, a Hygromycin resistance gene, a Blasticidin resistance gene, a Neomycin resistance gene, a Geneticin resistance gene or a Zeocin resistance gene or a modified form thereof.

In some embodiments, recombinant nucleic acids are transferred into cells using recombinant infectious virus particles, such as, e.g., vectors derived from simian virus 40 (SV40), adenoviruses, adeno-associated virus (AAV). In some embodiments, recombinant nucleic acids are transferred into T cells using recombinant lentiviral vectors or retroviral vectors, such as gamma-retroviral vectors (see, e.g., Koste et al. (2014) Gene Therapy 2014 Apr. 3. doi: 10.1038/gt.2014.25; Carlens et al. (2000) Exp Hematol 28(10): 1137-46; Alonso-Camino et al. (2013) Mol Ther Nucl Acids 2, e93; Park et al., Trends Biotechnol. 2011 November 29(11): 550-557.

In some embodiments, the retroviral vector has a long terminal repeat sequence (LTR), e.g., a retroviral vector derived from the Moloney murine leukemia virus (MoMLV), myeloproliferative sarcoma virus (MPSV), murine embryonic stem cell virus (MESV), murine stem cell virus (MSCV), or spleen focus forming virus (SFFV). Most retroviral vectors are derived from murine retroviruses. In some embodiments, the retroviruses include those derived from any avian or mammalian cell source. The retroviruses typically are amphotropic, meaning that they are capable of infecting host cells of several species, including humans. In one embodiment, the gene to be expressed replaces the retroviral gag, pol and/or env sequences. A number of illustrative retroviral systems have been described (e.g., U.S. Pat. Nos. 5,219,740; 6,207,453; 5,219,740; Miller and Rosman (1989) BioTechniques 7:980-990; Miller, A. D. (1990) Human Gene Therapy 1:5-14; Scarpa et al. (1991) Virology 180:849-852; Burns et al. (1993) Proc. Natl. Acad. Sci. USA 90:8033-8037; and Boris-Lawrie and Temin (1993) Cur. Opin. Genet. Develop. 3:102-109.

Methods of lentiviral transduction are known. Exemplary methods are described in, e.g., Wang et al. (2012) J. Immunother. 35(9): 689-701; Cooper et al. (2003) Blood. 101: 1637-1644; Verhoeyen et al. (2009) Methods Mol Biol. 506: 97-114; and Cavalieri et al. (2003) Blood. 102(2): 497-505.

In some embodiments, recombinant nucleic acids are transferred into T cells via electroporation (see, e.g., Chicaybam et al, (2013) PLoS ONE 8(3): e60298 and Van Tedeloo et al. (2000) Gene Therapy 7(16): 1431-1437). In some embodiments, recombinant nucleic acids are transferred into T cells via transposition (see, e.g., Manuri et al. (2010) Hum Gene Ther 21(4): 427-437; Sharma et al. (2013) Molec Ther Nucl Acids 2, e74; and Huang et al. (2009) Methods Mol Biol 506: 115-126). Other methods of introducing and expressing genetic material in immune cells include calcium phosphate transfection (e.g., as described in Current Protocols in Molecular Biology, John Wiley & Sons, New York. N.Y.), protoplast fusion, cationic liposome-mediated transfection; tungsten particle-facilitated microparticle bombardment (Johnston, Nature, 346: 776-777 (1990)); and strontium phosphate DNA co-precipitation (Brash et al., Mol. Cell Biol., 7: 2031-2034 (1987)).

Other approaches and vectors for transfer of the nucleic acids encoding the recombinant products are those described, e.g., in international patent application, Publication No.: WO2014055668, and U.S. Pat. No. 7,446,190.

In some embodiments, the cells, e.g., T cells, may be transfected either during or after expansion e.g. with a T cell receptor (TCR) or a chimeric antigen receptor (CAR). This transfection for the introduction of the gene of the desired receptor can be carried out with any suitable retroviral vector, for example. The genetically modified cell population can then be liberated from the initial stimulus (the anti-CD3/anti-CD28 stimulus, for example) and subsequently be stimulated with a second type of stimulus e.g. via a de novo introduced receptor). This second type of stimulus may include an antigenic stimulus in form of a peptide/MHC molecule, the cognate (cross-linking) ligand of the genetically introduced receptor (e.g. natural ligand of a CAR) or any ligand (such as an antibody) that directly binds within the framework of the new receptor (e.g. by recognizing constant regions within the receptor). See, for example, Cheadle et al, "Chimeric antigen receptors for T-cell based therapy" Methods Mol Biol. 2012; 907:645-66 or Barrett et al., Chimeric Antigen Receptor Therapy for Cancer Annual Review of Medicine Vol. 65: 333-347 (2014).

In some cases, a vector may be used that does not require that the cells, e.g., T cells, are activated. In some such instances, the cells may be selected and/or transduced prior to activation. Thus, the cells may be engineered prior to, or subsequent to culturing of the cells, and in some cases at the same time as or during at least a portion of the culturing.

Among additional nucleic acids, e.g., genes for introduction are those to improve the efficacy of therapy, such as by promoting viability and/or function of transferred cells; genes to provide a genetic marker for selection and/or evaluation of the cells, such as to assess in vivo survival or localization; genes to improve safety, for example, by making the cell susceptible to negative selection in vivo as described by Lupton S. D. et al., *Mol. and Cell Biol.,* 11:6 (1991); and Riddell et al., *Human Gene Therapy* 3:319-338 (1992); see also the publications of PCT/US91/08442 and PCT/US94/05601 by Lupton et al. describing the use of bifunctional selectable fusion genes derived from fusing a dominant positive selectable marker with a negative selectable marker. See, e.g., Riddell et al., U.S. Pat. No. 6,040,177, at columns 14-17.

IV. METHODS OF TREATMENT

In some embodiments, one or more compositions containing genetically engineered cells, such as those manufactured or produced in the presence of serum-free media as provided herein, are administered as a cell therapy, e.g., an adoptive cell therapy. The engineered cells are useful in a variety of therapeutic, diagnostic and prophylactic indications. For example, the engineered cells or compositions comprising the engineered cells are useful in treating a variety of diseases and disorders in a subject. Such methods and uses include therapeutic methods and uses, for example, involving administration of the engineered cells, or compositions containing the same, to a subject having a disease, condition, or disorder, such as a tumor or cancer. In some embodiments, the engineered cells or compositions comprising the same are administered in an effective amount to effect treatment of the disease or disorder. Uses include uses of the engineered cells or compositions in such methods and treatments, and in the preparation of a medicament in order to carry out such therapeutic methods. In some embodiments, the methods are carried out by administering the engineered cells, or compositions comprising the same, to the subject having or suspected of having the disease or condition. In some embodiments, the methods thereby treat the disease or condition or disorder in the subject.

Methods for administration of cells for adoptive cell therapy are known and may be used in connection with the provided methods and compositions. For example, adoptive T cell therapy methods are described, e.g., in US Patent Application Publication No. 2003/0170238 to Gruenberg et al; U.S. Pat. No. 4,690,915 to Rosenberg; Rosenberg (2011) Nat Rev Clin Oncol. 8(10):577-85). See, e.g., Themeli et al. (2013) Nat Biotechnol. 31(10): 928-933; Tsukahara et al. (2013) Biochem Biophys Res Commun 438(1): 84-9; Davila et al. (2013) PLoS ONE 8(4): e61338. The disease or condition that is treated can be any in which expression of an antigen is associated with and/or involved in the etiology of a disease condition or disorder, e.g. causes, exacerbates or otherwise is involved in such disease, condition, or disorder. Exemplary diseases and conditions can include diseases or conditions associated with malignancy or transformation of cells (e.g. cancer), autoimmune or inflammatory disease, or an infectious disease, e.g. caused by a bacterial, viral or other pathogen. Exemplary antigens, which include antigens associated with various diseases and conditions that can be treated, are described above. In particular embodiments, the chimeric antigen receptor or transgenic TCR specifically binds to an antigen associated with the disease or condition.

Among the diseases, conditions, and disorders are tumors, including solid tumors, hematologic malignancies, and melanomas, and including localized and metastatic tumors, infectious diseases, such as infection with a virus or other pathogen, e.g., HIV, HCV, HBV, CMV, HPV, and parasitic disease, and autoimmune and inflammatory diseases. In some embodiments, the disease, disorder or condition is a tumor, cancer, malignancy, neoplasm, or other proliferative disease or disorder. Such diseases include but are not limited to leukemia, lymphoma, e.g., acute myeloid (or myelogenous) leukemia (AML), chronic myeloid (or myelogenous) leukemia (CML), acute lymphocytic (or lymphoblastic) leukemia (ALL), chronic lymphocytic leukemia (CLL), hairy cell leukemia (HCL), small lymphocytic lymphoma (SLL), Mantle cell lymphoma (MCL), Marginal zone lymphoma, Burkitt lymphoma, Hodgkin lymphoma (HL), non-Hodgkin lymphoma (NHL), Anaplastic large cell lymphoma (ALCL), follicular lymphoma, refractory follicular lymphoma, diffuse large B-cell lymphoma (DLBCL) and multiple myeloma (MM). In some embodiments, disease or condition is a B cell malignancy selected from among acute lymphoblastic leukemia (ALL), adult ALL, chronic lymphoblastic leukemia (CLL), non-Hodgkin lymphoma (NHL), and Diffuse Large B-Cell Lymphoma (DLBCL). In some embodiments, the disease or condition is NHL and the NHL is selected from the group consisting of aggressive NHL, diffuse large B cell lymphoma (DLBCL), NOS (de novo and transformed from indolent), primary mediastinal large B cell lymphoma (PMBCL), T cell/histocyte-rich large B cell lymphoma (TCHRBCL), Burkitt's lymphoma, mantle cell lymphoma (MCL), and/or follicular lymphoma (FL) optionally, follicular lymphoma Grade 3B (FL3B).

In some embodiments, the disease or condition is an infectious disease or condition, such as, but not limited to, viral, retroviral, bacterial, and protozoal infections, immunodeficiency, Cytomegalovirus (CMV), Epstein-Barr virus (EBV), adenovirus, BK polyomavirus. In some embodiments, the disease or condition is an autoimmune or inflammatory disease or condition, such as arthritis, e.g., rheumatoid arthritis (RA), Type I diabetes, systemic lupus erythematosus (SLE), inflammatory bowel disease, psoriasis, scleroderma, autoimmune thyroid disease, Grave's disease, Crohn's disease, multiple sclerosis, asthma, and/or a disease or condition associated with transplant.

In some embodiments, the antigen associated with the disease or disorder or includes αvβ6 integrin (avb6 integrin), B cell maturation antigen (BCMA), B7-H3, B7-H6, carbonic anhydrase 9 (CA9, also known as CAIX or G250), a cancer-testis antigen, cancer/testis antigen 1B (CTAG, also known as NY-ESO-1 and LAGE-2), carcinoembryonic antigen (CEA), a cyclin, cyclin A2, C—C Motif Chemokine Ligand 1 (CCL-1), CD19, CD20, CD22, CD23, CD24, CD30, CD33, CD38, CD44, CD44v6, CD44v7/8, CD123, CD133, CD138, CD171, chondroitin sulfate proteoglycan 4 (CSPG4), epidermal growth factor protein (EGFR), type III epidermal growth factor receptor mutation (EGFR vIII), epithelial glycoprotein 2 (EPG-2), epithelial glycoprotein 40 (EPG-40), ephrinB2, ephrin receptor A2 (EPHa2), estrogen receptor, Fc receptor like 5 (FCRL5; also known as Fc receptor homolog 5 or FCRH5), fetal acetylcholine receptor (fetal AchR), a folate binding protein (FBP), folate receptor alpha, ganglioside GD2, O-acetylated GD2 (OGD2), ganglioside GD3, glycoprotein 100 (gp100), glypican-3 (GPC3), G protein-coupled receptor class C group 5 member D (GPRC5D), Her2/neu (receptor tyrosine kinase erbB2), Her3 (erb-B3), Her4 (erb-B4), erbB dimers, Human high molecular weight-melanoma-associated antigen (HMW-MAA), hepatitis B surface antigen, Human leukocyte antigen A1 (HLA-A1), Human leukocyte antigen A2 (HLA-A2), IL-22 receptor alpha (IL-22Rα), IL-13 receptor alpha 2 (IL-13Rα2), kinase insert domain receptor (kdr), kappa light chain, L1 cell adhesion molecule (L1-CAM), CE7 epitope of L1-CAM, Leucine Rich Repeat Containing 8 Family Member A (LRRC8A), Lewis Y, Melanoma-associated antigen (MAGE)-A1, MAGE-A3, MAGE-A6, MAGE-A10, mesothelin (MSLN), c-Met, murine cytomegalovirus (CMV), mucin 1 (MUC1), MUC16, natural killer group 2 member D (NKG2D) ligands, melan A (MART-1), neural cell adhesion molecule (NCAM), oncofetal antigen, Preferentially expressed antigen of melanoma (PRAME), progesterone receptor, a prostate specific antigen, prostate stem cell antigen (PSCA), prostate specific membrane antigen (PSMA), Receptor Tyrosine Kinase Like Orphan Receptor 1 (ROR1), survivin, Trophoblast glycoprotein (TPBG also known as 5T4), tumor-associated glycoprotein 72 (TAG72), Tyrosinase related protein 1 (TRP1, also known as TYRP1 or gp75), Tyrosinase related protein 2 (TRP2, also known as dopachrome tautomerase, dopachrome delta-isomerase or DCT), vascular endothelial growth factor receptor (VEGFR), vascular endothelial growth factor receptor 2 (VEGFR2), Wilms Tumor 1 (WT-1), a pathogen-specific or pathogen-expressed antigen, or an antigen associated with a universal tag, and/or biotinylated molecules, and/or molecules expressed by HIV, HCV, HBV or other pathogens. Antigens targeted by the receptors in some embodiments include antigens associated with a B cell malignancy, such as any of a number of known B cell marker. In some embodiments, the antigen is or includes CD20, CD19, CD22, ROR1, CD45, CD21, CD5, CD33, Igkappa, Iglambda, CD79a, CD79b or CD30.

In some embodiments, the disease or condition is a B cell malignancy. In some embodiments, the B cell malignancy is a leukemia or a lymphoma. In some aspects, the disease or condition is acute lymphoblastic leukemia (ALL), adult ALL, chronic lymphoblastic leukemia (CLL), non-Hodgkin lymphoma (NHL), or Diffuse Large B-Cell Lymphoma (DLBCL). In some cases, the disease or condition is an NHL, such as or including an NHL that is an aggressive NHL, diffuse large B cell lymphoma (DLBCL), NOS (de novo and transformed from indolent), primary mediastinal large B cell lymphoma (PMBCL), T cell/histocyte-rich large B cell lymphoma (TCHRBCL), Burkitt's lymphoma, mantle cell lymphoma (MCL), and/or follicular lymphoma (FL), optionally, follicular lymphoma Grade 3B (FL3B). In some aspects, the recombinant receptor, such as a CAR, specifically binds to an antigen associated with the disease or condition or expressed in cells of the environment of a lesion associated with the B cell malignancy. Antigens targeted by the receptors in some embodiments include antigens associated with a B cell malignancy, such as any of a number of known B cell marker. In some embodiments, the antigen targeted by the receptor is CD20, CD19, CD22, ROR1, CD45, CD21, CD5, CD33, Igkappa, Iglambda, CD79a, CD79b or CD30, or combinations thereof.

In some embodiments, the disease or condition is a myeloma, such as a multiple myeloma. In some aspects, the recombinant receptor, such as a CAR, specifically binds to an antigen associated with the disease or condition or expressed in cells of the environment of a lesion associated with the multiple myeloma. Antigens targeted by the receptors in some embodiments include antigens associated with multiple myeloma. In some aspects, the antigen, e.g., the second or additional antigen, such as the disease-specific antigen and/or related antigen, is expressed on multiple myeloma, such as B cell maturation antigen (BCMA), G protein-coupled receptor class C group 5 member D (GPRC5D), CD38 (cyclic ADP ribose hydrolase), CD138 (syndecan-1, syndecan, SYN-1), CS-1 (CS1, CD2 subset 1, CRCC, SLAMF7, CD319, and 19A24), BAFF-R, TACI and/or FcRH5. Other exemplary multiple myeloma antigens include CD56, TIM-3, CD33, CD123, CD44, CD20, CD40, CD74, CD200, EGFR, β2-Microglobulin, HM1.24, IGF-1R, IL-6R, TRAIL-R1, and the activin receptor type IIA (ActRIIA). See Benson and Byrd, J. Clin. Oncol. (2012) 30(16): 2013-15; Tao and Anderson, Bone Marrow Research (2011): 924058; Chu et al., Leukemia (2013) 28(4):917-27; Garfall et al., Discov Med. (2014) 17(91):37-46. In some embodiments, the antigens include those present on lymphoid tumors, myeloma, AIDS-associated lymphoma, and/or post-transplant lymphoproliferations, such as CD38. Antibodies or antigen-binding fragments directed against such antigens are known and include, for example, those described in U.S. Pat. Nos. 8,153,765; 8,603,477, 8,008,450; U.S. Pub. No. US20120189622 or US20100260748; and/or International PCT Publication Nos. WO2006099875, WO2009080829 or WO2012092612 or WO2014210064. In some embodiments, such antibodies or antigen-binding fragments thereof (e.g. scFv) are contained in multispecific antibodies, multispecific chimeric receptors, such as multispecific CARs, and/or multispecific cells.

In some embodiments, the antigen is or includes a pathogen-specific or pathogen-expressed antigen. In some embodiments, the antigen is a viral antigen (such as a viral antigen from HIV, HCV, HBV, etc.), bacterial antigens, and/or parasitic antigens.

In some embodiments, the cell therapy, e.g., adoptive T cell therapy, is carried out by autologous transfer, in which the cells are isolated and/or otherwise prepared from the subject who is to receive the cell therapy, or from a sample derived from such a subject. Thus, in some aspects, the cells are derived from a subject, e.g., patient, in need of a treatment and the cells, following isolation and processing are administered to the same subject.

In some embodiments, the cell therapy, e.g., adoptive T cell therapy, is carried out by allogeneic transfer, in which the cells are isolated and/or otherwise prepared from a subject other than a subject who is to receive or who ultimately receives the cell therapy, e.g., a first subject. In such embodiments, the cells then are administered to a different subject, e.g., a second subject, of the same species. In some embodiments, the first and second subjects are genetically identical. In some embodiments, the first and second subjects are genetically similar. In some embodiments, the second subject expresses the same HLA class or supertype as the first subject.

The cells can be administered by any suitable means, for example, by bolus infusion, by injection, e.g., intravenous or subcutaneous injections, intraocular injection, periocular injection, subretinal injection, intravitreal injection, transseptal injection, subscleral injection, intrachoroidal injection, intracameral injection, subconjectval injection, subconjuntival injection, sub-Tenon's injection, retrobulbar injection, peribulbar injection, or posterior juxtascleral delivery. In some embodiments, they are administered by parenteral, intrapulmonary, and intranasal, and, if desired for local treatment, intralesional administration. Parenteral infusions include intramuscular, intravenous, intraarterial, intraperitoneal, or subcutaneous administration. In some embodiments, a given dose is administered by a single bolus administration of the cells. In some embodiments, it is administered by multiple bolus administrations of the cells, for example, over a period of no more than 3 days, or by continuous infusion administration of the cells. In some embodiments, administration of the cell dose or any additional therapies, e.g., the lymphodepleting therapy, intervention therapy and/or combination therapy, is carried out via outpatient delivery.

For the prevention or treatment of disease, the appropriate dosage may depend on the type of disease to be treated, the type of cells or recombinant receptors, the severity and course of the disease, whether the cells are administered for preventive or therapeutic purposes, previous therapy, the subject's clinical history and response to the cells, and the discretion of the attending physician. The compositions and cells are in some embodiments suitably administered to the subject at one time or over a series of treatments.

In some embodiments, the cells are administered as part of a combination treatment, such as simultaneously with or sequentially with, in any order, another therapeutic intervention, such as an antibody or engineered cell or receptor or agent, such as a cytotoxic or therapeutic agent. The cells in some embodiments are co-administered with one or more additional therapeutic agents or in connection with another therapeutic intervention, either simultaneously or sequentially in any order. In some contexts, the cells are co-administered with another therapy sufficiently close in time such that the cell populations enhance the effect of one or more additional therapeutic agents, or vice versa. In some embodiments, the cells are administered prior to the one or more additional therapeutic agents. In some embodiments, the cells are administered after the one or more additional therapeutic agents. In some embodiments, the one or more additional agents include a cytokine, such as IL-2, for example, to enhance persistence. In some embodiments, the methods comprise administration of a chemotherapeutic agent.

In some embodiments, the methods comprise administration of a chemotherapeutic agent, e.g., a conditioning chemotherapeutic agent, for example, to reduce tumor burden prior to the administration.

Preconditioning subjects with immunodepleting (e.g., lymphodepleting) therapies in some aspects can improve the effects of adoptive cell therapy (ACT).

Thus, in some embodiments, the methods include administering a preconditioning agent, such as a lymphodepleting or chemotherapeutic agent, such as cyclophosphamide, fludarabine, or combinations thereof, to a subject prior to the initiation of the cell therapy. For example, the subject may be administered a preconditioning agent at least 2 days prior, such as at least 3, 4, 5, 6, or 7 days prior, to the initiation of the cell therapy. In some embodiments, the subject is administered a preconditioning agent no more than 7 days prior, such as no more than 6, 5, 4, 3, or 2 days prior, to the initiation of the cell therapy.

In some embodiments, the subject is preconditioned with cyclophosphamide at a dose between or between about 20 mg/kg and 100 mg/kg, such as between or between about 40 mg/kg and 80 mg/kg. In some aspects, the subject is preconditioned with or with about 60 mg/kg of cyclophosphamide. In some embodiments, the cyclophosphamide can be administered in a single dose or can be administered in a plurality of doses, such as given daily, every other day or every three days. In some embodiments, the cyclophosphamide is administered once daily for one or two days. In some embodiments, where the lymphodepleting agent comprises cyclophosphamide, the subject is administered cyclophosphamide at a dose between or between about 100 mg/m2 and 500 mg/m$^2$, such as between or between about 200 mg/m$^2$ and 400 mg/m2 or 250 mg/m2 and 350 mg/m$^2$, inclusive. In some instances, the subject is administered about 300 mg/m$^2$ of cyclophosphamide. In some embodiments, the cyclophosphamide can be administered in a single dose or can be administered in a plurality of doses, such as given daily, every other day or every three days. In some embodiments, cyclophosphamide is administered daily, such as for 1-5 days, for example, for 3 to 5 days. In some instances, the subject is administered about 300 mg/m$^2$ of cyclophosphamide, daily for 3 days, prior to initiation of the cell therapy.

In some embodiments, where the lymphodepleting agent comprises fludarabine, the subject is administered fludarabine at a dose between or between about 1 mg/m$^2$ and 100 mg/m2, such as between or between about 10 mg/m2 and 75 mg/m$^2$, 15 mg/m$^2$ and 50 mg/m$^2$, 20 mg/m$^2$ and 40 mg/m$^2$, or 24 mg/m$^2$ and 35 mg/m$^2$, inclusive. In some instances, the subject is administered about 30 mg/m$^2$ of fludarabine. In some embodiments, the fludarabine can be administered in a single dose or can be administered in a plurality of doses, such as given daily, every other day or every three days. In some embodiments, fludarabine is administered daily, such as for 1-5 days, for example, for 3 to 5 days. In some instances, the subject is administered about 30 mg/m$^2$ of fludarabine, daily for 3 days, prior to initiation of the cell therapy.

In some embodiments, the lymphodepleting agent comprises a combination of agents, such as a combination of cyclophosphamide and fludarabine. Thus, the combination of agents may include cyclophosphamide at any dose or administration schedule, such as those described above, and fludarabine at any dose or administration schedule, such as those described above. For example, in some aspects, the subject is administered 60 mg/kg (~2 g/m$^2$) of cyclophosphamide and 3 to 5 doses of 25 mg/m$^2$ fludarabine prior to the first or subsequent dose.

Following administration of the cells, the biological activity of the engineered cell populations in some embodiments is measured, e.g., by any of a number of known methods. Parameters to assess include specific binding of an engineered or natural T cell or other immune cell to antigen, in vivo, e.g., by imaging, or ex vivo, e.g., by ELISA or flow cytometry. In certain embodiments, the ability of the engineered cells to destroy target cells can be measured using any suitable known methods, such as cytotoxicity assays described in, for example, Kochenderfer et al., J. Immunotherapy, 32(7): 689-702 (2009), and Herman et al. J. Immunological Methods, 285(1): 25-40 (2004). In certain embodiments, the biological activity of the cells is measured by assaying expression and/or secretion of one or more cytokines, such as CD107a, IFNγ, IL-2, and TNF. In some aspects the biological activity is measured by assessing clinical outcome, such as reduction in tumor burden or load.

In certain embodiments, the engineered cells are further modified in any number of ways, such that their therapeutic or prophylactic efficacy is increased. For example, the engineered CAR or TCR expressed by the population can be conjugated either directly or indirectly through a linker to a targeting moiety. The practice of conjugating compounds, e.g., the CAR or TCR, to targeting moieties is known. See, for instance, Wadwa et al., J. Drug Targeting 3: 1 1 1 (1995), and U.S. Pat. No. 5,087,616.

In some embodiments, the cells are administered as part of a combination treatment, such as simultaneously with or sequentially with, in any order, another therapeutic intervention, such as an antibody or engineered cell or receptor or agent, such as a cytotoxic or therapeutic agent. The cells in some embodiments are co-administered with one or more additional therapeutic agents or in connection with another therapeutic intervention, either simultaneously or sequentially in any order. In some contexts, the cells are co-administered with another therapy sufficiently close in time such that the cell populations enhance the effect of one or more additional therapeutic agents, or vice versa. In some embodiments, the cells are administered prior to the one or more additional therapeutic agents. In some embodiments, the cells are administered after the one or more additional therapeutic agents. In some embodiments, the one or more additional agent includes a cytokine, such as IL-2, for example, to enhance persistence.

A. Dosing

In some embodiments, a dose of cells is administered to subjects in accord with the provided methods, and/or with the provided articles of manufacture or compositions. In some embodiments, the size or timing of the doses is determined as a function of the particular disease or condition in the subject. In some cases, the size or timing of the doses for a particular disease in view of the provided description may be empirically determined.

In some embodiments, the dose of cells comprises between at or about $2\times10^5$ of the cells/kg and at or about $2\times10^6$ of the cells/kg, such as between at or about $4\times10^5$ of the cells/kg and at or about $1\times10^6$ of the cells/kg or between at or about $6\times10^5$ of the cells/kg and at or about $8\times10^5$ of the cells/kg. In some embodiments, the dose of cells comprises no more than $2\times10^5$ of the cells (e.g. antigen-expressing, such as CAR-expressing cells) per kilogram body weight of the subject (cells/kg), such as no more than at or about $3\times10^5$ cells/kg, no more than at or about $4\times10^5$ cells/kg, no more than at or about $5\times10^5$ cells/kg, no more than at or about $6\times10^5$ cells/kg, no more than at or about $7\times10^5$ cells/kg, no more than at or about $8\times10^5$ cells/kg, no more than at or about $9\times10^5$ cells/kg, no more than at or about $1\times10^8$ cells/kg, or no more than at or about $2\times10^6$ cells/kg. In some embodiments, the dose of cells comprises at least or at least about or at or about $2\times10^5$ of the cells (e.g. antigen-expressing, such as CAR-expressing cells) per kilogram body weight of the subject (cells/kg), such as at least or at least about or at or about $3\times10^5$ cells/kg, at least or at least about or at or about $4\times10^5$ cells/kg, at least or at least about or at or about $5\times10^5$ cells/kg, at least or at least about or at or about $6\times10^5$ cells/kg, at least or at least about or at or about $7\times10^5$ cells/kg, at least or at least about or at or about $8\times10^5$ cells/kg, at least or at least about or at or about $9\times10^5$ cells/kg, at least or at least about or at or about $1\times10^6$ cells/kg, or at least or at least about or at or about $2\times10^6$ cells/kg.

In certain embodiments, the cells, or individual populations of sub-types of cells, are administered to the subject at a range of at or about 0.1 million to at or about 100 billion cells and/or that amount of cells per kilogram of body weight of the subject, such as, e.g., at or about 0.1 million to at or about 50 billion cells (e.g., at or about 5 million cells, at or about 25 million cells, at or about 500 million cells, at or about 1 billion cells, at or about 5 billion cells, at or about 20 billion cells, at or about 30 billion cells, at or about 40 billion cells, or a range defined by any two of the foregoing values), at or about 1 million to at or about 50 billion cells (e.g., at or about 5 million cells, at or about 25 million cells, at or about 500 million cells, at or about 1 billion cells, at or about 5 billion cells, at or about 20 billion cells, at or about 30 billion cells, at or about 40 billion cells, or a range defined by any two of the foregoing values), such as at or about 10 million to at or about 100 billion cells (e.g., at or about 20 million cells, at or about 30 million cells, at or about 40 million cells, at or about 60 million cells, at or about 70 million cells, at or about 80 million cells, at or about 90 million cells, at or about 10 billion cells, at or about 25 billion cells, at or about 50 billion cells, at or about 75 billion cells, at or about 90 billion cells, or a range defined by any two of the foregoing values), and in some cases at or about 100 million cells to at or about 50 billion cells (e.g., at or about 120 million cells, at or about 250 million cells, at or about 350 million cells, at or about 650 million cells, at or about 800 million cells, at or about 900 million cells, at or about 3 billion cells, at or about 30 billion cells, at or about 45 billion cells) or any value in between these ranges and/or per kilogram of body weight of the subject. Dosages may vary depending on attributes particular to the disease or disorder and/or patient and/or other treatments. In some embodiments, such values refer to numbers of recombinant receptor-expressing cells; in other embodiments, they refer to number of T cells or PBMCs or total cells administered.

In some embodiments, for example, where the subject is a human, the dose includes fewer than about $5\times10^8$ total recombinant receptor (e.g., CAR)-expressing cells, T cells, or peripheral blood mononuclear cells (PBMCs), e.g., in the range of at or about $1\times10^6$ to at or about $5\times10^8$ such cells, such as at or about $2\times10^6$, $5\times10^6$, $1\times10^7$, $5\times10^7$, $1\times10^8$, $1.5\times10^8$, or $5\times10^8$ total such cells, or the range between any two of the foregoing values. In some embodiments, for example, where the subject is a human, the dose includes more than at or about $1\times10^6$ total recombinant receptor (e.g., CAR)-expressing cells, T cells, or peripheral blood mononuclear cells (PBMCs) and fewer than at or about $2\times10^9$ total recombinant receptor (e.g., CAR)-expressing cells, T cells, or peripheral blood mononuclear cells (PBMCs), e.g., in the range of at or about $2.5\times10^7$ to at or about $1.2\times10^9$ such cells, such as at or about $2.5\times10^7$, $5\times10^7$, $1\times10^8$, $1.5\times10^8$, $8\times10^8$, or $1.2\times10^9$ total such cells, or the range between any two of the foregoing values.

In some embodiments, the dose of genetically engineered cells comprises from at or about $1\times10^5$ to at or about $5\times10^8$ total CAR-expressing (CAR$^+$) T cells, from at or about $1\times10^5$ to at or about $2.5\times10^8$ total CAR-expressing T cells, from at or about $1\times10^5$ to at or about $1\times10^8$ total CAR-expressing T cells, from at or about $1\times10^5$ to at or about $5\times10^7$ total CAR-expressing T cells, from at or about $1\times10^5$ to at or about $2.5\times10^7$ total CAR-expressing T cells, from at or about $1\times10^5$ to at or about $1\times10^7$ total CAR-expressing T cells, from at or about $1\times10^5$ to at or about $5\times10^6$ total CAR-expressing T cells, from at or about $1\times10^5$ to at or about $2.5\times10^6$ total CAR-expressing T cells, from at or about $1\times10^5$ to at or about $1\times10^6$ total CAR-expressing T cells, from at or about $1\times10^6$ to at or about $5\times10^8$ total CAR-expressing T cells, from at or about $1\times10^6$ to at or about $2.5\times10^8$ total CAR-expressing T cells, from at or about $1\times10^6$ to at or about $1\times10^8$ total CAR-expressing T cells, from at or about $1\times10^6$ to at or about $5\times10^7$ total CAR-expressing T cells, from at or about $1\times10^6$ to at or about $2.5\times10^7$ total CAR-expressing T cells, from at or about $1\times10^6$ to at or about $1\times10^7$ total CAR-expressing T cells, from at or about $1\times10^6$ to at or about $5\times10^6$ total CAR-expressing T cells, from at or about $1\times10^6$ to at or about $2.5\times10^6$ total CAR-expressing T cells, from at or about $2.5\times10^6$ to at or about $5\times10^8$ total CAR-expressing T cells, from at or about $2.5\times10^6$ to at or about $2.5\times10^8$ total CAR-expressing T cells, from at or about $2.5\times10^6$ to at or about $1\times10^8$ total CAR-expressing T cells, from at or about $2.5\times10^6$ to at or about $5\times10^7$ total CAR-expressing T cells, from at or about $2.5\times10^6$ to at or about $2.5\times10^7$ total CAR-expressing T cells, from at or about $2.5\times10^6$ to at or about $1\times10^7$ total CAR-expressing T cells, from at or about $2.5\times10^6$ to at or about $5\times10^6$ total CAR-expressing T cells, from at or about $5\times10^6$ to at or about $5\times10^8$ total CAR-expressing T cells, from at or about $5\times10^6$ to at or about $2.5\times10^8$ total CAR-expressing T cells, from at or about $5\times10^6$ to at or about $1\times10^8$ total CAR-expressing T cells, from at or about $5\times10^6$ to at or about $5\times10^7$ total CAR-expressing T cells, from at or about $5\times10^6$ to at or about $2.5\times10^7$ total CAR-expressing T cells, from at or about $5\times10^6$ to at or about $1\times10^7$ total CAR-expressing T cells, from at or about $1\times10^7$ to at or about $5\times10^8$ total CAR-expressing T cells, from at or about $1\times10^7$ to at or about $2.5\times10^8$ total CAR-expressing T cells, from at or about $1\times10^7$ to at or about $1\times10^8$ total CAR-expressing T cells, from at or about $1\times10^7$ to at or about $5\times10^7$ total CAR-expressing T cells, from at or about $1\times10^7$ to at or about $2.5\times10^7$ total CAR-expressing T cells, from at or about $2.5\times10^7$ to at or about $5\times10^8$ total CAR-expressing T cells, from at or about $2.5\times10^7$ to at or about $2.5\times10^8$ total CAR-expressing T cells, from at or about $2.5\times10^7$ to at or about $1\times10^8$ total CAR-expressing T cells, from at or about $2.5\times10^7$ to at or about $5\times10^7$ total CAR-expressing T cells, from at or about $5\times10^7$ to at or about $5\times10^8$ total CAR-expressing T cells, from at or about $5\times10^7$ to at or about $2.5\times10^8$ total CAR-expressing T cells, from at or about $5\times10^7$ to at or about $1\times10^8$ total CAR-expressing T cells, from at or about $1\times10^8$ to at or about $5\times10^8$ total CAR-expressing T cells, from at or about $1\times10^8$ to at or about $2.5\times10^8$ total CAR-expressing T cells, from at or about $2.5\times10^8$ to at or about $5\times10^8$ total CAR-expressing T cells. In some embodiments, the dose of genetically engineered cells comprises from or from about $2.5\times10^7$ to at or about $1.5\times10^8$ total CAR-expressing T cells, such as from or from about $5\times10^7$ to or to about $1\times10^8$ total CAR-expressing T cells.

In some embodiments, the dose of genetically engineered cells comprises at least at or about $1\times10^5$ CAR-expressing cells, at least at or about $2.5\times10^5$ CAR-expressing cells, at least at or about $5\times10^5$ CAR-expressing cells, at least at or about $1\times10^6$ CAR-expressing cells, at least at or about $2.5\times10^6$ CAR-expressing cells, at least at or about $5\times10^6$ CAR-expressing cells, at least at or about $1\times10^7$ CAR-expressing cells, at least at or about $2.5\times10^7$ CAR-expressing cells, at least at or about $5\times10^7$ CAR-expressing cells, at least at or about $1\times10^8$ CAR-expressing cells, at least at or about $1.5\times10^8$ CAR-expressing cells, at least at or about $2.5\times10^8$ CAR-expressing cells, or at least at or about $5\times10^8$ CAR-expressing cells.

In some embodiments, the cell therapy comprises administration of a dose comprising a number of cell from or from about $1\times10^5$ to or to about $5\times10^8$ total recombinant receptor-expressing cells, total T cells, or total peripheral blood mononuclear cells (PBMCs), from or from about $5\times10^5$ to or to about $1\times10^7$ total recombinant receptor-expressing cells, total T cells, or total peripheral blood mononuclear cells (PBMCs) or from or from about $1\times10^6$ to or to about $1\times10^7$ total recombinant receptor-expressing cells, total T cells, or total peripheral blood mononuclear cells (PBMCs), each inclusive. In some embodiments, the cell therapy comprises administration of a dose of cells comprising a number of cells at least or at least about $1\times10^5$ total recombinant receptor-expressing cells, total T cells, or total peripheral blood mononuclear cells (PBMCs), such at least or at least $1\times10^6$, at least or at least about $1\times10^7$, at least or at least about $1\times10^8$ of such cells. In some embodiments, the number is with reference to the total number of CD3$^+$ or CD8$^+$, in some cases also recombinant receptor-expressing (e.g. CAR$^+$) cells. In some embodiments, the cell therapy comprises administration of a dose comprising a number of cell from or from about $1\times10^5$ to or to about $5\times10^8$ CD3$^+$ or CD8$^+$ total T cells or CD3$^+$ or CD8$^+$ recombinant receptor-expressing cells, from or from about $5\times10^5$ to or to about $1\times10^7$ CD3$^+$ or CD8$^+$ total T cells or CD3$^+$ or CD8$^+$ recombinant receptor-expressing cells, or from or from about $1\times10^6$ to or to about $1\times10^7$ CD3$^+$ or CD8$^+$ total T cells or CD3$^+$ or CD8$^+$ recombinant receptor-expressing cells, each inclusive. In some embodiments, the cell therapy comprises administration of a dose comprising a number of cell from or from about $1\times10^5$ to or $5\times10^8$ total CD3$^+$/CAR$^+$ or CD8$^+$/CAR$^+$ cells, from or from about $5\times10^5$ to or to about $1\times10^7$ total CD3$^+$/CAR$^+$ or CD8$^+$/CAR$^+$ cells, or from or from about $1\times10^6$ to or to about $1\times10^7$ total CD3$^+$/CAR$^+$ or CD8$^+$/CAR$^+$ cells, each inclusive.

In some embodiments, the T cells of the dose include CD4+ T cells, CD8+ T cells or CD4+ and CD8+ T cells.

In some embodiments, for example, where the subject is human, the CD8$^+$ T cells of the dose, including in a dose including CD4$^+$ and CD8$^+$ T cells, includes between at or about $1\times10^6$ and at or about $5\times10^8$ total recombinant receptor (e.g., CAR)-expressing CD8$^+$ cells, e.g., in the range of from at or about $5\times10^6$ to at or about $1\times10^8$ such cells, such as $1\times10^7$, $2.5\times10^7$, $5\times10^7$, $7.5\times10^7$, $1\times10^8$, $1.5\times10^8$, or $5 \times 10^8$ total such cells, or the range between any two of the foregoing values. In some embodiments, the patient is administered multiple doses, and each of the doses or the total dose can be within any of the foregoing values. In some embodiments, the dose of cells comprises the administration of from or from about $1 \times 10^7$ to or to about $0.75 \times 10^8$ total recombinant receptor-expressing $CD8^+$ T cells, from or from about $1 \times 10^7$ to or to about $5 \times 10^7$ total recombinant receptor-expressing $CD8^+$ T cells, from or from about $1 \times 10^7$ to or to about $0.25 \times 10^8$ total recombinant receptor-expressing $CD8^+$ T cells, each inclusive. In some embodiments, the dose of cells comprises the administration of at or about $1 \times 10^7$, $2.5 \times 10^7$, $5 \times 10^7$, $7.5 \times 10^7$, $1 \times 10^8$, $1.5 \times 10^8$, $2.5 \times 10^8$, or $5 \times 10^8$ total recombinant receptor-expressing $CD8^+$ T cells.

In some embodiments, the dose of cells, e.g., recombinant receptor-expressing T cells, is administered to the subject as a single dose or is administered only one time within a period of two weeks, one month, three months, six months, 1 year or more.

In the context of adoptive cell therapy, administration of a given "dose" encompasses administration of the given amount or number of cells as a single composition and/or single uninterrupted administration, e.g., as a single injection or continuous infusion, and also encompasses administration of the given amount or number of cells as a split dose or as a plurality of compositions, provided in multiple individual compositions or infusions, over a specified period of time, such as over no more than 3 days. Thus, in some contexts, the dose is a single or continuous administration of the specified number of cells, given or initiated at a single point in time. In some contexts, however, the dose is administered in multiple injections or infusions over a period of no more than three days, such as once a day for three days or for two days or by multiple infusions over a single day period.

Thus, in some aspects, the cells of the dose are administered in a single pharmaceutical composition. In some embodiments, the cells of the dose are administered in a plurality of compositions, collectively containing the cells of the dose.

In some embodiments, the term "split dose" refers to a dose that is split so that it is administered over more than one day. This type of dosing is encompassed by the present methods and is considered to be a single dose.

Thus, the dose of cells may be administered as a split dose, e.g., a split dose administered over time. For example, in some embodiments, the dose may be administered to the subject over 2 days or over 3 days. Exemplary methods for split dosing include administering 25% of the dose on the first day and administering the remaining 75% of the dose on the second day. In other embodiments, 33% of the dose may be administered on the first day and the remaining 67% administered on the second day. In some aspects, 10% of the dose is administered on the first day, 30% of the dose is administered on the second day, and 60% of the dose is administered on the third day. In some embodiments, the split dose is not spread over more than 3 days.

In some embodiments, cells of the dose may be administered by administration of a plurality of compositions or solutions, such as a first and a second, optionally more, each containing some cells of the dose. In some aspects, the plurality of compositions, each containing a different population and/or sub-types of cells, are administered separately or independently, optionally within a certain period of time. For example, the populations or sub-types of cells can include CD8+ and CD4+ T cells, respectively, and/or CD8+– and CD4+– enriched populations, respectively, e.g., CD4+ and/or CD8+ T cells each individually including cells genetically engineered to express the recombinant receptor. In some embodiments, the administration of the dose comprises administration of a first composition comprising a dose of CD8+ T cells or a dose of CD4+ T cells and administration of a second composition comprising the other of the dose of CD4+ T cells and the CD8+ T cells.

In some embodiments, the administration of the composition or dose, e.g., administration of the plurality of cell compositions, involves administration of the cell compositions separately. In some aspects, the separate administrations are carried out simultaneously, or sequentially, in any order. In some embodiments, the dose comprises a first composition and a second composition, and the first composition and second composition are administered 0 to 12 hours apart, 0 to 6 hours apart or 0 to 2 hours apart. In some embodiments, the initiation of administration of the first composition and the initiation of administration of the second composition are carried out no more than 2 hours, no more than 1 hour, or no more than 30 minutes apart, no more than 15 minutes, no more than 10 minutes or no more than 5 minutes apart. In some embodiments, the initiation and/or completion of administration of the first composition and the completion and/or initiation of administration of the second composition are carried out no more than 2 hours, no more than 1 hour, or no more than 30 minutes apart, no more than 15 minutes, no more than 10 minutes or no more than 5 minutes apart.

In some composition, the first composition, e.g., first composition of the dose, comprises CD4+ T cells. In some composition, the first composition, e.g., first composition of the dose, comprises CD8+ T cells. In some embodiments, the first composition is administered prior to the second composition.

In some embodiments, the dose or composition of cells includes a defined or target ratio of CD4+ cells expressing a recombinant receptor to CD8+ cells expressing a recombinant receptor and/or of CD4+ cells to CD8+ cells, which ratio optionally is approximately 1:1 or is between approximately 1:3 and approximately 3:1, such as approximately 1:1. In some aspects, the administration of a composition or dose with the target or desired ratio of different cell populations (such as CD4+:CD8+ ratio or CAR+CD4+:CAR+ CD8+ ratio, e.g., 1:1) involves the administration of a cell composition containing one of the populations and then administration of a separate cell composition comprising the other of the populations, where the administration is at or approximately at the target or desired ratio. In some aspects, administration of a dose or composition of cells at a defined ratio leads to improved expansion, persistence and/or anti-tumor activity of the T cell therapy.

In some embodiments, the subject receives multiple doses, e.g., two or more doses or multiple consecutive doses, of the cells. In some embodiments, two doses are administered to a subject. In some embodiments, the subject receives the consecutive dose, e.g., second dose, is administered approximately 4, 5, 6, 7, 8, 9, 10, 11, 12, 13, 14, 15, 16, 17, 18, 19, 20 or 21 days after the first dose. In some embodiments, multiple consecutive doses are administered following the first dose, such that an additional dose or doses are administered following administration of the consecutive dose. In some aspects, the number of cells administered to the subject in the additional dose is the same as or similar to the first dose and/or consecutive dose. In some embodiments, the additional dose or doses are larger than prior doses.

In some aspects, the size of the first and/or consecutive dose is determined based on one or more criteria such as response of the subject to prior treatment, e.g. chemotherapy, disease burden in the subject, such as tumor load, bulk, size, or degree, extent, or type of metastasis, stage, and/or likelihood or incidence of the subject developing toxic outcomes, e.g., CRS, macrophage activation syndrome, tumor lysis syndrome, neurotoxicity, and/or a host immune response against the cells and/or recombinant receptors being administered.

In some aspects, the time between the administration of the first dose and the administration of the consecutive dose is about 9 to about 35 days, about 14 to about 28 days, or 15 to 27 days. In some embodiments, the administration of the consecutive dose is at a time point more than about 14 days after and less than about 28 days after the administration of the first dose. In some aspects, the time between the first and consecutive dose is about 21 days. In some embodiments, an additional dose or doses, e.g. consecutive doses, are administered following administration of the consecutive dose. In some aspects, the additional consecutive dose or doses are administered at least about 14 and less than about 28 days following administration of a prior dose. In some embodiments, the additional dose is administered less than about 14 days following the prior dose, for example, 4, 5, 6, 7, 8, 9, 10, 11, 12, or 13 days after the prior dose. In some embodiments, no dose is administered less than about 14 days following the prior dose and/or no dose is administered more than about 28 days after the prior dose.

In some embodiments, the dose of cells, e.g., recombinant receptor-expressing cells, comprises two doses (e.g., a double dose), comprising a first dose of the T cells and a consecutive dose of the T cells, wherein one or both of the first dose and the second dose comprises administration of the split dose of T cells.

In some embodiments, the dose of cells is generally large enough to be effective in reducing disease burden.

In some embodiments, the cells are administered at a desired dosage, which in some aspects includes a desired dose or number of cells or cell type(s) and/or a desired ratio of cell types. Thus, the dosage of cells in some embodiments is based on a total number of cells (or number per kg body weight) and a desired ratio of the individual populations or sub-types, such as the CD4+ to CD8+ ratio. In some embodiments, the dosage of cells is based on a desired total number (or number per kg of body weight) of cells in the individual populations or of individual cell types. In some embodiments, the dosage is based on a combination of such features, such as a desired number of total cells, desired ratio, and desired total number of cells in the individual populations.

In some embodiments, the populations or sub-types of cells, such as CD8+ and CD4+ T cells, are administered at or within a tolerated difference of a desired dose of total cells, such as a desired dose of T cells. In some aspects, the desired dose is a desired number of cells or a desired number of cells per unit of body weight of the subject to whom the cells are administered, e.g., cells/kg. In some aspects, the desired dose is at or above a minimum number of cells or minimum number of cells per unit of body weight. In some aspects, among the total cells, administered at the desired dose, the individual populations or sub-types are present at or near a desired output ratio (such as CD4+ to CD8+ ratio), e.g., within a certain tolerated difference or error of such a ratio.

In some aspects, the cells are administered at or within a tolerated difference of a desired dose of one or more of the individual populations or sub-types of cells, such as a desired dose of CD4+ cells and/or a desired dose of CD8+ cells. In some aspects, the desired dose is a desired number of cells of the sub-type or population, or a desired number of such cells per unit of body weight of the subject to whom the cells are administered, e.g., cells/kg. In some aspects, the desired dose is at or above a minimum number of cells of the population or sub-type, or minimum number of cells of the population or sub-type per unit of body weight.

Thus, in some embodiments, the dosage is based on a desired fixed dose of total cells and a desired ratio, and/or based on a desired fixed dose of one or more, e.g., each, of the individual sub-types or sub-populations. Thus, in some embodiments, the dosage is based on a desired fixed or minimum dose of T cells and a desired ratio of CD4+ to CD8+ cells, and/or is based on a desired fixed or minimum dose of CD4+ and/or CD8+ cells.

In some embodiments, the cells are administered at or within a tolerated range of a desired output ratio of multiple cell populations or sub-types, such as CD4+ and CD8+ cells or sub-types. In some aspects, the desired ratio can be a specific ratio or can be a range of ratios. for example, in some embodiments, the desired ratio (e.g., ratio of CD4+ to CD8+ cells) is between at or about 5:1 and at or about 5:1 (or greater than about 1:5 and less than about 5:1), or between at or about 1:3 and at or about 3:1 (or greater than about 1:3 and less than about 3:1), such as between at or about 2:1 and at or about 1:5 (or greater than about 1:5 and less than about 2:1, such as at or about 5:1, 4.5:1, 4:1, 3.5:1, 3:1, 2.5:1, 2:1, 1.9:1, 1.8:1, 1.7:1, 1.6:1, 1.5:1, 1.4:1, 1.3:1, 1.2:1, 1.1:1, 1:1, 1:1.1, 1:1.2, 1:1.3, 1:1.4, 1:1.5, 1:1.6, 1:1.7, 1:1.8, 1:1.9: 1:2, 1:2.5, 1:3, 1:3.5, 1:4, 1:4.5, or 1:5. In some aspects, the tolerated difference is within about 1%, about 2%, about 3%, about 4% about 5%, about 10%, about 15%, about 20%, about 25%, about 30%, about 35%, about 40%, about 45%, about 50% of the desired ratio, including any value in between these ranges.

In particular embodiments, the numbers and/or concentrations of cells refer to the number of recombinant receptor (e.g., CAR)-expressing cells. In other embodiments, the numbers and/or concentrations of cells refer to the number or concentration of all cells, T cells, or peripheral blood mononuclear cells (PBMCs) administered.

In some aspects, the size of the dose is determined based on one or more criteria such as response of the subject to prior treatment, e.g. chemotherapy, disease burden in the subject, such as tumor load, bulk, size, or degree, extent, or type of metastasis, stage, and/or likelihood or incidence of the subject developing toxic outcomes, e.g., CRS, macrophage activation syndrome, tumor lysis syndrome, neurotoxicity, and/or a host immune response against the cells and/or recombinant receptors being administered.

In some embodiments, the methods also include administering one or more additional doses of cells expressing a chimeric antigen receptor (CAR) and/or lymphodepleting therapy, and/or one or more steps of the methods are repeated. In some embodiments, the one or more additional dose is the same as the initial dose. In some embodiments, the one or more additional dose is different from the initial dose, e.g., higher, such as 2-fold, 3-fold, 4-fold, 5-fold, 6-fold, 7-fold, 8-fold, 9-fold or 10-fold or more higher than the initial dose, or lower, such as e.g., higher, such as 2-fold, 3-fold, 4-fold, 5-fold, 6-fold, 7-fold, 8-fold, 9-fold or 10-fold or more lower than the initial dose. In some embodiments, administration of one or more additional doses is determined based on response of the subject to the initial treatment or any prior treatment, disease burden in the subject, such as tumor load, bulk, size, or degree, extent, or type of metastasis, stage, and/or likelihood or incidence of the subject developing toxic outcomes, e.g., CRS, macrophage activation syndrome, tumor lysis syndrome, neurotoxicity, and/or a host immune response against the cells and/or recombinant receptors being administered.

V. ARTICLES OF MANUFACTURE AND KITS

Also provided herein are articles of manufacture containing the composition of serum-free media, basal medium or supplement such as there described herein and optionally instructions for making or using the composition. The articles of manufacture may include a container and a label or package insert on or associated with the container. Suitable containers include, for example, bottles, vials, syringes, IV solution bags, etc. The containers may be formed from a variety of materials such as glass or plastic. The container in some embodiments holds a composition which is by itself or combined with another composition effective for treating, preventing and/or diagnosing the condition. In some embodiments, the container has a sterile access port. Exemplary containers include an intravenous solution bags, vials, including those with stoppers pierceable by a needle for injection, or bottles or vials for orally administered agents. The label or package insert may indicate that the composition is used for treating a disease or condition.

In some embodiments, the article of manufacture includes (a) a first container containing a basal media as provided herein, such as containing a dipeptide form of L-glutamine in a base media; and (b) a second container containing a supplement as provided herein, such as a first supplement containing a free form of glutamine, e.g. L-glutamine. In some embodiments, the article of manufacture further includes a third container containing one or more additional supplement.

In some embodiments, the article of manufacture include (a) one or more container with a composition contained therein such as these described herein (e.g., serum-free media or each of the components for preparing the serum-free media each packaged in a separate container, such as basal medium and one or more supplement, e.g. at least a first supplement and one or more further or second supplement) and (b) a further container with a composition contained therein, wherein the composition includes the cells to be cultivated and/or prepared. In some embodiments, the cells are primary cells. In some embodiments, the cells are immune cells or enriched immune cells. In some embodiments, the cells are T cells or enriched with T cells. In some embodiments, the cells are CD4+ T cells or enriched CD4+ T cells. In some embodiments, the cells are CD8+ T cells or enriched CD8+ T cells. In some embodiments, the cells comprise cells to be genetically engineered or being genetically engineered. In some embodiments, the cells comprise an enriched population of cells to be genetically engineered or being genetically engineered. In some embodiments, the cells comprise genetically engineered T cells or an enriched population of genetically engineered T cells. In some embodiments, the cells comprises chimeric antigen receptor (CAR) expressing T cells or an enriched CAR-expressing T cells. In some embodiments, the cells have been previously cryopreserved. In some embodiments, the cells have been cultured in the serum-free media and cryopreserved following the culture.

In some embodiments, the article of manufacture include (a) a first container with a composition contained therein such as these described herein (e.g., serum-free media or each of the components for preparing the serum-free media each packaged in a separate container, such as basal medium and one or more supplement, e.g. at least a first supplement and one or more further or second supplement), (b) a second container with a composition contained therein, wherein the composition includes the cells to be cultivated and/or prepared, (c) a vector comprising a gene (e.g., a gene encoding a recombinant protein). In some embodiments, the vector is a lentivirus vector. In some embodiments, the gene encodes a chimeric antigen receptor. In some embodiments, the chimeric antigen receptor comprises an antigen-binding domain specifically binds to a tumor cell.

VI. DEFINITIONS

Unless defined otherwise, all terms of art, notations and other technical and scientific terms or terminology used herein are intended to have the same meaning as is commonly understood by one of ordinary skill in the art to which the claimed subject matter pertains. In some cases, terms with commonly understood meanings are defined herein for clarity and/or for ready reference, and the inclusion of such definitions herein should not necessarily be construed to represent a substantial difference over what is generally understood in the art.

As used herein, the singular forms "a," "an," and "the" include plural referents unless the context clearly dictates otherwise. For example, "a" or "an" means "at least one" or "one or more." It is understood that aspects and variations described herein include "consisting" and/or "consisting essentially of" aspects and variations.

Throughout this disclosure, various aspects of the claimed subject matter are presented in a range format. It should be understood that the description in range format is merely for convenience and brevity and should not be construed as an inflexible limitation on the scope of the claimed subject matter. Accordingly, the description of a range should be considered to have specifically disclosed all the possible sub-ranges as well as individual numerical values within that range. For example, where a range of values is provided, it is understood that each intervening value, between the upper and lower limit of that range and any other stated or intervening value in that stated range is encompassed within the claimed subject matter. The upper and lower limits of these smaller ranges may independently be included in the smaller ranges, and are also encompassed within the claimed subject matter, subject to any specifically excluded limit in the stated range. Where the stated range includes one or both of the limits, ranges excluding either or both of those included limits are also included in the claimed subject matter. This applies regardless of the breadth of the range.

The term "about" as used herein refers to the usual error range for the respective value readily known to the skilled person in this technical field. Reference to "about" a value or parameter herein includes (and describes) embodiments that are directed to that value or parameter per se. For example, description referring to "about X" includes description of "X".

As used herein, recitation that nucleotides or amino acid positions "correspond to" nucleotides or amino acid positions in a disclosed sequence, such as set forth in the Sequence listing, refers to nucleotides or amino acid positions identified upon alignment with the disclosed sequence to maximize identity using a standard alignment algorithm, such as the GAP algorithm. By aligning the sequences, one skilled in the art can identify corresponding residues, for example, using conserved and identical amino acid residues as guides. In general, to identify corresponding positions, the sequences of amino acids are aligned so that the highest order match is obtained (see, e.g.: Computational Molecular Biology, Lesk, A. M., ed., Oxford University Press, New York, 1988; Biocomputing: Informatics and Genome Projects, Smith, D. W., ed., Academic Press, New York, 1993; Computer Analysis of Sequence Data, Part I, Griffin, A. M., and Griffin, H. G., eds., Humana Press, New. Jersey, 1994; Sequence Analysis in Molecular Biology, von Heinje, G., Academic Press, 1987; and Sequence Analysis Primer, Gribskov, M. and Devereux, J., eds., M Stockton Press, New York, 1991; Carrillo et al. (1988) SIAM J Applied Math 48: 1073).

The term "vector," as used herein, refers to a nucleic acid molecule capable of propagating another nucleic acid to which it is linked. The term includes the vector as a self-replicating nucleic acid structure as well as the vector incorporated into the genome of a host cell into which it has been introduced. Certain vectors are capable of directing the expression of nucleic acids to which they are operatively linked. Such vectors are referred to herein as "expression vectors." Among the vectors are viral vectors, such as retroviral, e.g., gammaretroviral and lentiviral vectors.

The terms "host cell," "host cell line," and "host cell culture" are used interchangeably and refer to cells into which exogenous nucleic acid has been introduced, including the progeny of such cells. Host cells include "transformants" and "transformed cells," which include the primary transformed cell and progeny derived therefrom without regard to the number of passages. Progeny may not be completely identical in nucleic acid content to a parent cell, but may contain mutations. Mutant progeny that have the same function or biological activity as screened or selected for in the originally transformed cell are included herein.

As used herein, a statement that a cell or population of cells is "positive" for a particular marker refers to the detectable presence on or in the cell of a particular marker, typically a surface marker. When referring to a surface marker, the term refers to the presence of surface expression as detected by flow cytometry, for example, by staining with an antibody that specifically binds to the marker and detecting said antibody, wherein the staining is detectable by flow cytometry at a level substantially above the staining detected carrying out the same procedure with an isotype-matched control under otherwise identical conditions and/or at a level substantially similar to that for cell known to be positive for the marker, and/or at a level substantially higher than that for a cell known to be negative for the marker.

As used herein, a statement that a cell or population of cells is "negative" for a particular marker refers to the absence of substantial detectable presence on or in the cell of a particular marker, typically a surface marker. When referring to a surface marker, the term refers to the absence of surface expression as detected by flow cytometry, for example, by staining with an antibody that specifically binds to the marker and detecting said antibody, wherein the staining is not detected by flow cytometry at a level substantially above the staining detected carrying out the same procedure with an isotype-matched control under otherwise identical conditions, and/or at a level substantially lower than that for cell known to be positive for the marker, and/or at a level substantially similar as compared to that for a cell known to be negative for the marker.

As used herein, "percent (%) amino acid sequence identity" and "percent identity" when used with respect to an amino acid sequence (reference polypeptide sequence) is defined as the percentage of amino acid residues in a candidate sequence (e.g., the subject antibody or fragment) that are identical with the amino acid residues in the reference polypeptide sequence, after aligning the sequences and introducing gaps, if necessary, to achieve the maximum percent sequence identity, and not considering any conservative substitutions as part of the sequence identity. Alignment for purposes of determining percent amino acid sequence identity can be achieved in various ways that are within the skill in the art, for instance, using publicly available computer software such as BLAST, BLAST-2, ALIGN or Megalign (DNASTAR) software. Those skilled in the art can determine appropriate parameters for aligning sequences, including any algorithms needed to achieve maximal alignment over the full length of the sequences being compared.

An amino acid substitution may include replacement of one amino acid in a polypeptide with another amino acid. The substitution may be a conservative amino acid substitution or a non-conservative amino acid substitution. Amino acid substitutions may be introduced into a binding molecule, e.g., antibody, of interest and the products screened for a desired activity, e.g., retained/improved antigen binding, decreased immunogenicity, or improved ADCC or CDC.

Amino acids generally can be grouped according to the following common side-chain properties:
(1) hydrophobic: Norleucine, Met, Ala, Val, Leu, Ile;
(2) neutral hydrophilic: Cys, Ser, Thr, Asn, Gln;
(3) acidic: Asp, Glu;
(4) basic: His, Lys, Arg;
(5) residues that influence chain orientation: Gly, Pro;
(6) aromatic: Trp, Tyr, Phe.

In some embodiments, conservative substitutions can involve the exchange of a member of one of these classes for another member of the same class. In some embodiments, non-conservative amino acid substitutions can involve exchanging a member of one of these classes for another class.

As used herein, a composition refers to any mixture of two or more products, substances, or compounds, including cells. It may be a solution, a suspension, liquid, powder, a paste, aqueous, non-aqueous or any combination thereof.

As used herein, a "subject" is a mammal, such as a human or other animal, and typically is human.

VII. EXEMPLARY EMBODIMENTS

Among the provided embodiments are:
1. A serum-free media, comprising:
   0.5 mM to 5 mM of a dipeptide form of L-glutamine in a base media;
   0.5 mM to 5 mM L-glutamine; and
   at least one protein, wherein the media is free of serum.
2. The serum-free media of embodiment 1, wherein the dipeptide form of L-glutamine is L-alanyl-L-glutamine.
3. The serum-free media of embodiment 1 or embodiment 2, wherein the concentration of the dipeptide form of L-glutamine is from or from about 0.5 mM to 5 mM, 0.5 mM to 4 mM, 0.5 mM to 3 mM, 0.5 mM to 2 mM, 0.5 mM to 1 mM, 1 mM to 5 mM, 1 mM to 4 mM, 1 mM to 3 mM, 1 mM to 2 mM, 2 mM to 5 mM, 2 mM to 4 mM, 2 mM to 3 mM, 3 mM to 5 mM, 3 mM to 4 mM or 4 mM to 5 mM, each inclusive.
4. The serum-free media of any of embodiments 1-3, wherein the concentration of the dipeptide form of L-glutamine in the serum-free media is at least or at least about or is or is about 0.5 mM, 1 mM, 2 mM, 3 mM, 4 mM or 5 mM.

5. The serum-free media of any of embodiments 1-4, wherein the concentration of the dipeptide form of L-glutamine in the serum-free media is or is about 2 mM.

6. The serum-free media of any of embodiments 1-5, wherein the concentration of the L-glutamine in the serum-free media is from or from about 0.5 mM to 5 mM, 0.5 mM to 4 mM, 0.5 mM to 3 mM, 0.5 mM to 2 mM, 0.5 mM to 1 mM, 1 mM to 5 mM, 1 mM to 4 mM, 1 mM to 3 mM, 1 mM to 2 mM, 2 mM to 5 mM, 2 mM to 4 mM, 2 mM to 3 mM, 3 mM to 5 mM, 3 mM to 4 mM or 4 mM to 5 mM, each inclusive.

7. The serum-free media of any of embodiments 1-6, wherein the concentration of the L-glutamine in the serum-free media is at least or at least about or is or is about 0.5 mM, 1 mM, 2 mM, 3 mM, 4 mM or 5 mM.

8. The serum-free media of any of embodiments 1-7, wherein the concentration of L-glutamine in the serum-free media is or is about 2 mM.

9. The serum-free media of any of embodiments 1-8, wherein the at least one protein is not of non-mammalian origin.

10. The serum-free media of any of embodiments 1-9, wherein the at least one protein is a human protein.

11. The serum-free media of any of embodiments 1-10, wherein the at least one protein is recombinant.

12. The serum-free media of any of embodiments 1-11, wherein the at least one protein comprises one or more of albumin, insulin or transferrin, optionally one or more of a human or recombinant albumin, insulin or transferrin.

13. The serum-free media of embodiments 12, wherein the at least one protein comprises at least one albumin, optionally wherein the albumin is a human serum albumin or is a recombinant human albumin, and optionally wherein the concentration of albumin in the media is about 2.5 mg/mL to 7.5 mg/mL.

14. The serum-free media of embodiment 13, wherein the concentration of albumin in the serum-free media is about 5 mg/mL.

15. The serum-free media of embodiments 12, wherein the at least one protein comprises at least one transferrin, optionally wherein the transferrin is human or is a recombinant human albumin, and optionally wherein the concentration of transferrin in the serum-free media is about 50 mg/L to 200 mg/L.

16. The serum-free media of embodiment 15, wherein the concentration of transferrin in the serum-free media is about 100 mg/L.

17. The serum-free media of embodiments 12, wherein the at least one protein comprises at least one insulin, optionally wherein the insulin is human or is a recombinant human insulin, and optionally wherein the concentration of insulin in the serum-free media is about 5 mg/L to 20 mg/L.

18. The serum-free media of embodiment 17, wherein the concentration of insulin in the serum-free media is about 10 mg/L.

19. The serum-free media of any of embodiments 1-18, wherein the serum-free media comprises one or more of inorganic salts, sugars, amino acids, optionally also containing vitamins, organic acids, antioxidants, and/or buffers.

20. The serum-free media of any of embodiments 1-19, wherein the base media comprises Dulbecco's Modified Eagle's Medium (DMEM), Minimal Essential Medium (MEM), Basal Medium Eagle (BME), F-10, F-12, RPMI 1640, Glasgow's Minimal Essential Medium (GMEM), alpha Minimal Essential Medium (alpha MEM), Iscove's Modified Dulbecco's Medium, or M199.

21. The serum-free media of any one of embodiments 1-20, wherein the base media and/or the serum-free media does not comprise phenol red.

22. The serum-free media of any of embodiments 1-22, wherein the serum-free media comprises a lipid, growth factor, N-acetylcysteine, ethanolamine, and/or albumin.

23. The serum-free media of any of embodiments 1-22, wherein the serum-free media comprises one or more cytokines.

24. The serum-free media of embodiment 23, wherein the one or more cytokine is selected from IL-2, IL-7 or IL-15.

25. The serum-free media of any of embodiments 1-22, wherein the serum-free media supports the expansion of cells.

26. The serum-free media of 25, wherein cells are primary immune cells.

27. The serum-free media of embodiment 25 or embodiment 26, wherein cells are or comprise T cells.

28. The serum-free media of embodiment 27, wherein the T cells comprise CD4+ or CD8+ T cells.

29. A basal medium comprising a dipeptide form of L-glutamine, wherein the basal medium is free of L-glutamine and a protein.

30. The basal medium of embodiment 29, wherein the dipeptide form of L-glutamine is L-alanyl-L-glutamine.

31. The basal medium of embodiment 29 or embodiment 30, wherein the concentration of the dipeptide form of L-glutamine is from or from about 0.5 mM to 5 mM, 0.5 mM to 4 mM, 0.5 mM to 3 mM, 0.5 mM to 2 mM, 0.5 mM to 1 mM, 1 mM to 5 mM, 1 mM to 4 mM, 1 mM to 3 mM, 1 mM to 2 mM, 2 mM to 5 mM, 2 mM to 4 mM, 2 mM to 3 mM, 3 mM to 5 mM, 3 mM to 4 mM or 4 mM to 5 mM, each inclusive.

32. The basal medium of any of embodiments 29-31, wherein the concentration of the dipeptide form of L-glutamine in the serum-free media is at least or at least about or is or is about 0.5 mM, 1 mM, 2 mM, 3 mM, 4 mM or 5 mM.

33. The basal medium of any of embodiments 29-32, wherein the concentration of the dipeptide form of L-glutamine in the serum-free media is or is about 2 mM.

34. The basal medium of any of embodiments 29-33, wherein the basal medium comprises one or more of inorganic salts, sugars, amino acids, optionally also containing vitamins, organic acids, antioxidants, and/or buffers.

35. The basal medium of any of embodiments 29-34, comprising Dulbecco's Modified Eagle's Medium (DMEM), Minimal Essential Medium (MEM), Basal Medium Eagle (BME), F-10, F-12, RPMI 1640, Glasgow's Minimal Essential Medium (GMEM), alpha Minimal Essential Medium (alpha MEM), Iscove's Modified Dulbecco's Medium, or M199.

36. The basal medium of any of embodiments 29-35, wherein the basal media does not comprise phenol red.

37. The basal medium of any of embodiments 29-36, wherein the protein is a human-derived protein, or a recombinant protein, or both.

38. The basal medium of any of embodiments 29-37 that is a liquid.

39. A supplement comprising at least one protein and L-glutamine, wherein a basal cell culture medium combined with the supplement is capable of supporting the expansion of a cell.

40. The supplement of embodiment 39, wherein the supplement is frozen or stored frozen prior to use, optionally at a temperature of from or from about −10° C. to −30° C., optionally at or about 18° C. or 20° C.

41. A supplement of embodiment 39 or embodiment 40, wherein the L-glutamine in the supplement does not precipitate when combined with a basal media and/or when the supplement is thawed or subjected to a temperature of from or from about 20° C. to 42° C., optionally from or from about 20° C. to 42° C., or at or greater than or about 37° C.

42. A supplement of any of embodiments 39-41, wherein the concentration of L-glutamine in the supplement is less than 100 mM.

43. The supplement of any of embodiments 39-42, wherein the concentration of the L-glutamine in the supplement is from or from about 20 mM to 100 mM.

44. The supplement of any of embodiments 39-43, wherein the concentration of the L-glutamine in the supplement is at least or at least about or is or is about 40 mM, 50 mM, 60 mM, 70 mM, 80 mM or 90 mM.

45. The supplement of any of embodiments 39-44, wherein the concentration of L-glutamine in the supplement is or is about 80 mM.

46. The supplement of any of embodiments 39-45, wherein the at least one protein is not of non-mammalian origin.

47. The supplement of any of embodiments 39-46, wherein the at least one protein is a human protein.

48. The supplement of any of embodiments 39-47, wherein the at least one protein is recombinant.

49. The supplement of any of embodiments 39-48, wherein the at least one protein comprises one or more of albumin, insulin or transferrin, optionally one or more of a human or recombinant albumin, insulin or transferrin.

50. The supplement of embodiment 49, wherein the at least one protein comprises at least one albumin, wherein optionally wherein the albumin is a human serum albumin or is a recombinant human albumin.

51. The supplement of embodiment 49, wherein the at least one protein comprises at least one transferrin, wherein optionally wherein the transferrin is derived from human or is a recombinant human transferrin.

52. The supplement of embodiment 49, wherein the at least one protein comprises at least one insulin, optionally wherein the insulin is human insulin or a recombinant human insulin, and wherein the concentration of insulin in the serum-free media is about 5 mg/L to 20 mg/L.

53. The serum free media, basal medium or supplement that is sterile.

54. A method for preparing a serum-free medium, the method comprising combining the basal medium of any of embodiments 29-38 or 53 and the supplement of any of embodiments 39-53.

55. A method for preparing a serum-free medium formulation, the method comprising combining:
  (a) a basal medium comprising a dipeptide form of L-glutamine, wherein the serum-free basal medium is a liquid formulation and/or has not been frozen prior to the combining;
  (b) a first supplement comprising L-glutamine.

56. The method of embodiment 55, wherein the first supplement had been frozen prior to the combining, optionally wherein the method comprises thawing the first supplement prior to the combining.

57. The method of embodiment 55 or 56, wherein the concentration of the dipeptide form of L-glutamine in the basal medium is from or from about 0.5 mM to 5 mM, 0.5 mM to 4 mM, 0.5 mM to 3 mM, 0.5 mM to 2 mM, 0.5 mM to 1 mM, 1 mM to 5 mM, 1 mM to 4 mM, 1 mM to 3 mM, 1 mM to 2 mM, 2 mM to 5 mM, 2 mM to 4 mM, 2 mM to 3 mM, 3 mM to 5 mM, 3 mM to 4 mM or 4 mM to 5 mM, each inclusive.

58. The method of any of embodiments 55-57, wherein the concentration of the dipeptide form of L-glutamine in the basal medium is at least or at least about or is or is about 0.5 mM, 1 mM, 2 mM, 3 mM, 4 mM or 5 mM.

59. The method of any of embodiments 55-58, wherein the concentration of the dipeptide form of L-glutamine in the basal medium formulation is or is about 2 mM.

60. The method of any one of embodiments 55-59, wherein the dipeptide form of L-glutamine is L-alanyl-L-glutamine.

61. The method of any one of embodiments 55-60, wherein the concentration of the L-glutamine in the supplement is from or from about 20 mM to 100 mM.

62. The method of any one of embodiments 55-61, wherein the concentration of the L-glutamine in the supplement is at least or at least about or is or is about 40 mM, 50 mM, 60 mM, 70 mM, 80 mM or 90 mM.

63. The method of any one of embodiments 55-62, wherein the concentration of L-glutamine in the supplement is or is about 80 mM.

64. The method of any of embodiments 55-63, wherein the first supplement comprises at least one protein, and wherein the at least one protein present is a not a non-mammalian protein.

65. The method of any of embodiments 55-64, wherein the at least one protein present in the first supplement comprises a human protein.

66. The method of embodiment 65, wherein the human protein comprises a human serum albumin, human transferrin, and/or human recombinant insulin.

67. The method of any one of embodiments 54-66, wherein the serum-free medium formulation comprises 90% to 97.5% (v/v) of the basal medium and 1.25% to 5% (v/v) of the first supplement.

68. The method of any of embodiments 54-67, wherein the method further comprises combining (c) a second supplement comprising one or more ingredients selected from the group consisting of one or more antioxidants, one or more albumins or albumin substitutes, one or more lipid agents, one or more insulins or insulin substitutes, one or more transferrins or transferrin substitutes, one or more growth factors, one or more trace elements, and one or more glucocorticoids.

69. The method of embodiment 68, wherein the second supplement comprises a lipid, growth factor, N-acetylcysteine, ethanolamine, and/or albumin.

70. The method of embodiment 68 or embodiment 69, wherein the serum-free media formulation comprises and 1.25% to 5% (v/v) of the second supplement.

71. A serum-free medium formulation produced by the method of any of embodiments 54-70.

72. A method of culturing cells, the method comprising incubating a composition comprising cells in the serum-free medium formulation of any of embodiments 1-28, 53 and embodiment 71.

73. The method of embodiment 72, wherein the culturing is carried out in connection with one or more steps selected from activation of cells in the presence of a stimulating agent or condition; introduction of an agent encoding a heterologous protein, optionally a recombinant receptor, optionally wherein the recombinant receptor is a chimeric antigen receptor; or cultivation or expansion of the cells.

74. A method for producing engineered cells, the method comprising:
  (a) contacting a population of cells comprising cells with an agent comprising a nucleic acid molecule encoding a heterologous protein, optionally a recombinant receptor, under conditions to introduce the nucleic acid encoding the recombinant receptor into cells in the population; and
  (b) incubating the cells in the presence of a stimulating condition, prior to, during and/or subsequent to said contacting, wherein the stimulating condition induces a primary signal, signaling, stimulation, activation and/or expansion of the cells,
  wherein one or both of (a) and (b) is carried out in the serum-free medium formulation of any of embodiments 1-28, 53 and embodiment 71.

75. The method of any of embodiments 72-74, wherein the cells are primary cells.

76. The method of any of embodiments 72-75, wherein the cells are immune cells.

77. The method of any of embodiments 72-76, wherein the cells are T cells or enriched with T cells.

78. The method of any of embodiments 77, wherein the T cells or the enriched T cells are CD4+ T cells and/or CD8 T cells.

79. The method of any of embodiments 74-78, wherein the method further comprises, prior to (a), isolating the population of cells from a biological sample.

80. The method of embodiment 79, wherein the isolating comprises, selecting cells based on surface expression of CD3 or based on surface expression of one or both of CD4 and CD8, optionally by positive or negative selection.

81. The method of embodiment 79 or embodiment 80, wherein the isolating comprises carrying out immunoaffinity-based selection.

82. The method of any of embodiments 79-81, wherein the biological sample is or comprises a whole blood sample, a buffy coat sample, a peripheral blood mononuclear cells (PBMC) sample, an unfractionated T cell sample, a lymphocyte sample, a white blood cell sample, an apheresis product, or a leukapheresis product.

83. The method of any of embodiments 79-82, wherein CD4+ and CD8+ T cells are separately isolated and combined prior to the contacting or incubating, optionally combined at a ratio of 1:2 to 2:1 of CD4 to CD8 cells, optionally wherein the ratio is or is about 1:1.

84. The method of any of embodiments 79-82, wherein CD4+ T cells are isolated and/or the population of cells is enriched for CD4+ cells.

85. The method of any of embodiments 79-83, wherein CD8+ cells are isolated and/or the population of cells is enriched for CD8+ cells.

86. The method of any of embodiments 79-83, wherein total T cells, CD3+ cells or CD4+ cells and CD8+ cells are isolated and/or the population of cells is enriched for total T cells, CD3+ cells or CD4+ and CD8+ cells.

87. The method of any of embodiments 79-86, wherein the enriched cells comprises greater than or greater than about 75% 80%, 85%, 90%, 95%, 96%, 97%, 98%, 99% of the cells.

88. The method of any of embodiments 72-87, wherein the cells are primary cells obtained from a subject.

89. The method of any of embodiments 79-88, wherein the stimulating condition comprises incubation with a stimulatory reagent capable of activating one or more intracellular signaling domains of one or more components of a TCR complex and/or one or more intracellular signaling domains of one or more costimulatory molecules.

90. The method of embodiment 89, wherein the stimulatory reagent comprises a primary agent that specifically binds to a member of a TCR complex and a secondary agent that specifically binds to a T cell costimulatory molecule.

91. The method of embodiment 89 or embodiment 90, wherein the primary agent specifically binds to CD3 and/or the costimulatory molecule is selected from the group consisting of CD28, CD137 (4-1-BB), OX40, or ICOS.

92. The method of embodiment 90 or embodiment 91, wherein the primary and secondary agents comprise antibodies and/or are present on the surface of a solid support, optionally a bead.

93. The method of any of embodiments 79-92, wherein the stimulating the cells is carried out or is initiated prior to the contacting, optionally for 18-24 hours at or about 37° C.

94. The method of any of embodiments 79-93, wherein the stimulating condition comprises a cytokine selected from among IL-2, IL-15 and IL-7.

95. The method of any of embodiments 79-94, wherein the stimulating cells is carried out subsequent to the contacting, optionally for a period of time to achieve a threshold concentration.

96. The method of any of embodiments 73-95, wherein the agent comprising a nucleic acid molecule encoding the recombinant receptor is a viral vector, optionally a lentiviral vector or a gamma retroviral vector.

97. The method of any of embodiments 73-96, wherein the heterologous protein is a recombinant receptor.

98. The method of embodiment 97, wherein the recombinant receptor is a chimeric antigen receptor.

99. The method of any of embodiments 72-98, wherein the method results in expansion of cells at least about 5-fold, 10-fold, 20-fold, 30-fold, 40-fold, or 50-fold or more compared to the number of cells at the initiation of the incubating.

100. The method of embodiment 99, wherein the expansion of cells is achieved after carrying out the incubating for more than 5 days, optionally 5, 6, 7, 8, or 9 days.

101. The method of any of embodiments 72-100, wherein the method results in cells that have a viability higher than about 80%, 85%, or 90% after the incubating.

102. The method of embodiment 101, wherein the viability exists after carrying out the incubating for more than 5 days, optionally 5, 6, 7, 8 or 9 days.

103. A cell composition produced by the method of any of embodiments 72-102.

104. An article of manufacture, comprising the serum-free media of any of embodiments 1-28, 53 and 71; the basal medium of any of embodiments 29-38 and 53; or the supplement of any of embodiments 39-53, and instructions for making or using the composition.

105. The article of manufacture of embodiment 104 that is a container, optionally a bottle.

VIII. EXAMPLES

The following examples are included for illustrative purposes only and are not intended to limit the scope of the invention.

Example 1: Production of Engineered T Cells Expressing a Chimeric Antigen Receptor (CAR) in the Presence of Serum-Free Media Formulation Genetically engineered human T cells expressing a chimeric antigen receptor (CAR) were produced in the presence of a serum-free media formulation. An engineered composition of primary T cells containing CD4+ and CD8+ T cells expressing an anti-BCMA chimeric antigen receptor (CAR) was produced by an exemplary process that included separately selecting CD4+ and CD8+ T cells from a sample prior to combining the selected cells at a defined ratio for subsequent processing steps, including activation, transduction and cultivation to expand the cells. The CAR contained an scFv antigen-binding domain specific for BCMA a CD28 transmembrane region, a 4-1BB costimulatory signaling region and a CD3-zeta derived intracellular signaling domain.

In the method, activation, transduction and cultivation to expand the cells were carried out in a serum-free media that was prepared from: (1) a liquid basal medium containing about 2 mM L-alanyl-L-glutamine (GlutaMax); (2) a first supplement, containing 80 mM glutamine and serum-substituting proteins, that was kept frozen prior to use; and (3) a second supplement provided as a liquid solution, e.g. OpTmizer™ T-Cell Expansion Supplement. The basal medium contained a nutrient mixture and buffers and did not contain phenol red. After thawing the frozen supplement, the components were combined at about 95.0%+/−0.2% (v/v) of the basal media, about 2.5%+/−0.2% (v/v) of the first supplement and about 2.5%+/−0.2% (v/v) of the second supplement, thereby generating an exemplary serum-free cell growth media (designated "SFM-A"). The presence of the L-glutamine in the frozen supplement ensured its stability prior to addition to the basal media to minimize variable glutamine concentration and/or increasing ammonia concentration in the serum-free media formulation that can occur due to instability of L-glutamine. The L-glutamine remained soluble in the first supplement due to the presence of the L-alanyl-L-glutamine. The media additionally was supplemented with cytokines, such as IL-2, IL-7 and/or IL-15.

Separate compositions of CD4+ and CD8+ cells were selected from isolated PBMCs from a human leukapheresis sample, including from subjects having multiple myeloma (MM), and the selected cell compositions were cryofrozen. The selected CD4+ and CD8+ T cell compositions were subsequently thawed and mixed at a ratio of 1:1 of viable CD4+ T cells to viable CD8+ T cells prior to carrying out steps for stimulation, transduction and expansion.

Approximately $300 \times 10^6$ T cells ($150 \times 10^6$ CD4+ and $150 \times 10^6$ CD8+ T cells) from the mixed cell composition, at a density of about $3 \times 10^6$ cells/mL, were stimulated in the presence of paramagnetic polystyrene-coated beads with attached anti-CD3 and anti-CD28 antibodies at a 1:1 bead to cell ratio in an exemplary serum-free media (see, e.g., Example 3). The media also contained recombinant IL-2, IL-7, and IL-15. The stimulation was carried out by incubation for between 18 to 30 hours.

Following the incubation, approximately $100 \times 10^6$ viable cells from the stimulated cell composition were washed and resuspended in the exemplary serum free media containing recombinant IL-2, IL-7, and IL-15. No transduction adjuvant was added. The cells were transduced with a lentiviral vector encoding the anti-BCMA CAR by spinoculation for 60 minutes followed by incubation for about 18 to 30 hours at about 37° C. The density of the cells post-spinoculation was about $1 \times 10^6$ cells/mL. The CAR contained an scFv antigen-binding domain specific for BCMA, a CD28 transmembrane region, a 4-1BB costimulatory signaling region, and a CD3-zeta derived intracellular signaling domain.

The transduced cells were then cultivated for expansion by transfer to a bioreactor (e.g. a rocking motion bioreactor) in about 500 mL of the exemplary serum free media containing twice the concentration of IL-2, IL-7, and IL-15 as used during the incubation and transduction steps. In this exemplary process, the exemplary media does not contain poloxamer. After a threshold cell density of greater than or about $0.6 \times 10^6$ cells/mL was achieved, media was added step-wise with shots of fresh media being added periodically, such as between about 2 and about 15 minutes to a volume of 1000 mL and the cells were cultivated under steady rocking conditions (non-perfusion) until a threshold viable cell density of greater than or about $0.6 \times 10^6$ cells/mL was achieved. If the viable cell density was greater than $0.8 \times 10^6$ cells/mL, a combination fill/perfusion step was initiated wherein first media was added in a step-wise manner as indicated above, until a target volume of 1000 mL, then perfusion was initiated as explained below. Media was then replaced by semi-continuous perfusion with continual mixing. The perfusion rate and/or rocking speed were increased at least one time during the expansion phase as cell density increased. The perfusion rate was increased at least one time during the expansion phase as cell density increased. Media was added to the culture in a step-wise manner with total volume per day determined by viable cell density (with higher rates once certain densities were reached), up to a rate, e.g., resulting in approximately 750 mL or 1500 mL of total fresh media added to the culture per day (with higher rates when higher cell concentrations were reached), with shots of fresh media added throughout the day periodically, such as between about every 0.5 and about every 1.5 or 2 hours. The cells were harvested at a time one day after the total number of nucleated cells (TNC) had reached at least or at least approximately $3500 \times 10^6$ and at a point at which the TNC number had reached at least or at least approximately $5500 \times 10^6$ total nucleated cells. Following harvest, the anti-CD3 and anti-CD28 antibody conjugated beads were removed from the cell composition by exposure to a magnetic field. The cells were then formulated and cryofrozen.

Seventy-nine individual compositions of engineered T cells were produced from the exemplary process described above. Robust expansion during the cultivation was observed, as determined by the total number of viable cells, from each of the 79 manufacturing runs, including those derived from healthy donors and multiple myeloma patients. All runs were able to produce cell compositions with a cell density above a target threshold of $5.5 \times 10^9$ cells/mL within 6 days of the initiation of cultivation. A greater than 27-fold increase in number of viable cells was observed for all manufacturing runs within 6 days of initiating cultivation, with over 85% of the runs achieving such an expansion by day 5. Overall, these data support the robust performance of the serum-free media formulation across the cells derived from healthy donors and patient donors.

Example 2: Assessment of CAR+ T Cells Compositions Produced by a Process Involving Serum-Free Media Genetically engineered human T cells expressing a chimeric antigen receptor (CAR) were produced in the presence of the exemplary SFM-A substantially as described in Example 1. In this study, to generate CAR-expressing T cells, CD4+ and CD8+ T cells were individually isolated by immunoaffinity-based enrichment from donor leukapheresis samples, mixed at about 1:1, activated in the presence of anti-CD3/anti-CD28 magnetic beads, transduced with a viral vector encoding the anti-BCMA CAR described in Example 1 and cultivated by incubation at about 37° C. to expand the cells. Activation, transduction and cultivation to expand the cells were carried out in in either 5% (v/v) human serum-containing media or in SFM-A media described in Example 1, each in the presence of cytokines. Exemplary features of the produced engineered T cell compositions were compared among matched cell compositions generated from the same donor either in the presence of SFM-A or serum-containing media.

A. Viability

Viability of the T cells after activation, after activation and transduction, and at each day after initiation (day=0) of cultivation until day 6, was assessed. Early in the process through day 2 after initiation of cultivation, lower cell numbers and viability were observed in cell compositions cultured in the presence of SFM-A compared to serum-containing media. By day 3 of expansion, however, viability was comparable between cells cultured in the presence of SFM-A and the serum-containing formulation. This result is consistent with a delay in T cell expansion in the presence of serum-free media, for example, as the cells adapt to serum-free conditions during the initial stages of the process. In spite of the initial lower cell number, culture of the cells in the presence of SFM-A yielded slightly greater numbers of viable cells by day 5 and 6 and comparable percent viable cells to serum-containing media.

B. CAR-T Cell Activity

The functional activity of CAR+ T cells in the T cell compositions post-expansion was assessed by monitoring cytokine accumulation following stimulation with phorbol myristate acetate (PMA)/ionomycin in the presence of Golgi inhibitor. Polyfunctional accumulation of cytokines was assessed by intracellular cytokine staining (ICS) for IL-2, IFN-gamma and TNF-alpha in cells that were also co-stained for surface CD4, CD8 or the anti-BCMA CAR. A comparable percentage of functional CAR+CD4+ T cells or CAR+CD8+ T cells, as determined by polyfunctional accumulation of IL-2, IFN-gamma and TNF-alpha, was observed in cells cultured in the presence of SFM-A as compared to cells cultured with serum-containing media.

Production of cytokines IL-2, IFN-gamma, TNF-alpha and GM-CSF also were measured in supernatant using a Luminex Multiplex Assay following co-culture of the generated anti-BCMA CAR+ T cell compositions with antigen-expressing cells. Secretion of inflammatory cytokines (IL-2, TNF-alpha, GM-CSF and IFN-gamma) was comparable among cultures generated in the presence of SFM-A compared to serum-containing media.

C. Apoptotic Marker

Anti-BCMA CAR+ T cell compositions, which were produced by a process using either serum-containing media or the exemplary SFM-A, and subsequently cryopreserved and thawed prior to analysis, were assessed for surface expression of active caspase 3. Less than 5% of the generated engineered CD3+CAR+ cell cultured in the presence of SFM-A were positive for active caspase-3. The frequency of CD3+CAR+ cells that were positive for active caspase-3 was lower in matched T cell compositions produced from an exemplary donor when cultured in the presence of SFM-A compared to serum-containing media.

D. Transduction Frequency

Transduction frequency of the generated T cell compositions was determined by flow cytometry. Surface expression of the anti-BCMA CAR was measured using a CAR specific reagent. In exemplary donor-matched T cell compositions, cells produced by a process involving SFM-A exhibited an increased transduction efficiency compared to cells produced by a process involving serum-containing media. In an exemplary experiment, the transduction efficiency was increased from about 53% to about 68%.

Example 3: Anti-Tumor Effect of CAR-Expressing T Cells Produced by a Serum-Free Media Process An anti-BCMA CAR+ T cell compositions were produced by a process involving the exemplary SFM-A substantially as described in Example 1. As a comparison, a T cell composition from a matched donor was produced by a similar process, except using serum-containing media. The anti-tumor effect of the generated CAR+ T compositions was assessed by monitoring tumors following adoptive transfer of cells in tumor-bearing animal models, including OPM2 human multiple myeloma disseminated xenograft mouse model.

To generate tumor-bearing mice, six- to eight-week old female NOD.Cg.Prkdc$^{scid}$IL2rg$^{tm1Wjl}$/SzJ (NSG) mice were injected with 2×10$^6$ OPM2 (multiple myeloma) cells transfected with firefly luciferase (OPM2-ffluc). Tumor size was monitored at day 13 using bioluminescence imaging and at day 14 mice were administered a single intravenous (i.v.) injection of an anti-BCMA CAR+ T cell composition that was produced by a process that included SFM-A or that was produced by a process that included serum-containing media. The assessed anti-BCMA CAR+ T cell compositions were generated from the same human donor. Cells were administered at a dose of 1×10$^6$, 5×10$^5$, or 2.5×10$^5$ CAR-expressing T cells. Cells that did not express a CAR (mock) were used as a negative control. Tumor growth and survival of the mice were monitored over a 100 day time period post administration of cells.

Anti-tumor activity of the adoptively transferred CAR-expressing cells was monitored by bioluminescence imaging on various days post-CAR T cell injection up to day 100. For bioluminescence imaging, mice received intraperitoneal (i.p.) injections of luciferin substrate (CaliperLife Sciences, Hopkinton, MA) resuspended in PBS (15 µg/g body weight). Mice were anesthetized and imaged essentially as described in WO2015/095895. The total flux (photon/s) was determined at each time point. For the negative control treated mice, animals were sacrificed between 22 and 26 days after CAR-T transfer, due to high tumor burden. CAR-expressing T cells produced with either SFM-A or serum-containing media slowed tumor growth and prolonged survival, which was generally comparable at all assessed doses.

Example 4: Assessment of Serum-Free Media Formulations in a Dual Stream Process for Generating Engineered CD4+ and CD8+ T Cells Expressing a Chimeric Antigen Receptor (CAR)

Genetically engineered human T cells expressing a chimeric antigen receptor (CAR) were produced in a process in which separate compositions of CD4+ T cells and CD8+ T cells were subjected to process steps separately. Separate compositions of CD4+ and CD8+ cells were selected from isolated PBMCs from human leukapheresis samples and cryofrozen. The selected CD4+ and CD8+ compositions were subsequently thawed and separately stimulated in the presence of paramagnetic polystyrene-coated beads with attached anti-CD3 and anti-CD28 antibodies, separately transduced with a lentiviral vector encoding the CAR and cultivated at about 37° C. to expand the cells. Each of the separate steps of activation, transduction and cultivation were carried out in the presence of SFM-A described in Example 1 or in a serum-containing media. SFM-A or serum-containing media additionally was supplemented with cytokines. The generated CD4+ and CD8+CAR-T cells were mixed 1:1 prior to assessing the cells in in vitro functional assays. Exemplary features of the produced engineered T cell compositions were compared.

A. Apoptotic Marker

Cryopreserved CAR-expressing T cell compositions, produced as generally described above, were thawed and then were cultured for up to 48 hours. A kinetic quantification of caspase 3/7 was carried out by incubating the cells with a substrate containing a recognition motif for caspase 3/7 fused to a fluorescent moiety to permit visualization and quantification of apoptosis over time.

Under all conditions, CAR-T cell compositions generated in the presence of SFM-A had lower staining for caspase 3/7 compared to T cell compositions generated with serum-containing medium during the course of the kinetic assessment. These results are consistent with an observation that T cell composition generated with the exemplary SFM-A may be healthier and have improved viability.

B. Cytokine Production

To assess antigen-dependent activity of the generated CAR+ T cell composition, generated T cell compositions were co-cultured for 24 hours with target cells transduced with the antigen recognized by the CAR or parental (non-transduced) cells not expressing the antigen. Secretion of cytokines IL-2, IFN-gamma, and TNF-alpha were measured in supernatant using a Luminex Multiplex Assay. The levels of cytokines measured in the supernatant after antigen-specific stimulation was comparable for CAR-expressing T cells produced in SFM-A compared to in serum-containing medium. No cytokine production was observed in a T cell composition from the same donor not expressing the CAR.

C. Killing of Target Cells.

CAR-expressing T cell compositions, produced in SFM-A or serum-containing media, were assessed for the function of killing target cells. Antigen-expressing target cells were co-cultured with the CAR-T cell compositions at a effector to target cell (E:T) ratio of 3:1 or 1:1. Cell lysis was assessed by adding a fluorescent caspase 3/7 Reagent to the co-cultures and target cell death was quantitated by automated image analysis. The area under the curve (AUC) of fluorescent signal was determined. A killing index was determined using the formula: 1/AUC. Improved target cell killing was observed for CAR-T cells produced with SFM-A compared to CAR-T cells produced with serum-containing medium at both 3:1 and 1:1 E:T ratios.

D. Expansion

CAR-expressing T cell compositions, produced in SFM-A or serum-containing media, were assessed for T cell expansion in response to antigen. Cryopreserved CAR-expressing T cell compositions, produced as described above, were thawed and then were co-cultured with antigen-expressing target cells. At day 4 of co-culture, expansion of T cells was assessed by counting cell numbers. Improved expansion was observed for CAR-T cells produced with SFM-A compared to CAR-T cells produced with serum-containing medium.

Example 5 Assessment of T Cell Compositions Generated by Exemplary Manufacturing Processes with Serum Free Media In an exemplary process essentially as described in Example 1, 50 CAR+ T cell compositions containing autologous T cells expressing an anti-BCMA CAR were generated from apheresis collected from 50 separate human subjects (one apheresis from each subject), including 10 healthy donors and 40 multiple myeloma patients. CD4+ and CD8+ T cells were selected from the apheresis samples and separately cryopreserved. The cells were then thawed, and the CD4+ T cells and CD8+ T cells were combined at a 1:1 ratio of viable CD4+ to CD8+ cells. The combined CD4+ and CD8+ T cells were activated, transduced with a vector encoding a CAR, expanded, and frozen by cryopreservation essentially as described in Example 1.

In an exemplary alternative process, therapeutic T cell compositions were generated by a process including immunoaffinity-based selection of T cells from leukapheresis samples from 55 individual human cancer subjects. Bulk T cells were subjected to activation and transduction with a viral vector encoding a CAR, expansion and cryopreservation.

The cells in the frozen compositions were thawed and assessed by flow cytometry for viability, expression of an apoptotic marker such as active caspase 3 (CAS)), surface expression of CD3, CD4, CD8, CD27, CD28, CCR7, and CD45RA, and CAR. The percentage of CD3+ cells, percentage of CAR+ apoptotic marker negative cells in CD3+ CAR+ cells in the compositions, and the percentages of central memory CD4+CAR+ cells and central memory CD8+CAR+ cells in the compositions were determined. Cell phenotypes of the cell compositions generated by the manufacturing process were assessed and in some aspects were compared to those of the cell compositions generated by the alternative process.

Figure 1B:
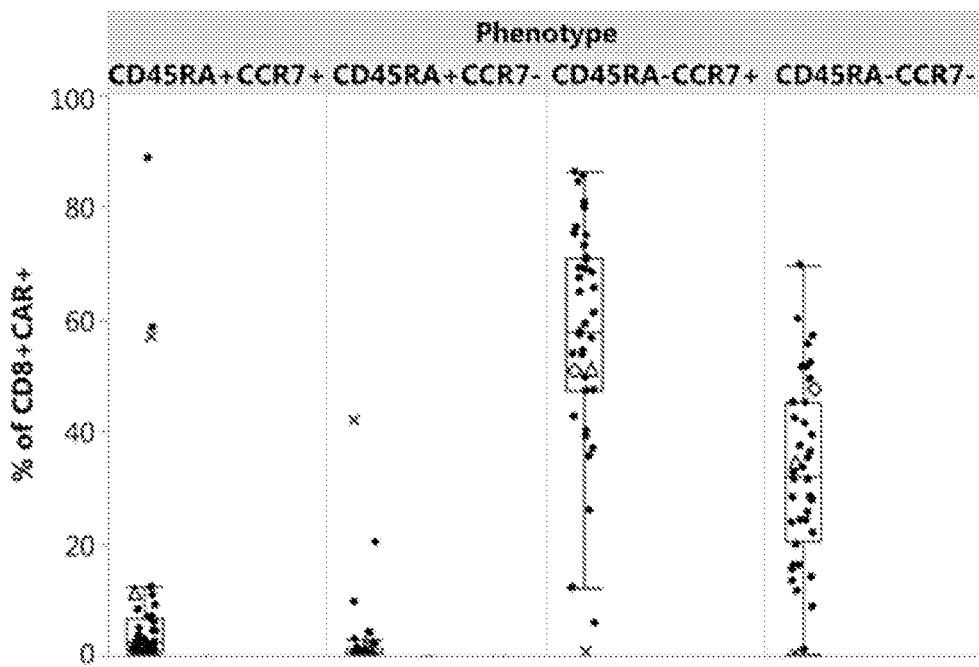
Figure 1C:
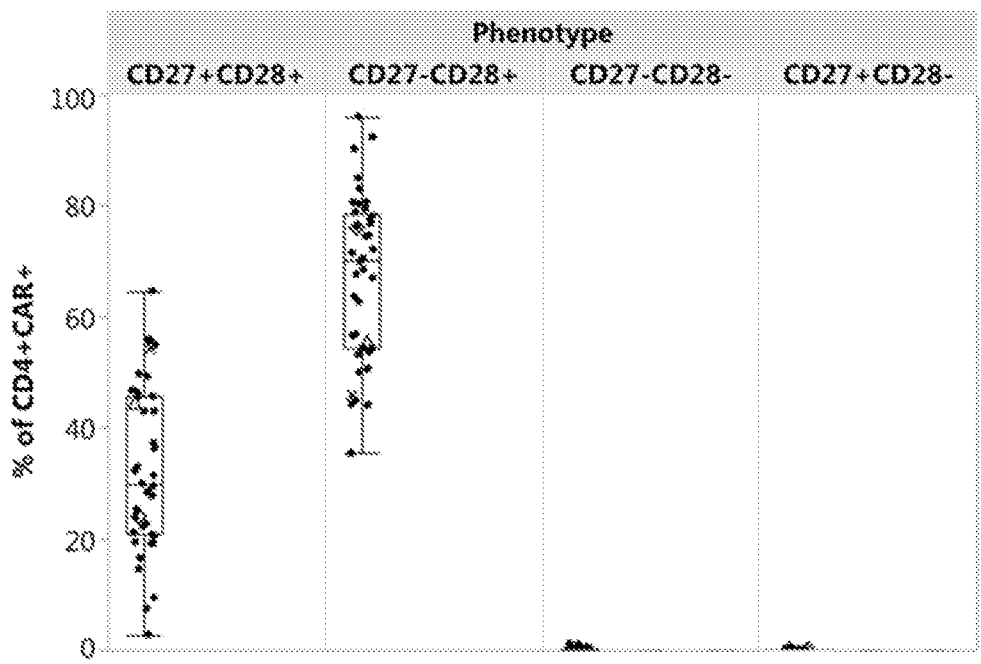
Figure 1D:
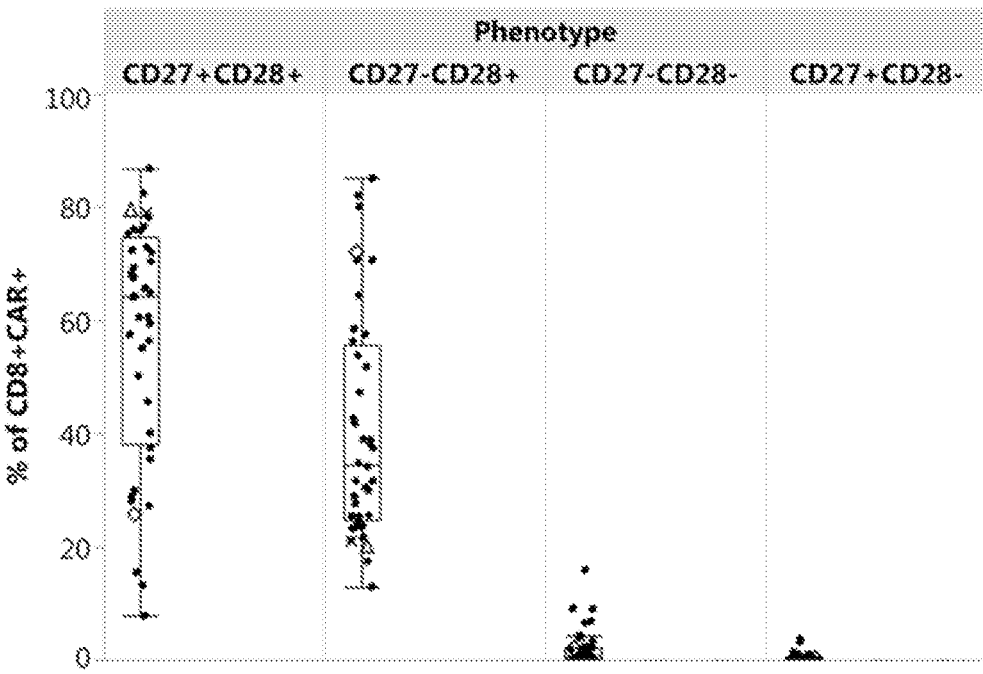

The manufacturing process of this example resulted in engineered cell compositions meeting certain pre-determined features, including threshold numbers of cells expressing the CAR in a cell composition administration to the patients, in 100% of the human biological samples on which it was carried out. FIGS. 1A and 1B show median (horizontal lines), interquartile range (box), and 1.5× interquartile range (whiskers) for percentages of cells of the indicated phenotypes (based on CD45RA and CCR7 surface expression), among CD4+CAR+ cells (FIG. 1A) and among CD8+CAR+ cells (FIG. 1B) in the compositions, respectively, for compositions individually generated from the group of samples from the 40 multiple myeloma subjects. FIGS. 1C and 1D show median (horizontal lines), interquartile range (box), and 1.5× interquartile range (whiskers) for percentages of cells of the indicated phenotypes (based on CD27 and CD28 surface expression), among CD4+ CAR+ cells (FIG. 1C) and among CD8+CAR+ cells (FIG. 1D)) in the compositions, respectively, for compositions individually generated from the group of samples from the 40 multiple myeloma subjects. For individual leukapheresis samples obtained from a range of multiple myeloma patients, using this exemplary process to generate engineered cell compositions from such samples, it was observed that the range of duration of the portion of the process from initiation of activation through harvest was between 7 and 10 days, and an average duration among these samples of approximately 7.5 days. It was further determined that the average number of cumulative population doublings over the course of the process among the different samples was approximately 7.5.

In this study, engineered T cell populations in the cell compositions produced by the exemplary process included less than 15% cells expressing an apoptotic marker, and were enriched for a central memory phenotype as compared to the starting samples and to cell compositions generated using the exemplary alternative process.

The present invention is not intended to be limited in scope to the particular disclosed embodiments, which are provided, for example, to illustrate various aspects of the invention. Various modifications to the compositions and methods described will become apparent from the description and teachings herein. Such variations may be practiced without departing from the true scope and spirit of the disclosure and are intended to fall within the scope of the present disclosure.

Sequences

| # | SEQUENCE | ANNOTATION |
|---|----------|------------|
| 1 | ESKYGPPCPPCP | spacer (IgG4hinge) (aa) |
| 2 | GAATCTAAGTACGGACCGCCCTGCCCCCCTTGCCCT | spacer (IgG4hinge) (nt) |
| 3 | ESKYGPPCPPCPGQPREPQVYTLPPSQEEMTKNQVSLTCLVKGFYPSDIAV EWESNGQPENNYKTTPPVLDSDGSFFLYSRLTVDKSRWQEGNVFSCSVMHE ALHNHYTQKSLSLSLGK | Hinge-$C_H3$ spacer |
| 4 | ESKYGPPCPPCPAPEFLGGPSVFLFPPKPKDTLMISRTPEVTCVVVDVSQE DPEVQFNWYVDGVEVHNAKTKPREEQFNSTYRVVSVLIVLHQDWLNGKEYK CKVSNKGLPSSIEKTISKAKGQPREPQVYTLPPSQEEMTKNQVSLTCLVKG FYPSDIAVEWESNGQPENNYKTTPPVLDSDGSFFLYSRLTVDKSRWQEGNV FSCSVMHEALHNHYTQKSLSLSLGK | Hinge-$C_H2$-$C_H3$ spacer |
| 5 | RWPESPKAQASSVPTAQPQAEGSLAKATTAPATTRNTGRGGEEKKKEKEKE EQEERETKTPECPSHTQPLGVYLLTPAVQDLWLRDKATFTCFVVGSDLKDA HLTWEVAGKVPTGGVEEGLLERHSNGSQSQHSRLILPRSLWNAGTSVTCTL NHPSLPPQRLMALREPAAQAPVKLSLNLLASSDPPEAASWLLCEVSGFSPP NILLMWLEDQREVNTSGFAPARPPPQPGSTTFWAWSVLRVPAPPSPQPATY TCVVSHEDSRILLNASRSLEVSYVTDH | IgD-hinge-Fc |
| 6 | LEGGGEGRGSLLTCGDVEENPGPR | T2A |
| 7 | MLLLVTSLLLCELPHPAFLLIPRKVCNGIGIGEFKDSLSINATNIKHFKNC ISISGDLHILPVAFRGDSFTHTPPLDPQELDILKTVKEITGFLLIQAWPEN RTDLHAFENLEIIRGRTKQHGQFSLAVVSLNITSLGLRSLKEISDGDVIIS GNKNLCYANTINWKKLFGTSGQKTKIISNRGENSCKATGQVCHALCSPEGC WGPEPRDCVSCRNVSRGRECVDKCNLLEGEPREFVENSECIQCHPECLPQA MNITCTGRGPDNCIQCAHYIDGPHCVKTCPAGVMGENNTLVWKYADAGHVC HLCHPNCTYGCTGPGLEGCPTNGPKIPSIATGMVGALLLLLVVALGIGLFM | tEGFR |
| 8 | FWVLVVVGGVLACYSLLVTVAFIIFWV | CD28 (amino acids 153-179 of Accession No. P10747) |
| 9 | IEVMYPPPYLDNEKSNGTIIHVKGKHLCPSPLFPGPSKP FWVLVVVGGVLACYSLLVTVAFIIFWV | CD28 (amino acids 114-179 of Accession No. P10747) |
| 10 | RSKRSRLLHSDYMNMTPRRPGPTRKHYQPYAPPRDFAAYRS | CD28 (amino acids 180-220 of P10747) |
| 11 | RSKRSRGGHSDYMNMTPRRPGPTRKHYQPYAPPRDFAAYRS | CD28 (LL to GG) |
| 12 | KRGRKKLLYIFKQPFMRPVQTTQEEDGCSCRFPEEEEGGCEL | 4-1BB (amino acids 214-255 of Q07011.1) |
| 13 | RVKFSRSADAPAYQQGQNQLYNELNLGRREEYDVLDKRRGRDPEMGGKPRR KNPQEGLYNELQKDKMAEAYSEIGMKGERRRGKGHDGLYQGLSTATKDTYD ALHMQALPPR | CD3 zeta |
| 14 | RVKFSRSAEPPAYQQGQNQLYNELNLGRREEYDVLDKRRGRDPEMGGKPRR KNPQEGLYNELQKDKMAEAYSEIGMKGERRRGKGHDGLYQGLSTATKDTYD ALHMQALPPR | CD3 zeta |
| 15 | RVKFSRSADAPAYKQGQNQLYNELNLGRREEYDVLDKRRGRDPEMGGKPRR KNPQEGLYNELQKDKMAEAYSEIGMKGERRRGKGHDGLYQGLSTATKDTYD ALHMQALPPR | CD3 zeta |
| 16 | RKVCNGIGIGEFKDSLSINATNIKHFKNCTSISGDLHILPVAFRGDSFTHT PPLDPQELDILKTVKEITGFLLIQAWPENRTDLHAFENLEIIRGRTKQHGQ FSLAVVSLNITSLGLRSLKEISDGDVIISGNKNLCYANTINWKKLFGTSGQ KTKIISNRGENSCKATGQVCHALCSPEGCWGPEPRDCVSCRNVSRGRECVD | tEGFR |

-continued

| # | SEQUENCE | ANNOTATION |
|---|---|---|
| | KCNLLEGEPREFVENSECIQCHPECLPQAMNITCTGRGPDNCIQCAHYIDG<br>PHCVKTCPAGVMGENNTLVWKYADAGHVCHLCHPNCTYGCTGPGLEGCPTN<br>GPKIPSIATGMVGALLLLLVVALGIGLFM | |
| 17 | EGRGSLLTCGDVEENPGP | T2A |
| 18 | GSGATNFSLLKQAGDVEENPGP | P2A |
| 19 | ATNFSLLKQAGDVEENPGP | P2A |
| 20 | QCTNYALLKLAGDVESNPGP | E2A |
| 21 | VKQTLNFDLLKLAGDVESNPGP | F2A |
| 22 | -PGGG-(SGGGG)5-P- wherein P is proline, G is glycine and S is serine | Linker |
| 23 | GSADDAKKDAAKKDGKS | Linker |
| 24 | atgcttctcctggtgacaagccttctgctctgtgagttaccacacccagca<br>ttcctcctgatccca | GMCSFR alpha chain signal sequence |
| 25 | MLLLVTSLLLCELPHPAFLLIP | GMCSFR alpha chain signal sequence |
| 26 | MALPVTALLLPLALLLHA | CD8 alpha signal peptide |
| 27 | EVQLVQSGAEMKKPGASLKLSCKASGYTFIDYYVYWMRQAPGQGLESMGWI<br>NPNSGGTNYAQKFQGRVTMTRDTSISTAYMELSRLRSDDTAMYYCARSQRD<br>GYMDYWGQGTLVTVSS | Variable heavy ($V_H$) Anti-BCMA |
| 28 | QSALTQPASVSASPGQSIAISCTGTSSDVGWYQQHPGKAPKLMIYEDSKRP<br>SGVSNRFSGSKSGNTASLTISGLQAEDEADYYCSSNTRSSTLVFGGGTKLT<br>VLG | Variable light ($V_L$) Anti-BCMA |
| 29 | ESKYGPPCPPCPAPPVAGPSVFLFPPKPKDTLMISRTPEVTCVVVDVSQED<br>PEVQFNWYVDGVEVHNAKTKPREEQFQSTYRVVSVLTVLHQDWLNGKEYKC<br>KVSNKGLPSSIEKTISKAKGQPREPQVYTLPPSQEEMTKNQVSLTCLVKGF<br>YPSDIAVEWESNGQPENNYKTTPPVLDSDGSFFLYSRLTVDKSRWQEGNVF<br>SCSVMHEALHNHYTQKSLSLSLGK | Hinge-$C_H2$-$C_H3$ spacer Homo sapiens |
| 30 | QIQLVQSGPELKKPGETVKISCKASGYTFTDYSINWVKRAPGKGLKWMGWI<br>NTETREPAYAYDERGRFAFSLETSASTAYLQINNLKYEDTATYFCALDYSY<br>AMDYWGQGISVTVSS | Variable heavy ($V_H$) Anti-BCMA |
| 31 | DIVLTQSPPSLAMSLGKRATISCRASESVTILGSHLIHWYQQKPGQPPTLL<br>IQLASNVQTGVPARFSGSGSRTDFTLTIDPVEEDDVAVYYCLQSRTIPRTF<br>GGGTKLEIK | Variable light ($V_L$) Anti-BCMA |
| 32 | QIQLVQSGPDLKKPGETVKLSCKASGYTFTNFGMNWVKQAPGKGFKWMAWI<br>NTYTGESYFADDFKGRFAFSVETSATTAYLQINNLKTEDTATYFCARGEIY<br>YGYDGGFAYWGQGTLVTVSA | Variable heavy ($V_H$) Anti-BCMA |
| 33 | DVVMTQSHRFMSTSVGDRVSITCRASQDVNTAVSWYQQKPGQSPKLLIFSA<br>SYRYTGVPDRFTGSGSGADFTLTISSVQAEDLAVYYCQQHYSTPWTFGGGT<br>KLDIK | Variable light ($V_L$) Anti-BCMA |
| 34 | EVQLVQSGAEVKKPGESLKISCKGSGYSFTSYWIGWVRQMPGKGLEWMGII<br>YPGDSDTRYSPSFQGHVTISADKSISTAYLQWSSLKASDTAMYYCARYSGS<br>FDNWGQGTLVTVSS | Variable heavy ($V_H$) Anti-BCMA |
| 35 | SYELTQPPSASGTPGQRVTMSCSGTSSNIGSHSVNWYQQLPGTAPKLLIYT<br>NNQRPSGVPDRFSGSKSGTSASLAISGLQSEDEADYYCAAWDGSLNGLVFG<br>GGTKLTVLG | Variable light ($V_L$) Anti-BCMA |
| 36 | GGGGS | Linker |
| 37 | GGGS | Linker |
| 38 | GGGGSGGGGSGGGGS | Linker |
| 39 | GSTSGSGKPGSGEGSTKG | Linker |

-continued

| # | SEQUENCE | ANNOTATION |
|---|---|---|
| 40 | SRGGGGSGGGGSGGGGSLEMA | Linker |
| 41 | EVQLVQSGAEVKKPGSSVKVSCKASGGTFSSYAISWVRQAPGQGLEWMGRI IPILGIANYAQKFQGRVTMTEDTSTDTAYMELSSLRSEDTAVYYCARSGYS KSIVSYMDYWGQGTLVTVSS | Variable heavy ($V_H$) Anti-BCMA |
| 42 | LPVLTQPPSTSGTPGQRVTVSCSGSSSNIGSNVVFWYQQLPGTAPKLVIYR NNQRPSGVPDRFSVSKSGTSASLAISGLRSEDEADYYCAAWDDSLSGYVFG TGTKVTVLG | Variable light ($V_L$) Anti-BCMA |
| 43 | QVQLVQSGAEVKKPGSSVKVSCKASGGTFSSYAISWVRQAPGQGLEWMGRI IPILGTANYAQKFQGRVTITADESTSTAYMELSSLRSEDTAVYYCARSGYG SYRWEDSWGQGTLVTVSS | Variable heavy ($V_H$) Anti-BCMA |
| 44 | QAVLTQPPSASGTPGQRVTISCSGSSSNIGSNYVFWYQQLPGTAPKLLIYS NNQRPSGVPDRFSGSKSGTSASLAISGLRSEDEADYYCAAWDDSLSASYVF GTGTKVTVLG | Variable light ($V_L$) Anti-BCMA |
| 45 | QVQLVQSGAEVKKPGASVKVSCKASGYTFTDYYMHWVRQAPGQRLEWMGWI NPNSGGTNYAQKFQDRITVTRDTSSNTGYMELTRLRSDDTAVYYCARSPYS GVLDKWGQGTLVTVSS | Variable heavy ($V_H$) Anti-BCMA |
| 46 | QSVLTQPPSVSGAPGQRVTISCTGSSSNIGAGFDVHWYQQLPGTAPKLLIY GNSNRPSGVPDRFSGSKSGTSASLAITGLQAEDEADYYCQSYDSSLSGYVF GTGTKVTVLG | Variable light ($V_L$) Anti-BCMA |
| 47 | RASQDISKYLN | CDR L1 |
| 48 | SRLHSGV | CDR L2 |
| 49 | GNTLPYTFG | CDR L3 |
| 50 | DYGVS | CDR H1 |
| 51 | VIWGSETTYYNSALKS | CDR H2 |
| 52 | YAMDYWG | CDR H3 |
| 53 | EVKLQESGPGLVAPSQSLSVTCTVSGVSLPDYGVSWIRQPPRKGLEWLGVI WGSETTYYNSALKSRLTIIKDNSKSQVFLKMNSLQTDDTAIYYCAKHYYYG GSYAMDYWGQGTSVTVSS | VH |
| 54 | DIQMTQTTSSLSASLGDRVTISCRASQDISKYLNWYQQKPDGTVKLLIYHT SRLHSGVPSRFSGSGSGTDYSLTISNLEQEDIATYFCQQGNTLPYTFGGGT KLEIT | VL |
| 55 | DIQMTQTTSSLSASLGDRVTISCRASQDISKYLNWYQQKPDGTVKLLIYHT SRLHSGVPSRFSGSGSGTDYSLTISNLEQEDIATYFCQQGNTLPYTFGGGT KLEITGSTSGSGKPGSGEGSTKGEVKLQESGPGLVAPSQSLSVTCTVSGVS LPDYGVSWIRQPPRKGLEWLGVIWGSETTYYNSALKSRLTIIKDNSKSQVF LKMNSLQTDDTAIYYCAKHYYYGGSYAMDYWGQGTSVTVSS | scFv |
| 56 | KASQNVGTNVA | CDR L1 |
| 57 | SATYRNS | CDR L2 |
| 58 | QQYNRYPYT | CDR L3 |
| 59 | SYWMN | CDR H1 |
| 60 | QIYPGDGDTNYNGKFKG | CDR H2 |
| 61 | KTISSVVDFYFDY | CDR H3 |
| 62 | EVKLQQSGAELVRPGSSVKISCKASGYAFSSYWMNWVKQRPGQGLEWIGQI YPGDGDTNYNGKFKGQATLTADKSSSTAYMQLSGLTSEDSAVYFCARKTIS SVVDFYFDYWGQGTTVTVSS | VH |
| 63 | DIELTQSPKFMSTSVGDRVSVTCKASQNVGINVAWYQQKPGQSPKPLIYSA TYRNSGVPDRFTGSGSGTDFTLTITNVQSKDLADYFCQQYNRYPYTSGGGT KLEIKR | VL |
| 64 | GGGGSGGGGSGGGGS | Linker |

| # | SEQUENCE | ANNOTATION |
|---|---|---|
| 65 | EVKLQQSGAELVRPGSSVKISCKASGYAFSSYWMNWVKQRPGQGLEWIGQI YPGDGDTNYNGKFKGQATLTADKSSSTAYMQLSGLTSEDSAVYFCARKTIS SVVDFYFDYWGQGTTVTVSSGGGGSGGGGSGGGGSDIELTQSPKFMSTSVG DRVSVTCKASQNVGTNVAWYQQKPGQSPKPLIYSATYRNSGVPDRFTGSGS GTDFTLTITNVQSKDLADYFCQQYNRYPYTSGGGTKLEIKR | scFv |
| 66 | HYYYGGSYAMDY | HC-CDR3 |
| 67 | HTSRLHS | LC-CDR2 |
| 68 | QQGNTLPYT | LC-CDR3 |
| 69 | gacatccagatgacccagaccacctccagcctgagcgccagcctgggcgac cgggtgaccatcagctgcgggcagccaggacatcagcaagtacctgaac tggtatcagcagaagcccgacggcaccgtcaagctgctgatctaccacacc agccggctgcacagcggcgtgcccagccggtttagcggcagcggctccggc accgactacagcctgaccatctccaacctggaacaggaagatatcgccacc tactttttgccagcagggcaacacactgccctacacctttggcggcggaaca aagctggaaatcaccggcagcacctccggcagcggcaagcctggcagcggc gagggcagcaccaagggcgaggtgaagctgcaggaaagcggccctggcctg gtggcccccagccagagcctgagcgtgacctgcaccgtgagcggcgtgagc ctgcccgactacggcgtgagctggatccggcagcccccccaggaagggcctg gaatggctgggcgtgatctggggcagcgagaccacctactacaacagcgcc ctgaagagccggctgaccatcatcaaggacaacagcaagagccaggtgttc ctgaagatgaacagcctgcagaccgacgacaccgccatctactactgcgcc aagcactactactacggcggcagctacgccatggactactggggccaggc accagcgtgaccgtgagcagc | Sequence encoding scFv |
| 70 | GSTSGSGKPGSGEGSTKG | linker |

The invention claimed is:

1. A serum-free medium for use for culturing T cells, comprising:
   (a) 1 mM to 3 mM of L-alanyl-L-glutamine;
   (b) 1 mM to 3 mM of L-glutamine;
   (c) 100 IU/mL to 200 IU/mL of IL-2;
   (d) 500 IU/mL to 1400 IU/mL of IL-7;
   (e) 100 IU/mL to 200 IU/mL of IL-15;
   (f) at least one protein, wherein the at least one protein comprises human serum albumin; and
   (g) a base medium;
   wherein the serum-free medium is free of serum.

2. The serum-free medium of claim 1, wherein:
   the concentration of IL-2 in the serum free medium is 100 IU/mL or 200 IU/mL;
   the concentration of IL-7 in the serum free medium is 600 IU/mL or 1,200 IU/mL; and
   the concentration of IL-15 in the serum free medium is 100 IU/mL or 200 IU/mL.

3. The serum-free medium of claim 1, wherein:
   the concentration of IL-2 in the serum free medium is 100 IU/mL;
   the concentration of IL-7 in the serum free medium is 600 IU/mL; and
   the concentration of IL-15 in the serum free medium is 100 IU/mL.

4. The serum-free medium of claim 1, wherein:
   the concentration of IL-2 in the serum free medium is 200 IU/mL;
   the concentration of IL-7 in the serum free medium is 1,200 IU/mL; and
   the concentration of IL-15 in the serum free medium is 200 IU/mL.

5. The serum-free medium of claim 1, wherein the at least one protein comprises human serum albumin and one or both of transferrin and insulin.

6. The serum-free medium of claim 1, wherein the concentration of the L-alanyl-L-glutamine in the serum-free medium is from 1.5 mM to 2.5 mM.

7. The serum-free medium of claim 1, wherein the concentration of the L-glutamine in the serum-free medium is from 1.5 mM to 2.5 mM.

8. The serum-free medium of claim 1, wherein the concentration of the L-alanyl-L-glutamine in the serum-free medium is from 1.5 mM to 2.5 mM, and the concentration of the L-glutamine in the serum-free medium is from 1.5 mM to 2.5 mM.

9. The serum-free medium of claim 1, wherein the base medium comprises Dulbecco's Modified Eagle's Medium (DMEM), Minimal Essential Medium (MEM), Basal Medium Eagle (BME), F-10, F-12, RPMI 1640, Glasgow's Minimal Essential Medium (GMEM), alpha Minimal Essential Medium (alpha MEM), Iscove's Modified Dulbecco's Medium, or M199.

10. The serum-free medium of claim 1, wherein the serum-free medium comprises 500 IU/mL to 1400 IU/mL of IL-7.

11. The serum-free medium of claim 1, wherein the serum-free medium comprises 100 IU/mL to 200 IU/mL of IL-15.

12. The serum-free medium of claim 1, wherein serum-free medium does not comprise phenol red.

13. The serum-free medium of claim 8, wherein the serum-free medium does not comprise phenol red.

* * * * *